US012089203B2

(12) United States Patent
MolavianJazi et al.

(10) Patent No.: US 12,089,203 B2
(45) Date of Patent: Sep. 10, 2024

(54) ADAPTIVE CROSS-CARRIER SCHEDULING AND FLEXIBLE PUCCH GROUPS

(71) Applicant: Samsung Electronics Co., Ltd., Suwon-si (KR)

(72) Inventors: Ebrahim MolavianJazi, Santa Clara, CA (US); Jeongho Jeon, San Jose, CA (US); Joonyoung Cho, Portland, OR (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 17/444,052

(22) Filed: Jul. 29, 2021

(65) Prior Publication Data
US 2022/0053522 A1 Feb. 17, 2022

Related U.S. Application Data

(60) Provisional application No. 63/156,800, filed on Mar. 4, 2021, provisional application No. 63/126,808, filed
(Continued)

(51) Int. Cl.
H04W 72/00 (2023.01)
H04L 1/1812 (2023.01)
(Continued)

(52) U.S. Cl.
CPC ....... *H04W 72/1263* (2013.01); *H04L 1/1819* (2013.01); *H04L 1/1896* (2013.01);
(Continued)

(58) Field of Classification Search
None
See application file for complete search history.

(56) References Cited

U.S. PATENT DOCUMENTS

2015/0092707 A1    4/2015  Kwon
2020/0413435 A1*   12/2020 Chin ............... H04W 72/23
(Continued)

FOREIGN PATENT DOCUMENTS

CA         3106480 A1      1/2020
WO      2016064048 A1      4/2016
(Continued)

OTHER PUBLICATIONS

"5G; NR; Physical channels and modulation (3GPP TS 38.211 version 16.2.0 Release 16)", ETSI TS 138 211 V16.2.0, Jul. 2020, 136 pages.
(Continued)

*Primary Examiner* — Brandon M Renner

(57) ABSTRACT

Methods and apparatuses for adaptive cross-carrier scheduling and flexible physical uplink control channel (PUCCH) groups. A method for receiving physical downlink control channels (PDCCHs) or transmitting PUCCHs includes receiving first information for a first group of cells and for a second group of cells and receiving second information for activation of only one of the first group of cells and the second group of cells. The method also includes determining a group of cells to be activated based on the second information and receiving the PDCCHs only on first cells from the activated group of cells or transmitting PUCCHs only on second cells from the activated group of cells.

20 Claims, 41 Drawing Sheets

Related U.S. Application Data on Dec. 17, 2020, provisional application No. 63/071,169, filed on Aug. 27, 2020, provisional application No. 63/069,970, filed on Aug. 25, 2020, provisional application No. 63/064,060, filed on Aug. 11, 2020.

(51) Int. Cl.
| | | |
|---|---|---|
| *H04L 1/1867* | (2023.01) | |
| *H04L 27/26* | (2006.01) | |
| *H04W 72/0446* | (2023.01) | |
| *H04W 72/0453* | (2023.01) | |
| *H04W 72/1263* | (2023.01) | |
| *H04W 72/20* | (2023.01) | |

(52) U.S. Cl.
CPC ... *H04L 27/26025* (2021.01); *H04W 72/0446* (2013.01); *H04W 72/0453* (2013.01); *H04W 72/20* (2023.01)

(56) References Cited

U.S. PATENT DOCUMENTS

| | | | |
|---|---|---|---|
| 2021/0051698 A1* | 2/2021 | Tsai | H04L 5/0053 |
| 2021/0266909 A1* | 8/2021 | Lin | H04L 5/0053 |
| 2022/0116875 A1* | 4/2022 | Nimbalker | H04W 52/0216 |
| 2022/0271894 A1* | 8/2022 | Li | H04W 72/0446 |

FOREIGN PATENT DOCUMENTS

| | | | |
|---|---|---|---|
| WO | 2020113999 A1 | 6/2020 | |
| WO | 2020155160 A1 | 8/2020 | |
| WO | 2021133705 A1 | 7/2021 | |

OTHER PUBLICATIONS

"5G; NR; Multiplexing and channel coding (3GPP TS 38.212 version 16.2.0 Release 16)", ETSI TS 138 212 V16.2.0, Jul. 2020, 154 pages.

"5G; NR; Physical layer procedures for control (3GPP TS 38.213 version 16.2.0 Release 16)", ETSI TS 138 213 V16.2.0, Jul. 2020, 180 pages.

"5G; NR; Physical layer procedures for data (3GPP TS 38.214 version 16.2.0 Release 16)", ETSI TS 138 214 V16.2.0, Jul. 2020, 167 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

"5G; NR; NR and NG-RAN Overall description; Stage-2 (3GPP TS 38.300 version 16.2.0 Release 16)", ETSI TS 138 300 V16.2.0, Jul. 2020, 150 pages.

International Search Report and Written Opinion issued Nov. 29, 2021 regarding International Application No. PCT/KR2021/010690, 7 pages.

Oppo, "Email report of [AT109e][046][DCCA] Fast SCell Activation (Oppo)", 3GPP TSG-RAN WG2 Meeting #109, R2-2002224, Feb. 2020, 31 pages.

Qualcomm Incorporated, "Solutions for Fast SCG and SCell Activation", 3GPP TSG-RAN WG1 #96, R1-1903028, Feb. 2019, 6 pages.

Qualcomm Incorporated, "Potential Techniques for UE Power Saving", 3GPP TSG-RAN WG1 #96, R1-1903016, Feb. 2019, 33 pages.

Extended European Search Report issued Dec. 8, 2023 regarding Application No. 21856244.5, 10 pages.

Apple Inc., "Remaining issues of DL signal and channels", 3GPP TSG-RAN WG1 #102-e, Aug. 2020, 3 pages.

\* cited by examiner

2900

- Applies to the active scheduling cell with higher priority
- Add a pseudocode block for the active scheduling cell with lower priority
  - An 'if' clause to check whether UE remaining BD/CCE budget is sufficient for the set index $j$ of the active scheduling cell with lower priority
    - If so, allocate PDCCH candidates from the UE budget Set $M_{PDCCH}^{max} = \min(M_{PDCCH}^{candidate}, M_{PDCCH}^{total,slot}) - M_{PDCCH}^{css}$ Set $C_{PDCCH}^{max} = \min(C_{PDCCH}^{candidate}, C_{PDCCH}^{total,slot}) - C_{PDCCH}^{css}$ Set $j = 0$ while $\sum_i M_{C,j}^{(i)} \le M_{PDCCH}^{max}$ AND $\left(\mathcal{M}_{CCE}(S_{uss}(j))\right) \le C_{PDCCH}^{max}$ allocate $\sum_i M_{C,j}^{(i)}$ PDCCH candidates for monitoring to USS set $S_{uss}(j)$ $M_{PDCCH}^{max} = M_{PDCCH}^{max} - \sum_i M_{C,j}^{(i)}$;

$C_{PDCCH}^{max} = C_{PDCCH}^{max} - \mathcal{M}_{CCE}(S_{uss}(j))$;

$j = j + 1$;

end while

ADAPTIVE CROSS-CARRIER SCHEDULING AND FLEXIBLE PUCCH GROUPS

CROSS-REFERENCE TO RELATED APPLICATIONS AND CLAIM OF PRIORITY

The present application claims priority to:
U.S. Provisional Patent Application No. 63/064,060, filed on Aug. 11, 2020;
U.S. Provisional Patent Application No. 63/069,970, filed on Aug. 25, 2020;
U.S. Provisional Patent Application No. 63/071,169, filed on Aug. 27, 2020;
U.S. Provisional Patent Application No. 63/126,808, filed on Dec. 17, 2020; and
U.S. Provisional Patent Application No. 63/156,800, filed on Mar. 4, 2021.
The contents of the above-identified patent documents are incorporated herein by reference.

TECHNICAL FIELD

The present disclosure relates generally to wireless communication systems and, more specifically, the present disclosure relates to adaptive cross-carrier scheduling and flexible physical uplink control channel (PUCCH) groups.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to adaptive cross-carrier scheduling and flexible PUCCH groups.

In one embodiment, a method for receiving physical downlink control channels (PDCCHs) is provided. The method includes receiving first information for a first group of cells and for a second group of cells and receiving second information for activation of only one of the first group of cells and the second group of cells. The method also includes determining a group of cells to be activated based on the second information and receiving the PDCCHs only on first cells from the activated group of cells.

In another embodiment, a user equipment (UE) is provided. The UE includes a transceiver configured to receive first information for a first group of cells and for a second group of cells and second information for activation of only one of the first group of cells and the second group of cells. The UE also includes a processor operably coupled to the transceiver. The processor is configured to determine a group of cells to be activated based on the second information. The transceiver is further configured to receive PDCCHs only on first cells from the activated group of cells.

In yet another embodiment, a base station (BS) is provided. The BS includes a transceiver configured to transmit first information for a first group of cells and for a second group of cells and second information for activation of only one of the first group of cells and the second group of cells. The BS also includes a processor operably coupled to the transceiver. The processor is configured to determine a group of cells to be based on the second information. The transceiver is further configured to transmit PDCCHs only on first cells from the activated group of cells.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 29 illustrates an example pseudo-code for SS set dropping according to embodiments of the present disclosure;

DETAILED DESCRIPTION

Figure 1:
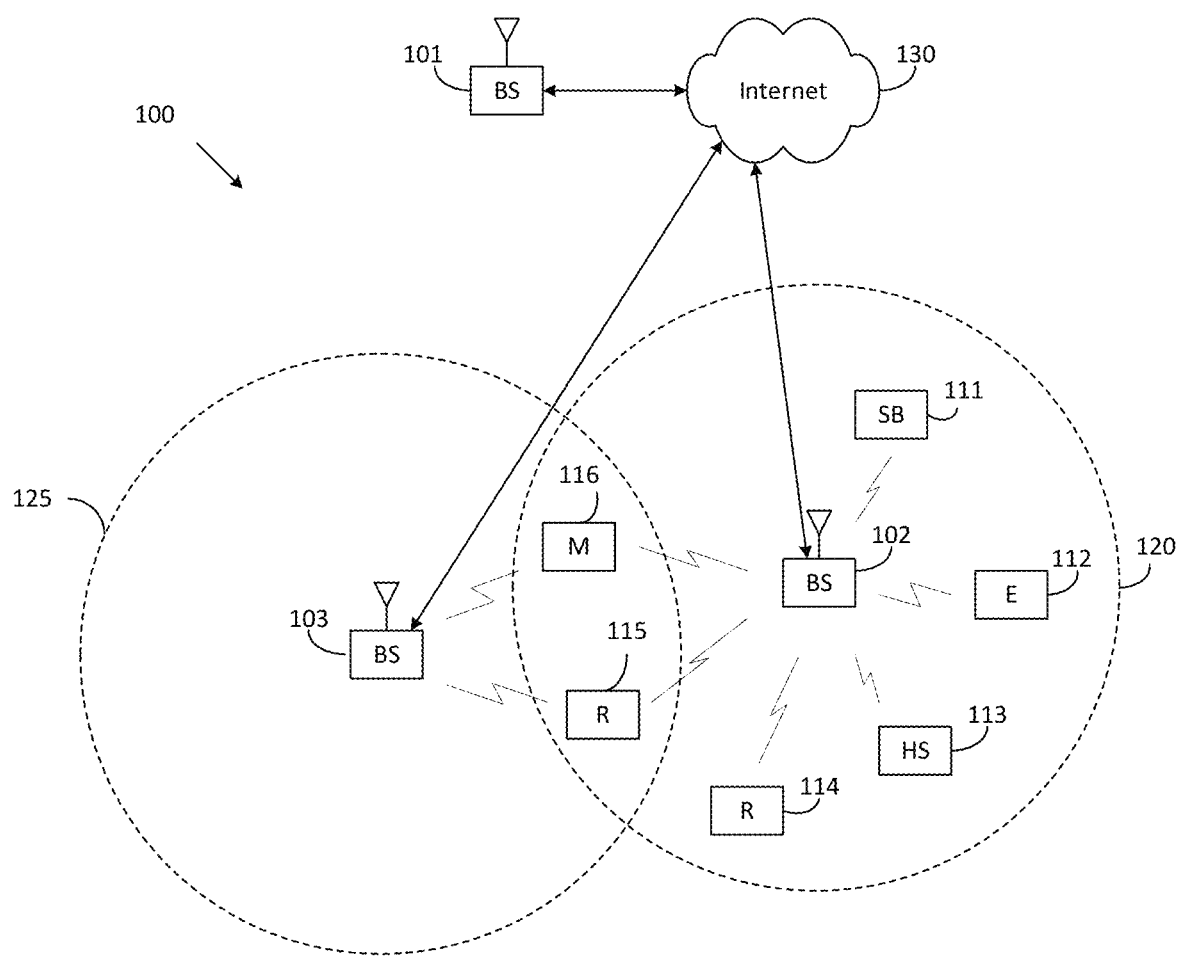
FIG. 1 illustrates an example wireless network according to embodiments of the present disclosure.
Figure 56:
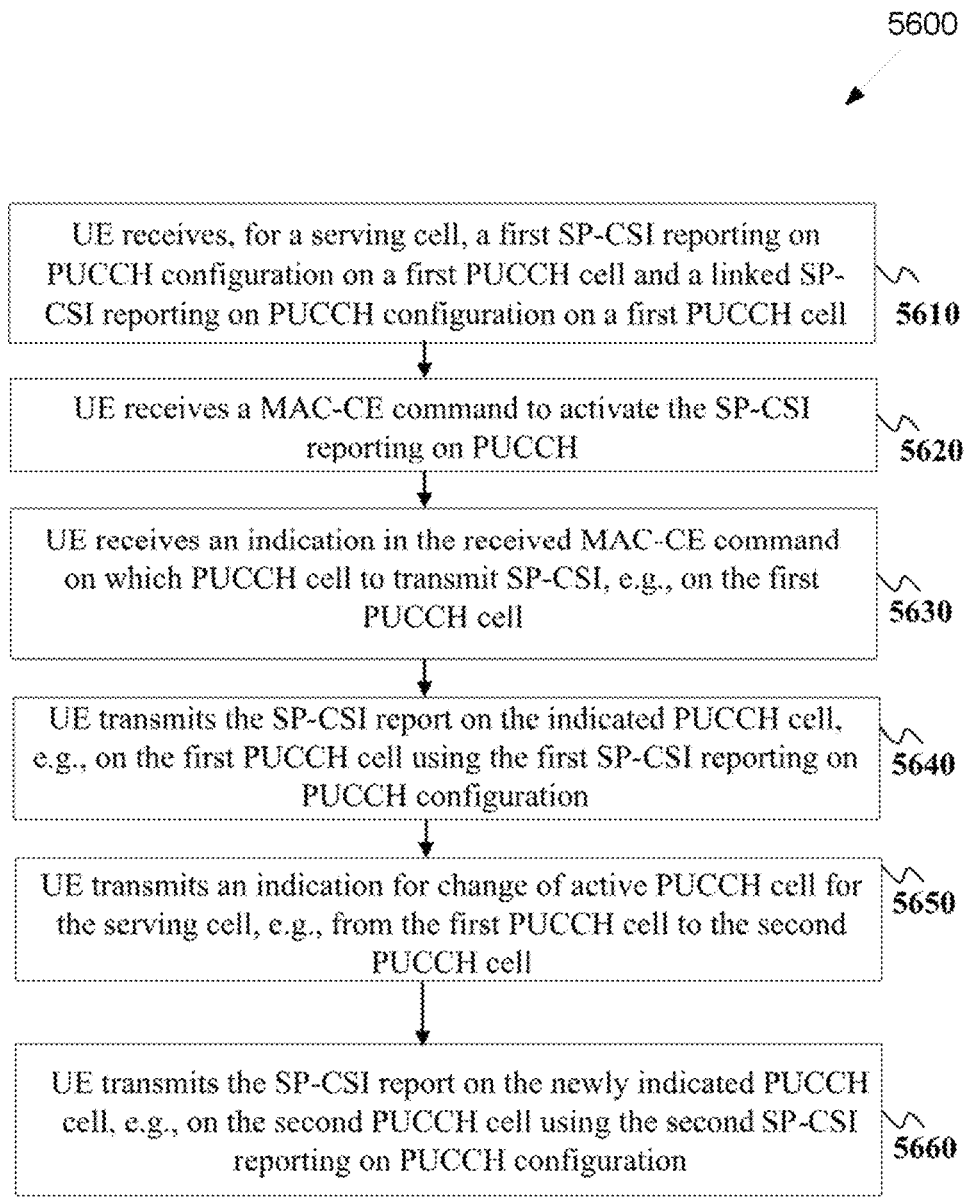
FIG. 56 illustrates a flowchart of a method for determination of SP-CSI report on PUCCH on multiple PUCCH cells according to embodiments of the present disclosure.

FIG. 1 through FIG. 56, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.2.0, "NR; Physical channels and modulation"; 3GPP TS 38.212 v16.2.0, "NR; Multiplexing and Channel coding"; 3GPP TS 38.213 v16.2.0, "NR; Physical Layer Procedures for Control"; 3GPP TS 38.214 v16.2.0, "NR; Physical Layer Procedures for Data"; 3GPP TS 38.321 Rel-16 v16.1.0, "NR; Medium Access Control (MAC) protocol specification"; 3GPP TS 38.331 v16.1.0, "NR; Radio Resource Control (RRC) Protocol Specification" and 3GPP TS 38.300 Rel-16 v16.2.0, "NR; NR and NG-RAN Overall Description; Stage 2," July 2020.

Figure 2:
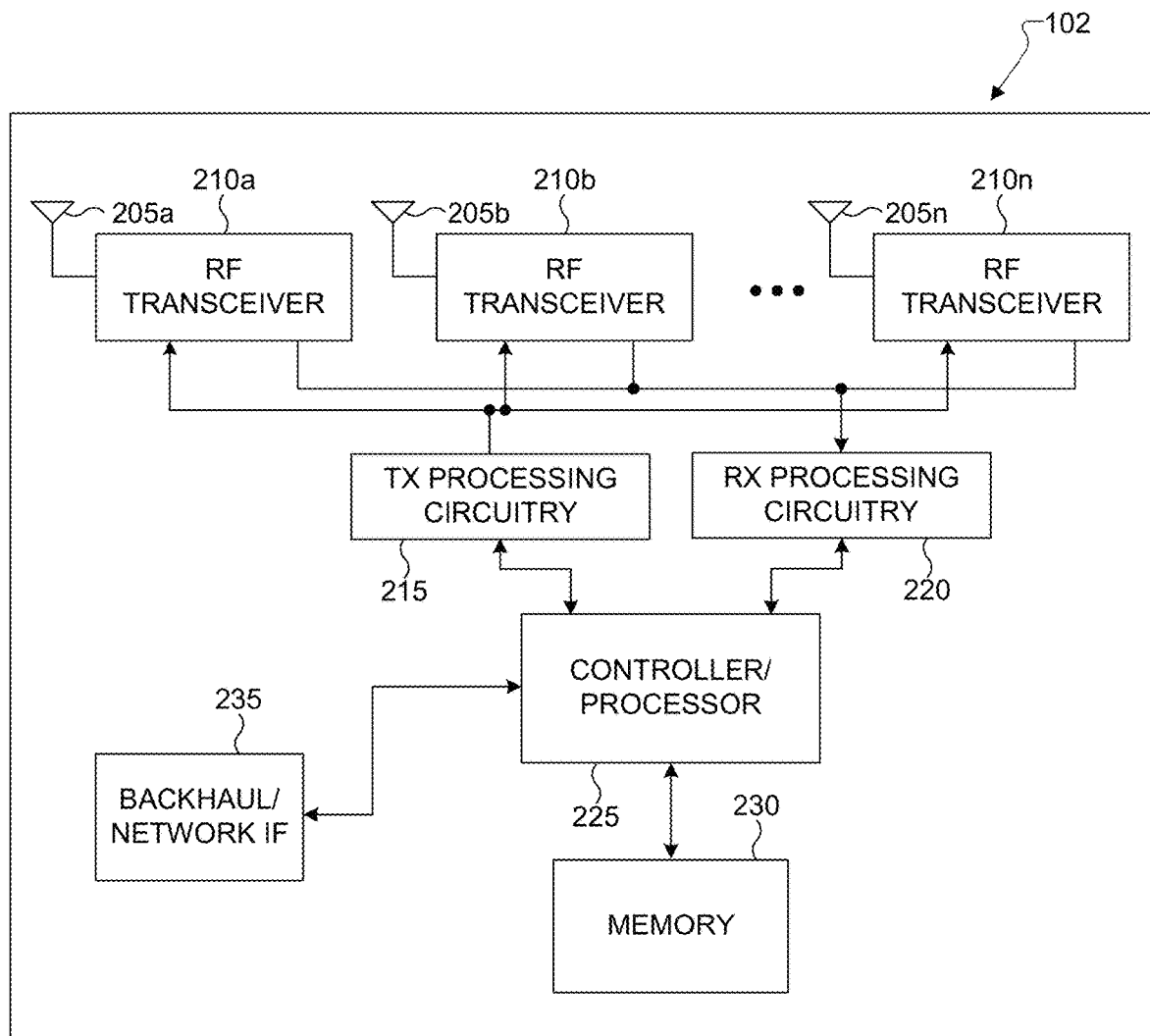
FIG. 2 illustrates an example gNB according to embodiments of the present disclosure.
Figure 3:
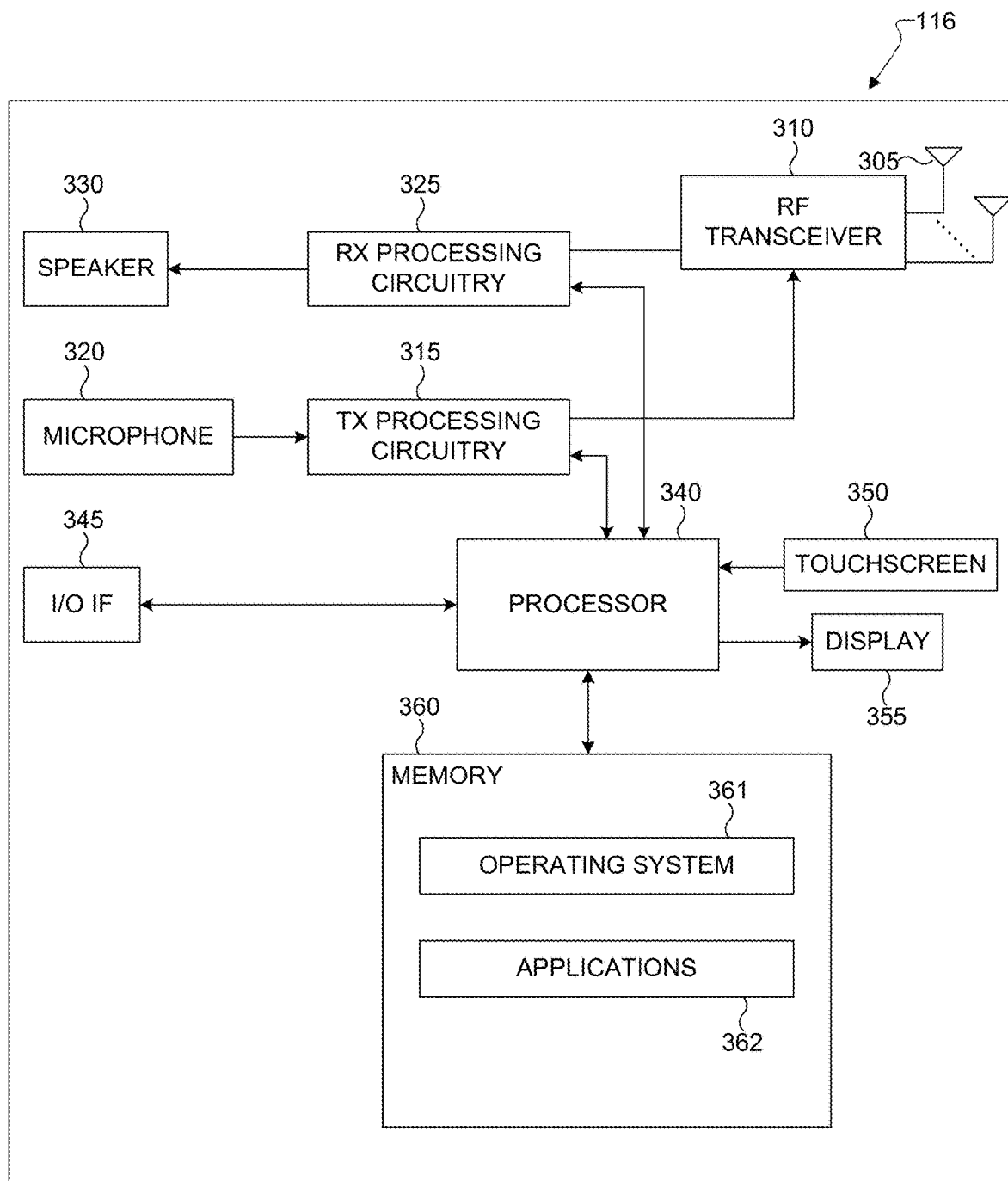
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "gNB" can refer to any component (or collection of components) configured to provide remote terminals with wireless access to a network, such as base transceiver station, a radio base station, transmit point (TP), transmit-receive point (TRP), a ground gateway, an airborne gNB, a satellite system, mobile base station, a macrocell, a femtocell, a WiFi access point (AP) and the like. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for beam management and coverage enhancements for semi-persistent and configured grant transmission. In certain embodiments, and one or more of the gNBs 101-103 includes circuitry, programming, or a combination thereof, for beam management and coverage enhancements for semi-persistent and configured grant transmission.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, and to enable various vertical applications, 5G communication systems have been developed and are currently being deployed.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), full dimensional MIMO (FD-MIMO), array antenna, an analog beam forming, large-scale antenna techniques are discussed in 5G communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
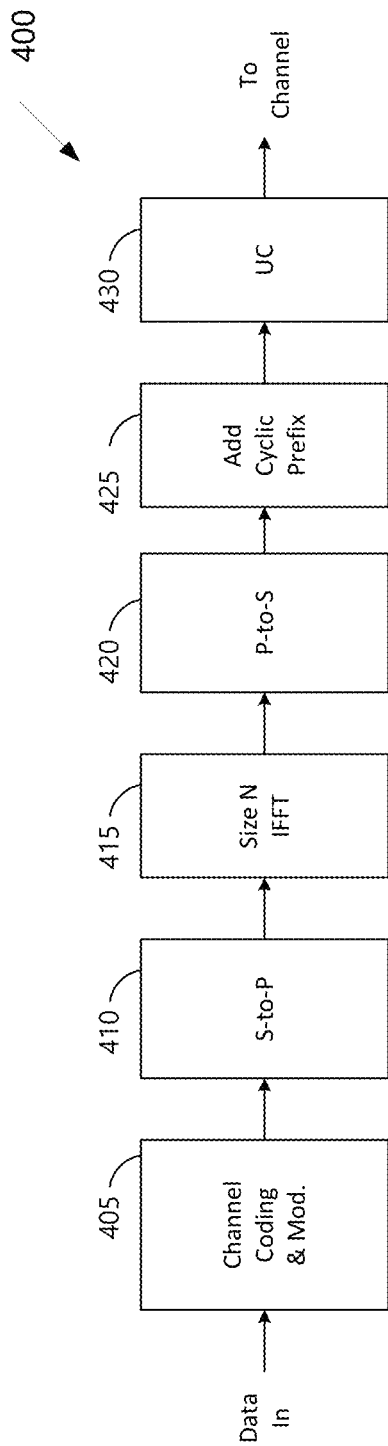
FIGS. 4 and 5 illustrate example wireless transmit and receive paths according to this disclosure.
Figure 5:
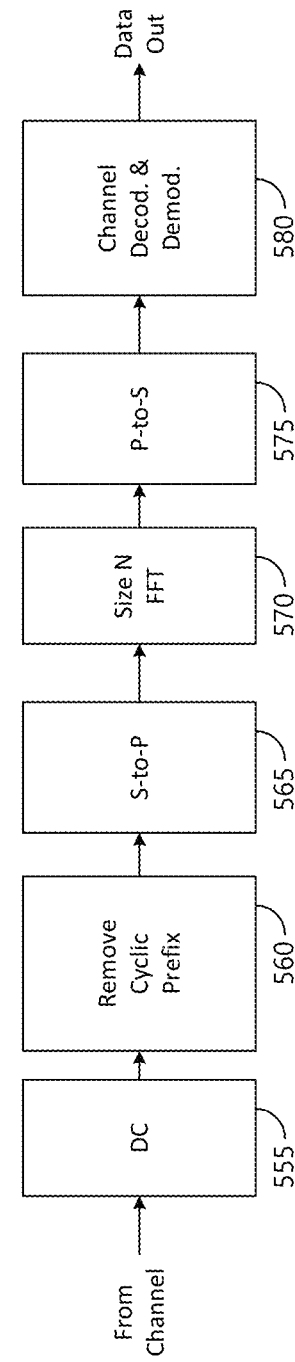

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure relates to a pre-5G or 5G or beyond 5G communication system to be provided for supporting one or more of: higher data rates, lower latency, higher reliability, and massive connectivity, beyond 4G communication system such as LTE. Although the focus of this disclosure is on 3GPP 5G NR communication systems, various embodiments may apply in general to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

This disclosure pertains cross-carrier scheduling in a carrier aggregation (CA) operation, wherein control signalling corresponding to data transmission/reception, e.g., PDCCH/DCI for scheduling PDSCH or PUSCH, for a serving cell, referred to as the scheduled cell, is transmitted by the gNB and monitored/received by the UE on another serving cell, referred to as the scheduling cell. As such, cross-carrier scheduling is a useful feature to limit control signalling to only a few serving cells, i.e., the scheduling cells, instead of all serving cells. However, the existing cross-carrier scheduling methods supported in LTE and NR Rel-15/16 consider only semi-static association of scheduled cells with the scheduling cells. For example, each scheduled cell is semi-statically configured with a single scheduling cell. Therefore, any change in the scheduling cell for a given scheduled cell would require a semi-static RRC reconfiguration, which incurs high overhead signalling as well as long latency before changes get effective.

On the other hand, different serving cells operating in different frequency bands have different physical characteristics. For example, a serving cell in lower frequency bands, such as the sub-1 GHz, offers strong channel conditions and is hence suitable for ultra-reliable low-latency communication (URLLC) and massive machine-type-communications (mMTC) use-cases. In addition, such a low-band serving cell also enjoys a lower pathloss compared to mid/high bands and can therefore provide a high coverage for enhanced mobile broadband (eMBB) service and also act as a potential "fallback" serving cell when mid-/high-band cells experience failure, deactivation, and so on.

There is a need to transmit control signalling such as DCI on a serving cell that can offer improved reliability, whenever possible and/or available, e.g., a low-band (primary) serving cell with stronger channel conditions. Reliability of the control signalling is essential for all applications, but more so for such use-cases as URLLC.

There is another need to avoid congestion of control signalling on each serving cell, such as any given scheduling cell. It is essential that sufficient control resources are guaranteed for self-scheduling of a serving cell which is also configured as a scheduling cell for other serving cells. For example, a low-band serving cell is likely to be configured as the primary cell (PCell) for a UE with CA operation, and therefore may face increased control signaling overhead from (numerous) UEs/transmissions within the same serving cell as well as UEs/transmissions from other serving cells. It is important to ensure that inherently low-band services such as URLLC and mMTC enjoy sufficient PDCCH resources on a low-band (primary) serving cell. In addition, control signalling overhead from other serving/scheduled cells need to stay within reasonable limits so that time-frequency resources on a low-band (primary) serving cell get freed-up and available for data transmission, when needed.

There is a further need to support mechanisms that enable dynamic trade-off between control channel reliability and control signaling overhead. For example, in the current specifications a low-band (primary) serving cell may be overwhelmed with many DCIs from self-scheduling as well as cross-carries scheduling, but there is no possibility for offloading cross-carrier DCIs to other scheduling cells, unless the configuration for scheduling cell(s) is RRC reconfigured. Depending on various aspects, such as change of network traffic situation and (not) availability (or not) of control resources, the network needs to dynamically offload DCI/PDCCH signaling overhead among different scheduling cells to avoid control congestion on one/some scheduling cells, while maintaining the option to have most/all of the control signaling on scheduling cell(s) with improved control channel reliability, such as a low-band (primary) serving cell with stronger channel conditions, whenever possible.

The present disclosure provides enhancements for cross-carrier scheduling in a CA operation to enable dynamic and adaptive mechanisms for offloading of control overhead corresponding to different serving cells among the scheduling cells. Various embodiments of this disclosure present solutions that allow the network to decide on which scheduling cell to transmit the control/PDCCH/DCI signaling for a given scheduled cell. The network benefits from the flexibility of changing the scheduling cell association dynamically, so that a scheduled cell can potentially monitor and receive DCI on two or more scheduling cells, either simultaneously at any given time, or one different scheduling cell at a time.

The provided adaptive cross-carrier scheduling mechanism provides the network with a tool for dynamically offloading DCI/PDCCH signaling overhead among different scheduling cells, while maintaining most/all of the control signaling on scheduling cell(s) offering improved reliability, when possible. For example, when a low-band primary serving cell with strong channel conditions is "available," i.e., it has sufficient control resources, all DCIs can be transmitted over the low-band PCell to improve DCI reliability, but when the low-band PCell is "busy," i.e., it is overwhelmed with many self-scheduling and/or cross-scheduling DCIs and therefore has insufficient control resources to handle all such transmissions, the network can offload some cross-carrier DCIs to an alternative scheduling cell.

The provided control overhead offloading mechanisms are supported with dynamic, fast and "light" signaling mechanisms in L1/L2, without a need for RRC reconfiguration, and therefore can conveniently address scenarios of (rather) fast change in network traffic situation. Such mechanisms can be also beneficial for power saving purposes, when a scheduling cell or a PUCCH cell is deactivated or switched to dormant BWP, for example, via a MAC CE command or a DCI format, in which case alternative scheduling cell(s) or PUCCH cell(s) can be used for offloading of control signaling.

One motivation for focusing on these enhanced schemes is to improve operation of 3GPP 5G NR system on low frequency bands, such as sub-1 GHz bands. The embodiments, however, are generic and can apply to other frequency bands including various frequency bands in different frequency ranges (FR) such as FR1, FR2, and FR4, e.g., mid frequency bands, such as 1-7 GHz, and high/millimetre frequency bands, such as 24-100 GHz. In addition, the embodiments are generic and can apply to various use cases and settings as well, such as eMBB, URLLC and industrial internet of things (IIoT), mMTC and IoT, sidelink/V2X, operation in unlicensed/shared spectrum (NR-U), non-terrestrial networks (NTN), operation with reduced capability (RedCap) UEs, private or non-public networks (NPN), and so on.

This disclosure addresses the above concepts and provides additional design aspects for supporting enhanced carrier aggregation operation and discloses novel solutions and embodiments for adaptive cross-carrier scheduling and advanced PDCCH monitoring operation as summarized in the following and fully elaborated further below.

In one embodiment of E-1, support for configuration of two/multiple scheduling cells for a scheduled cell & indication of at least one "active scheduling cell" for PDCCH monitoring for the scheduled cell is provided. In this embodiment, a UE which is configured with CA operation, can be configured with two or more scheduling cells for at least one serving/scheduled cell. additionally, for a scheduled cell configured with two more scheduling cells, the UE expects that at least one of the configured scheduling cells is "active" or an "active scheduling cell" for that scheduled cell, meaning that, the UE monitors PDCCH for the scheduled cell on that scheduling cell.

In one embodiment of E-1-0, first active scheduling cell is provided. In such embodiment, a scheduled cell configured with two or more scheduling cell can be configured with a "first active scheduling cell" on which the UE can perform PDCCH monitoring before receiving any L1/L2 signaling to indicate the active scheduling cell(s) for the scheduled cell.

In one example of E-1-1, scenario 1 for adaptive cross-carrier scheduling (dynamic switching of the active scheduling cell) is provided. In such example (referred to as "scenario 1"), the UE is indicated that each scheduled cell configured with multiple scheduling cells can have only a single active scheduling cell at a time.

In one example of E-1-2, scenario 2 for adaptive cross-carrier scheduling (all scheduling cells are simultaneously active) is provided. In such example (referred to as "scenario 2"), the UE is indicated that, for each scheduled cell configured with multiple scheduling cells, all of the configured scheduling cells are simultaneously active all the time.

In one example of E-1-3, scenario 3 for adaptive cross-carrier scheduling (scenario 1+scenario 2: Dynamic switching of multiple simultaneously active scheduling cells) is provided. In yet another example (referred to as "scenario 3"), the UE is indicated that, at least for one scheduled cell configured with [M]>2 scheduling cells, a strict subset of size [N], wherein 2≤[N]≤[M], of the configured scheduling cells can be simultaneously active at least in some time instances/periods.

In one embodiment E-1-4, network signaling for selection among Scenarios 1/2/3 for adaptive cross-carrier scheduling is provided. In one embodiment, a scheduled cell which is configured with two or more scheduling cells can be configured with a parameter [N] for the maximum number of active scheduling cells. The parameter [N] along with network configuration and indications for the scheduling cell(s) provide a means to distinguish between Scenarios 1/2/3, and also facilitate a transition between different Scenarios.

In one embodiment of E-2, contents of an indication for switching of active scheduling cell(s) is provided. In one embodiment, an indication for switching of active scheduling cell(s) can include a "cross-carrier scheduling/switching" (CCS) field including indications for the scheduled cell and/or the scheduling cell information.

In one embodiment of E-3, indication mechanisms for switching of active scheduling cell(s) is provided. In one embodiment, various mechanism based on network signaling and/or UE determination can be used to indicate/trigger a switching of the active scheduling cell among the at least two scheduling cells.

In one example of E-3-1, in a first mechanism for this embodiment, a UE-specific PDCCH/DCI can be used to indicate a switching of the active scheduling cell(s).

In one example of E-3-2, in a second mechanism for this embodiment, a group-common PDCCH/DCI format can be used to indicate a switching of the active scheduling cell(s). According to this mechanism, a group of UEs receive a single joint indication in a group-common DCI format including at least two fields, wherein each field corresponds to an indication for one UE for switching of active scheduling cell(s).

In one example of E-3-3, in a third mechanism for this embodiment, a downlink MAC-CE activation/deactivation command can be used to indicate a switching of the active scheduling cell(s). This mechanism facilitates a joint indication of switching of active scheduling cell(s) for multiple/several scheduling cells and/or corresponding to multiple/several scheduled cells for a single UE within a single command.

In one example of E-3-4, in a fourth mechanism for this embodiment, a scheduling cell inactivity timer method can be used to determine a switching of the active scheduling cell(s). According to this mechanism, if the UE does not receive PDCCH/DCI for a scheduled cell on an active scheduling cell until the inactivity timer for that scheduling cell expires, the UE can fall back to the default scheduling cell for PDCCH monitoring for the scheduled cell. This mechanism can provide a long-term protection for missing PDCCHs/DCI formats used for indicating a switching of the active scheduling cell.

In one example of E-3-5, in a fifth mechanism for this embodiment, a time pattern can be used to determine a switching of the active scheduling cell(s). According to this mechanism, RRC configures a time pattern for different scheduling cells corresponding to a scheduled cell, that provides a mapping between the time slots, subframes, frames and so on with the configured scheduling cells, so that a first scheduling cell is active on a first set of slots/subframes/frames, and a second scheduling cell is active in a second set of slots/subframes/frames, for PDCCH monitoring for a scheduled cell or a group of scheduled cells. The time pattern can be also provided by the specifications or by UE determines based on a predetermined rule or formula. The time pattern provided for switching and/or determination of active scheduling cell(s) can be related to a TDD UL-DL configuration for the scheduling cells and/or scheduled cells. For example, a gNB/scheduler can configure a first set of slots/subframes for the scheduling PCell and another for a scheduling SCell, e.g., the slots/subframes for PCell can be the DL slots/subframes in a TDD UL-DL configuration on PCell, and the slots/subframes for SCell can be the UL slots/subframes in a TDD UL-DL configuration on the PCell.

In one embodiment of E-4, timeline aspects for change of active scheduling cell(s) is provided. In one embodiment, when network signaling is used to indicate a switching of the active scheduling cell among the at least two scheduling cells, the UE can operate PDCCH monitoring with various methods during a time period, e.g., referred to as a scheduling cell(s) "activation" time, from a time when the UE receives a gNB indication for switching of the active scheduling cell(s) until a time when the UE can start to receive DCI on a new active scheduling cell(s).

In one embodiment of E-5, search space set configuration for a scheduled cell with multiple active scheduling cell(s) is provided. In one embodiment, when a UE is configured with at least two scheduling cells for a given scheduled cell, a PDCCH configuration in the scheduled cell includes a list of search space (SS) sets, wherein for each SS set in the list, a cell index corresponding to the scheduling cell is configured.

In one embodiment of E-6, determination of "total" limits for PDCCH blind decoding (BD) is provided when operating in cross-carrier scheduling mode with at least two active scheduling cells is provided. In one embodiment, when a UE is configured with at least two scheduling cells for a given scheduled cell, determination of a total number of DL component carriers (DL CCs) and a corresponding limit on the total number of PDCCH candidates $M_{PDCCH}^{total,\ slot,\ \mu}$ (resp. non-overlapped CCEs $C_{PDCCH}^{total,\ slot,\ \mu}$) can be based on a numerology(ies) of the PDCCH scheduling cells for the scheduled cell(s).

In one embodiment of E-7, determination of "maximum" limits for PDCCH BD is provided when operating in cross-carrier scheduling mode with at least two active scheduling cells is provided. In one embodiment, when a UE is configured with at least two scheduling cells for a given scheduled cell, the UE can determine a limit on the maximum number of PDCCH candidates $M_{PDCCH}^{max,\ slot,\ \mu}$ (resp. non-overlapped CCEs $C_{PDCCH}^{max,\ slot,\ \mu}$) for the scheduled cell based on a number of scheduling cell(s) and a numerology(ies) of the scheduling cells for the scheduled cell(s). According to this embodiment, for the maximum per-slot/per-span per scheduled cell limit on BD/CCE in the two active scheduling cells corresponding to a single scheduled cell, such as $M_{PDCCH}^{max,\ slot,\ \mu}$ or $C_{PDCCH}^{max,\ slot,\ \mu}$, the number of PDCCH candidates/non-overlapped CCEs in each active scheduling cell can be individually limited by a UE's BD/CCE budget or capability, or by a scaled version of a UE's BD/CCE budget or capability, or an aggregate number of PDCCH candidates/non-overlapped CCEs across both active scheduling cells is collectively limited by the UE's BD/CCE budget.

In one embodiment of E-8, priority levels for SS set configuration for handling SS set overbooking and dropping is provided. In one embodiment, when a UE is configured with at least two scheduling cells for a given scheduled cell, and the scheduled cell is associated with at least two active scheduling cells, an SS set for the scheduled cell associated with a CORESET in a scheduling cell can be configured with a priority level, so that different SS sets on different active scheduling cells for a same scheduled cell can be prioritized among each other. According to this embodiment, the UE can monitor a first SS set on an active scheduling cell (e.g., a first scheduling cell) with higher priority before monitoring a second SS set on another active scheduling cell (e.g., a second scheduling cell) with a lower priority. In addition, if a UE budget (as specified in the specifications) for monitoring PDCCH candidates and/or non-overlapped CCEs is consumed with SS sets with higher priority, the UE can drop a/some SS set(s) with lower priority.

In one embodiment of E-9, joint PDCCH transmission for a scheduled cell from two different scheduling cells is provided. In one embodiment, a UE is configured with at least two scheduling cells for a given scheduled cell, wherein the two scheduling cells cooperate for jointly transmitting PDCCH, e.g., for DCI formats with large sizes, in the sense that, some CCEs of a PDCCH are transmitted by one active scheduling cell, and other remaining CCEs of the PDCCH are transmitted by the other active scheduling cell.

While certain portions of this application use numbered embodiments, this is for ease of explanation only and not intended as any type of limitation on the elements of the present disclosure that can be utilized together. In particular, unless technically impossible, any elements from any of the embodiments, either numbered or unnumbered, discussed herein can be utilized together in any suitable combination or excluded in embodiments of the present disclosure.

Throughout the present disclosure, the terms "synchronization signal (SS)/physical broadcasting channel PBCH) block (SSB)" and "SS/PBCH block" are used interchangeably. Throughout the present disclosure, the term "configuration" and variations thereof (such as "configured" and so on) are used to refer to one or more of: a system information signalling such as by a master information block (MIB) or a system information block (SIB), a common higher layer/RRC signalling, and a dedicated higher layer/RRC signalling.

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same physical resource group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same code division multiplexing (CDM) group are quasi co-located with respect to Doppler shift, Doppler spread, average delay, delay spread, and spatial Rx. The UE may also assume that DMRS ports associated with a PDSCH are quasi co-location (QCL) with QCL Type A, Type D (when applicable) and average gain. The UE may further assume that no DM-RS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DMRS ports of the PDSCH, the DMRS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs.

The quasi co-location types corresponding to each DL RS are given by the higher layer parameter qcl-Type in QCL-Info and may take one of the following values: (1) "QCL-TypeA": {Doppler shift, Doppler spread, average delay, delay spread}; (2) "QCL-TypeB": {Doppler shift, Doppler spread; "QCL-TypeC": {Doppler shift, average delay}; and/or (3) "QCL-TypeD": {Spatial Rx parameter}.

The UE receives a MAC-CE activation command to map up to [N] (e.g., N=8) transmission configuration indicator (TCI) states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot e.g. $n+3N_{slot}^{subframe,\mu}$.

The PDCCH can be used to schedule DL transmissions on PDSCH and UL transmissions on PUSCH, where the DCI on PDCCH includes: (1) downlink assignments containing at least modulation and coding format, resource allocation, and hybrid-ARQ information related to DL-SCH; and/or (2)

uplink scheduling grants containing at least modulation and coding format, resource allocation, and hybrid-ARQ information related to UL-SCH.

In addition to scheduling, PDCCH can be used to for: (1) activation and deactivation of configured PUSCH transmission with configured grant; (2) activation and deactivation of PDSCH semi-persistent transmission; (3) notifying one or more UEs of the slot format; (4) notifying one or more UEs of the PRB(s) and OFDM symbol(s) where the UE may assume no transmission is intended for the UE; (5) transmission of transmit power control (TPC) commands for PUCCH and PUSCH; (6) transmission of one or more TPC commands for SRS transmissions by one or more UEs; (7) switching a UE's active bandwidth part; (8) initiating a random access procedure; and (9) indicating the UE(s) to monitor the PDCCH during the next occurrence of the discontinuous reception (DRX) on-duration; and/or (10) in integrated access and backhaul (IAB) context, indicating the availability for soft symbols of an IAB-DU.

A UE monitors a set of PDCCH candidates in the configured monitoring occasions in one or more configured control resource SETs (CORESETs) according to the corresponding search space configurations.

A CORESET includes a set of PRBs with a time duration of 1 to 3 OFDM symbols. The resource units resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH. Each resource element group carrying PDCCH carries its own DMRS. QPSK modulation is used for PDCCH.

A UE monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

If a UE is provided monitoringCapabilityConfig-r16 for a serving cell, the UE obtains an indication to monitor PDCCH on the serving cell for a maximum number of PDCCH candidates and non-overlapping CCEs: per slot, if monitoringCapabilityConfig-r16=r15monitoringcapability, or per span, if monitoringCapabilityConfig-r16=r16monitoringcapability. If the UE is not provided monitoringCapabilityConfig-r16, the UE monitors PDCCH on the serving cell per slot.

A UE can indicate a capability to monitor PDCCH according to one or more of the combinations (X, Y)=(2, 2), (4, 3), and (7, 3) per SCS configuration of $\mu=0$ and $\mu=1$. A span is a number of consecutive symbols in a slot where the UE is configured to monitor PDCCH. Each PDCCH monitoring occasion is within one span. If a UE monitors PDCCH on a cell according to combination (X, Y), the UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y.

If a UE indicates a capability to monitor PDCCH according to multiple (X, Y) combinations and a configuration of search space sets to the UE for PDCCH monitoring on a cell results to a separation of every two consecutive PDCCH monitoring spans that is equal to or larger than the value of X for one or more of the multiple combinations (X, Y), the UE monitors PDCCH on the cell according to the combination (X, Y), from the one or more combinations (X, Y), that is associated with the largest maximum number of $C_{PDCCH}^{max,(X,Y),\mu}$ and $M_{PDCCH}^{max,(X,Y),\mu}$ defined in TABLE 2 and TABLE 4.

A UE capability for PDCCH monitoring per slot or per span on an active DL BWP of a serving cell is defined by a maximum number of PDCCH candidates and non-overlapped CCEs the UE can monitor per slot or per span, respectively, on the active DL BWP of the serving cell. If a UE indicates in UE-NR-Capability a carrier aggregation capability larger than 4 serving cells, the UE includes in UE-NR-Capability an indication for a maximum number of PDCCH candidates the UE can monitor per slot when the UE is configured for carrier aggregation operation over more than 4 cells.

When a UE is not configured for NR-DC operation, the UE determines a capability to monitor a maximum number of PDCCH candidates per slot that corresponds to $N_{cells}^{cap}$ downlink cells, where $N_{cells}^{cap}$ is the number of configured downlink cells if the UE does not provide pdcch-BlindDetectionCA, otherwise, $N_{cells}^{cap}$ is the value of pdcch-BlindDetectionCA.

If a UE indicates in UE-NR-Capability a carrier aggregation capability larger than 4 serving cells and the UE is not provided monitoringCapabilityConfig-r16 for any downlink cell or if the UE is provided monitoringCapabilityConfig-r16=r15monitoringcapability for all downlink cells where the UE monitors PDCCH, the UE includes in UE-NR-Capability an indication for a maximum number of PDCCH candidates and for a maximum number of non-overlapped CCEs the UE can monitor per slot when the UE is configured for carrier aggregation operation over more than 4 cells.

When a UE is not configured for NR-DC operation, the UE determines a capability to monitor a maximum number of PDCCH candidates and a maximum number of non-overlapped CCEs per slot that corresponds to $N_{cells}^{cap}$ downlink cells, where $N_{cells}^{cap}$ is $N_{cells,0}^{DL}+R \cdot N_{cells,1}^{DL}$ if the UE does not provide pdcch-BlindDetectionCA where $N_{cells,0}^{DL}+N_{cells,1}^{DL}$ is the number of configured downlink serving cells, otherwise, $N_{cells}^{cap}$ is the value of pdcch-BlindDetectionCA For each DL BWP configured to a UE in a serving cell, the UE can be provided by higher layer signalling with: P≤3 CORESETs if CORESETPoolIndex is not provided, or if a value of CORESETPoolIndex is same for all CORESETs if CORESETPoolIndex is provided; and/or P≤5 CORESETs if CORESETPoolIndex is not provided for a first CORESET, or is provided and has a value 0 for a first CORESET, and is provided and has a value 1 for a second CORESET.

For each CORESET, the UE is provided the following by ControlResourceSet: (1) a CORESET index p, by controlResourceSetId, where 0≤p<12 if CORESETPoolIndex is not provided, or if a value of CORESETPoolIndex is same for all CORESETs if CORESETPoolIndex is provided; and 0<p<16 if CORESETPoolIndex is not provided for a first CORESET, or is provided and has a value 0 for a first CORESET, and is provided and has a value 1 for a second CORESET; (2) a DM-RS scrambling sequence initialization value by pdcch-DMRS-ScramblingID; (3) a precoder granularity for a number of REGs in the frequency domain where the UE can assume use of a same DM-RS precoder by precoderGranularity; (4) a number of consecutive symbols provided by duration; (5) a set of resource blocks provided by frequencyDomainResources; (6) CCE-to-REG mapping parameters provided by cce-REG-MappingType; (7) an antenna port quasi co-location, from a set of antenna port quasi co-locations provided by TCI-State, indicating quasi co-location information of the DM-RS antenna port for PDCCH reception in a respective CORESET; if the UE is provided by simultaneousTCI-UpdateList-r16 or simultaneousTCI-UpdateListSecond-r16 up to two lists of cells for simultaneous TCI state activation, the UE applies the antenna port quasi co-location provided by TCI-States with same activated tci-StateID value to CORESETs with index p in all configured DL BWPs of all configured cells in a list determined from a serving cell index provided by a MAC CE command; and (8) an indication for a presence or absence of a transmission configuration indication (TCI) field for a DCI format, other than DCI format 1_0, that schedules PDSCH receptions or indicates SPS PDSCH release and is transmitted by a PDCCH in CORESET p, by tci-PresentInDCI or tci-PresentInDCI-ForDCIFormat1_2.

When precoderGranularity=allContiguousRBs, a UE does not expect: (1) to be configured a set of resource blocks of a CORESET that includes more than four sub-sets of resource blocks that are not contiguous in frequency; and (2) any RE of a CORESET to overlap with any RE determined from lte-CRS-ToMatchAround, or from LTE-CRS-PatternList-r16, or with any RE of a SS/PBCH block.

For each CORESET in a DL BWP of a serving cell, a respective frequencyDomainResources provides a bitmap: (1) if a CORESET is not associated with any search space set configured with freqMonitorLocation-r16, the bits of the bitmap have a one-to-one mapping with non-overlapping groups of 6 consecutive PRBs, in ascending order of the PRB index in the DL BWP bandwidth of $N_{RB}^{BWP}$ PRBs with starting common RB position $N_{BWP}^{start}$, where the first common RB of the first group of 6 PRBs has common RB index $6 \cdot \lceil N_{BWP}^{start}/6 \rceil$ if rb-Offset-r16 is not provided, or the first common RB of the first group of 6 PRBs has common RB index $N_{BWP}^{start}+N_{RB}^{offset}$ where $N_{RB}^{offset}$ is provided by rb-Offset-r16; and (2) if a CORESET is associated with at least one search space set configured with freqMonitorLocation-r16, the first $N_{RBG,set0}^{size}$ bits of the bitmap have a one-to-one mapping with non-overlapping groups of 6 consecutive PRBs, in ascending order of the PRB index in each RB set k in the DL BWP bandwidth of $N_{RB}^{BWP}$ PRBs with starting common RB position $RB_{s0+k,DL}^{start,\mu}$ [TS 38.214], where the first common RB of the first group of 6 PRBs has common RB index $RB_{s0+k,DL}^{start,\mu}+N_{RB}^{offset}$ and k is indicated by freqMonitoringLocations-r16 if provided for a search space set; otherwise, k=0. $N_{RBG,set0}^{size}=\lfloor(N_{RB,set0}^{size}-N_{RB}^{offset})/6\rfloor$, $N_{RB,set0}^{size}$ is a number of available PRBs in the RB set 0 for the DL BWP, and $N_{RB}^{offset}$ is provided by rb-Offset-r16 or $N_{RB}^{offset}=0$ if rb-Offset-r16 is not provided.

For a CORESET other than a CORESET with index 0, (1) if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in [TS 38.321], the UE assumes that the DM-RS antenna port associated with PDCCH receptions is quasi co-located with the SS/PBCH block the UE identified during the initial access procedure; and (2) if a UE has been provided a configuration of more than one TCI states by tci-StatesPDCCH-ToAddList and tci-StatesPDCCH-ToReleaseList for the CORESET as part of Reconfiguration with sync procedure as described in [TS 38.331] but has not received a MAC CE activation command for one of the TCI states as described in [TS 38.321], the UE assumes that the DM-RS antenna port associated with PDCCH receptions is quasi co-located with the SS/PBCH block or the CSI-RS resource the UE identified during the random access procedure initiated by the Reconfiguration with sync procedure as described in [TS 38.331].

For a CORESET with index 0, the UE assumes that a DM-RS antenna port for PDCCH receptions in the CORESET is quasi co-located with: (1) the one or more DL RS configured by a TCI state, where the TCI state is indicated by a MAC CE activation command for the CORESET, if any, or (2) a SS/PBCH block the UE identified during a most recent random access procedure not initiated by a PDCCH order that triggers a contention-free random access procedure, if no MAC CE activation command indicating a TCI state for the CORESET is received after the most recent random access procedure.

For a CORESET other than a CORESET with index 0, if a UE is provided a single TCI state for a CORESET, or if the UE receives a MAC CE activation command for one of the provided TCI states for a CORESET, the UE assumes that the DM-RS antenna port associated with PDCCH receptions in the CORESET is quasi co-located with the one or more DL RS configured by the TCI state.

For a CORESET with index 0, the UE expects that QCL-TypeD of a CSI-RS in a TCI state indicated by a MAC CE activation command for the CORESET is provided by a SS/PBCH block, if the UE receives a MAC CE activation command for one of the TCI states, the UE applies the activation command in the first slot that is after slot $k+3 \cdot N_{slot}^{subframe, \mu}$ where k is the slot where the UE would transmit a PUCCH with HARQ-ACK information for the PDSCH providing the activation command and μ is the SCS configuration for the PUCCH. The active BWP is defined as the active BWP in the slot when the activation command is applied.

For each DL BWP configured to a UE in a serving cell, the UE is provided by higher layers with S≤10 search space sets where, for each search space set from the S search space sets, the UE is provided the following by SearchSpace: (1) a search space set index s, 0≤s<40, by searchSpaceId; (2) an association between the search space set s and a CORESET p by controlResourceSetId; (3) a PDCCH monitoring periodicity of $k_s$ slots and a PDCCH monitoring offset of $o_s$ slots, by monitoringSlotPeriodicityAndOffset; (4) a PDCCH monitoring pattern within a slot, indicating first symbol(s) of the CORESET within a slot for PDCCH monitoring, by monitoringSymbolsWithinSlot; (5) a duration of $T_s<k_s$ slots indicating a number of slots that the search space set s exists by duration; (6) a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively; and/or (7) an indication that search space set s is either a CSS set or a USS set by searchSpaceType.

The UE is further provided: if search space set s is a CSS set: (1) an indication by dci-Format0-0-AndFormat1-0 to monitor PDCCH candidates for DCI format 0_0 and DCI format 1_0; (2) an indication by dci-Format2-0 to monitor one or two PDCCH candidates, or to monitor one PDCCH candidate per RB set if the UE is provided freqMonitorLocation-r16 for the search space set, for DCI format 2_0 and a corresponding CCE aggregation level; (3) an indication by dci-Format2-1 to monitor PDCCH candidates for DCI format 2_1; (4) an indication by dci-Format2-2 to monitor PDCCH candidates for DCI format 2_2; (5) an indication by dci-Format2-3 to monitor PDCCH candidates for DCI format 2_3; (6) an indication by dci-Format2-4 to monitor PDCCH candidates for DCI format 2_4; and/or (7) an indication by dci-Format2-6 to monitor PDCCH candidates for DCI format 2_6.

The UE is further provided: if search space set s is a USS set, an indication by dci-Formats to monitor PDCCH candidates either for DCI format 0_0 and DCI format 1_0, or for DCI format 0_1 and DCI format 1_1, or an indication by dci-Formats-Rel16 to monitor PDCCH candidates for DCI format 0_0 and DCI format 1_0, or for DCI format 0_1 and DCI format 1_1, or for DCI format 0_2 and DCI format 1_2, or, if a UE indicates a corresponding capability, for DCI format 0_1, DCI format 1_1, DCI format 0_2, and DCI format 1_2, or for DCI format 3_0, or for DCI format 3_1, or for DCI format 3_0 and DCI format 3_1.

The UE is further provided: a bitmap by freqMonitorLocation-r16, if provided, to indicate an index of one or more RB sets for the search space set s, where the MSB k in the bitmap corresponds to RB set k−1 in the DL BWP. For RB set k indicated in the bitmap, the first PRB of the frequency domain monitoring location confined within the RB set is given by $RB_{s0+k,DL}^{start,\mu}+N_{RB}^{offset}$, where $RB_{s0+k,DL}^{start,\mu}$ is the index of first common RB of the RB set k [TS 38.214], and $N_{RB}^{offset}$ is provided by rb-Offset-r16 or $N_{RB}^{offset}=0$ if rb-Offset-r16 is not provided. For each RB set with a corresponding value of 1 in the bitmap, the frequency domain resource allocation pattern for the monitoring location is determined based on the first $N_{RBG,set}\, o^{size}$ bits in frequencyDomainResources provided by the associated CORESET configuration.

If the monitoringSymbolsWithinSlot indicates to a UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

A UE does not expect to be provided a first symbol and a number of consecutive symbols for a CORESET that results to a PDCCH candidate mapping to symbols of different slots. A UE does not expect any two PDCCH monitoring occasions on an active DL BWP, for a same search space set or for different search space sets, in a same CORESET to be separated by a non-zero number of symbols that is smaller than the CORESET duration.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^{\mu}$ [TS 38.211] in a frame with number $n_f$ if $(n_f \cdot N_{slot}^{frame,\mu}+n_{s,f}^{\mu}-o_s) \mod k_s=0$. The UE monitors PDCCH candidates for search space set s for $T_s$ consecutive slots, starting from slot $n_{s,f}^{\mu}$, and does not monitor PDCCH candidates for search space set s for the next $k_s-T_s$ consecutive slots.

A USS at CCE aggregation level $L \in \{1, 2, 4, 8, 16\}$ is defined by a set of PDCCH candidates for CCE aggregation level L.

If a UE is configured with CrossCarrierSchedulingConfig for a serving cell the carrier indicator field value corresponds to the value indicated by CrossCarrierSchedulingConfig.

For an active DL BWP of a serving cell on which a UE monitors PDCCH candidates in a USS, if the UE is not configured with a carrier indicator field, the UE monitors the PDCCH candidates without carrier indicator field. For an active DL BWP of a serving cell on which a UE monitors PDCCH candidates in a USS, if a UE is configured with a carrier indicator field, the UE monitors the PDCCH candidates with carrier indicator field.

A UE does not expect to monitor PDCCH candidates on an active DL BWP of a secondary cell if the UE is configured to monitor PDCCH candidates with carrier indicator field corresponding to that secondary cell in another serving cell. For the active DL BWP of a serving cell on which the UE monitors PDCCH candidates, the UE monitors PDCCH candidates at least for the same serving cell.

For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are given by $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i$$

where for any CSS, $$Y_{p,n_{s,f}^{\mu}} = 0;$$

for a USS, $$Y_{p,n_{s,f}^{\mu}} = \left( A_p \cdot Y_{p,n_{s,f}^{\mu}-1} \right) \mod D,$$

$Y_{p,-1}=n_{RNTI}\neq 0$, $A_p=39827$ for pmod3=0, $A_p=39829$ for pmod3=1, $A_p=39839$ for pmod3=2, and D=65537; i=0, . . . , L−1; $N_{CCE,p}$ is the number of CCEs, numbered from 0 to $N_{CCE,p}-1$, in CORESET p and, if any, per RB set; $n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$; $m_{s,n_{CI}}=0$, . . . , $M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$; for any CSS, $M_{s,max}^{(L)}=M_{s,0}^{(L)}=M_{s,0}^{(L)}$; for a USS, $M_{s,max}^{(L)}$ is the maximum of $M_{s,n_{CI}}^{(L)}$ over all configured nu values for a CCE aggregation level L of search space set s; and the RNTI value used for $n_{RNTI}$ is the C-RNTI.

A UE expects to monitor PDCCH candidates for up to 4 sizes of DCI formats that include up to 3 sizes of DCI formats with CRC scrambled by C-RNTI per serving cell. The UE counts a number of sizes for DCI formats per serving cell based on a number of configured PDCCH candidates in respective search space sets for the corresponding active DL BWP.

A PDCCH candidate with index $m_{s_j,n_{CI}}$ for a search space set $s_j$ using a set of CCEs in a CORESET p on the active DL BWP for serving cell $n_{CI}$ is not counted for monitoring if there is a PDCCH candidate with index $m_{s_i,n_{CI}}$ for a search space set $s_i<s_j$, or if there is a PDCCH candidate with index $n_{s_j,n_{CI}}$ and $n_{s_j,n_{CI}}<m_{s_j,n_{CI}}$, in the CORESET p on the active DL BWP for serving cell $n_{CI}$ using a same set of CCEs, the PDCCH candidates have identical scrambling, and the corresponding DCI formats for the PDCCH candidates have a same size; otherwise, the PDCCH candidate with index $m_{S_j,n_{CI}}$ is counted for monitoring. TABLE 1 provides the maximum number of monitored PDCCH candidates, $M_{PDCCH}^{max,slot,\mu}$, per slot for a UE in a DL BWP with SCS configuration µ for operation with a single serving cell.

TABLE 1

Maximum number $M_{PDCCH}^{max,slot,\mu}$ of monitored PDCCH candidates per slot for a DL BWP with SCS configuration µ ∈ {0, 1, 2, 3} for a single serving cell.

| µ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

TABLE 2 provides the maximum number of monitored PDCCH candidates, $M_{PDCCH}^{max,(X,Y),\mu}$, per span for a UE in a DL BWP with SCS configuration µ for operation with a single serving cell.

TABLE 2

Maximum number $M_{PDCCH}^{max,(X,Y),\mu}$ of monitored PDCCH candidates in a span for combination (X, Y) for a DL BWP with SCS configuration µ ∈ {0, 1} for a single serving cell.

| µ | Maximum number $M_{PDCCH}^{max,(X,Y),\mu}$ of monitored PDCCH candidates per span for combination (X, Y) and per serving cell | | |
|---|---|---|---|
|   | (2, 2) | (4, 3) | (7, 3) |
| 0 | 14 | 28 | 44 |
| 1 | 12 | 24 | 36 |

TABLE 3 provides the maximum number of non-overlapped CCEs, $C_{PDCCH}^{max,slot,\mu}$, for a DL BWP with SCS configuration µ that a UE is expected to monitor corresponding PDCCH candidates per slot for operation with a single serving cell. CCEs for PDCCH candidates are non-overlapped if CCEs correspond to: (1) different CORESET indexes, or (2) different first symbols for the reception of the respective PDCCH candidates.

TABLE 3

Maximum number $C_{PDCCH}^{max,slot,\mu}$ of non-overlappeda CCEs per slot for a DL BWP with SCS configuration µ ∈ {0, 1, 2, 3} for a single serving cell.

| µ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

TABLE 4 provides the maximum number of non-overlapped CCEs, $C_{PDCCH}^{max,(X,Y),\mu}$, for a DL BWP with SCS configuration µ that a UE is expected to monitor corresponding PDCCH candidates per span for operation with a single serving cell.

TABLE 4

Maximum number $C_{PDCCH}^{max,(X,Y),\mu}$ of non-overlapped CCEs in a span for combination (X, Y) for a DL BWP with SCS configuration µ ∈ {0, 1} for a single serving cell.

| µ | Maximum number $C_{PDCCH}^{max,(X,Y),\mu}$ of non-overlapped CCEs per span for combination (X, Y) and per serving cell | | |
|---|---|---|---|
|   | (2, 2) | (4, 3) | (7, 3) |
| 0 | 18 | 36 | 56 |
| 1 | 18 | 36 | 56 |

If a UE is configured with $N_{cells}^{DL,\mu}$ downlink cells with DL BWPs having SCS configuration µ where $$\sum_{\mu=0}^{3} N_{cells}^{DL,\mu} \le N_{cells}^{cap},$$

the UE is not required to monitor, on the active DL BWP of the scheduling cell, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell.

If a UE is configured with $N_{cells}^{DL,\mu}$ downlink cells with DL BWPs having SCS configuration µ, where $$\sum_{\mu=0}^{3} N_{cells}^{DL,\mu} \le N_{cells}^{cap},$$

a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $$M_{PDCCH}^{total,slot,\mu} = \left\lfloor N_{cells}^{cap} \cdot M_{PDCCH}^{max,slot,\mu} \cdot N_{cells}^{DL,\mu} \Big/ \sum_{j=0}^{3} N_{cells}^{DL,j} \right\rfloor$$

PDCCH candidates or more than $$C_{PDCCH}^{total,slot,\mu} = \left\lfloor N_{cells}^{cap} \cdot C_{PDCCH}^{max,slot,\mu} \cdot N_{cells}^{DL,\mu} \Big/ \sum_{j=0}^{3} N_{cells}^{DL,j} \right\rfloor$$

non-overlapped CCEs per slot on the active DL BWP(s) of scheduling cell(s) from the $N_{cells}^{DL,\mu}$ downlink cells.

For each scheduled cell, the UE is not required to monitor on the active DL BWP with SCS configuration µ of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

If a UE: (1) does not report pdcch-BlindDetectionCA or is not provided BDFactorR, γ=R; and (2) reports pdcch-BlindDetectionCA, the UE can be indicated by BDFactorR either γ=1 or γ=R.

If a UE is configured with $N_{cells,0}^{DL,\mu} + N_{cells,1}^{DL,\mu}$ downlink cells with associated PDCCH candidates monitored in the active DL BWPs of the scheduling cell(s) using SCS configuration µ where $\sum_{\mu=0}^{3} (N_{cells,0}^{DL,\mu} + \gamma \cdot N_{cells,1}^{DL,\mu})$ $\leq N_{cells}^{cap}$, the UE is not required to monitor, on the active BWP of the scheduling cell: (1) more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell when the scheduling cell is from the $N_{cells,0}^{DL,\mu}$ downlink cells; (2) more than $M_{PDCCH}^{total,slot,\mu} = \gamma \cdot M_{PDCCH}^{max,slot,\mu}$ PDCCH candidates or more than $C_{PDCCH}^{total,slot,\mu} = \gamma \cdot C_{PDCCH}^{max,slot,\mu}$ non-overlapped CCEs per slot for each scheduled cell when the scheduling cell is from the $N_{cells,1}^{DL,\mu}$ downlink cells; and/or (3) more than $M_{PDCCH}^{max,slot,\mu}$ PDCCH candidates or more than $C_{PDCCH}^{max,slot,\mu}$ non-overlapped CCEs per slot for CORESETs with same CORESETPoolIndex value for each scheduled cell when the scheduling cell is from the $N_{cells,1}^{DL,\mu}$ downlink cells.

If a UE: (1) is configured with $N_{cells,0}^{DL,\mu} + N_{cells,1}^{DL,\mu}$ downlink cells for which the UE is not provided monitoringCapabilityConfig-r16 or is provided monitoringCapabilityConfig-r16=r15monitoringcapability; (2) with associated PDCCH candidates monitored in the active DL BWPs of the scheduling cell(s) using SCS configuration $\mu$, where $\Sigma_{\mu=0}^{3} = (N_{cells,0}^{DL,\mu} + \gamma \cdot N_{cells,1}^{DL,\mu}) > N_{cells}^{cap}$, and (3) a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,slot,\mu} = \lfloor N_{cells}^{cap} \cdot M_{PDCCH}^{max,slot,\mu} \cdot (N_{cells,0}^{DL,\mu} + \gamma \cdot N_{cells,1}^{DL,\mu}) / \Sigma_{j=0}^{3} (N_{cells,0}^{DL,j} + \gamma \cdot N_{cells,1}^{DL,j}) \rfloor$ PDCCH candidates or more than $C_{PDCCH}^{total,slot,\mu} = \lfloor N_{cells}^{cap} \cdot C_{PDCCH}^{max,slot,\mu} \cdot (N_{cells,0}^{DL,\mu} + \gamma \cdot N_{cells,1}^{DL,\mu}) / \Sigma_{j=0}^{3} (N_{cells,0}^{DL,j} + \gamma \cdot N_{cells,1}^{DL,j}) \rfloor$ non-overlapped CCEs per slot on the active DL BWP(s) of scheduling cell(s) from the $N_{cells,0}^{DL,\mu} + N_{cells,1}^{DL,\mu}$ downlink cells.

For each scheduled cell, the UE is not required to monitor on the active DL BWP with SCS configuration $\mu$ of the scheduling cell from the $N_{cells,0}^{DL,\mu}$ downlink cells more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

For each scheduled cell, the UE is not required to monitor on the active DL BWP with SCS configuration $\mu$ of the scheduling cell from the $N_{cells,1}^{DL,\mu}$ downlink cells: (1) more than $\min(\gamma \cdot M_{PDCCH}^{max,slot,\mu}, M_{PDCCH}^{total,slot,\mu})$ PDCCH candidates or more than $\min(\gamma \cdot C_{PDCCH}^{max,slot,\mu}, C_{PDCCH}^{total,slot,\mu})$ non-overlapped CCEs per slot; and/or (2) more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot for CORESETs with same CORESETPoolIndex value.

If a UE is configured only with $N_{cells,r16}^{DL,\mu}$ downlink cells for which the UE is provided monitoringCapabilityConfig-r16=r16monitoringcapability and with associated PDCCH candidates monitored in the active DL BWPs of the scheduling cell(s) using SCS configuration $\mu$, and with $N_{cells,r16}^{DL,(X,Y),\mu}$ of the $N_{cells,r16}^{DL,\mu}$ downlink cells using combination (X, Y) for PDCCH monitoring, where $\Sigma_{\mu=0}^{1} N_{cells,r16}^{DL,\mu} > N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,(X,Y),\mu} = \lfloor N_{cells}^{cap-r16} \cdot M_{PDCCH}^{max,(X,Y),\mu} \cdot N_{cells,r16}^{DL,(X,Y),\mu} / \Sigma_{j=0}^{1} N_{cells,r16}^{DL,j} \rfloor$ PDCCH candidates or more than $C_{PDCCH}^{total,(X,Y),\mu} = \lfloor N_{cells}^{cap-r16} \cdot C_{PDCCH}^{max,(X,Y),\mu} \cdot N_{cells,r16}^{DL,(X,Y),\mu} / \Sigma_{j=0}^{1} N_{cells,r16}^{DL,j} \rfloor$ non-overlapped CCEs: (1) per set of spans on the active DL BWP(s) of all scheduling cell(s) from the $N_{cells,r16}^{DL,(X,Y),\mu}$ downlink cells, if the union of PDCCH monitoring occasions on all scheduling cells from the $N_{cells,r16}^{DL,(X,Y),\mu}$ downlink cells results to PDCCH monitoring according to the combination (X, Y) and any pair of spans in the set is within Y symbols, where first X symbols start at a first symbol with a PDCCH monitoring occasion and next X symbols start at a first symbol with a PDCCH monitoring occasion that is not included in the first X symbols; and/or (2) per set of spans across the active DL BWP(s) of all scheduling cells from the $N_{cells,r16}^{DL,(X,Y),\mu}$ downlink cells, with at most one span per scheduling cell for each set of spans, otherwise where $N_{cells,r16}^{DL,j}$ is a number of configured cells with SCS configuration j. If a UE is configured with downlink cells for which the UE is provided both monitoringCapabilityConfig-r16=r15monitoringcapability and monitoringCapabilityConfig-r16=r16monitoringcapability, $N_{cells}^{cap-r16}$ is replaced by $N_{cells,r16}^{cap-r16}$.

For each scheduled cell, the UE is not required to monitor on the active DL BWP with SCS configuration $\mu$ of the scheduling cell, from the $N_{cells,r16}^{DL,(X,Y),\mu}$ downlink cells using combination (X,Y), more than $\min(M_{PDCCH}^{max,(X,Y),\mu}, M_{PDCCH}^{total,(X,Y),\mu})$ PDCCH candidates or more than $\min(C_{PDCCH}^{max,(X,Y),\mu}, C_{PDCCH}^{total,(X,Y),\mu})$ non-overlapped CCEs per span.

A UE does not expect to be configured CSS sets that result to corresponding total, or per scheduled cell, numbers of monitored PDCCH candidates and non-overlapped CCEs per slot or per span that exceed the corresponding maximum numbers per slot or per span, respectively.

For same cell scheduling or for cross-carrier scheduling, a UE does not expect a number of PDCCH candidates, and a number of corresponding non-overlapped CCEs per slot or per span on a secondary cell to be larger than the corresponding numbers that the UE is capable of monitoring on the secondary cell per slot or per span, respectively. If a UE is provided PDCCHMonitoringCapabilityConfig=r16monitoringcapability for the primary cell, except the first span of each slot, the UE does not expect a number of PDCCH candidates and a number of corresponding non-overlapped CCEs per span on the primary cell to be larger than the corresponding numbers that the UE is capable of monitoring on the primary cell per span.

For cross-carrier scheduling, the number of PDCCH candidates for monitoring and the number of non-overlapped CCEs per span or per slot are separately counted for each scheduled cell.

For all search space sets within a slot n or within a span in slot n, denote by $S_{css}$ a set of CSS sets with cardinality of $I_{css}$ and by $S_{uss}$ a set of USS sets with cardinality of $J_{uss}$. The location of USS sets $s_j$, $0 \leq j < J_{uss}$, in $S_{uss}$ is according to an ascending order of the search space set index. Denote by $M_{S_{css}(i)}^{(L)}$, $0 \leq i < I_{css}$, the number of counted PDCCH candidates for monitoring for CSS set $S_{css}(i)$ and by $M_{S_{css}(j)}^{(L)}$, $0 \leq j < J_{uss}$, the number of counted PDCCH candidates for monitoring for USS set $S_{uss}(j)$.

For the CSS sets, a UE monitors $$M_{PDCCH}^{CSS} = \sum_{i=0}^{I_{css}-1} \sum_{L} M_{S_{css}(i)}^{(L)}$$

PDCCH candidates requiring a total of $C_{PDCCH}^{CSS}$ non-overlapping CCEs in a slot or in a span.

The UE allocates PDCCH candidates for monitoring to USS sets for the primary cell having an active DL BWP with SCS configuration μ in a slot if the UE is not provided PDCCHMonitoringCapabilityConfig for the primary cell or if the UE is provided PDCCHMonitoringCapabilityConfig=r15monitoringcapability for the primary cell, or in the first span of each slot if the UE is provided PDCCHMonitoringCapabilityConfig=r16monitoringcapability for the primary cell, according to the following pseudocode. If for the USS sets for scheduling on the primary cell the UE is not provided CORESETPoolIndex for first CORESETs, or is provided CORESETPoolIndex with value 0 for first CORESETs, and is provided CORESETPoolIndex with value 1 for second CORESETs, and if min $(\gamma \cdot M_{PDCCH}^{max,slot,\mu}, M_{PDCCH}^{total,slot,\mu}) >$ min $(M_{PDCCH}^{max,slot,\mu}, M_{PDCCH}^{total,slot,\mu})$ or min$(\gamma \cdot C_{PDCCH}^{max,slot,\mu}, C_{PDCCH}^{total,slot,\mu}) >$ min$(C_{PDCCH}^{max,slot,\mu}, C_{PDCCH}^{total,slot,\mu})$, the following pseudocode applies only to USS sets associated with the first CORESETs. A UE does not expect to monitor PDCCH in a USS set without allocated PDCCH candidates for monitoring. In the following pseudocode, if the UE is provided PDCCHMonitoringCapabilityConfig=r16monitoringcapability for the primary cells, $M_{PDCCH}^{max,slot,\mu}$ and $C_{PDCCH}^{max,slot,\mu}$ are replaced by $M_{PDCCH}^{max,(X,Y),\mu}$ and $C_{PDCCH}^{max,(X,Y),\mu}$ respectively, and $M_{PDCCH}^{total,slot,\mu}$ and $C_{PDCCH}^{total,slot,\mu}$ are replaced by $M_{PDCCH}^{total,(X,Y),\mu}$ and $C_{PDCCH}^{total,(X,Y),\mu}$ respectively.

Denote by $V_{CCE}(S_{uss}(j))$ the set of non-overlapping CCEs for search space set $S_{uss}(j)$ and by $\mathcal{C}(V_{CCE}(S_{uss}(j)))$ the cardinality of $V_{CCE}(S_{uss}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \leq k \leq j$.

TABLE 5

Set $M_{PDCCH}^{uss} = \min(M_{PDCCH}^{max,slot,\mu}, M_{PDCCH}^{total,slot,\mu}) - M_{PDCCH}^{css}$
Set $C_{PDCCH}^{uss} = \min(C_{PDCCH}^{max,slot,\mu}, C_{PDCCH}^{total,slot,\mu}) - C_{PDCCH}^{css}$
Set j = 0 while $\sum_L M_{S_{uss}(j)}^{(L)} \leq M_{PDCCH}^{uss}$ AND $C(V_{CCE}(S_{uss}(j))) \leq C_{PDCCH}^{uss}$ allocate $\sum_L M_{S_{uss}(j)}^{(L)}$ PDCCH candidates for monitoring to USS set $S_{uss}(j)$ $M_{PDCCH}^{uss} = M_{PDCCH}^{uss} - \sum_L M_{S_{uss}(j)}^{(L)}$;

$C_{PDCCH}^{uss} = M_{PDCCH}^{uss} - \mathcal{C}(V_{CCE}(S_{uss}(j)))$;
j = j + 1;
end while If a UE: (1) is configured for single cell operation or for operation with carrier aggregation in a same frequency band, and (2) monitors PDCCH candidates in overlapping PDCCH monitoring occasions in multiple CORESETs that have same or different QCL-TypeD properties on active DL BWP(s) of one or more cells, the UE monitors PDCCHs only in a CORESET, and in any other CORESET from the multiple CORESETs having same QCL-TypeD properties as the CORESET, on the active DL BWP of a cell from the one or more cells: (1) the CORESET corresponds to the CSS set with the lowest index in the cell with the lowest index containing CSS, if any; otherwise, to the USS set with the lowest index in the cell with lowest index; (2) the lowest USS set index is determined over all USS sets with at least one PDCCH candidate in overlapping PDCCH monitoring occasions; (3) for the purpose of determining the CORESET, a SS/PBCH block is considered to have different QCL-TypeD properties than a CSI-RS; (4) for the purpose of determining the CORESET, a first CSI-RS associated with a SS/PBCH block in a first cell and a second CSI-RS in a second cell that is also associated with the SS/PBCH block are assumed to have same QCL-TypeD properties; (5) the allocation of non-overlapping CCEs and of PDCCH candidates for PDCCH monitoring is according to all search space sets associated with the multiple CORESETs on the active DL BWP(s) of the one or more cells; and/or (6) the number of active TCI states is determined from the multiple CORESETs.

If a UE: (1) is configured for single cell operation or for operation with carrier aggregation in a same frequency band, and (2) monitors PDCCH candidates in overlapping PDCCH monitoring occasions in multiple CORESETs where none of the CORESETs has TCI-states with "QCL-TypeD," the UE is required to monitor PDCCH candidates in overlapping PDCCH monitoring occasions for search space sets associated with different CORESETs.

CA is a framework for wider bandwidth operation, wherein the UE can transmit and/or receive on multiple carriers, referred to as component carriers (CCs), in parallel. A CA operation can involve intra-band contiguous or non-contiguous CCs, as well as inter-band CCs, for frequency placements of CCs. A CA operation can be visible to PHY and MAC layers (L1 and L2), but transparent to higher layers.

In CA, two or more component carriers (CCs) are aggregated. A UE may simultaneously receive or transmit on one or multiple CCs depending on capabilities: (1) A UE with single timing advance capability for CA can simultaneously receive and/or transmit on multiple CCs corresponding to multiple serving cells sharing the same timing advance (multiple serving cells grouped in one TAG); (2) a UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell; and (3) A non-CA capable UE can receive on a single CC and transmit on a single CC corresponding to one serving cell only (one serving cell in one TAG).

CA is supported for both contiguous and non-contiguous CCs. When CA is deployed frame timing and SFN are aligned across cells that can be aggregated, or an offset in multiples of slots between the PCell/PSCell and an SCell is configured to the UE. For example, the maximum number of configured CCs for a UE is 16 for DL and 16 for UL.

In conjunction with a UL/DL carrier pair (FDD band) or a bidirectional carrier (TDD band), a UE may be configured with additional, supplementary uplink (SUL). SUL differs from the aggregated uplink in that the UE may be scheduled to transmit either on the supplementary uplink or on the uplink of the carrier being supplemented, but not on both at the same time.

When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the PCell. Depending on UE capabilities, secondary cells (SCells) can be configured to form together with the PCell a set of serving cells. The configured set of serving cells for a UE therefore includes one PCell and one or more S Cells.

The reconfiguration, addition and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signalling is used for sending all required system information of the SCell i.e., while in connected mode, UEs need not acquire broadcast system information directly from the SCells.

To enable bandwidth adaptation on the PCell, the gNB configures the UE with UL and DL BWP(s). To enable BA on SCells in case of CA, the gNB configures the UE with DL BWP(s) at least (i.e., there may be none in the UL). For the PCell, the BWP used for initial access is configured via system information. For the SCell(s), the BWP used after initial activation is configured via dedicated RRC signaling.

In paired spectrum, DL and UL can switch BWP independently. In unpaired spectrum, DL and UL switch BWP simultaneously. Switching between configured BWPs happens by means of RRC signalling, DCI, inactivity timer or upon initiation of random access. When an inactivity timer is configured for a serving cell, the expiry of the inactivity timer associated to that cell switches the active BWP to a default BWP configured by the network. There can be at most one active BWP per cell, except when the serving cell is configured with SUL, in which case there can be at most one on each UL carrier.

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor the UE is required to perform CQI measurements. Conversely, when an SCell is active, the UE may receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signalling is associated with the PUCCH on the PUCCH SCell) may not be activated. NG-RAN ensures that SCells mapped to PUCCH SCell are deactivated before the PUCCH SCell is changed or removed.

When reconfiguring the set of serving cells: (1) SCells added to the set are initially activated or deactivated; and/or (2) SCells which remain in the set (either unchanged or reconfigured) do not change their activation status (activated or deactivated).

At handover or connection resume from RRC_INACTIVE: SCells are activated or deactivated.

To enable reasonable UE battery consumption when BA is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, PRACH and UL-SCH.

To enable fast SCell activation when CA is configured, one dormant BWP can be configured for an SCell. If the active BWP of the activated SCell is a dormant BWP, the UE stops monitoring PDCCH on the SCell but continues performing CSI measurements, AGC and beam management, if configured. A DCI is used to control entering/leaving the dormant BWP for one or more SCell(s) or one or more SCell group(s).

The dormant BWP is one of the UE's dedicated BWPs configured by network via dedicated RRC signalling. The SpCell and PUCCH SCell cannot be configured with a dormant BWP.

Cross-carrier scheduling with the Carrier Indicator Field (CIF) allows the PDCCH of a serving cell to schedule resources (e.g., for data transmission and/or reception) on another serving cell but with the following restrictions in the current standards: (1) cross-carrier scheduling may not apply to PCell i.e., PCell may be scheduled via PDCCH. In some examples, PCell can be also cross-scheduled by an SCell; (2) when an SCell is configured with a PDCCH, that cell's PDSCH and PUSCH are scheduled by the PDCCH on this SCell; (3) When an SCell is not configured with a PDCCH, that SCell's PDSCH and PUSCH are scheduled by a PDCCH on another serving cell; and/or (4) the scheduling PDCCH and the scheduled PDSCH/PUSCH can use the same or different numerologies.

Cross-carrier scheduling allows for PDCCH monitoring and/or reception on a few serving cells, referred to as the scheduling cells, while the received PDCCHs correspond to scheduling data transmission and/or reception, etc. on all serving cells, referred to as the scheduled cells.

Figure 6:
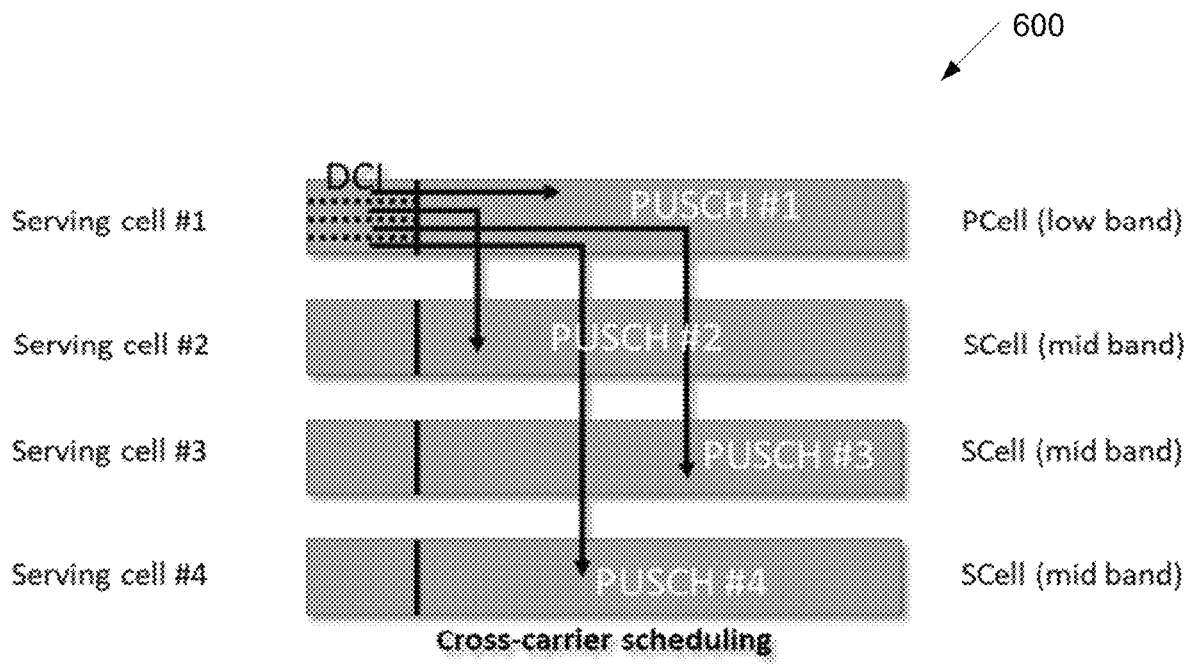
FIG. 6 illustrate an example configuration with cross-carrier scheduling according to embodiments of the present disclosure.

FIG. 6 illustrate an example configuration 600 with cross-carrier scheduling according to embodiments of the present disclosure. An embodiment of the configuration 600 shown in FIG. 6 is for illustration only.

FIG. 6 shows an example configuration with cross-carrier scheduling, wherein a PCell which is operating in a low-band frequency (such as below 1-GHz), is the scheduling cell for a own cell as well as on serving/scheduled cells #2, #3, and #4. In one example, serving/scheduled cells #2, #3, and #4 can be on low-band and/or high-band frequency. For example, a UE receives four DCIs on the low-band PCell to schedule transmission of PUSCH #1 on serving cell #1, namely the PCell itself, PUSCH #2 on serving cell #2, PUSCH #3 on serving cell #3, and PUSCH #4 on serving cell #4.

A shortcoming of cross-carrier scheduling in the current standards is that a configuration of a scheduling cell and a scheduled cell and an association thereof is only semi-statically configured, and cannot be changed unless by an RRC signaling, which incurs high overhead and/or latency. Such a semi-static configuration may not capture the impact of (rather) fast change in the network traffic situation such as variable scheduling load and/or control signaling overhead.

Figure 7:
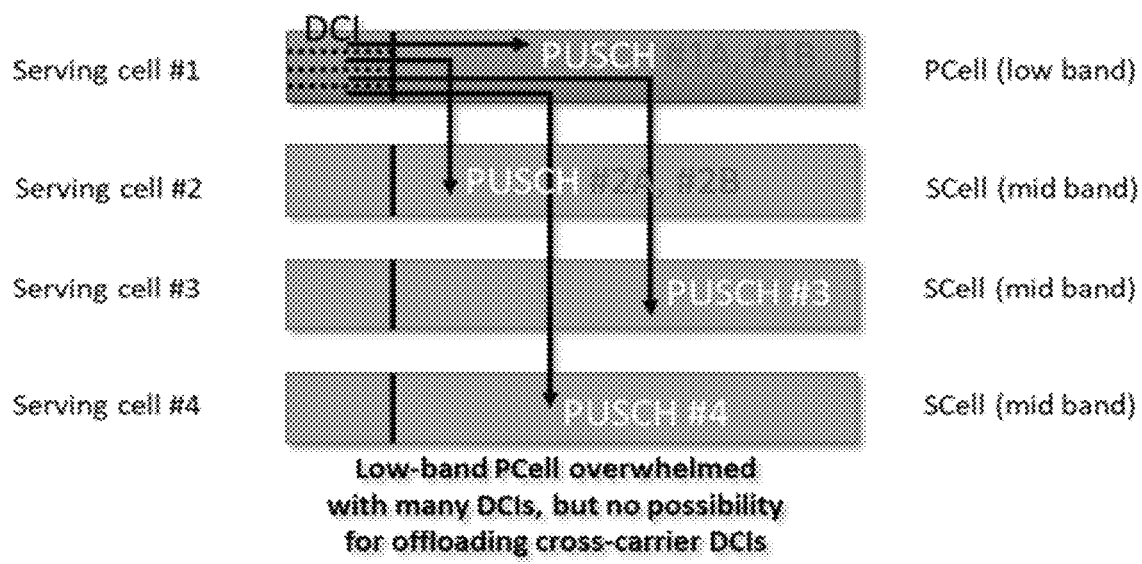
FIG. 7 illustrate an example operation with cross-carrier scheduling according to embodiments of the present disclosure.

FIG. 7 illustrate an example operation 700 with cross-carrier scheduling according to embodiments of the present disclosure. An embodiment of the operation 700 shown in FIG. 7 is for illustration only.

FIG. 7 shows an example operation with cross-carrier scheduling that illustrates the shortcoming above. The setting of serving cells in this example is the same as that in FIG. 6. In this example, however, serving cell #1 is experiencing more network traffic such as multiple PUSCH transmissions on the serving cells #1 and #2, e.g., PUSCH #1A and PUSCH #1B on the serving cell #1, and PUSCH #2A and PUSCH #2B on the serving cell #2. For example, such an increase in the number of scheduled transmissions can be due to more URLLC, IIoT, mMTC, IoT use-cases which are mainly operating in the low frequency bands. According to the configuration for this scenario, although the low-band PCell is overwhelmed with too many DCIs, there is no possibility for fast and dynamic offloading of the DCIs, such as cross-carrier PDCCHs/DCIs, to an alternative serving/scheduling cell, since serving cell #1 is configured as the only scheduling cell for scheduled cells #1, #2, #3, and #4 by higher layer/RRC signalling.

The present disclosure considers solutions, referred to herein as adaptive cross-carrier scheduling, to overcome the shortcomings described above for the currently supported cross-carrier scheduling, by allowing/supporting multiple (two or more) scheduling cells for a given scheduled cell, along with at least one "active" scheduling cell to indicate a scheduling cell(s) on which the UE performs PDCCH monitoring and blind decoding.

Figure 8:
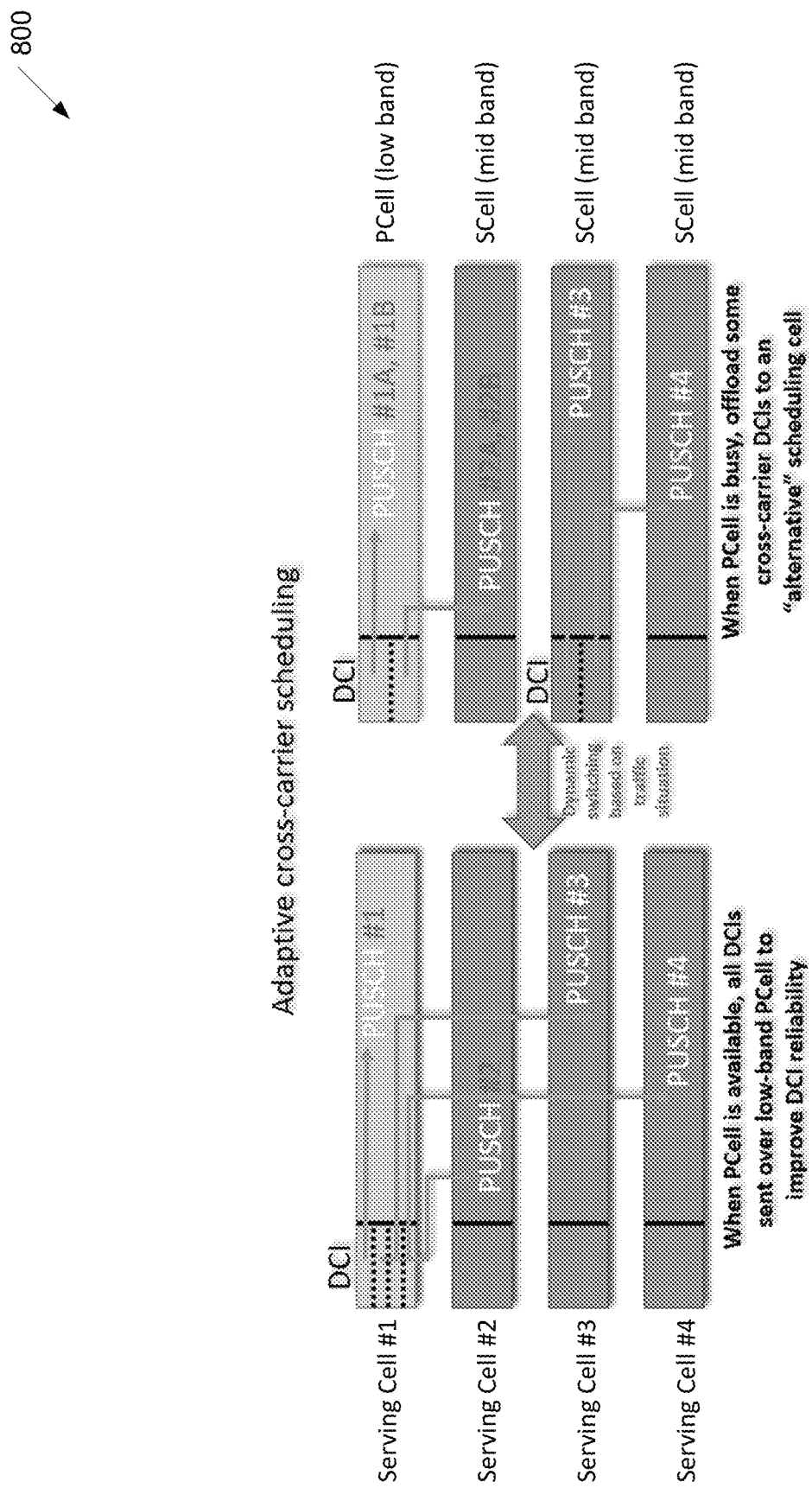
FIG. 8 illustrates an example operation with adaptive cross-carrier scheduling according to embodiments of the present disclosure.

FIG. 8 illustrates an example operation 800 with adaptive cross-carrier scheduling according to embodiments of the present disclosure. An embodiment of the operation 800 shown in FIG. 8 is for illustration only.

FIG. 8 shows an example operation with adaptive cross-carrier scheduling provided in the present disclosure. The setting of serving cells in this example is the same as that in FIG. 6. In this example, however, serving cell #3 is configured (in addition to serving cell #1) as an alternative scheduling cell for serving cells #3 and #4 as well. When the network traffic situation is moderate/normal and the first scheduling cell, namely, the low-band PCell is "available," all PDCCHs/DCIs are transmitted over the scheduling cell #1 (the low-band PCell) to benefit from the improved reliability offered by low-band PCell. But, when the network traffic situation is high/congested and the first scheduling cell, namely, the low-band PCell is "busy," serving cell #3 is indicated as the new active scheduling cell for serving cells #3 and #4, so that some cross-carrier DCIs from serving cells #3 and #4 is offloaded to serving cell #3, and serving cell #1 (i.e., the low-band PCell) can manage the extra traffic/control signalling load on serving cells #1 and #2. Such a switching is supported in a dynamic manner based on network indication and/or UE determination.

Throughout this disclosure, although CA is discussed, the embodiments are equally applicable to scenarios with multiple transmission and reception points (multi-TRP) in one or multiple serving/scheduled/scheduling cell as well, wherein same and/or different spatial settings/relations/beams can be additionally used.

As illustrated above, in one embodiment of E-1, support for configuration of two/multiple scheduling cells for a scheduled cell & indication of at least one "active scheduling cell" for PDCCH monitoring for the scheduled cell is provided.

In one embodiment, a UE which is configured with CA operation, can be configured with two or more scheduling cells for at least one serving/scheduled cell. According to this embodiment, a cross-carrier scheduling configuration for at least one serving cell can include a configuration for two or more cell indices as (potential) scheduling cells along with a configuration of a carrier indicator field (CIF) for each of the scheduling cells. In one example, the configured CIF values corresponding to different scheduling cells for a given/same scheduled cell can be different.

According to this embodiment, for a scheduled cell configured with two or more scheduling cells, the UE expects that at least one of the configured scheduling cells is "active" or an "active scheduling cell" for that scheduled cell, meaning that, the UE monitors PDCCH on that scheduling cell. In one example, a serving cell can be configured as a scheduling cell for both a first scheduled cell and a second scheduled cell, and the serving cell is (1) only an active scheduling cell for the first (resp. second) scheduled cell, while not an active scheduling cell for the second (resp. first) scheduled cell, OR (2) an active scheduling cell for both the first and the second scheduled cell, OR (3) not an active scheduling cell for either the first or the second scheduled cell. In one example, a UE does not expect that a scheduling cell is only active for other scheduled cell(s), but not an active scheduling cell for a own cell, i.e., a scheduling cell needs to be an active scheduling cell at least for the same serving cell; in other words, for the active DL BWP of a serving cell on which the UE monitors PDCCH candidates, the UE monitors PDCCH candidates at least for the same serving cell.

In one example, a first serving cell be configured with both self-carrier scheduling and cross-carrier scheduling, so that the first cell can be scheduled by the first cell or by a second serving/scheduling cell.

In one example, a configuration for scheduling cell(s) for a serving cell can be based on search space (SS) set types or DCI formats or DCI format sizes. For example, a serving cell can be configured with self-carrier scheduling for a first SS set type such as common SS (CSS) sets and configured with cross-carrier scheduling for a second SS set type such as UE-specific SS (USS) sets. In another example, a serving cell can be configured with self-carrier scheduling for a first group of DCI formats such as DCI format 0_0 and DCI format 1_0 and configured with cross-carrier scheduling for a second group of DCI formats such as DCI format 0_1 or 0_2 and DCI format 1_1 or 1_2.

In some examples, various forms of "chain scheduling" can be considered. In one example, a first configured scheduling cell may not be an active scheduling cell for all/any scheduled cells, including its own cell, for a time period, at least when the first scheduling cell is itself configured to be cross-carrier scheduled by a second scheduling cell, and the second scheduling cell is an active scheduling cell for the first scheduling cell. For example, a first cell can be scheduled by a second cell, and the second cell can be scheduled by a third cell, wherein the first and second and third cells are different. In another example, a first serving cell be configured for cross-carrier scheduling by both a second cell and a third cell, wherein the second cell can also be in turn configured to be (at least) cross-carrier scheduled by the third cell, in addition to possible self-carrier scheduling.

In all examples where scheduled cells are configured to be scheduled by more than one scheduling cells, including for self-carrier scheduling, the set of more than one scheduling cells can be active at a same time occasion or at different time occasions, as described in the following embodiments.

Throughout the present disclosure, a scheduled cell can be any serving cell including a primary cell such as a SpCell, PCell, or PSCell, or a secondary cell (SCell). A scheduled cell and a corresponding scheduling cell can operate in same or different frequency band(s) or frequency ranges. A scheduled cell and a corresponding scheduling cell can belong to same or different cell groups, such as a master cell group (MCG), or a secondary cell group (SCG), or a secondary DRX group, or a cell group for search space set switching.

An example information element for RRC configuration of cross-carrier scheduling with two or more scheduling cells for a serving/scheduled cell is provided below. For the case that the "CrossCarrierSchedulingConfig" is included within the configuration of a scheduled cell, in one example, a field such as "nrOfSchedulingCells" can indicate a number of configured scheduling cell(s) for the scheduled cell. This number is at least one but can up to a configured maximum value such as "maxNrOfSchedulingCellsPerScheduledCell" for the specified/supported number of scheduling cells per scheduled cell, such as N=2 or 4 scheduling cells per scheduled cell (e.g., see embodiment E-1-4).

In another example, for each scheduling cell corresponding to a scheduled cell, a field such as "schedulingCellConfig" can include the configuration for the scheduling cell, such as the serving cell index for the scheduling cell along with a corresponding CIF value. In a further example, the configuration can additionally include a field such as "maxNrOfActiveSchedulingCells" to indicate the maximum number of active scheduling cells (from the total number/set of configured scheduling cells) for the scheduled cell.

In yet another example, the configuration can include a field such as "firstActiveSchedulingCell" to indicate a first active scheduling cell for PDCCH monitoring during initial access and/or before any further indication is provided for change and/or addition and/or modification of the scheduling cell(s) (e.g., see embodiment E-1-0).

TABLE 6

| CrossCarrierSchedulingConfig information element |
|---|
| -- ASN1START<br>-- TAG-CrossCarrierSchedulingConfig-START<br>CrossCarrierSchedulingConfig ::= SEQUENCE {<br>schedulingCellInfo CHOICE {<br>own SEQUENCE { -- Cross carrier scheduling: scheduling cell<br>cif-Presence BOOLEAN<br>},<br>other SEQUENCE {-- Cross carrier scheduling: scheduled cell<br>nrOfSchedulingCells INTEGER<br>(1.. maxNrOfSchedulingCellsPerScheduledCell),<br>SEQUENCE (SIZE (1.. nrOfSchedulingCells)) OF<br>schedulingCellConfig,<br>maxNrOfActiveSchedulingCells INTEGER (1.. nrOfSchedulingCells),<br>OPTIONAL<br>firstActiveSchedulingCell INTEGER (1.. nrOfSchedulingCells)<br>OPTIONAL<br>}<br>},<br>...,<br>[[<br>carrierIndicatorSize SEQUENCE {<br>carrierIndicatorSizeForDCI-Format1-2-r16 INTEGER (0..3),<br>carrierIndicatorSizeForDCI-Format0-2-r16 INTEGER (0..3)<br>} OPTIONAL -- Cond CIF-PRESENCE<br>]]<br>}<br>schedulingCellConfig ::= SEQUENCE {<br>schedulingCellId ServCellIndex,<br>cif-InSchedulingCell INTEGER (1..7)<br>}<br>maxNrOfSchedulingCellsPerScheduledCell ::= [4]<br>-- TAG-CrossCarrierSchedulingConfig-STOP<br>-- ASN1STOP |

Another example information element (IE) for RRC configuration of cross-carrier scheduling with two or more scheduling cells for a scheduled cell is provided below. The difference with the previous example is that the IE allows for both self-carrier scheduling and cross-carrier scheduling for a serving cell. There can be various options regarding whether all configured scheduling cells are active or not, as described in detail in the subsequent embodiments.

TABLE 6A

| CrossCarrierSchedulingConfig information element |
|---|
| -- ASN1START<br>-- TAG-CrossCarrierSchedulingConfig-START<br>CrossCarrierSchedulingConfig ::= SEQUENCE {<br>nrOfSchedulingCells INTEGER<br>(1.. maxNrOfSchedulingCellsPerScheduledCell),<br>maxNrOfActiveSchedulingCells INTEGER<br>(1.. nrOfSchedulingCells), OPTIONAL<br>firstActiveSchedulingCell INTEGER (0.. nrOfSchedulingCells), |

TABLE 6A-continued

| CrossCarrierSchedulingConfig information element |
|---|
| OPTIONAL<br>schedulingCellInfo SEQUENCE {<br>own SEQUENCE { -- Cross carrier scheduling: scheduling cell<br>cif-Presence BOOLEAN<br>},<br>other SEQUENCE { -- Cross carrier scheduling: scheduled cell<br>SEQUENCE (SIZE (0.. nrOfSchedulingCells − 1))<br>OF schedulingCellConfig,<br>}<br>},<br>...,<br>[[<br>carrierIndicatorSize SEQUENCE {<br>carrierIndicatorSizeForDCI-Format1-2-r16 INTEGER (0..3),<br>carrierIndicatorSizeForDCI-Format0-2-r16 INTEGER (0..3)<br>} OPTIONAL -- Cond CIF-PRESENCE<br>]]<br>}<br>schedulingCellConfig ::=SEQUENCE {<br>schedulingCellId ServCellIndex,<br>cif-InSchedulingCell INTEGER (1..7)<br>}<br>maxNrOfSchedulingCellsPerScheduledCell : ::= [4]<br>-- TAG-CrossCarrierSchedulingConfig-STOP<br>-- ASN1STOP |

Figure 9:
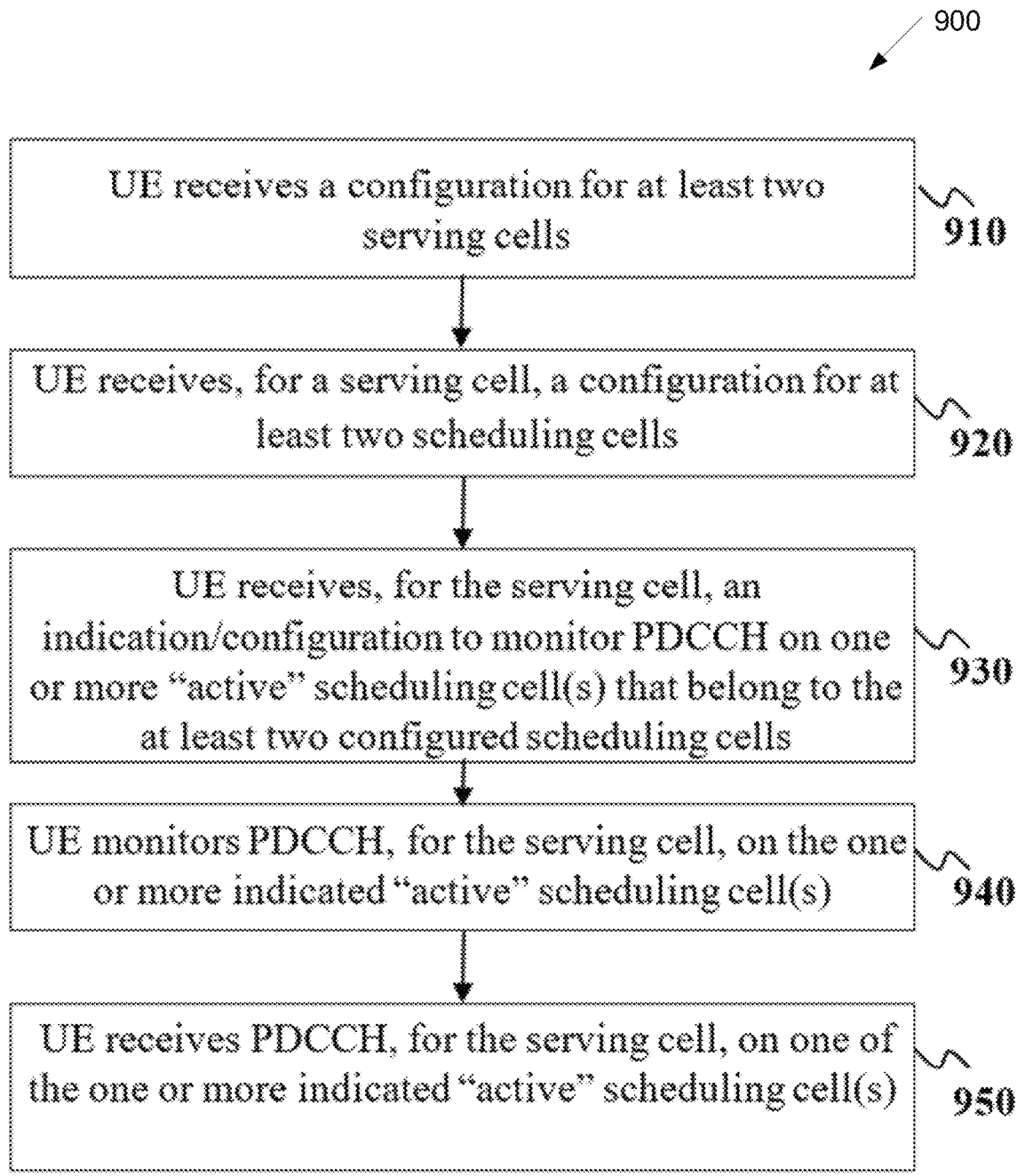
FIG. 9 illustrates a flowchart of a method for supporting of multiple configured scheduling cells and indication of one or more active scheduling cells for a given scheduled cell according to embodiments of the present disclosure.

FIG. 9 illustrates a flowchart of a method 900 for supporting of multiple configured scheduling cells and indication of one or more active scheduling cells for a given scheduled cell according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 shows an example flowchart for support of multiple configured scheduling cells and indication of one or more active scheduling cells for a given scheduled cell. A UE receives a configuration for operation with at least two serving cells, at step 910, i.e., carrier aggregation operation. It is noted that a configuration can include one or more of an indication by system information such as by a MIB or a SIB, a common higher layer such as RRC signalling, and a dedicated higher layer such as RRC signalling. The UE also receives a configuration for cross-carrier scheduling of a first serving cell from the at least two serving cells so that it is configured with at least two scheduling cells, at step 920. The UE then receives an indication and/or configuration to monitor PDCCH for the first serving cell on one or more active scheduling cell(s) that belong to the set of at least two configured scheduling cells, at step 930. Accordingly, the UE monitors PDCCH for the first serving cell on the one or more indicated active scheduling cell(s), at step 940. The UE receives PDCCH, for the first serving cell, on one of the one or more indicated "active" scheduling cell(s), at step 950.

In one example, it is possible for a UE to be configured with one or more serving cells associated with two or more scheduling cells, and thus use adaptive cross-carrier scheduling methods, while the UE is also configured with another one or more serving cells associated with only one scheduling cell, including self-scheduling. In other words, having one scheduled cell with multiple scheduling cells does not mandate similar settings for all other scheduled cells; it is fine for some serving/scheduled cells to be configured with only a single scheduling cell.

As aforementioned, in one embodiment of E-1-0, first active scheduling cell is provided. In one embodiment, a scheduled cell that is configured with two or more scheduling cell can be configured with a "first active scheduling cell" on which the UE can perform PDCCH monitoring before receiving any L1/L2 signaling to indicate the active scheduling cell(s) for the scheduled cell.

For example, the configuration of the first active scheduling cell for a scheduled cell ensures that the UE has no confusion for PDCCH monitoring during initial access, and/or during random access procedure, and/or immediately after configuration of a serving/scheduled cell. The UE can later receive network signaling or apply other (predetermined) rules/methods to indicate or determine a new active scheduling cell(s). In one example, a scheduled cell can be configured with only a single first active scheduling cell. In another example, a scheduled cell can be configured with two/multiple first active scheduling cells.

Figure 10:
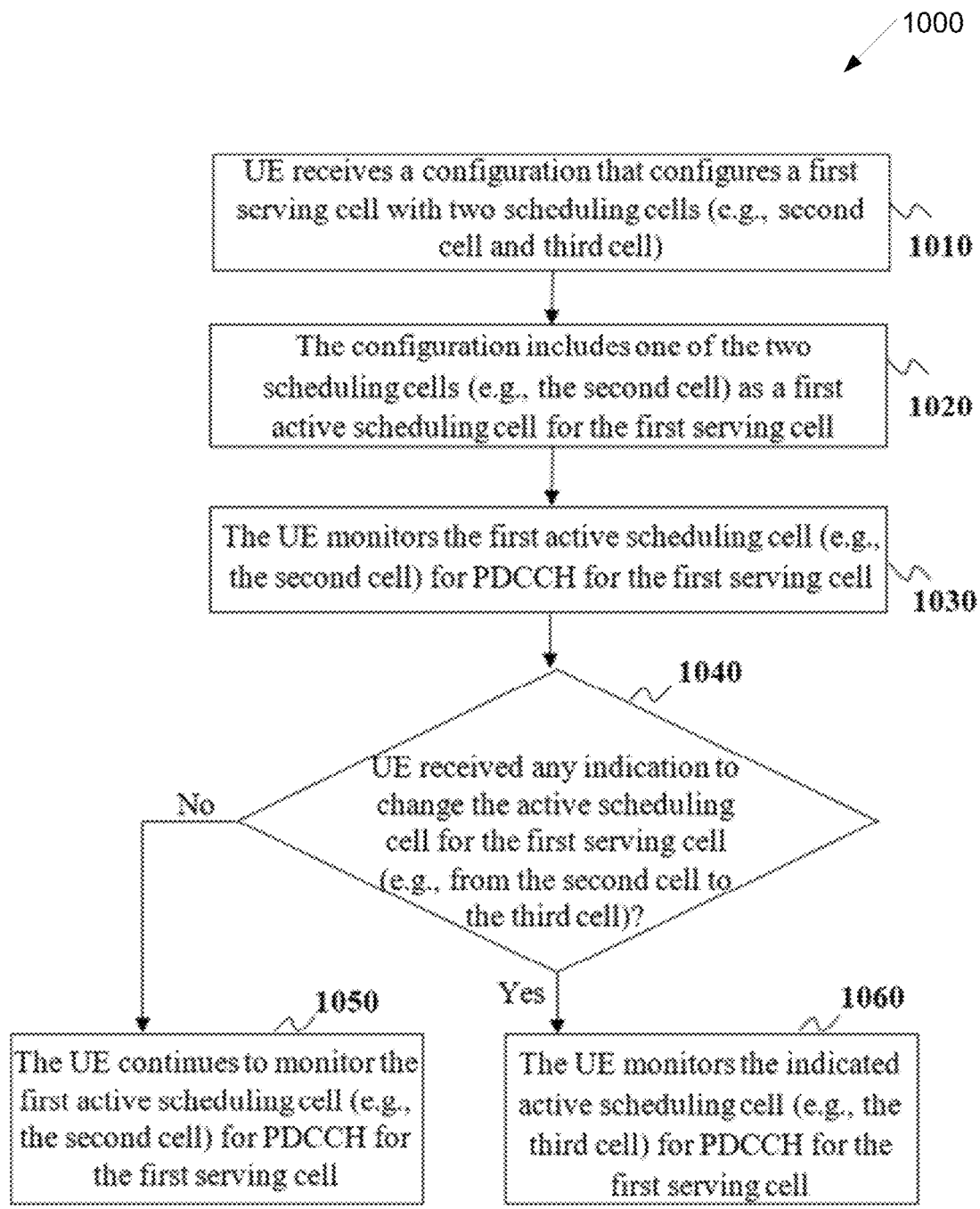
FIG. 10 illustrates a flowchart of a method for operation with a first active scheduling cell according to embodiments of the present disclosure.

FIG. 10 illustrates a flowchart of a method 1000 for operation with a first active scheduling cell according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIG. 10 shows an example flowchart for the operation with a first active scheduling cell. A UE receives a configuration that configures a first serving cell with two scheduling cells (e.g., second cell and third cell), at step 1010. The configuration includes or designates one of the two scheduling cells (e.g., the second cell) as a first active scheduling cell for the first serving cell, at step 1020. The UE monitors PDCCH for the first serving cell on the first active scheduling cell (e.g., the second cell), at step 1030. The UE determines whether the UE received any new indication to change the active scheduling cell for the first serving cell (e.g., from the second cell to the third cell), at step 1040. If not, that is, if the UE has not received any indication to change the active scheduling cell for the first serving cell, then the UE continues to monitor PDCCH for the first serving cell on the first active scheduling cell (e.g., the second cell), at step 1050. But if the UE has received a new indication to change the active scheduling cell for the first serving cell (e.g., from the second cell to the third cell), then the UE starts to monitor the newly indicated active scheduling cell (e.g., the third cell) for PDCCH for the first serving cell, at step 1060.

As aforementioned, in one embodiment of E-1-1, scenario 1 for adaptive cross-carrier scheduling (dynamic switching of the active scheduling cell) is provided.

In one example (referred to as "scenario 1"), the UE is indicated that each scheduled cell configured with multiple scheduling cells can have only a single active scheduling cell at a time. In such example, the UE monitors PDCCH for a given scheduled cell on a first scheduling cell for a first time period and on a second scheduling cell for a second timer period, wherein the first time period has no overlap with the second time period and the first scheduling cell is different from the second scheduling cell, therefore a dynamic switching of the active scheduling cell. In one example, the UE receives an indication from the network and/or uses a predetermined rule to change the active scheduling cell for the scheduled cell between the first scheduling cell and the second scheduling cell details for indication methods are discussed at length in embodiment E-3.

Figure 11:
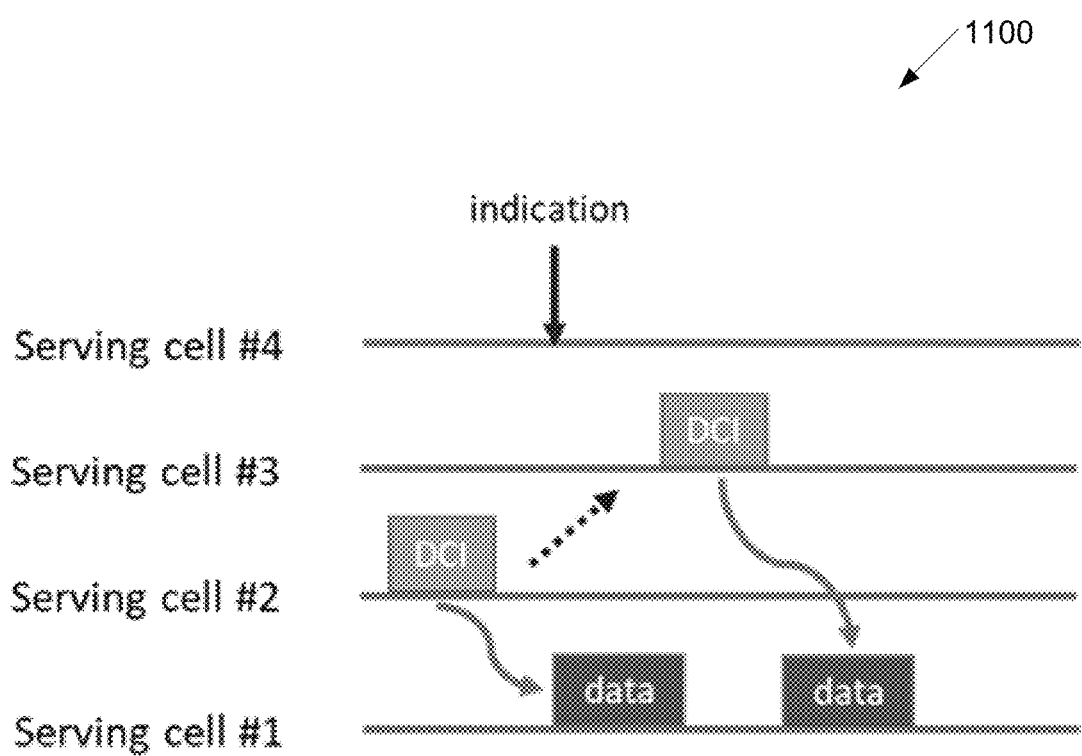
FIG. 11 illustrates an example dynamic switching of the active scheduling cell according to embodiments of the present disclosure.

FIG. 11 illustrates an example dynamic switching of the active scheduling cell 1100 according to embodiments of the present disclosure. An embodiment of the dynamic switching of the active scheduling cell 1100 shown in FIG. 11 is for illustration only.

FIG. 11 shows an example operation for Scenario 1, namely dynamic switching of the active scheduling cell.

A serving cell #1 (i.e., scheduled cell) is configured with two scheduling cells, namely scheduling cells #2 and #3. It is noted that, serving cell #1 can be same as or different from scheduling cell #2 or scheduling cell #3. It is assumed that scheduling cells #2 and #3 are different. For example, the scheduling cell #2 can be a first active scheduling cell for serving cell #4 (see embodiment E-1-0) or a previously indicated active scheduling cell. The UE monitors PDCCH for serving cell #1 on scheduling cell #2. The UE receives, for serving cell #1, an indication of change of the active scheduling cell from scheduling cell #2 to scheduling cell #3. The indication is received on a serving cell #4, which can be same as scheduling cells #2 or #3 or serving/scheduled cell #1, or a serving cell which is different from both the scheduled cell #1 and the scheduling cells #2 and #3. The UE then monitors PDCCH for serving cell #1 on scheduling cell #3. In one example, the UE can receive an indication on the PCell. In another example, the UE can receive the indication on an SCell.

According to scenario 1, the UE complexity in terms of for example PDCCH monitoring, blind decoding, control channel estimation, and/or monitoring non-overlapped CCEs may not change compared to a legacy UE, since at each time instance/period, the UE still monitors PDCCH on a single scheduling cell per scheduled cell, and the PDCCH monitoring impact of a change of scheduling cell for a scheduled cell can be no different from the case of RRC reconfiguration of the scheduling cell for the scheduled cell.

One example benefit of this method, compared to the semi-static offloading mechanism (i.e., reconfiguration of the scheduling cell) can be that a change of scheduling cell can be achieved with faster signaling in L1/L2 rather than L3 RRC signaling, which also incurs higher signaling overhead.

Figure 12:
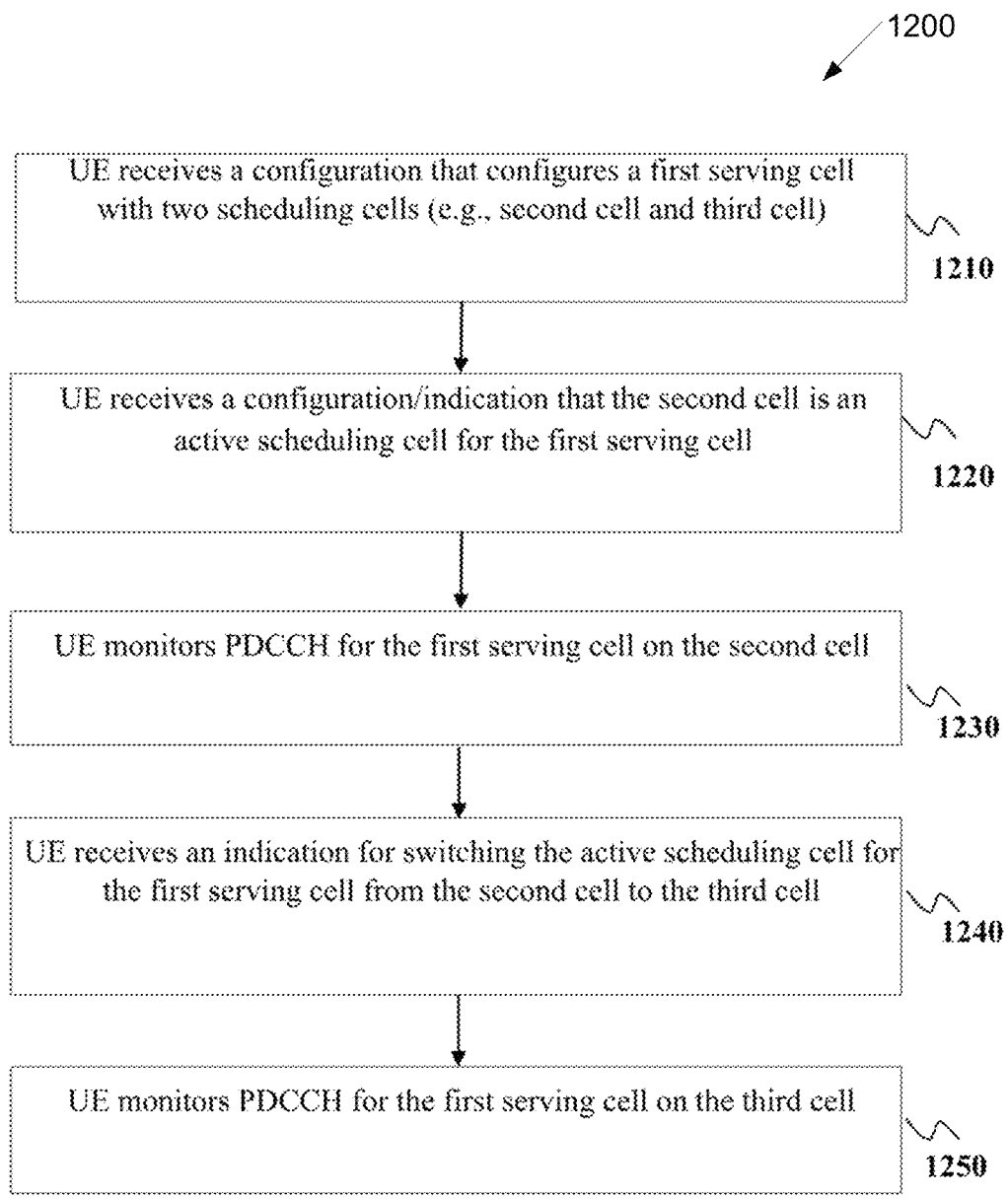
FIG. 12 illustrates a flowchart of a method for operation of dynamic switching of the active scheduling cell for a given scheduled cell according to embodiments of the present disclosure.

FIG. 12 illustrates a flowchart of a method 1200 for operation of dynamic switching of the active scheduling cell for a given scheduled cell according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

FIG. 12 shows an example flowchart for the operation in Scenario 1, namely dynamic switching of the active scheduling cell for a given scheduled cell. A UE receives a configuration that configures a first serving cell with two scheduling cells (e.g., second cell and third cell), at step 1210. The UE receives a configuration/indication that the second cell is an active scheduling cell for the first serving cell, at step 1220. The UE monitors PDCCH for the first serving cell on the second cell, at step 1230. Then, the UE receives an indication for switching the active scheduling cell for the first serving cell from the second cell to the third cell, at step 1240. The UE monitors PDCCH for the first serving cell on the third cell, at step 1250.

As aforementioned, in one embodiment of E-1-2, scenario 2 for adaptive cross-carrier scheduling (all scheduling cells are simultaneously active) is provided.

In one example (referred to as "scenario 2"), the UE is indicated that, for each scheduled cell configured with multiple scheduling cells, all of the configured scheduling cells are simultaneously active all the time. According to this example, the UE monitors PDCCH for a given scheduled cell simultaneously on all the two or more scheduling cells configured for that scheduled cell. For example, a scheduled cell is configured with two scheduling cell and both of them are active scheduling cells for the scheduled cell. In another example, a scheduled cell is configured with four scheduling cell and all four of them are active scheduling cells for the scheduled cell.

For scenario 2, there is no need for the network to indicate an active scheduling cell(s) and/or for the UE to use any (predetermined) rule/method to determine an active scheduling cell(s), since all scheduling cells are considered to be active and potentially used for PDCCH/DCI transmission and reception. This method enables a fast/instantaneous DCI offloading mechanism, since the gNB can simply send a PDCCH/DCI at a first time instant on any of the scheduling cells the gNB wishes, independent of the pervious and future PDCCH/DCI transmissions and without any need for indication to the UE.

Figure 13:
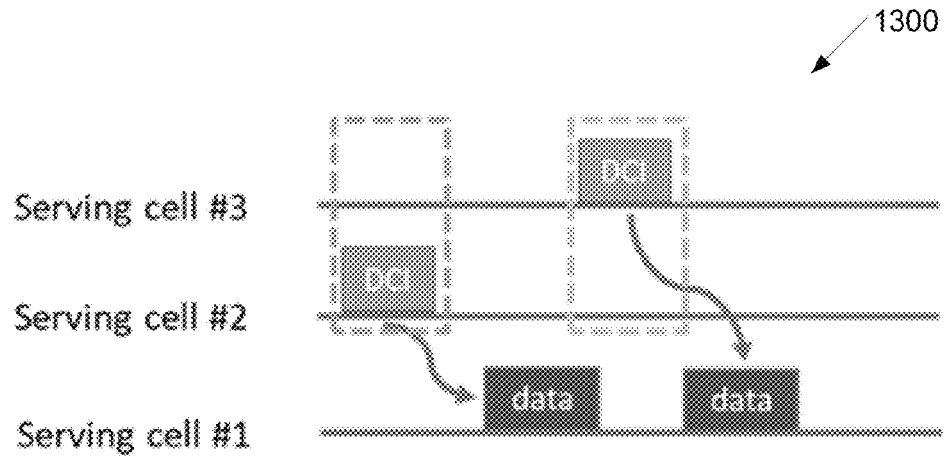
FIG. 13 illustrates example scheduling cells that are active at all times according to embodiments of the present disclosure.

FIG. 13 illustrates example scheduling cells 1300 that are active at all times according to embodiments of the present disclosure. An embodiment of the scheduling cells 1300 shown in FIG. 13 is for illustration only.

FIG. 13 shows an example operation for scenario 2, i.e., both scheduling cells are active at all times. A serving cell #1 (i.e., scheduled cell) is configured with two scheduling cells, namely serving cell #2 and #3. It is noted that, serving cell #1 can be same as or different from scheduling cell #2 or scheduling cell #3. It is assumed that scheduling cells #2 and #3 are different. The UE monitors PDCCH for serving cell #1 simultaneously on both scheduling cells #2 and #3. On some occasions, the UE receives a PDCCH/DCI for serving cell #1 on the scheduling cell #2, while in some other occasions, the UE receives a PDCCH/DCI for serving cell #1 on the scheduling cell #3.

Since a UE capable of supporting Scenario 2 needs to monitor PDCCH on two or more scheduling cells per scheduled cell, UE complexity aspects in terms of for example PDCCH monitoring, blind decoding, control channel estimation, and/or monitoring non-overlapped CCEs need to be addressed. For example, specification can impose restrictions on PDCCH monitoring and/or define modified behavior for the gNB and/or UE so that the complexity of a UE supporting Scenario 2 is either comparable or close to that of a legacy UE that only supports PDCCH monitoring on a single scheduling cells per scheduled cell. In one example, a UE supporting Scenario 2 may be deemed a more capable UE compared to a legacy UE, which can handle higher PDCCH monitoring complexity.

As aforementioned, in one embodiment of E-1-3, scenario 3 for adaptive cross-carrier scheduling (Scenario 1+Scenario 2) (dynamic switching of multiple simultaneously active scheduling cells) is provided.

In yet another example (referred to as "scenario 3"), the UE is indicated that, at least for one scheduled cell configured with [M]>2 scheduling cells, a strict subset of size [N], wherein 2<[N]<[M], of the configured scheduling cells can be simultaneously active at least in some time instances/periods. According to this example, the UE can be configured/indicated to monitor PDCCH for a given scheduled cell simultaneously on at least two or more scheduling cells configured for that scheduled cell. For example, a scheduled cell is configured with four scheduling cells, and two out of the four configured scheduling cells are active scheduling cells for the scheduled cell. It is noted that, based on the configuration, at least in some time instances/periods/occasions, scenario 3 can fall back to scenario 1 (when only one configured scheduling cell is active for the scheduled cell) or to scenario 2 (when all configured scheduling cells are active for the scheduled cell).

For scenario 3, similar to scenario 1, there is a need for network indication or UE determination of the active scheduling cell(s). In addition, for scenario 3, similar to scenario 2, there is a need to address PDCCH monitoring complexity aspects for example by imposing restrictions on PDCCH monitoring, and/or defining modified behavior for the gNB and/or UE, and/or or defining new UE capability for PDCCH monitoring.

As aforementioned, in one embodiment of E-1-4, network signaling for selection among Scenarios 1/2/3 for adaptive cross-carrier scheduling is provided.

In one embodiment, a scheduled cell which is configured with two or more scheduling cells can be configured with a parameter [N] for the maximum number of active scheduling cells.

In one example, when [N]=1, then the scheduled call is associated with only one active scheduling cell, and therefore falls into scenario 1.

In another example, when [N]>1, then the UE can be configured with exactly [N] active scheduling cells or strictly less than [N] active scheduling cell; in addition, later gNB indications via L1/L2 signaling and/or UE determination based on predetermined rules/methods can provide change, addition, and/or removal to the set of active scheduling cells for the scheduled cell. According to this example, at each time instance/period/occasion, there is either one active scheduling cell for the scheduled cell (i.e., scenario 1) or there are at least two active scheduling cells associated with the scheduled cell (i.e., scenario 2 or 3).

Therefore, parameter [N] along with network configuration and indications for the scheduling cell(s) provide a means to distinguish between scenarios 1/2/3, and also facilitate a transition between different Scenarios.

As aforementioned, in one embodiment of E-2, contents of an indication for switching of active scheduling cell(s) are provided.

In one embodiment, when a UE is configured with at least two scheduling cells for a given scheduled cell, and is associated with a set of active scheduling cells which is a strict subset of the set of at least two configured scheduling cells, (for example, a scheduled cell is configured with two scheduling cells and only one of them can be an active scheduling cells for the scheduled cell), e.g., scenario 1 and/or scenario 3 in embodiment E-1, the UE can receive an indication from the network for a change, replacement, addition, and/or modification of the active scheduling cell(s), herein referred to as "an indication for switching of active scheduling cell(s)" for brevity.

According to this embodiment, an indication for switching of active scheduling cell(s) can include a "cross-carrier scheduling/switching" (CCS) field including for example one or more of: a scheduling cell indicator (SCI) that indicates an index for a new active scheduling cell with a bit-width such as 1-2 bits (associated with 2-4 scheduling cells), a BWP index in the new active scheduling cell with a bit-width such as 2 bits (associated with 4 BWPs) that can facilitate a switching of the active BWP on the new active scheduling cell before starting to monitor PDCCH, and a scheduled cell index that indicates the scheduled cell for which the active scheduling cell is changed, and can be used to distinguish the cell on which the indication is received from the cell for which the activation of the scheduling cell applies.

In one example, an indication for switching of active scheduling cell(s) can include multiple CCS fields, corresponding to multiple scheduled cell(s), and/or multiple scheduling cell(s), and/or multiple UEs.

In another example, if the BWP index is absent in an indication for switching of active scheduling cell(s), the UE would monitor PDCCH on the current active DL BWP or an initial DL BWP or a first active BWP or a default BWP of the indicated scheduling cell(s).

In yet another example, an indication for switching of active scheduling cell(s) can imply a change and/or an addition and/or modification of the set of active scheduling cell(s). For example, for a scheduled cell with two configured scheduling cells and associated with one active scheduling cell, an indication for switching of active scheduling cell(s) can include one CCS field, in which case a current/old active scheduling cell is replaced by a new active scheduling cell. For example, for a scheduled cell with two configured scheduling cells and associated with up to two active scheduling cells: in one case, there is already one active scheduling cell for the scheduled cell and an indication for switching of active scheduling cell(s) can include one CCS field to add a new active scheduling cell, so that a total of two active scheduling cells are present (e.g., scheduling cell #2 is added as a new active scheduling cell in addition to a previously active scheduling cell #1); in another case, there is already one or two active scheduling cell(s) for the scheduled cell and an indication for switching of active scheduling cell(s) can include two CCS fields to replace the existing active scheduling cell(s) with the two newly activated scheduling cells (e.g., scheduling cell #2 and #3 become the new active scheduling cells instead of a previously active scheduling cell #1).

In one example, the UE that has a first number of active scheduling cells for a given scheduled cell does not expect to receive an indication for switching of active scheduling cell(s) that includes an indication for addition of a second number of active scheduling cell, wherein a summation of the first number and the second number exceeds the configured maximum number of active scheduling cells for the scheduled cell. In a further example, an indication for a switching of active scheduling cell(s) (and/or each CCS field therein) includes a parameter the indicates whether the indications pertains an activation, addition, deactivation, removal, or replacing a configured scheduling cell(s) from the set of active scheduling cells for a scheduled cell.

In one example, an indication for switching of active scheduling cell(s) can include one or multiple CCS fields, each CCS field including a parameter for indicating scheduled cell index, and therefore can apply only to the scheduled cell(s) that are indicated by the CCS fields. According to this example, not all scheduled cells "corresponding to" the indicated scheduling cell may necessarily change their active scheduling cell to the indicated scheduling cell. For example, if a second scheduled cell and a third scheduled cell are both configured a same first scheduling cell, when the UE receives an indication for switching of active scheduling cell(s) that includes an indication that the first scheduling cell is an active scheduling cell for the second scheduled cell, such indication does not imply that the first scheduling cell is also an active scheduling cell for the third scheduled cell.

In one example, when the UE receives an indication for switching of active scheduling cell(s) that includes an indication that the first scheduling cell is an active scheduling cell for the second scheduled cell, such indication implies that the first scheduling cell is also an active scheduling cell a own cell, i.e., for the first scheduling cell. In one example, the UE can be configured with one or multiple groups that include one or multiple scheduled cells corresponding to a scheduling cell. According to this example, the UE can receive an indication that the scheduling cell is an active scheduling cell for a first group of scheduled cells (among the configured group of scheduled cell) e.g. by indicating a group index, or for a number of groups of scheduled cells based on e.g. a bitmap that corresponds to the configured group of scheduled cell, wherein a "1" in the [N]-th position in the bitmap indicates that the scheduling cell is active for the corresponding group, e.g., the [N]-th group, of the scheduled cells, and a "0" in the [N]-th position in the bitmap indicates that the scheduling cell is active for the corresponding group, e.g., the [N]-th group, of the scheduled cells. In another example, an indication can correspond to scheduled cells within a group, so that a scheduling cell is active for one or multiple scheduled cell(s) within a group e.g. based on a bitmap within the group.

In one example, an indication for switching of active scheduling cell(s) can apply to all scheduled cells corresponding to the scheduling cell and can activate the indicated scheduling cell as an active scheduling cell for all corresponding scheduled cells. In one example, if a scheduled cell already had the indicated scheduling cell as an active scheduling cell, no action is needed for that scheduled cell. According to this example, a scheduled cell index can be absent in an indication for switching of active scheduling cell(s). In another example, a scheduling cell indicator (SCI) parameter can have a bit-width of, for example, up to 5 bits or less to indicate an "absolute" cell index (e.g., out of the up to 32 configured serving cells for a UE).

In another example, an indication can correspond to a group of scheduling cell among e.g. one or multiple groups of scheduling cells, e.g., using a group ID method and/or a bitmap method. In one example, when a scheduling cell is configured with multiple scheduling cells, an indication can include a bitmap, so that a "1" in the [N]-th position in the bitmap indicates that the [N]-th scheduling cell is active for that scheduled cell, while a [0] indicates that the [N]-th scheduling cell is not active for that scheduled cell.

Figure 14:
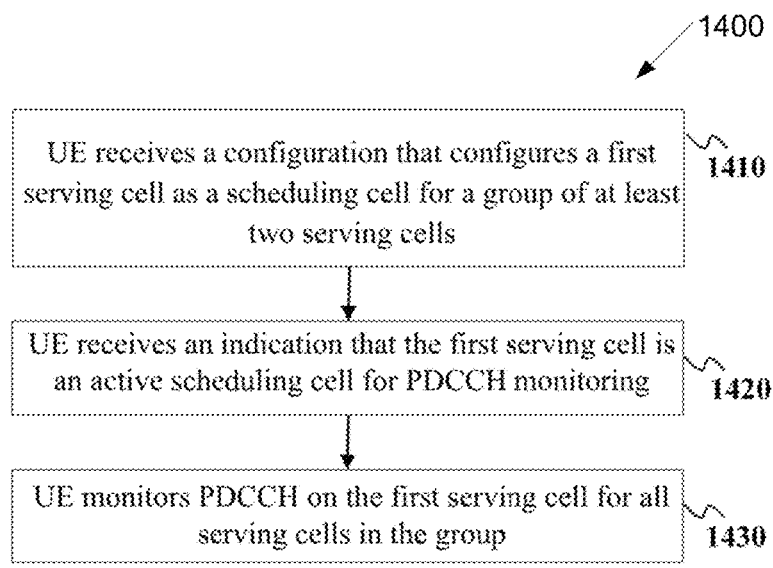
FIG. 14 illustrates a flowchart of a method for indication for switching of active scheduling cells according to embodiments of the present disclosure.

FIG. 14 illustrates a flowchart of a method 1400 for indication for switching of active scheduling cells according to embodiments of the present disclosure. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, a UE receives a configuration that configures a first serving cell as a scheduling cell for a group of at least two serving cells, at step 1410. For example, the group can include at least the first serving cell. The UE receives an indication that the first serving cell is an active scheduling cell for PDCCH monitoring, at step 1420. The UE monitors PDCCH on the first serving cell for all serving cells in the group, at step 1430.

As aforementioned, in one embodiment of E-3, indication mechanisms for switching of active scheduling cell(s) is provided. In one embodiment, when a UE is configured with at least two scheduling cells for a given scheduled cell, and is associated with a set of active scheduling cells which is a strict subset of the set of at least two configured scheduling cells, (for example, a scheduled cell is configured with two scheduling cells and only one of them can be an active scheduling cells for the scheduled cell), e.g., scenario 1 and/or scenario 3 in Embodiment E-1, various mechanism based on network signaling and/or UE determination can be used to indicate/trigger a switching of the active scheduling cell among the at least two scheduling cells.

As aforementioned, in one embodiment of E-3-1, in a first mechanism for this embodiment, a UE-specific PDCCH/DCI can be used to indicate a switching of the active scheduling cell(s). According to this mechanism, the UE receives a PDCCH on a first scheduling cell, such as a first active scheduling cell for the scheduled cell or a previously activated scheduling cell for the scheduled cell, wherein the PDCCH includes a DCI carrying an indication for switching to a second scheduling cell as the active scheduling cell for the scheduled cell. In one example, a DCI format can be a DCI format for scheduling UL data transmission such as a DCI format 0_0 and 0_1, and/or can be a DCI format for scheduling DL data transmission such as a DCI format 1_0 and 1_1. In another example, a DCI format can be a "compact" DCI format (e.g., for URLLC use-cases) such as a DCI format 0_2 and 1_2, potentially with restrictions on the bit-width of the CCS field, such as a configurable bit-width for the CCS field, or potentially with merging of the CCS field with other fields such as CIF so that a combined bit-width (e.g., CCF+CIF bit-width) does not exceed a configured/specified number of bits.

In one example, the indication for switching of active scheduling cell applies only to the scheduled cell which receives the DCI format and/or for which a data transmission is scheduled by the DCI format. In another example, the indication for switching of active scheduling cell applies to all scheduled cells configured with a same scheduling cell as the scheduled cell which receives the DCI format and/or for which a data transmission is scheduled by the DCI format; namely the scheduling cell becomes an active scheduling cell for the scheduled cell receiving the indication as well as all scheduled cells that are configured with the same scheduling cell.

In one example, a UE-specific PDCCH carries a DCI format that includes an indication for switching of the active scheduling cell for a scheduled cell in addition to scheduling data transmission on that scheduled cell. In one example, a "CCS" field is added as a new field to the DCI format. In one example, a CCS field can be as described in embodiment E-2. In one example, a DCI format may include multiple CCS fields, each corresponding to activation of a different/separate scheduling cell (for the scheduled cell which receives the DCI format and/or for which the data transmission is scheduled by the DCI format). In one example, when a scheduled cell is configured with a single scheduling cell, then the UE does not expect any field for cross-carrier scheduling (CCS) in the DCI format, i.e., the CCS field has a zero (0) bit-width, and the UE continues to monitor PDCCH for the first serving cell on the same scheduling cell.

Figure 15:
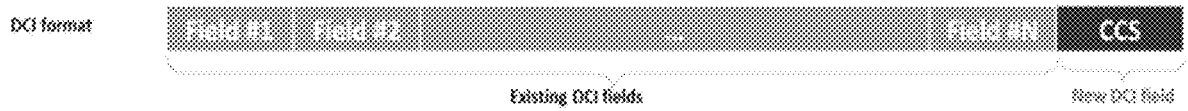
FIG. 15 illustrates an example DCI format according to embodiments of the present disclosure.

FIG. 15 illustrates an example DCI format 1500 according to embodiments of the present disclosure. An embodiment of the DCI format 1500 shown in FIG. 15 is for illustration only.

As illustrated in FIG. 15, wherein Fields #1, #2, through #N correspond to existing fields in the DCI format, e.g., for scheduling DL/UL data transmission, and a new field for CCS is added to the DCI format for indication of a switching of the active scheduling cell.

Figure 16:
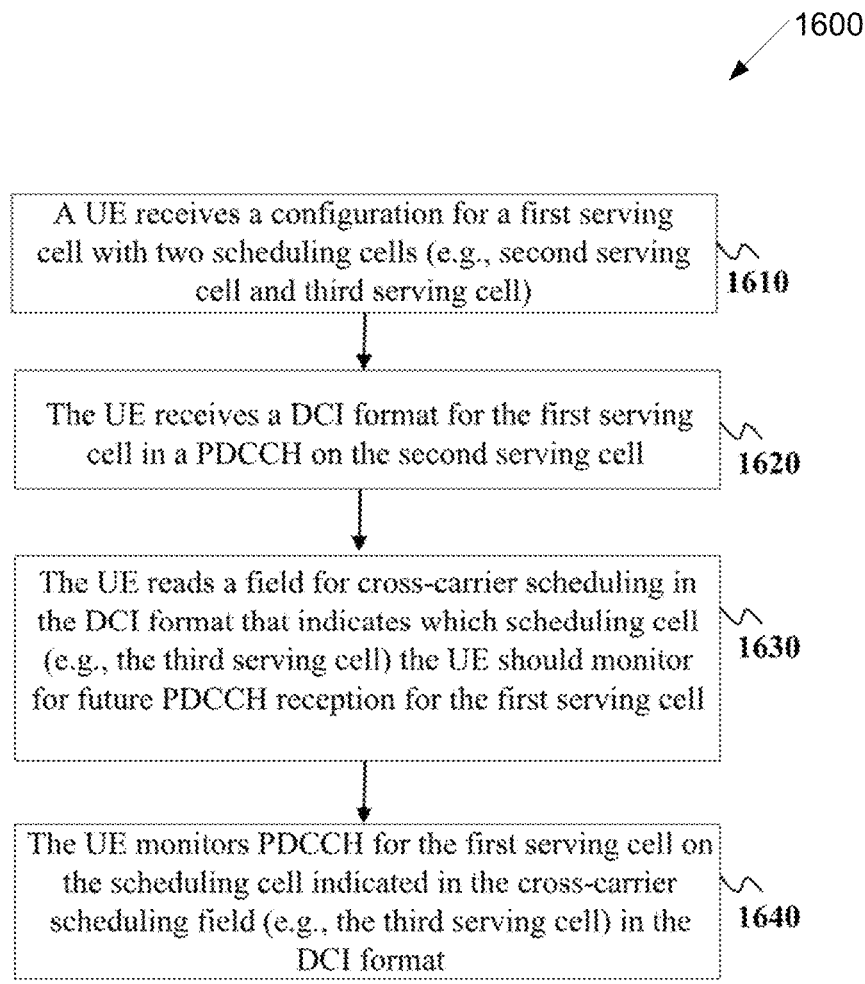
FIG. 16 illustrates a flowchart of a method for indication of switching of the active scheduling cells according to embodiments of the present disclosure.

FIG. 16 illustrates a flowchart of a method 1600 for indication of switching of the active scheduling cells according to embodiments of the present disclosure. An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

As illustrated in FIG. 16, a UE receives a configuration for a first serving cell with two scheduling cells (e.g., second serving cell and third serving cell), at step 1610. The UE receives a DCI format for the first serving cell in a PDCCH on the second serving cell, at step 1620. For example, the second serving cell can be a first active scheduling cell or a configured and previously activated scheduling cell for the first serving cell. In one example, the DCI format can be in a PDCCH in a UE-specific search space or a common search space of the second serving cell for triggering data transmission/reception (e.g., downlink assignment, uplink grant, SPS/CG activation) on a first serving cell. In another example, the UE performs data transmission/reception on the first serving cell as triggered in the received DCI format. The UE reads a field for cross-carrier scheduling in the DCI format that indicates which scheduling cell (e.g., the third serving cell) the UE may monitor for future PDCCH reception for the first serving cell, at step 1630. Then, the UE monitors PDCCH for the first serving cell in the scheduling cell indicated in the cross-carrier scheduling field (e.g., the third serving cell) in the DCI format, at step 1640.

In one example, a UE-specific PDCCH carries a DCI format may not be used for scheduling data transmission on a scheduled cell, rather merely used for including an indication for switching of the active scheduling cell. According to this example, no new field may be included in the DCI format for cross-carrier scheduling, rather a specified group of DCI fields, such as one or more of a frequency domain resource allocation (FDRA) field and a time-domain resource allocation (TDRA) field, can be re-interpreted/re-purposed to indicate a CCS field, as described in Embodiment E-2. In one example, the specified group of DCI fields can be re-interpreted/re-purposed as multiple CCS fields, each corresponding to activation of a different/separate scheduling cell.

According to this example, for PDCCH monitoring for this DCI format, in one example, the UE uses an existing RNTI, such as a C-RNTI, while in another example, the UE uses a new RNTI such as a "CCS-RNTI." In one example, the UE performs a validation of a DCI format to determine whether the DCI format is used an indication for switching of the active scheduling cell. For example, the UE determines whether a specified group of DCI fields, such as one or more of modulation and coding scheme (MCS), HARQ process number (HPN), redundancy version (RV), are set to specified default values, such as all zero(s) or all one(s) values. In another example, a validation also includes the usage of the new RNTI such as CCS-RNTI for PDCCH monitoring and reception of the DCI format.

Figure 17:
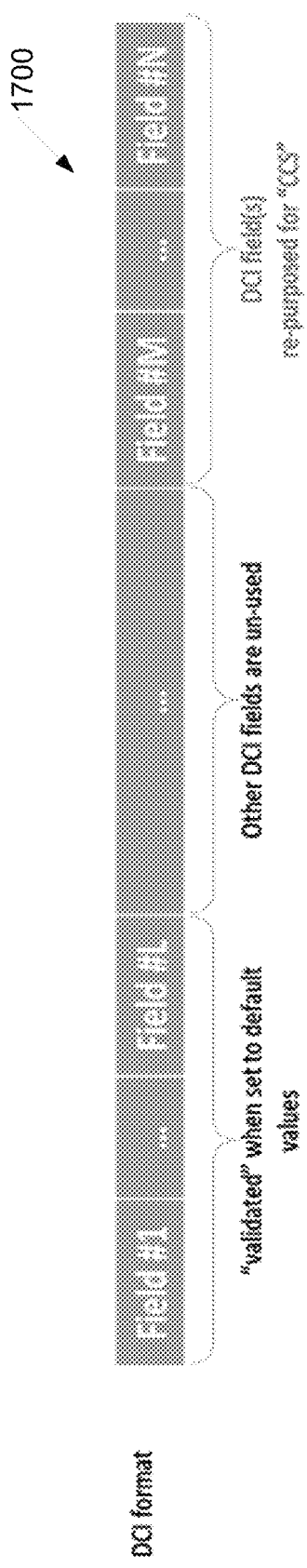
FIG. 17 illustrates an example DCI format according to embodiments of the present disclosure.

FIG. 17 illustrates an example DCI format 1700 according to embodiments of the present disclosure. An embodiment of the DCI format 1700 shown in FIG. 17 is for illustration only.

As illustrated in FIG. 17, wherein Fields #1 through #L correspond to validation fields that are validated when set to default values per specification, and Fields #M through #N are re-purposed for/re-interpreted as a CCS field(s). In one example, other remaining DCI fields are unused.

A UE receives a DCI format (for a first serving cell) in a PDCCH in a UE-specific search space set or a common search space set of a second serving cell using an existing RNTI such as a C-RNTI or using a new RNTI for cross-carrier scheduling, such as a CCS-RNTI. The UE determines a value(s) of a first group of at least one validation DCI field within the received DCI format per specifications. The UE determines whether the value(s) of the first group of at least one "validation" field is/are set to default value(s) per specifications. In one example, if the UE determines that the value(s) of the first group of at least one "validation" field is/are not set to default value(s) per specifications AND the UE has used a legacy RNTI such as a C-RNTI for PDCCH monitoring and reception of the DCI format, the UE performs legacy operation, such as data transmission or reception as triggered by the received DCI format.

In another example, if the UE determines that the value(s) of the first group of at least one "validation" field is/are not set to default value(s) per specifications AND the UE has used a new RNTI such as a CCS-RNTI for PDCCH monitoring and reception of the DCI format, the UE discards the received DCI format. But, if the UE determines that the value(s) of the first group of at least one "validation" field is/are set to default value(s) per specifications, the UE does not perform any legacy operation such as data transmission or reception, rather the UE determines a value(s) of a second group of at least one field in the received DCI format per specifications. The UE re-interprets the value(s) of the second group including at least one field to determine a new active scheduling cell (e.g., a third serving cell) that the UE may monitor for future PDCCH reception (for the first serving cell).

In one example, the UE sends a HARQ-ACK feedback to indicate successful reception of the PDCCH and determination of the new active scheduling cell. The UE monitors PDCCH (for the first serving cell) on the determined new active scheduling cell.

Protection methods can be considered for a UE-specific DCI format to reduce the likelihood of UE missing the PDCCH/DCI format used for indication of a switching of active scheduling cell(s). In one example, gNB implementation can increase the aggregation level (AL) for transmission of this DCI format so that low coding rate can be used and a higher reliability for the DCI format can be achieved.

In another example, to avoid long-term protection of the PDCCH/DCI format used for indication of a switching of active scheduling cell(s), a scheduling cell inactivity timer method can be used, so that multiple consecutive missing of the PDCCH/DCI format can be detected and avoided (see embodiment E-3-4).

In yet another example, the UE may transmit a HARQ-ACK feedback to indicate the successful reception of the PDCCH/DCI format for indication of a switching of active scheduling cell(s). According to this example, the UE can transmit the HARQ-ACK feedback in a PUCCH resource, such as a specified/default/configured PUCCH resource or a PUCCH resource indicated by the DCI format, or multiplexed on a PUSCH resource transmission.

As aforementioned, in one embodiment of E-3-2, in a second mechanism for this embodiment, a group-common PDCCH/DCI format can be used to indicate a switching of the active scheduling cell(s). According to this mechanism, a group of UEs receive a single joint indication in a group-common DCI format including at least two fields, wherein each field corresponds to an indication for one UE for switching of active scheduling cell(s), such as a CCS field as described in Embodiment E-2. For example, the group of UEs can include UEs in nearby proximity with similar channel conditions experiencing similar PDCCH reliability performance and requiring similar/related DCI offloading situation between PCell and scheduling SCell(s). In one example, the UE receives the group-common DCI format using a new UE-group RNTI such as a CCS-RNTI.

In the first instance to the second mechanism, the group-common DCI format includes a fixed set of UEs in the group. According to this instance, each UE within the group is RRC configured with a parameter for a position in the group-common DCI format, so that the UE reads a fixed position/field within the group-common DCI format. In one example, if there is no change for the active scheduling cell(s) to be indicated to a UE within the group, the position/field corresponding to that UE in the group-common DCI format can include a default value such as all zeros.

Figure 18:
FIG. 18 illustrates an example group-common DCI format according to embodiments of the present disclosure.

FIG. 18 illustrates an example group-common DCI format 1800 according to embodiments of the present disclosure. An embodiment of the group-common DCI format 1800 shown in FIG. 18 is for illustration only.

FIG. 18 shows an example group-common DCI format used for the first option, including [N] fields for [N] UEs, wherein CCS #1 corresponds to a switching of the active scheduling cell(s) for a first UE, and CCS #2 corresponds to a second UE, and so on, and the field CCS #N corresponds to an N-th UE.

In the second instance to the second mechanism, the group-common DCI format includes a variable set of UEs in the group with a variable position/field in the group-common DCI format. According to this option, each UE within the group is RRC configured with a UE ID within the UE-group/UE-group membership ID, with a bit-width such as 4 bits for a group of 16 UEs. Then, a UE determines an indication within the group-common DCI format for switching of active scheduling cell(s), such as a CCS field as described in Embodiment E-2, when the UE ID within the UE-group/UE-group membership ID for that UE is included in a field in the group-common DCI format. In such a case, the UE reads the value of the corresponding field to determine the indication, e.g., the CCS field. In this option, when there is no change for the active scheduling cell(s) to be indicated to a UE within the group, the group-common DCI format may not include any field corresponding to that UE.

Figure 19:
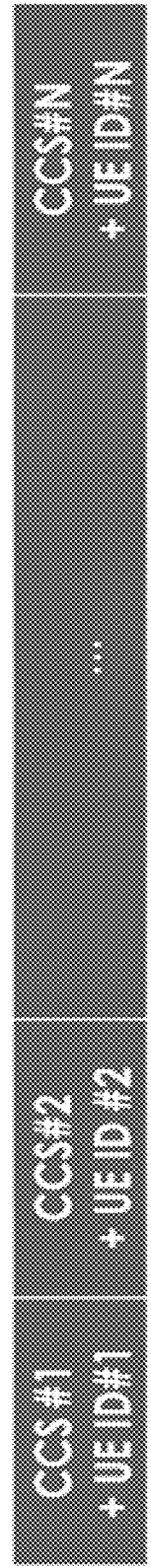
FIG. 19 illustrates another example group-common DCI format according to embodiments of the present disclosure.

FIG. 19 illustrates another example group-common DCI format 1900 according to embodiments of the present disclosure. An embodiment of group-common DCI format 1900 shown in FIG. 19 is for illustration only.

FIG. 19 shows an example group-common DCI format used for the second option, including [N] fields for [N] UEs, wherein CCS #1 corresponds to a switching of the active scheduling cell(s) for a first UE with a UE ID #1 within the group, and CCS #2 corresponds to a second UE with a UE ID #1 within the group, and so on, and the field CCS #N corresponds to an N-th UE with a UE ID #N within the group.

Figure 20:
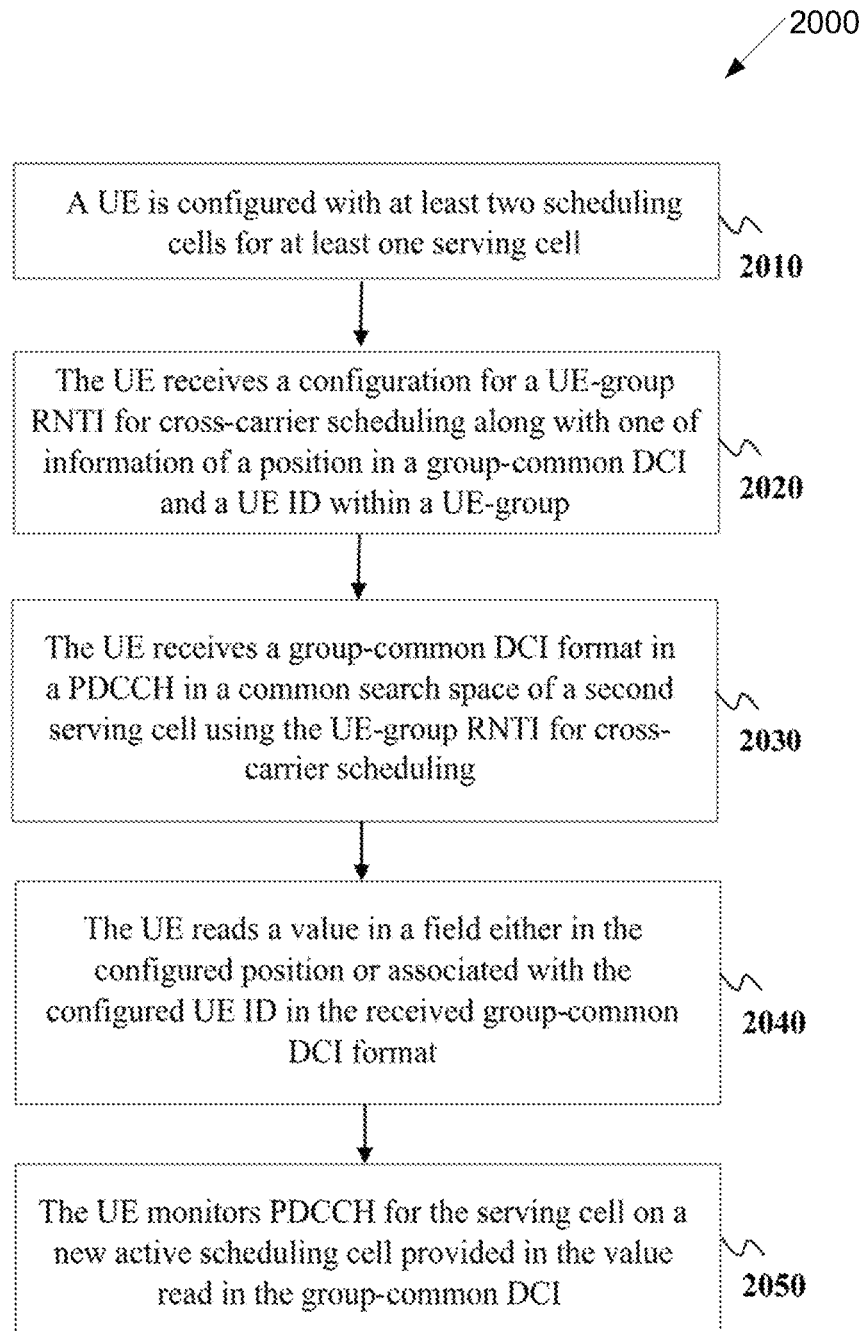
FIG. 20 illustrates a flowchart of a method for indication of switching of the active scheduling cells according to embodiments of the present disclosure.

FIG. 20 illustrates a flowchart of a method 2000 for indication of switching of the active scheduling cells according to embodiments of the present disclosure. An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

FIG. 20 shows an example flowchart for the second mechanism for indication of switching of active scheduling cell(s), namely using group-common PDCCH/DCI format.

A UE is configured with at least two scheduling cells (e.g., a first serving cell and a second serving cell) for at least one serving cell, at step 2010. The UE receives a configuration for a UE-group RNTI such as a CCS-RNTI for cross-carrier scheduling along with one of information of a position in a group-common DCI and a UE ID within a UE-group, at step 2020. The UE receives a group-common DCI format in a PDCCH in a common search space of a first serving cell using the UE-group RNTI for cross-carrier scheduling, at step 2030. For example, the first serving cell can be a first active scheduling cell or a configured and previously activated scheduling cell for the serving cell. The UE reads a value in a field in the configured position or in a filed associated with the configured UE ID in the received group-common DCI format, at step 2040. Finally, the UE monitors PDCCH for the serving cell on a new active scheduling cell (e.g., the second serving cell) provided in the value read in the group-common DCI, at step 2050. In one example, when the UE is configured with the UE ID within the UE-group, and when the UE determines that a configured UE ID within the UE-group is not included in the group-common DCI format, the UE discards the group-common DCI format, and continues to monitor PDCCH for the serving cell on the serving cell, i.e., no change to the active scheduling cell(s) for that UE.

As aforementioned, in one embodiment of E-3-3, in the third mechanism for this embodiment, a downlink MAC-CE activation/deactivation command can be used to indicate a switching of the active scheduling cell(s). According to this mechanism, the DL MAC-CE command is carried by a PDSCH transmission and applies to a single UE, namely the UE for which the PDSCH is scheduled (and received). This mechanism is suitable for control overhead load balancing and offloading for situations with moderate speed of change in the network traffic pattern. In addition, this mechanism facilitates a joint indication of switching of active scheduling cell(s) for multiple/several scheduling cells and/or corresponding to multiple/several scheduled cells within a single command, which is difficult/impossible to fit in a (UE-specific or group-common) DCI format as described in Embodiments E-3-1 and E-3-2.

In this mechanism, the DL MAC-CE command can include a variable number of CCS fields, as described in Embodiment E-2, wherein each field corresponds to a scheduled cell whose active scheduling cell is changing and/or corresponds to a scheduling cell which is getting activated or deactivated for all corresponding scheduled cells. In one example, the MAC-CE includes a field that indicates the number of CCS fields included in the MAC-CE command. In another example, for each CCS field, there is a corresponding field that indicates whether the CCS field correspond to activation/addition of a scheduling cell or deactivation/removal/replacement of a scheduling cell (for a scheduled cell).

In one example, the UE transmits a HARQ-ACK feedback to acknowledge a successful reception (or not) of the MAC-CE command for switching of active scheduling cell(s). Such HARQ-ACK feedback, in one example, is transmitted in a specified/default/configured PUCCH resource or a PUCCH resource indicated in a DCI format the schedules the PDSCH that carries the MAC-CE command, while in other example is multiplexed on a PUSCH resource transmission.

Figure 21:
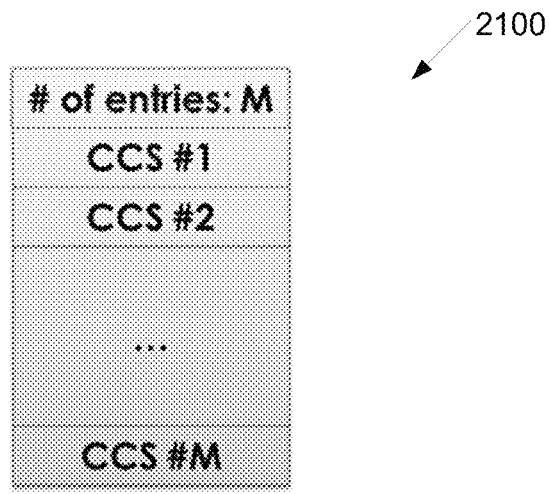
FIG. 21 illustrates an example downlink MAC-CE activation deactivation command according to embodiments of the present disclosure.

FIG. 21 illustrates an example downlink MAC-CE activation deactivation command 2100 according to embodiments of the present disclosure. An embodiment of the downlink MAC-CE activation deactivation command 2100 shown in FIG. 21 is for illustration only.

FIG. 21 shows an example downlink MAC-CE activation deactivation command used in the third mechanism, wherein a field indicated the number [M] of the CCS fields included the MAC-CE command, and wherein CCS #1 corresponds to a first indication of a switching in the active scheduling cell, and CCS #2 corresponds to a second indication of a switching in the active scheduling cell, and so on, and CCS #M corresponds to an M-th indication of a switching in the active scheduling cell.

Figure 22:
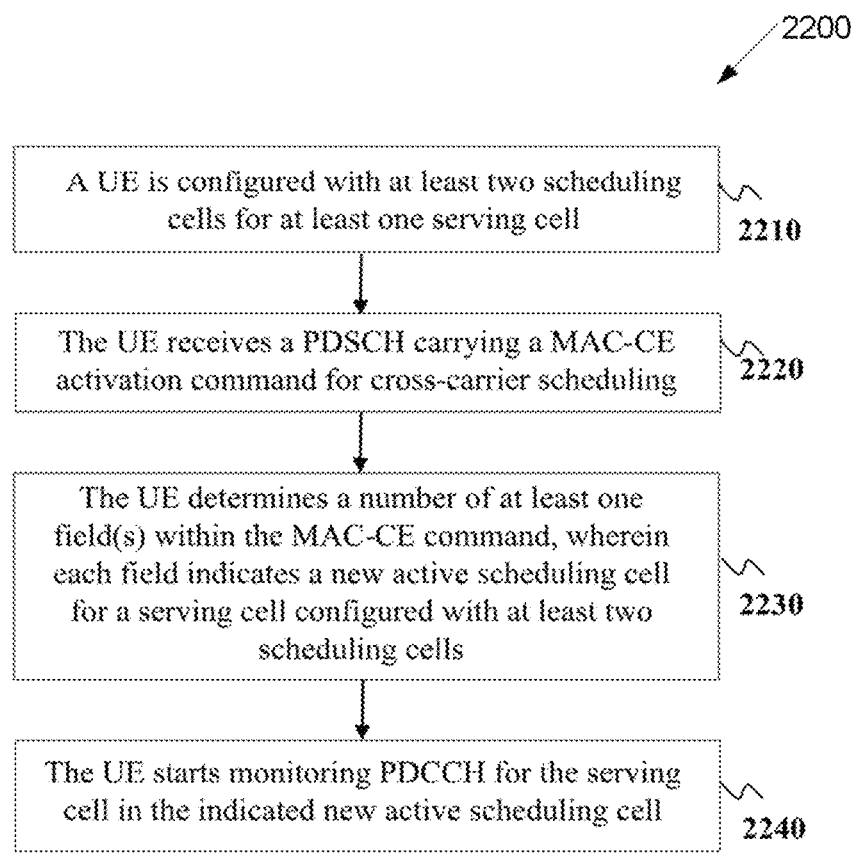
FIG. 22 illustrates a flowchart of a method for indication of switching of the active scheduling cells using MAC-CE activation/deactivation command according to embodiments of the present disclosure.

FIG. 22 illustrates a flowchart of a method 2200 for indication of switching of the active scheduling cells using MAC-CE activation/deactivation command according to embodiments of the present disclosure. An embodiment of the method 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

FIG. 22 shows an example flowchart for the third mechanism, namely using MAC-CE activation/deactivation command for indication of a switching of active scheduling cell(s). A UE is configured with at least two scheduling cells for at least one serving cell, at step 2210. The UE receives a PDSCH carrying a MAC-CE activation command for cross-carrier scheduling, at step 2220. The UE determines a number of at least one field(s) within the MAC-CE command, wherein each field indicates a new active scheduling cell for a serving cell configured with at least two scheduling cells, at step 2230. In one example, the UE transmits a HARQ-ACK feedback in a PUCCH resource to indicate a successful reception of the PDSCH carrying the MAC-CE activation command. The UE starts monitoring PDCCH for the serving cell in the indicated new active scheduling cell, at step 2240. In one example, the UE starts the PDDCH monitoring after [N] time units/msec/symbols/slots after transmission of the HARQ-ACK in the PUCCH, wherein the parameter [N] is specified or configured or determined based on a rule.

As forementioned, in one embodiment of E-3-4, in the fourth mechanism for this embodiment, a scheduling cell inactivity timer method can be used to determine a switching of the active scheduling cell(s). According to this mechanism, RRC configures a "default" scheduling cell along with a configuration of values for the inactivity timer. Then, if the UE does not receive PDCCH/DCI for a scheduled cell on an active scheduling cell until the inactivity timer for that scheduling cell expires, the UE can fall back to the default scheduling cell for PDCCH monitoring for the scheduled cell. Further, when the UE receives a new indication from the network for changing an active scheduling cell for the scheduled cell while the inactivity timer for the currently/previously active scheduling cell is running, the UE can reset/restart the timer.

This mechanism can provide a long-term protection for missing PDCCHs/DCI formats used for indicating a switching of the active scheduling cell. For example, if the network sends PDCCH(s)/DCI format(s) to indicate a switching(s) of the active scheduling cell, but the UE is not monitoring the true active scheduling cell(s), then the UE would keep missing the scheduling PDCCH/DCIs, so the gNB may eventually realize that the UE has lost the indications for a switching(s) of the active scheduling cell. In such a case, based on the configured inactivity timer value, both gNB and the UE may eventually fall back to a same active scheduling cell, namely, the default scheduling cell.

It is noted that, although the scheduling-cell inactivity timer is mainly intended for long term protection of the PDCCH/DCI based indication for switching of the active scheduling cell(s), i.e., protection of the first mechanism described in Embodiment E-3-1, the UE needs to start the timer every time the UE starts to monitor PDCCH on a new active scheduling cell, regardless of what indication mechanism was used to activate the scheduling cell, e.g., any of the first, second, and/or third mechanisms. Accordingly, the scheduling cell inactivity timer method can operate along with other mechanisms.

In one example, a periodic timer may be used instead of an inactivity timer, so that RRC configures a "periodicity" for each scheduling cell, and the UE monitors PDCCH on each scheduling cell during the configured periodicity, and then switches to the next scheduling cell. In this example, a predetermined order, e.g., based on the serving cell index or configuration index of the configured scheduling cells can be used. In another example, an ordering of the configured scheduling cells can be configured by the network. In one example, a periodic timer can be overridden by another network indication for switching of the scheduling cells, e.g., any of the first, second, and/or third mechanisms. In one example, if a scheduling-cell inactivity timer is running for a first scheduling cell and then the UE receives a network indication for switching the active scheduling cell from the first scheduling cell to a second scheduling cell, then the UE stops the timer for the old scheduling cell.

Figure 23:
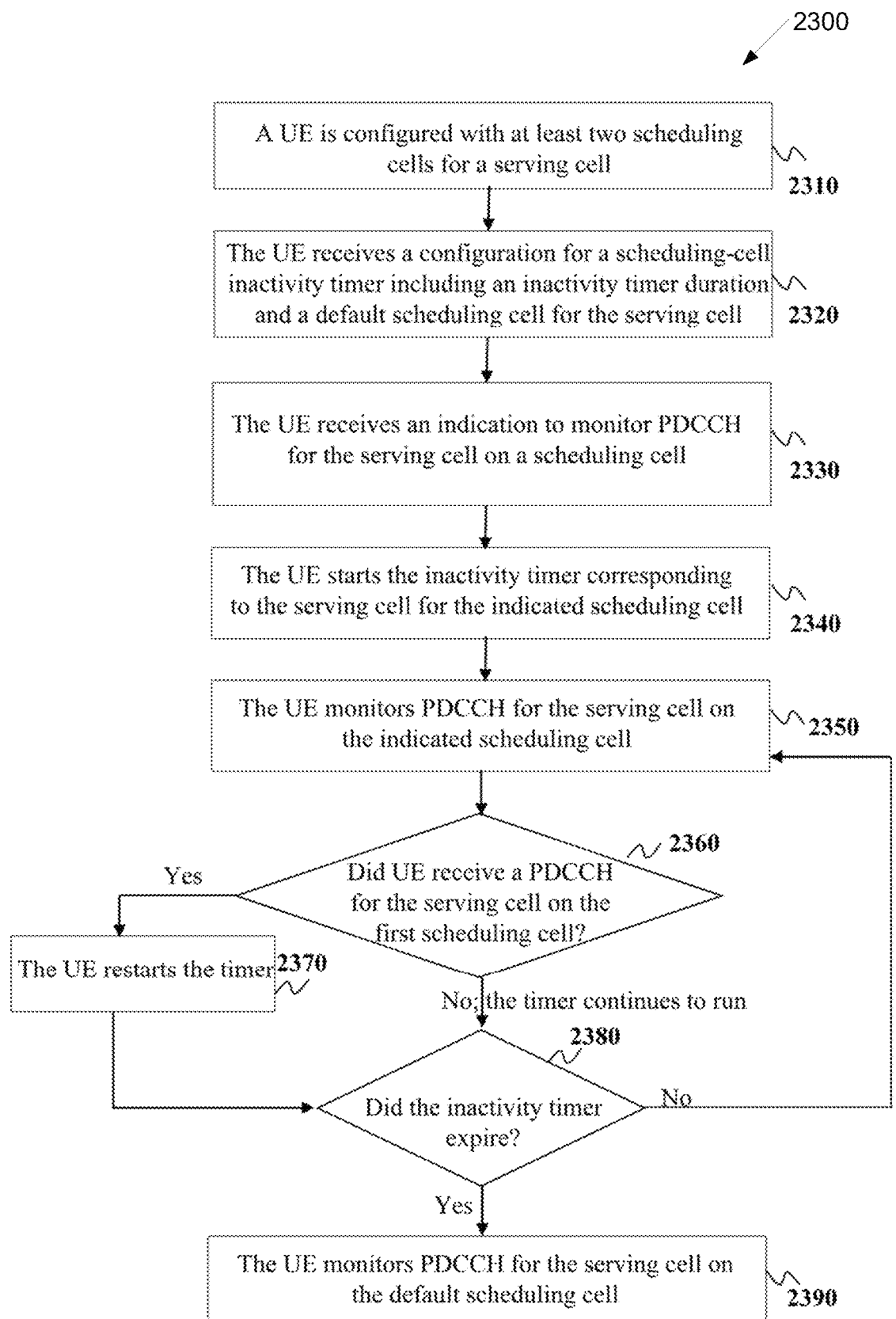
FIG. 23 illustrates a flowchart of a method for scheduling-cell inactivity timer according to embodiments of the present disclosure.

FIG. 23 illustrates a flowchart of a method 2300 for scheduling-cell inactivity timer according to embodiments of the present disclosure. An embodiment of the method 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions.

As illustrated in FIG. 23, a UE is configured with at least two scheduling cells for a serving cell, at step 2310. The UE receives a configuration for a scheduling-cell inactivity timer including an inactivity timer duration and a default scheduling cell for the serving cell, at step 2320. The UE receives an indication (e.g., RRC, DCI, MAC-CE) to monitor PDCCH for the serving cell on a scheduling cell, at step 2330. The UE starts the inactivity timer corresponding to the serving cell for the indicated scheduling cell, at step 2440. The UE monitors PDCCH for the serving cell on the indicated scheduling cell, at step 2350. The UE determines whether the UE received a PDCCH for the serving cell on the first scheduling cell, at step 2360. If the UE has received a PDCCH for the serving cell on the first scheduling cell, the UE restarts the timer, at step 2370. But, if the UE has not received a PDCCH for the serving cell on the first scheduling cell, the timer continues to run. The UE determines whether the scheduling-cell inactivity timer has expired, at step 2380. If not, i.e., timer is still running, the UE continues to monitor PDCCH for the serving cell on the indicated scheduling cell, as at step 2350. But if the scheduling-cell inactivity timer has expired, the UE starts to monitor PDCCH for the serving cell on the default scheduling cell, at step 2390.

As aforementioned, in one embodiment of E-3-5, in the fifth mechanism for this embodiment, a time pattern can be used to determine a switching of the active scheduling cell(s). According to this mechanism, RRC configures a time pattern for different scheduling cells corresponding to a scheduled cell, that provides a mapping between the time slots, subframes, frames and so on with the configured scheduling cells, so that a first scheduling cell is active on a first set of slots/subframes/frames, and a second scheduling cell is active in a second set of slots/subframes/frames, for PDCCH monitoring for a scheduled cell or a group of scheduled cells. In one example, the first and the second set of slots are complementary to cover all time slots.

In another example, the first and the second set of slots are non-overlapping, so that only one scheduling cell can be active at each slot, while in yet another example, the first and the second set of slots are overlapping, so that two/multiple scheduling cells can be active in the overlapped slots.

In one example, the time pattern is provided by the specifications. In another example, specification provides a list of possible time patterns, and the RRC configurations (and or L1/L2 signaling) indicates one of the provided time patterns. In yet another example, the UE determines a time patterns based on a predetermined rule or formula.

In one example, a time pattern provided for switching and/or determination of active scheduling cell(s) can be related to a TDD UL-DL configuration for the scheduling cells and/or scheduled cells. For example, a gNB/scheduler can configure a first set of slots/subframes for the scheduling PCell and another for a scheduling SCell, e.g., the slots/subframes for PCell can be the DL slots/subframes in a TDD UL-DL configuration on PCell, and the slots/subframes for SCell can be the UL slots/subframes in a TDD UL-DL configuration on the PCell. In another example, (NR) serving/scheduling cells can have complementary UL-DL configurations and the active scheduling cells can be determined based on that, e.g., identical or a subset of the TDD UL-DL configurations, or, in general, based on a time pattern. That can also result to the scheduled cell being counted only once for allocation of BDs/CCEs. Such methods can be beneficial in different scenarios including for LTE-NR coexistence.

In one example, the time pattern can be based on a reference SCS/numerology, such as a default SCS/numerology based on a frequency range (for example, 15 kHz for FR1, 60 kHz for FR2, and so on), or such as a minimum or maximum of SCS s/numerologies for the scheduling cells for a scheduled cell. If the UE determines that a PDCCH monitoring occasion on a scheduling cell partially overlaps with a set of PDCCH monitoring occasions that are not allowed by the time pattern then, in a first approach, the UE can discard the monitoring occasion. In a second approach, the UE can monitor PDCCH on the occasion when there is no overlapping for any symbol of the PDCCH reception.

In another example, two/multiple separate time patterns can be configured for two/multiple scheduling cells associated with a scheduled cell, wherein each time pattern is based on a SCS/numerology for the corresponding scheduling cells. A time pattern for a scheduling cell can be same for all scheduled cells corresponding to the scheduling cell or can be different patterns for different scheduled cells corresponding to the scheduling cell.

A UE can apply a time pattern to all SS sets configured on a scheduling cell for a scheduled cell. For example, the UE applies the time pattern in addition to a time-domain configuration for the SS set, such as a SS set periodicity, or bitmap, or offset, or duration and so on, to determine actual PDCCH monitoring occasions. For example, the UE determines PDCCH monitoring occasions based on the overlap/intersection of such time pattern for the scheduling cell and the time-domain configuration in each SS set.

In one example, a time pattern can be based on a timing configuration for a search space (SS) set that determines PDCCH monitoring by a UE for a scheduled cell, wherein the SS set is associated with a CORESET configured on a scheduling cell for the scheduled cell. A timing configuration for the SS set can be based on parameters such as a periodicity, an offset, or a duration for the SS set or PDCCH monitoring occasions thereof, wherein the parameters can have a granularity level of symbols/slots/subframes/frames and so on. For example, the time pattern can include a first set of symbols/slots/subframes/frames where the UE monitors a first SS set associated with a first scheduling cell, and a second set of symbols/slots/subframes/frames where the UE monitors a second SS set associated with a second scheduling cell, wherein the first and second scheduling cells are for a same scheduled cell. When the first time pattern and the second time pattern overlap, for example when the first and second scheduling cells use different SCS for PDCCH transmissions, the UE can be configured to monitor PDCCH only on the first or the second scheduling cell or on both first and second scheduling cells or the scheduling cell can be predetermined in the specifications of the system operation, such as the scheduling cell is the one with the smaller or larger cell index or with the smaller or larger SCS/numerology. In one example, for a same scheduled cell, the UE monitors PDCCH in a first slot according to a first SS set associated with a first scheduling cell, and monitors PDCCH in a second slot on a second SS set associated with a second scheduling cell. In case the first and second scheduling cells use different SCS, the slot can be defined relative to the larger SCS (or smaller SCS) or, as a general reference, relative to the SCS of a PUCCH transmission. In another example, the UE monitors PDCCH in first symbols of a slot on a first SS set associated with a first scheduling cell, and monitors PDCCH in second symbols of the slot on a second SS set associated with a second scheduling cell. Accordingly, the UE can be configured with non-overlapping SS sets/PDCCH monitoring occasions on two scheduling cells in a same slot for a same scheduled cell.

As aforementioned, in one embodiment of E-4, timeline aspects for change of active scheduling cell(s) are provided.

In one embodiment, when a UE is configured with at least two scheduling cells for a given scheduled cell, and is associated with a set of active scheduling cells which is a strict subset of the set of at least two configured scheduling cells, (for example, a scheduled cell is configured with two scheduling cells and only one of them can be an active scheduling cells for the scheduled cell), e.g., Scenario 1 and/or Scenario 3 in Embodiment E-1, and when network signaling is used to indicate a switching of the active scheduling cell among the at least two scheduling cells, the gNB and/or the UE can perform PDCCH monitoring on a current/previous active scheduling cell(s) and/or on a new active scheduling cell(s) based on some timeline considerations. According to this embodiment, the UE can operate PDCCH monitoring with various methods during a time period, e.g., referred to as a scheduling cell(s) "activation" time or simply put an "activation" time, from a time when the UE receives a gNB indication for switching of the active scheduling cell(s) until a time when the UE can start to receive DCI on a new active scheduling cell(s).

In one example, an activation time for switching of the active scheduling cell(s) can involve RF switching delay/latency, e.g., when a newly indicated active scheduling cell(s) has/have not been an activated serving cell(s) before the gNB indication, and/or when a newly indicated active scheduling cell(s) has/have been in a different current/old active BWP compared to the new active BWP intended for operation after a switching of the active scheduling cell(s), and/or when a newly indicated active scheduling cell(s) and/or a corresponding BWP(s) has/have been in a dormancy behavior before the gNB indication, and so on. In another example, an activation time for switching of the active scheduling cell(s) can involve UE baseband processing time, e.g., for the UE to receive the gNB indication for switching of the active scheduling cell(s), decoding and processing the indication, and determining a newly active scheduling cell(s). In one example, an indication for switching of the active scheduling cell(s) can explicitly or implicitly include a starting time for when the UE can/is expected to monitor/receive PDCCH on a newly indicated active scheduling cell(s).

In one example, an activation time for switching of the active scheduling cell(s) can be zero, so that a switching of the active scheduling cell(s) can be instant. In another example, an activation time for switching of the active scheduling cell(s) can be greater than zero, so that a switching of the active scheduling cell(s) incurs some latency/delay.

When an activation time for switching of the active scheduling cell(s) is greater than zero, in one example, a UE can monitor/receive PDCCH on neither the current/old active scheduling cell(s), nor the new active scheduling cell(s) during a scheduling cell(s) activation time, i.e., the UE is not expected to monitor/receive PDCCH for that scheduled cell on either the current/old or the new active scheduling cell(s). In another example, a UE can continue to monitor/receive PDCCH on the current/old active scheduling cell(s) during an entire duration/period for a scheduling cell(s) activation time. In yet another example, a UE can continue to monitor/receive PDCCH on the current/old active scheduling cell(s) after receiving an indication for switching the active scheduling cell(s), but the UE can continue to do so until an offset from (the end of) a scheduling cell(s) activation time, after/during which the UE is not expected to monitor/receive PDCCH on either the current/old or the new active scheduling cell(s).

Figure 24:
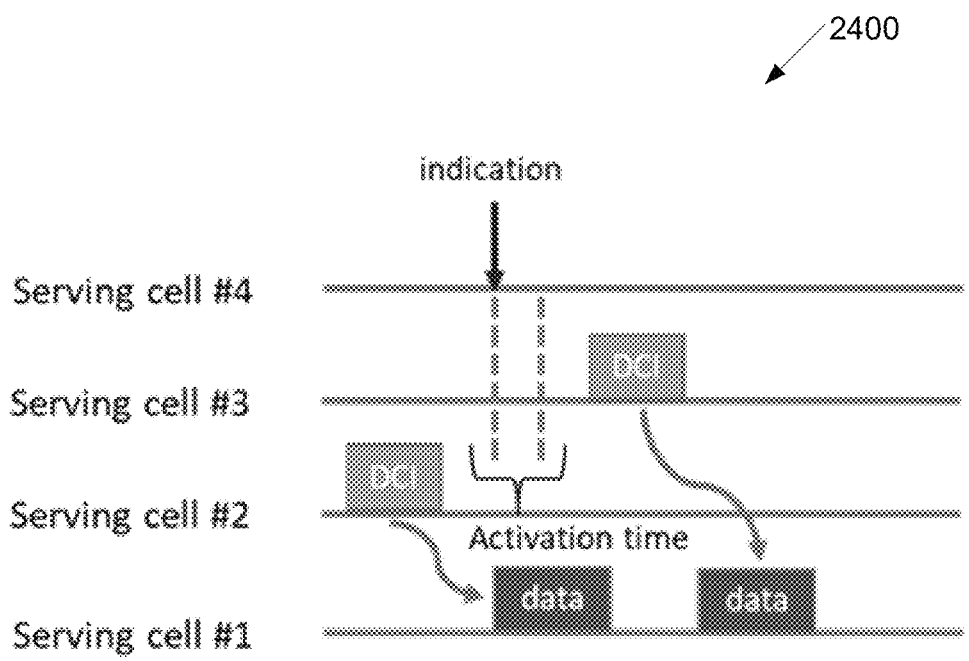
FIG. 24 illustrates an example activation time for switching of an active scheduling cells according to embodiments of the present disclosure.

FIG. 24 illustrates an example activation time 2400 for switching of an active scheduling cells according to embodiments of the present disclosure. An embodiment of the activation time 2400 shown in FIG. 24 is for illustration only.

FIG. 24 shows an example operation for activation time for switching of an active scheduling cell(s). A serving cell #1 (i.e., scheduled cell) is configured with two scheduling cells, namely scheduling cells #2 and #3. It is noted that, serving cell #1 can be same as or different from scheduling cell #2 or scheduling cell #3. It is assumed that scheduling cells #2 and #3 are different. The scheduling cell #2 can be a first active scheduling cell for serving cell #1 (see embodiment E-1-0). The UE monitors PDCCH for serving cell #1 on scheduling cell #2. The UE receives, for serving cell #1, an indication of change of the active scheduling cell from scheduling cell #2 to scheduling cell #3. The indication can be received on a serving cell #4, which can be same as the scheduling cell #2 or #3 or the serving cell #1, or even serving cell which is different from both the scheduled cell #1 and the scheduling cells #2 and #3. The UE processes the gNB indication for switching of the active scheduling cell(s) for an activation time period. In one example, the UE is not expected to monitor/receive PDCCH during the activation time. The UE then monitors PDCCH for serving cell #1 on scheduling cell #3.

In one example, when a PDCCH/DCI format, such as a UE-specific DCI and/or a group-common DCI, as described in Embodiment E-3-1 and E-3-2 is used for gNB indication of a switching of the active scheduling cell(s), and (i) in a first case, the DCI format, e.g., a "CCS" field in the DCI format, indicates no change to the active scheduling cell(s), then the UE can continue to monitor/receive PDCCH on the current active scheduling cell(s), and (ii) in a second case, the DCI format, e.g., a "CCS" field in the DCI format, indicates a change to the active scheduling cell(s), then in one example, the UE does not expect a scheduling PDCCH/DCI during a UE processing "activation" time, such as a decoding and/or processing time for a PDCCH/DCI format that indicates a change to the active scheduling cell(s). After that activation time for the newly indicated active scheduling cell(s), the UE can monitor PDCCH in the new active scheduling cell.

For example, the UE is expected to start monitoring PDCCH on the newly indicated active scheduling cell(s) after N symbols from the last symbol of a PDCCH providing an indication for switching of the active scheduling cell(s). If processingType2Enabled of PDSCH-ServingCellConfig is set to enable for the serving/scheduled cell whose active scheduling cell(s) is indicated to be switched, N=5 for µ=0, N=5.5 for µ=1, and N=11 for µ=2, otherwise, N=10 for µ=0, N=12 for µ=1, N=22 for µ=2, and N=25 for µ=3, wherein µ corresponds to (ii-A) in one example, the SCS configuration of the PDCCH providing the indication for switching of the active scheduling cell(s), and/or (ii-B) in another example, the smallest SCS configuration between the SCS configuration of the PDCCH providing the indication for switching of the active scheduling cell(s) and the SCS configuration of a serving/scheduled cell whose active scheduling cell(s) is indicated to be switched, and/or (ii-C) in another example, the smallest SCS configuration among the SCS configuration of the PDCCH providing the indication for switching of the active scheduling cell(s) and the SCS configuration of a serving/scheduled cell whose active scheduling cell(s) is indicated to be switched and the SCS configuration of the current/old active scheduling cell(s) and/or the newly indicated active scheduling cell(s).

In one example, when a MAC-CE activation/deactivation command, as described in Embodiment E-3-3 is used for gNB indication of a switching of the active scheduling cell(s), and (i) in a first case, the MAC-CE activation/deactivation command, e.g., a "CCS" field in the MAC-CE activation/deactivation command, indicates no change to the active scheduling cell(s), then the UE can continue to monitor/receive PDCCH on the current active scheduling cell(s), and (ii) in a second case, the MAC-CE activation/deactivation command, e.g., a "CCS" field in the MAC-CE activation/deactivation command, indicates a change to the active scheduling cell(s), then in one example, there can be an activation delay, such as [N]=3 msec, delay for processing of the MAC-CE command.

For example, if the UE receives a MAC-CE activation command for switching of the active scheduling cell(s), the UE applies the activation command in the first slot that is after slot $k+3 \cdot N_{slot}^{subframe,\mu}$ where k is the slot where the UE would transmit a PUCCH with HARQ-ACK information for the PDSCH providing the activation command and µ is the SCS configuration for the PUCCH. The active BWP is defined as the active BWP in the slot when the activation command is applied. The activation time can additionally include a time between the time the UE receives the PDCCH/PDSCH providing the activation command and the time the UE would transmit a PUCCH with HARQ-ACK information for the PDSCH providing the activation command. In such a case, in one example, the UE does not expect any (scheduling) DCI during this MAC-CE activation time.

In another example, the UE can still monitor and receive PDCCH on the current/old active scheduling cell(s) during this MAC-CE activation time. In a further example, the UE can monitor and receive PDCCH on the current/old active scheduling cell(s) during this MAC-CE activation time but can continue to do so until an offset from the end of the activation time, such a 3 msec period minus a UE processing time for PDCCH reception, such as N symbols. For example, if processingType2Enabled of PDSCH-ServingCellConfig is set to enable for the serving/scheduled cell whose active scheduling cell(s) is indicated to be switched, N=5 for µ=0, N=5.5 for µ=1, and N=11 for µ=2, otherwise, N=10 for µ=0, N=12 for µ=1, N=22 for µ=2, and N=25 for µ=3, wherein µ corresponds for example to one or more options from option (ii-A), (ii-B), and (ii-C) described above.

As aforementioned, in one embodiment of E-5, search space set configuration for a scheduled cell with multiple active scheduling cell(s) is provided. In one embodiment, when a UE is configured with at least two scheduling cells for a given scheduled cell, a PDCCH configuration in the scheduled cell includes a list of SS sets, wherein for each SS set in the list, a cell index corresponding to the scheduling cell is configured.

The following information element shows an example structure for a search space set configuration in a scheduled cell with cross-carrier scheduling and at least two configured scheduling cell(s). In this example, the parameter "schedulingCellId" indicates the serving cell index of the scheduling cell on which the SS set for the scheduled cell is configured. According to this example, a number of PDCCH candidates (per AL) in each SS set, as captured e.g., by the parameter "nrofCandidates," can depend on the scheduling cell. For example, most/all PDCCH with low AL can be configured on a low-band primary (scheduling) cell, so that a higher coding rate for PDCCH is compensated with stronger channel, or simply a smaller DCI size is facilitated. In another example, most/all PDCCH with high AL can be configured on a mid-band secondary (scheduling) cell, so that a weaker channel for the scheduling cell is compensated with a lower coding rate for PDCCH, or simply a larger DCI size is facilitated. In another example, a "SSsetPriorityLevel" can be configured for each SS set to indicate a priority level for the SS set to handle overbooking/dropping of SS sets, e.g., with a same SS set index "searchSpaceId" (e.g., Embodiment E-8).

TABLE 7

SearchSpace information element

-- ASN1START
-- TAG-SEARCHSPACE-START
SearchSpace ::= SEQUENCE {
searchSpaceId SearchSpaceId,
schedulingCellId ServCellIndex OPTIONAL,
SSsetPriorityLevel INTEGER (1.. nrOfSchedulingCells), OPTIONAL,
nrofCandidates SEQUENCE {
aggregationLevel1 ENUMERATED {n0, n1, n2, n3, n4, n5, n6, n8}, TABLE 7-continued SearchSpace information element aggregationLevel2 ENUMERATED {n0, n1, n2, n3, n4, n5, n6, n8},
aggregationLevel4 ENUMERATED {n0, n1, n2, n3, n4, n5, n6, n8},
aggregationLevel8 ENUMERATED {n0, n1, n2, n3, n4, n5, n6, n8},
aggregationLevel16 ENUMERATED {n0, n1, n2, n3, n4, n5, n6, n8}
} OPTIONAL, -- Cond Setup
}
-- TAG-SEARCHSPACE-STOP
-- ASN1STOP As aforementioned, in one embodiment of E-6, determination of "total" limits for PDCCH blind decoding (BD) when operating in cross-carrier scheduling mode with at least two active scheduling cells is provided.

In one embodiment, when a UE is configured with at least two scheduling cells for a given scheduled cell, determination of a total number of scheduled cells and a corresponding limit on the total number of PDCCH candidates $M_{PDCCH}^{total,slot,\mu}$ (resp. non-overlapped CCEs $C_{PDCCH}^{total,slot,\mu}$) can be based on a numerology(ies) of the scheduling cells for the scheduled cell(s). According to this embodiment, for counting a total number $N_{DL}^{\mu}$ of scheduled cells corresponding to a numerology $\mu$, when a scheduled cell is configured with at least two scheduling cells and has two active scheduling cells, wherein a DL BWP of a first active scheduling cell for the scheduled cell is configured with numerology $\mu 1$, and a DL BWP of a second active scheduling cell for the scheduled cell is configured with numerology $\mu 2$, and the first active scheduling cell is different from the second active scheduling cell, and numerology $\mu 1$ is different from numerology $\mu 2$, various methods can be considered. In one example, such a scheduled cell is counted only once in $\Sigma_{\mu=0}^{3} N_{DL}^{\mu}$, e.g., since such a scheduled cell simply refers to only a single cell. In another example, such a scheduled cell is counted twice in $\Sigma_{\mu=0}^{3} N_{DL}^{\mu}$, so that one such scheduled cell can belong to two "$N_{DL}^{\mu}$ groups" which is also consistent with the definition of $N_{DL}^{\mu}$ for each numerology $\mu$ configured for an active DL BWP of a scheduling cell.

It is noted that determination of a limit on the total number of PDCCH candidates $M_{PDCCH}^{total,slot,\mu}$ (resp. non-overlapped CCEs $C_{PDCCH}^{total,slot,\mu}$), or similar limits for a time span instead of a slot, can be based on a comparison of $\Sigma_{\mu=0}^{3} N_{DL}^{\mu}$ with a reported UE capability $N_{cells}^{cap}$ (e.g., in the range 4-16) for the maximum number of scheduled cells for which it can monitor PDCCH per slot/span. One example is when a first cell with numerology $\mu 1$ for an active DL BWP is configured for both self-carrier scheduling and for cross-carrier scheduling by a second cell with a numerology $\mu 2$ for an active DL BWP.

Figure 25:
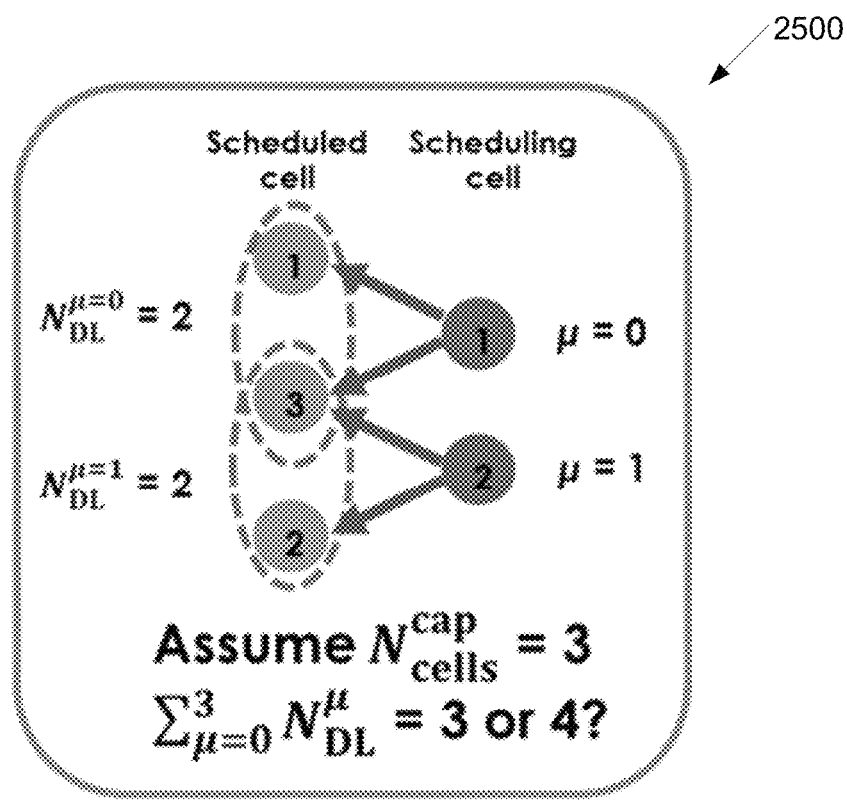
FIG. 25 illustrates an example operation for counting in $\Sigma_{\mu=0}^{3} N_{DL}^{\mu}$ according to embodiments of the present disclosure.

FIG. 25 illustrates an example operation 2500 for counting in $\Sigma_{\mu=0}^{3} N_{DL}^{\mu}$ according to embodiments of the present disclosure. An embodiment of the operation 2500 shown in FIG. 25 is for illustration only.

FIG. 25 shows an example operation for counting in $\Sigma_{\mu=0}^{3} N_{DL}^{\mu}$ when determining a limit on the total number of PDCCH candidates $M_{PDCCH}^{total,slot,\mu}$ (resp. non-overlapped CCEs $C_{PDCCH}^{total,slot,\mu}$). A DL BWP of a scheduling cell #1 is configured with a numerology $\mu=0$ (e.g., SCS=15 kHz), and a DL BWP of a scheduling cell #2 is configured with a numerology $\mu=1$ (e.g., SCS=30 kHz). A scheduled cell #1 is associated with scheduling cell #1 as the only configured/active scheduling cell. A scheduled cell #2 is associated with scheduling cell #2 as the only configured/active scheduling cell. A scheduled cell #3 is associated with scheduling cell #3 as both scheduling cell #1 and scheduling cell #2 as configured and active scheduling cells. In such a case, it can be considered that $N_{DL}^{\mu=0}=2$ and $N_{DL}^{\mu=1}=2$ so that $\Sigma_{\mu=0}^{3} N_{DL}^{\mu}=4$, or it can be considered that $N_{DL}^{\mu=0}=2$ and $N_{DL}^{\mu=1}=2$ but $\Sigma_{\mu=0}^{3} N_{DL}^{\mu}=3$ based on a simple counting of the total number of the number of DL CCs. For an example with $N_{cells}^{cap}=3$, there can be a case with $\Sigma_{\mu=0}^{3} N_{DL}^{\mu}=4>3=N_{cells}^{cap}$ or with $\Sigma_{\mu=0}^{3} N_{DL}^{\mu}=3\leq 3=N_{cells}^{cap}$, each of which correspond to different determination formulas for the limit on the total number of PDCCH candidates $M_{PDCCH}^{total,slot,\mu}$ (resp. non-overlapped CCEs $C_{PDCCH}^{total,slot,\mu}$).

In one example, if two scheduling cells corresponding to a same scheduled cell are not operating at the same time, e.g., two scheduling cells have different and/or complementary TDD UL-DL configurations, then the scheduled cell is counted only once regardless of whether or not the two scheduling cells have same or different numerologies.

Figure 26:
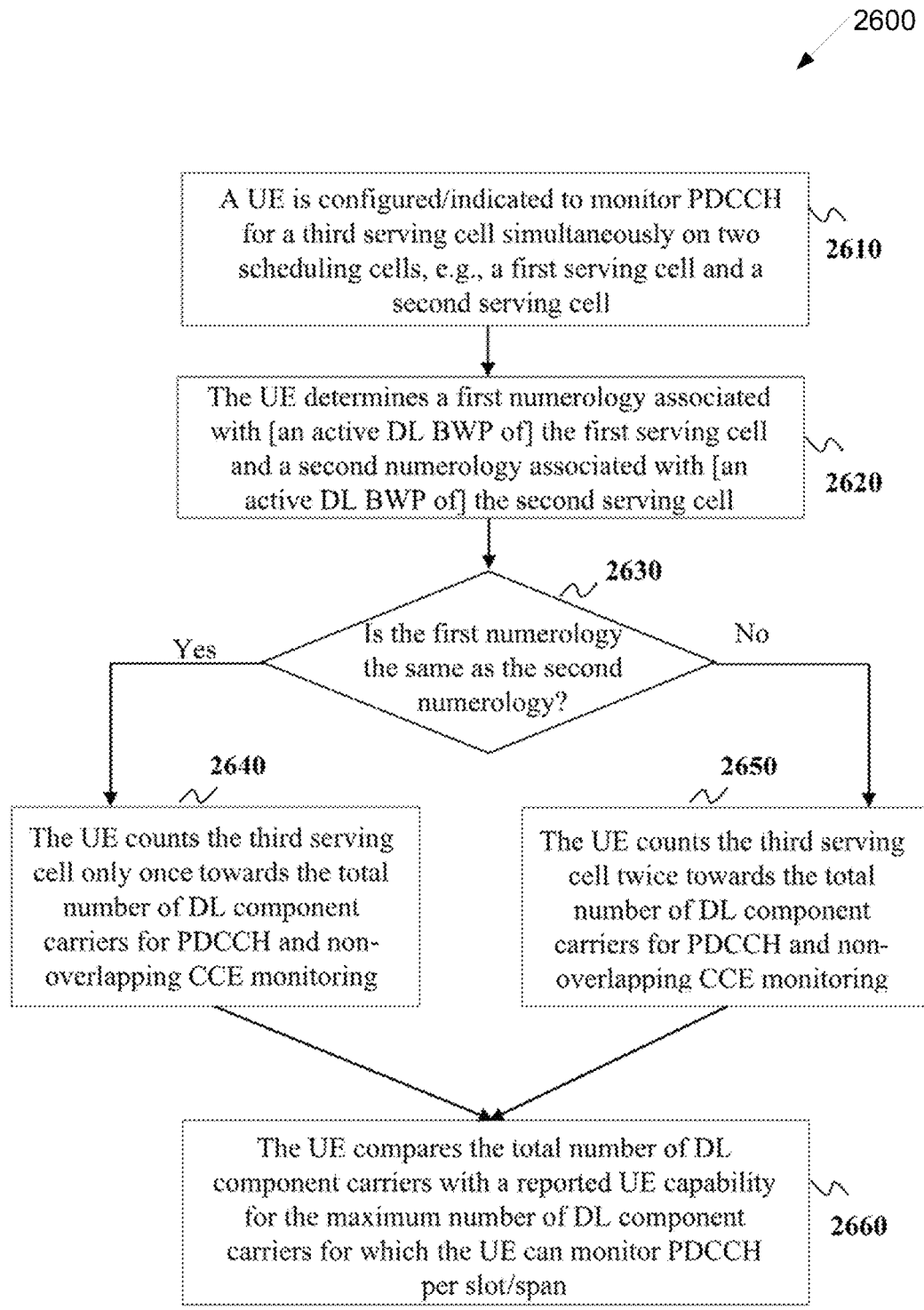
FIG. 26 illustrates a flowchart of a method for counting in $\Sigma_{\mu=0}^{3} N_{DL}^{\mu}$ according to embodiments of the present disclosure.

FIG. 26 illustrates a flowchart of a method 2600 for counting in $\Sigma_{\mu=0}^{3} N_{DL}^{\mu}$ according to embodiments of the present disclosure. An embodiment of the method 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions.

FIG. 26 shows an example flowchart for counting in $\Sigma_{\mu=0}^{3} N_{DL}^{\mu}$ when determining a limit on the total number of PDCCH candidates $M_{PDCCH}^{total,slot,\mu}$ (resp. non-overlapped CCEs $C_{PDCCH}^{total,slot,\mu}$). A UE is configured/indicated to monitor PDCCH for a third simultaneously on two scheduling cells, e.g., a first serving cell and a second serving cell, at step 2610. The UE determines a first numerology associated with an active DL BWP of the first serving cell and a second numerology associated with an active DL BWP of the second serving cell, at step 2620. The UE determines whether the first numerology is the same as the second numerology, as step 2630. When the first numerology is the same as the second numerology, the UE counts the third serving cell only once towards the total number of DL component carriers for PDCCH and non-overlapping CCE monitoring, at step 2640. When the first numerology is different from the second numerology, the UE counts the third serving cell twice towards the total number of DL component carriers for PDCCH and non-overlapping CCE monitoring, at step 2650. The UE compares the total number of DL component carriers with a reported UE capability for the maximum number of DL component carriers for which the UE can monitor PDCCH per slot/span, at step 2660.

As forementioned, in one embodiment of E-7, determination of "maximum" limits for PDCCH blind decoding (BD) when operating in cross-carrier scheduling mode with at least two active scheduling cells is provided.

In one embodiment, when a UE is configured with at least two scheduling cells for a given scheduled cell, the UE can determine a limit on the maximum number of PDCCH candidates $M_{PDCCH}^{max,slot,\mu}$ (resp. non-overlapped CCEs $C_{PDCCH}^{max,slot,\mu}$) for the scheduled cell based on a number of scheduling cell(s) and a numerology(ies) of the scheduling cells for the scheduled cell(s).

According to this embodiment, for the maximum per-slot/per-span per scheduled cell limit on BD/CCE in the two active scheduling cells corresponding to a single scheduled cell, such as $M_{PDCCH}^{max,slot,\mu}$ or $C_{PDCCH}^{max,slot,\mu}$, various methods are provided. In one example, the number of PDCCH candidates/non-overlapped CCEs in each active scheduling cell is individually limited by a UE's BD/CCE budget or capability. In another example, the number of PDCCH candidates/non-overlapped CCEs in each active scheduling cell is individually limited by a scaled option of a UE's BD/CCE budget or capability. In yet another example, an aggregate number of PDCCH candidates/non-overlapped CCEs across both active scheduling cells is collectively limited by the UE's BD budget.

For example, when the two active scheduling cells have two different numerologies µ1 and µ2 on their respective active DL BWPs, let $BD_1$ (resp. $BD_2$) be a number of monitored PDCCH candidates in the first (resp. second) active scheduling cell and $CCE_1$ (resp. $CCE_2$) be a number of non-overlapped CCEs monitored in the first (resp. second) active scheduling cell.

Then in a first option, the UE operates with $BD_1 \leq \min(M_{PDCCH}^{total,slot,\mu 1}, M_{PDCCH}^{max,slot,\mu 1})$ and $BD_2 \leq \min(M_{PDCCH}^{total,slot,\mu 2}, M_{PDCCH}^{max,slot,\mu 2})$. The UE also operates with $CCE_1 \leq \min(C_{PDCCH}^{total,slot,\mu 1}, C_{PDCCH}^{max,slot,\mu 1})$ and $CCE_2 \leq \min(C_{PDCCH}^{total,slot,\mu 2}, C_{PDCCH}^{max,slot,\mu 2})$. This option can correspond to an advanced UE capability with increased monitoring of PDCCH candidates and/or non-overlapped CCEs, such as twice a legacy UE.

In a second option, the UE determines a scaling ratio $0 \leq \alpha \leq 1$ and then operates with $BD_1 \leq \alpha \min(M_{PDCCH}^{total,slot,\mu 1}, M_{PDCCH}^{max,slot,\mu 1})$ and $BD_2 \leq (1-\alpha)\min(M_{PDCCH}^{total,slot,\mu 2}, M_{PDCCH}^{max,slot,\mu 2})$. The UE also operates with $CCE_1 \leq \alpha \min(C_{PDCCH}^{total,slot,\mu 1}, C_{PDCCH}^{max,slot,\mu 1})$ and $CCE_2 \leq (1-\alpha)\min(C_{PDCCH}^{total,slot,\mu 2}, C_{PDCCH}^{max,slot,\mu 2})$.

In a third option, the UE determines a scaling ratio $0 \leq \alpha \leq 1$ and then operates with $BD_1 + BD_2 \leq \alpha \min(M_{PDCCH}^{total,slot,\mu 1}, M_{PDCCH}^{max,slot,\mu 1}) + (1-\alpha)\min(M_{PDCCH}^{total,slot,\mu 2}, M_{PDCCH}^{max,slot,\mu 2})$. The UE also operates with $CCE_1 + CCE_2 \leq \alpha \min(C_{PDCCH}^{total,slot,\mu 1}, C_{PDCCH}^{max,slot,\mu 1}) + (1-\alpha)\min(C_{PDCCH}^{total,slot,\mu 2}, C_{PDCCH}^{max,slot,\mu 2})$.

The second and/or third options can correspond to a non-legacy UE capability with comparable/similar monitoring of PDCCH candidates and/or non-overlapped CCEs, such as almost same as a legacy UE. For example, for Option-2 and Option-3, the scaling ratio $\alpha$ can be explicitly specified or configured, and/or $\alpha$ implicitly configured, e.g., $$\alpha = \frac{N_1}{N_1 + N_2},$$

where $N_1$ (resp. $N_2$) is a total number of PDDCH candidates in all SS sets of the active scheduling cell with numerology µ1 (resp. µ2) for the given scheduled cell.

Figure 27:
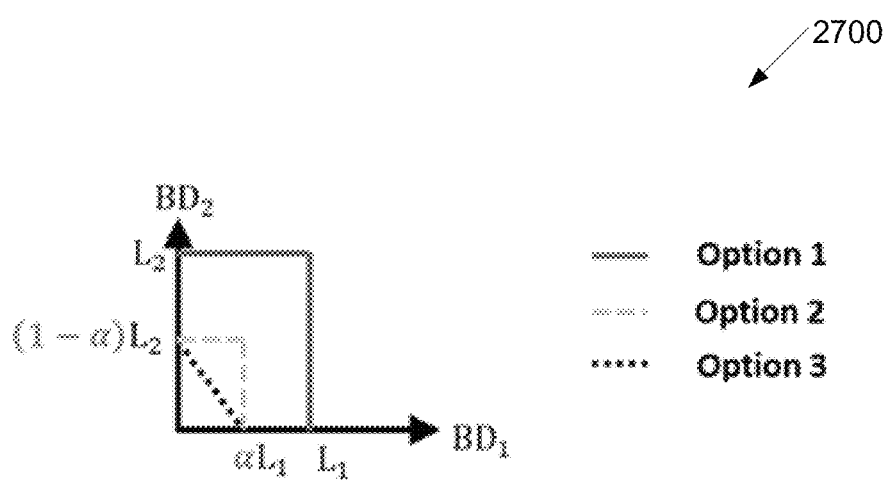
FIG. 27 illustrates an example blind decoding limits according to embodiments of the present disclosure.

FIG. 27 illustrates an example blind decoding limits 2700 according to embodiments of the present disclosure. An embodiment of the blind decoding limits 2700 shown in FIG. 27 is for illustration only.

FIG. 27 shows an example graph of the blind decoding limits for the case of the active scheduling cell. An outer graph shows the BD limits for the first option, while a middle graph shows the BD limits for the second option, and an inner graph shows the BD limits for the third option.

In one example, when a first numerology for an active DL BWP of the first scheduling cell is the same as a second numerology of an active DL BWP of the second scheduling cell, a scaling ratio $\alpha$ may not be defined, then a first option can be utilized, a second option may not be utilized, and a third option can be utilized without any scaling ratio, so that $BD_1 + BD_2 \leq \min(M_{PDCCH}^{total,slot,\mu}, M_{PDCCH}^{max,slot,\mu})$ and/or $CCE_1 + CCE_2 \leq \min(C_{PDCCH}^{total,slot,\mu}, C_{PDCCH}^{max,slot,\mu})$ can be applied. In another example, a second option can be still utilized with $BD_1 \leq \alpha \min(M_{PDCCH}^{total,slot,\mu}, M_{PDCCH}^{max,slot,\mu})$ and $BD_2 \leq (1-\alpha)\min(M_{PDCCH}^{total,slot,\mu}, M_{PDCCH}^{max,slot,\mu})$ or $CCE_1 \leq \alpha \min(C_{PDCCH}^{total,slot,\mu}, C_{PDCCH}^{max,slot,\mu})$ and $CCE_2 \leq (1-\alpha) \min(C_{PDCCH}^{total,slot,\mu}, C_{PDCCH}^{max,slot,\mu})$ to explicitly indicate the allocation of BDs/CCEs among the two/multiple active scheduling cells.

In one example, when an active DL BWP of a first scheduling cell is configured with a numerology µ1 and an active DL BWP of a second scheduling cell is configured with a numerology µ2, in the third option, for each scheduled cell, the UE is not required to monitor on the active DL BWP with SCS configuration µ1 of the first active scheduling cell more than $\min(M_{PDCCH}^{total,slot,\mu 1}, M_{PDCCH}^{max,slot,\mu 1})$ PDCCH candidates or more than $\min(C_{PDCCH}^{total,slot,\mu 1}, C_{PDCCH}^{max,slot,\mu 1})$ non-overlapped CCEs per slot/span, and on the active DL BWP with SCS configuration µ2 of the second active scheduling cell more than $\min(M_{PDCCH}^{total,slot,\mu 2}, M_{PDCCH}^{max,slot,\mu 2})$ PDCCH candidates or more than $\min(C_{PDCCH}^{total,slot,\mu 1}, C_{PDCCH}^{max,slot,\mu 2})$ non-overlapped CCEs per slot/span.

In another example, for the first option, for each scheduled cell, the UE is not required to monitor collectively on the active DL BWP with SCS configuration µ of all corresponding active scheduling cells more than $\alpha \min(\alpha \min(M_{PDCCH}^{total,slot,\mu 1}, M_{PDCCH}^{max,slot,\mu 1}) + (1-\alpha)\min(M_{PDCCH}^{total,slot,\mu 2}, M_{PDCCH}^{max,slot,\mu 2})$ PDCCH candidates or more than $\alpha \min(C_{PDCCH}^{total,slot,\mu 1}, C_{PDCCH}^{max,slot,\mu 1}) + (1-\alpha)\min(C_{PDCCH}^{total,slot,\mu 2}, C_{PDCCH}^{max,slot,\mu 2})$ non-overlapped CCEs per slot/span. In yet another example, for the second option, for each scheduled cell, the UE is not required to monitor on the active DL BWP with SCS configuration µ1 of a first active scheduling cells more than $\alpha \min(M_{PDCCH}^{total,slot,\mu 1}, M_{PDCCH}^{max,slot,\mu 1})$ PDCCH candidates or more than $\alpha \min(C_{PDCCH}^{total,slot,\mu 1}, C_{PDCCH}^{max,slot,\mu 1})$ non-overlapped CCEs per slot/span, and on the active DL BWP with SCS configuration µ2 of a second active scheduling cell more than $(1-\alpha)\min(M_{PDCCH}^{total,slot,\mu 2}, M_{PDCCH}^{max,slot,\mu 2})$ PDCCH candidates or more than $(1-\alpha)\min(C_{PDCCH}^{total,slot,\mu 2}, C_{PDCCH}^{max,slot,\mu 2})$ non-overlapped CCEs per slot/span.

In one example, a generic scaling ratio $\beta$ can be used instead of $(1-\alpha)$, so that $\alpha + \beta \neq 1$ is also supported. In one example, parameters $\alpha$ and $\beta$ can be selected such that a minimum/maximum of the two BD/CCE limits corresponding to the two numerologies is achieved, e.g., $\alpha \min(M_{PDCCH}^{total,slot,\mu 1}, M_{PDCCH}^{max,slot,\mu 1}) + \beta \min(M_{PDCCH}^{total,slot,\mu 2}, M_{PDCCH}^{max,slot,\mu 2}) \leq \min\{\min(M_{PDCCH}^{total,slot,\mu 1}, M_{PDCCH}^{max,slot,\mu 1}), \min(M_{PDCCH}^{total,slot,\mu 2}, M_{PDCCH}^{max,slot,\mu 2})\}$, or $\alpha \min(M_{PDCCH}^{total,slot,\mu 1}, M_{PDCCH}^{max,slot,\mu 1}) + \beta \min(M_{PDCCH}^{total,slot,\mu 2}, M_{PDCCH}^{max,slot,\mu 2}) \leq \max\{\min(M_{PDCCH}^{total,slot,\mu 1}, M_{PDCCH}^{max,slot,\mu 1}), \min(M_{PDCCH}^{total,slot,\mu 2}, M_{PDCCH}^{max,slot,\mu 2})\}$.

In the examples above, similar constraints for non-overlapped CCEs, i.e., limits on $C_{PDCCH}^{total,slot,\mu 2}$, $C_{PDCCH}^{max,slot,\mu 2}$, can be utilized as well. In one example, parameters $\alpha$ and $\beta$ can be chosen such that similar constraint for both BD limits and non-overlapped CCE limits are met simultaneously.

Such a selection, at least in some configurations, can be achieved by setting the BD/CCE limits based on those for a cell with minimum or maximum SCS/numerology. Alternatively, a selection $\beta = L_2/L_1$ or $\beta = L_1/L_2$ can apply wherein $L_1 = M_{PDCCH}^{total,slot,\mu 1}$ or $L_1 = M_{PDCCH}^{max,slot,\mu 1}$ or $L_1 = \min(M_{PDCCH}^{total,slot,\mu 1}, M_{PDCCH}^{max,slot,\mu 1})$ and so on. Corresponding parameters can also apply for non-overlapped CCEs or for $L_2$ that is associated with SCS/numerology µ2. In another example, BD and CCE partitioning/allocation can be based on a scheduling cell with minimum or maximum SCS/numerology. For example, the UE can operate with $BD_1 \leq \min(M_{PDCCH}^{total,slot,\mu1}, M_{PDCCH}^{max,slot,\mu1})$, $BD_2 \leq \min(M_{PDCCH}^{total,slot,\mu1}, M_{PDCCH}^{max,slot,\mu1})$, $CCE_1 \leq \min(C_{PDCCH}^{total,slot,\mu1}, C_{PDCCH}^{max,slot,\mu1})$, and $CCE_2 \leq \min(C_{PDCCH}^{total,slot,\mu1}, C_{PDCCH}^{max,slot,\mu1})$, when $\beta1 \leq \mu2$. Other options, similar to Options 2 and 3, can also apply by setting a same BD/CCE budget limit based on a minimum or maximum SCS/numerology. For example, the UE can operate with $BD_1 \leq \alpha \min(M_{PDCCH}^{total,slot,\mu1}, M_{PDCCH}^{max,slot,\mu1})$ and $BD_2 \leq (1-\alpha)\min(M_{PDCCH}^{total,slot,\mu1}, M_{PDCCH}^{max,slot,\mu1})$, or with $BD_1+BD_2 \leq \min(M_{PDCCH}^{total,slot,\mu1}, M_{PDCCH}^{max,slot,\mu1})$. Similar expressions apply for the corresponding non-overlapped CCE limits.

In another example, the UE can operate with a same BD/CCE partitioning for both/all scheduling cells corresponding to a same scheduled cell, wherein the BD/CCE partitioning can be determined based on a reference numerology. For example, the reference numerology can be a numerology for the scheduled cell when the scheduled cell is configured with both self-carrier scheduling and cross-carrier scheduling.

In one realization, all example methods above that use one or more scaling parameters for determining BD/CCE limits can apply such parameters to parts or components of corresponding BD/CCE allocation terms. For example, a term such as a $\min(M_{PDCCH}^{total,slot,\mu1}, M_{PDCCH}^{max,slot,\mu1})$ can be replaced with $\min(M_{PDCCH}^{total,slot,\mu1}, \alpha M_{PDCCH}^{max,slot,\mu1})$. In another example, a term such as $\alpha \min(M_{PDCCH}^{total,slot,\mu1}, M_{PDCCH}^{max,slot,\mu1})+(1-\alpha)\min(M_{PDCCH}^{total,slot,\mu2}, M_{PDCCH}^{max,slot,\mu2})$ can be replaced with $\min(M_{PDCCH}^{total,slot,\mu1}, \alpha M_{PDCCH}^{max,slot,\mu1})+\min(M_{PDCCH}^{total,slot,\mu2}, (1-\alpha)M_{PDCCH}^{max,slot,\mu2})$ or $\min(M_{PDCCH}^{total,slot,\mu1}, M_{PDCCH}^{total,slot,\mu2}, \alpha M_{PDCCH}^{max,slot,\mu1}+(1-\alpha)M_{PDCCH}^{max,slot,\mu2})$. In yet another example, a term such as $\alpha \min(M_{PDCCH}^{total,slot,\mu1}, M_{PDCCH}^{max,slot,\mu1})+\beta \min(M_{PDCCH}^{total,slot,\mu2}, M_{PDCCH}^{max,slot,\mu2})$ can be replaced with $\min(M_{PDCCH}^{total,slot,\mu1}, \alpha M_{PDCCH}^{max,slot,\mu1})+\min(M_{PDCCH}^{total,slot,\mu2}, \beta M_{PDCCH}^{max,slot,\mu2})$ or $\min(M_{PDCCH}^{total,slot,\mu1}, M_{PDCCH}^{total,slot,\mu2}, \alpha M_{PDCCH}^{max,slot,\mu1}+\beta M_{PDCCH}^{max,slot,\mu2})$. In a further example, scaling parameters can be applied in two stages, such as a first stage scaling applied to component(s) within a BD/CCE allocation term as described in the previous examples, and a second stage scaling applied to an/each BD/CCE allocation term as described in earlier examples.

In one example, all solutions above can be similarly applied to multiple active scheduling cells, e.g., using one scaling ratio for each scheduling cell. In another example, all solutions above can be similarly applied to different time units for PDCCH monitoring, such as (time) slots, (time) spans, and so on.

In another example, a split of UE's budget for BD/CCE based on a ratio parameter can be applied to the total BD/CCE limits, namely, the UE is not required to monitor more than $M_{PDCCH}^{total,slot,\mu}=\lfloor N_{cells}^{cap} \cdot M_{PDCCH}^{max,slot,\mu} \cdot (N_{cells,1}^{DL,\mu}+\alpha \cdot N_{cells,2}^{DL,\mu})/\sum_{j=0}^{3}(N_{cells,1}^{DL,j}+\alpha \cdot N_{cells,2}^{DL,j})\rfloor$ PDCCH candidates or more than $C_{PDCCH}^{total,slot,\mu}=\lfloor N_{cells}^{cap} \cdot C_{PDCCH}^{max,slot,\mu} \cdot (N_{cells,1}^{DL,\mu}+\alpha \cdot N_{cells,2}^{DL,\mu})/\sum_{j=0}^{3}(N_{cells,1}^{DL,j}+\alpha \cdot N_{cells,2}^{DL,j})\rfloor$ non-overlapped CCEs per slot on the active DL BWP(s) of scheduling cell(s) from the $N_{cells,1}^{DL,\mu}+N_{cells,2}^{DL,\mu}$ downlink cells, wherein $N_{cells,1}^{DL,\mu}$ stands for a number of DL CCs and/or scheduled cells operating with only one configured or active scheduling cell, and wherein $N_{cells,2}^{DL,\mu}$ stands for a number of DL CCs and/or scheduled cells operating with two configured or active scheduling cells.

In one example, a parameter can be selected based on a numerology of the scheduling cell. In another example, different parameters e.g. a and can be selected for the BD constraint compared to the CCE constraint. It is noted that parameters a and utilized in the present example for determination of total BD/CCE limits can be same as or different than parameters a and utilized in previous examples for allocation of BD/CCE budget among different scheduling cells. In another example, there can be more terms in the summations if a DL CC/scheduled cell can be operating with more than two active scheduling cells. In yet another example, an additional parameter p can be used for the scheduled cells operating with only one active scheduling cell. In one example, alternative and/or additional limits based on a number of configured scheduling cells (active or not) are utilized.

Figure 28:
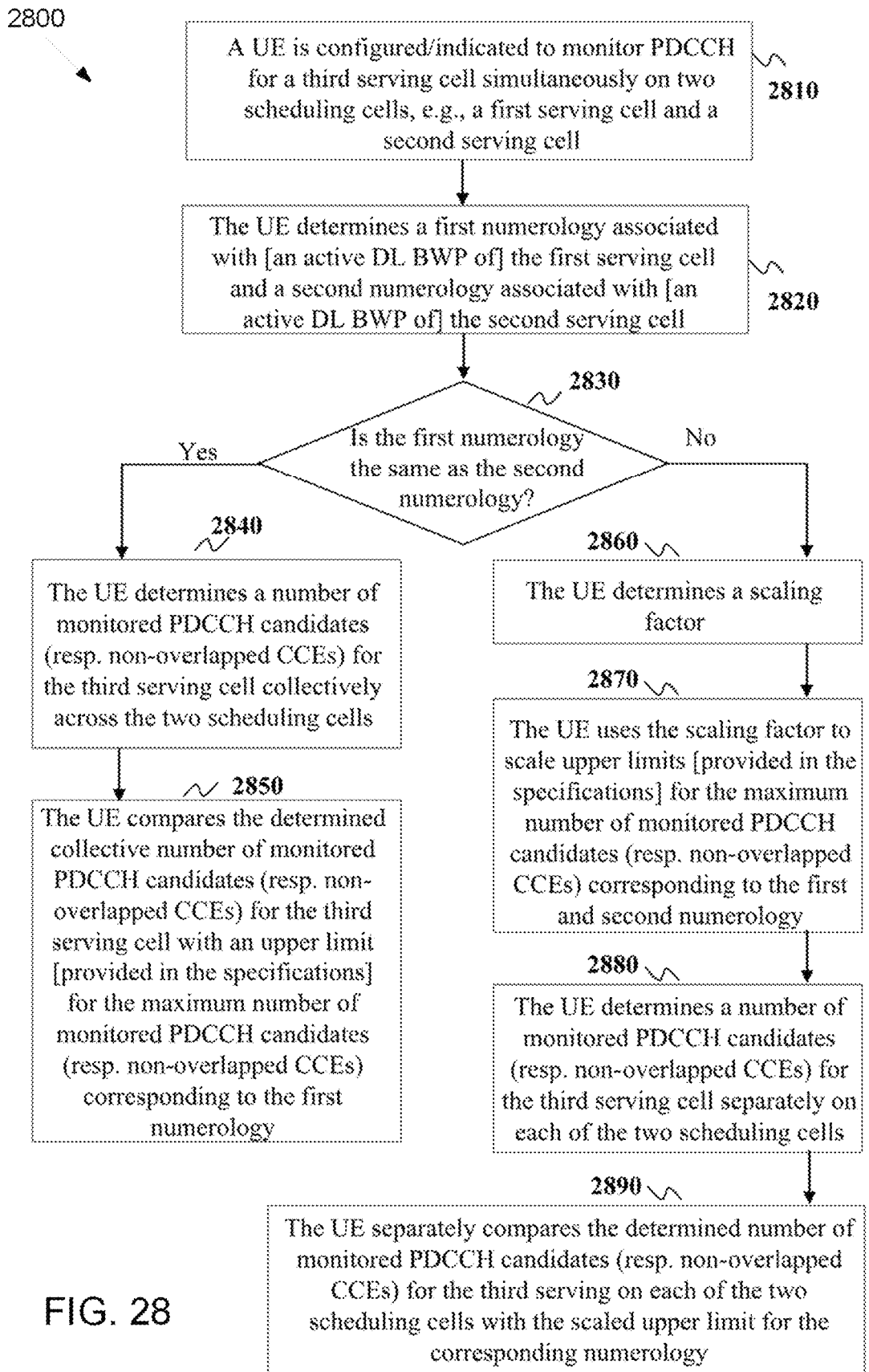
FIG. 28 illustrates a flowchart of a method for operation of the scheduled cell based on the numerology of the active scheduling cells according to embodiments of the present disclosure.

FIG. 28 illustrates a flowchart of a method 2800 for operation of the scheduled cell based on the numerology of the active scheduling cells according to embodiments of the present disclosure. An embodiment of the method 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions.

As illustrated in FIG. 28, a UE is configured/indicated to monitor PDCCH for a third serving cell simultaneously on two scheduling cells, e.g., a first serving cell and a second serving cell, at step 2810. The UE determines a first numerology associated with an active DL BWP of the first serving cell and a second numerology associated with an active DL BWP of the second serving cell, at step 2820. The UE determines whether the first numerology is the same as or different from the second numerology, at step 2830. If the UE determines that the first numerology is the same as the second numerology, then the UE determines a number of monitored PDCCH candidates (resp. non-overlapped CCEs) for the third serving cell collectively across the two scheduling cells, at step 2840, and the UE compares the determined collective number of monitored PDCCH candidates (resp. non-overlapped CCEs) for the third serving cell with an upper limit provided in the specifications for the maximum number of monitored PDCCH candidates (resp. non-overlapped CCEs) corresponding to the first numerology, at step 2850. If the UE determines that the first numerology is different from the second numerology, then the UE determines a scaling factor, at step 2860, and then uses the scaling factor to scale upper limits provided in the specifications for the maximum number of monitored PDCCH candidates (resp. non-overlapped CCEs) corresponding to the first and second numerology, at step 2870. The UE determines a number of monitored PDCCH candidates (resp. non-overlapped CCEs) for the third serving cell separately on each of the two scheduling cells, at step 2880. The UE separately compares the determined number of monitored PDCCH candidates (resp. non-overlapped CCEs) for the third serving on each of the two scheduling cells with the scaled upper limit for the corresponding numerology, as step 2890.

In one example, when a UE is configured with dynamic switching (such as via a DCI format or a MAC-CE, and so on, as described in embodiment E-3) of an active scheduling cell for a scheduled cell (such as in Scenario 1), the UE applies the BD/CCE limits based on a numerology of an active DL BWP of the active scheduling cell. For example, for a first serving cell that is configured with self-carrier scheduling and for cross-carrier scheduling by a second serving cell, when the first cell is indicated as the active scheduling cell, the UE applies the BD/CCE limits according to a SCS/numerology µ1 of an active DL BWP of the first serving cell; otherwise, when the second cell is indicated as the active scheduling cell, the UE applies the BD/CCE limits according to a SCS/numerology μ2 of an active DL BWP of the second serving cell.

In one example, when a scheduled cell is configured with two scheduling cells with search space set configuration(s) that are not overlapping in a slot/span, the UE applies the BD/CCE limits in each slot/span based on a SCS/numerology of an active DL BWP of a scheduling cell that is active in that slot/span. For example, a first serving cell can be configured with self-carrier scheduling in a first set of slots/spans and configured with cross-carrier scheduling by a second serving cell for a second set of slots/spans. Then, the UE applies the BD/CCE limits according to a SCS/numerology μ1 of an active DL BWP of the first serving cell in the first set of slots/spans, and according to a SCS/numerology μ2 of an active DL BWP of the second serving cell in the second set of slots/spans.

In one example, when a UE is configured with two active scheduling cells for a scheduled cell, wherein the UE monitors a first set of DCI formats or DCI format sizes only on a first scheduling cell and monitors a second set of DCI formats or DCI format sizes only on a second scheduling cell, the UE may determine a BD/CCE allocation among the first and second scheduling cells based on the DCI format (size) restriction. In one option, decoding for different DCI formats sizes is counted as additional PDCCH blind decoding complexity, so the BD/CCE allocation is adjusted when such restrictions are applied. For example, when the UE is configured to monitor a fewer number of DCI format sizes compared to a reference number of DCI format sizes, such as 1 DCI format size instead of 3 DCI format sizes in a UE-specific SS set of the first serving cell, the UE may perform additional PDCCH monitoring on the first scheduling cell, such as by a scaling factor $\rho \geq 1$ that is applied to as $\rho \min(M_{PDCCH}^{total,slot,\mu1}, M_{PDCCH}^{max,slot,\mu1})$ or as $\min(M_{PDCCH}^{total,slot,\mu1}, \rho M_{PDCCH}^{max,slot,\mu1})$ and so on. In another option, decoding for different DCI formats sizes is not counted as additional PDCCH blind decoding complexity, so the BD/CCE allocation is not adjusted when such restrictions are applied.

As aforementioned, in one embodiment of E-8, priority levels for SS set configuration for handling SS set overbooking and dropping is provided.

In one embodiment, when a UE is configured with at least two scheduling cells for a given scheduled cell, and the scheduled cell is associated with at least two active scheduling cells, an SS set for the scheduled cell associated with a CORESET in a scheduling cell can be configured with a priority level, so that different SS sets on different active scheduling cells for a same scheduled cell can be prioritized among each other. According to this embodiment, the UE can monitor a first SS set on an active scheduling cell (e.g., a first scheduling cell) with higher priority before monitoring a second SS set on another active scheduling cell (e.g., a second scheduling cell) with a lower priority. In addition, if a UE budget (as specified in the specifications) for monitoring PDCCH candidates and/or non-overlapped CCEs is consumed with SS sets with higher priority, the UE can drop a/some SS set(s) with lower priority.

For example, a SS set on a first scheduling cell which is a PCell (respectively, SCell) can have a higher priority level than a SS set on a second scheduling cell which is a SCell (respectively, PCell) configured to a UE. In another example, a SS set with a higher index has a lower priority level than a SS set with a lower index.

In one example, a SS set overbooking and/or dropping can be applied when an active scheduling cell is PCell configured to a UE. In another example, a SS set overbooking and/or dropping can be applied to a first time span on a PCell. In yet another example, SS set overbooking and/or dropping can be applied to "over-booked" SS sets on an active scheduling cell, when the active scheduling cell is a secondary cell (SCell) configured to the UE.

In one example, a priority level for SS sets impact SS overbooking and/or dropping when an active scheduling cell (e.g., a first scheduling cell) is a PCell configured to a UE and/or when another active scheduling cell (e.g., a second scheduling cell) is a SCell configured to a UE, and/or when a joint/collective limit on a number of PDCCH candidates and/or non-overlapped CCEs may be applied to both active scheduling cells (e.g., PCell+SCell) corresponding to the single scheduled cell, such as in the aforementioned option(s) in Embodiment E-7, e.g., $BD_1+BD_2 \leq \alpha L_1 + (1-\alpha) L_2$, then the UE can drop some SS set(s) on the PCell corresponding to the scheduled cell based on monitoring PDCCH candidates and/or non-overlapped CCEs in SS sets on the SCell corresponding to the scheduled cell.

In one example, a priority level for a SS set on an active scheduling cell corresponding to a scheduled cell can be further based on an aggregation level (AL) within a SS set, so that PDCCH candidates and/or non-overlapped CCEs with a given AL on a first SS set on a first scheduling cell can have a higher priority level than PDCCH candidates and/or non-overlapped CCEs with a same AL on a second SS set on a second scheduling cell. For example, a SS set with AL=8 or 16 on a first scheduling cell which is a SCell can have a higher priority level than a SS set with AL=8 or 16 on a second scheduling cell which is a PCell configured to a UE. In another example, a SS set with AL=2 or 4 on a first scheduling cell which is a PCell can have a higher priority level than a SS set with AL=2 or 4 on a second scheduling cell which is a PCell configured to a UE, e.g., since a PCell such as a low-band PCell can provide improved reliability for lower ALs/smaller CCEs compared to an SCell. In that sense, a UE's BD/CCE budget for AL=2 or 4 can be first spent on a scheduling cell which is a PCell.

In one example, a priority level/order among SS sets can be with respect to a scheduling cell, e.g., all SS sets in a first scheduling cell can have a higher priority than all SS sets in a second scheduling cell, so that a priority order within a scheduling cell can be uniform for all SS sets and all ALs.

In one example, a priority level/order among SS sets can be first with respect to a SS set index, and then for two SS sets on two different active scheduling cells with a same SS set index corresponding to a same scheduled cell, a first SS set on a first active scheduling cell can have a higher priority than a second SS set with a same SS set index on a second scheduling cell.

In one example, a priority level for a SS set can be explicit. In another example, a priority level for a SS set can be implicit, e.g., based on a configured number of PDCCH candidates in a SS set and/or based on a configured number of PDCCH candidates for an AL in a SS set.

In one example, a priority order for a SS set can be same/fixed for all ALs within a SS set. In another example, a priority order for SS set can be dependent on an AL within a SS set.

FIG. 29 illustrates an example pseudo-code 2900 for SS set dropping according to embodiments of the present disclosure. An embodiment of the pseudo-code 2900 shown in FIG. 29 is for illustration only.

FIG. 29 shows an example pseudo-code for SS set dropping, e.g., on a scheduling cell which is a PCell, when the corresponding scheduled cell has another active scheduling cell which is a secondary cell, and when a joint/collective limit on the number of PDCCH candidates and/or non-overlapped CCEs is applied across the two active scheduling cells. A UE budget for BD/CCE can is allocated to common SS sets configured to a first scheduling cell. A remaining UE budget for BD/CCE is then allocated to UE-specific SS sets on a scheduling cell with higher priority in an increasing order of SS sets, starting from SS set index j=0, and within a same SS set index, a remaining UE budget for BD/CCE, if sufficient, is allocated to UE-specific SS sets on a scheduling cell with a lower priority, and the UE budget for BD/CCE is reduced accordingly; otherwise the UE drops the SS set on the scheduling cell with a lower priority.

As aforementioned, in one embodiment of E-9, joint PDCCH transmission for a scheduled cell from two different scheduling cells is provided.

In one embodiment, a UE is configured with at least two scheduling cells for a given scheduled cell, wherein the two scheduling cells cooperate for jointly transmitting PDCCH, e.g., for DCI formats with large sizes, in the sense that, some CCEs of a PDCCH are transmitted by one active scheduling cell, and other remaining CCEs of the PDCCH are transmitted by the other active scheduling cell. According to this embodiment, an SS set for the scheduled cell can be associated with two CORESETs (as opposed to one CORESET, in the current standards) from two different active scheduling cells. In such a case, combined limits for blind decoding (BD) and non-overlapped CCEs are applied across the two scheduling cells.

The disclosure can be applicable to NR specifications Rel-17/18 to provide enhancements for cross-carrier scheduling in a CA operation and enable dynamic and adaptive mechanisms for offloading of control overhead corresponding to different serving cells among the scheduling cells. The network benefits from the flexibility of changing the scheduling cell association dynamically, so that a scheduled cell can potentially monitor and receive DCI on two or more scheduling cells, either simultaneously at any given time, or one different scheduling cell at a time.

This disclosure pertains PUCCH cell and PUCCH groups in a CA operation. In a baseline operation, any/all uplink control information (UCI) is transmitted on the PCell configured to/acquired by the UE. In an enhanced operation, the UE can be provided with PUCCH configuration on two serving cells, e.g., the PCell along with a certain secondary cell referred to as a PUCCH-SCell, so that UCI corresponding to serving cells and/or serving cell groups is transmitted on one of these two serving cells with PUCCH configuration, referred to as the PUCCH cells. Accordingly, the UE transmits UCI for a first group of serving cells on the PCell and transmits UCI for a second group of serving cells on the PUCCH-SCell. The first group is referred to as the primary PUCCH group, while the second group is referred to as the secondary PUCCH group. As such, configuration of the PUCCH-SCell to establish two PUCCH groups is a useful feature to limit UL control signalling on the PCell to only that from a few serving cells, i.e., the primary PUCCH group only, instead of all serving cells, therefore offloading the uplink control signalling from the remaining serving cells, i.e., the secondary PUCCH group, to the PUCCH-SCell.

However, the existing PUCCH group configuration supported in LTE and NR Rel-15/16 consider only semi-static association of serving cells with the PUCCH cells/groups. For example, each serving cell is semi-statically configured to belong to only one of the two PUCCH groups. Therefore, any change in the PUCCH group for a given serving cell would require a semi-static RRC reconfiguration, which incurs high overhead signalling as well as long latency before changes get effective.

There is a need to transmit control signalling such as UCI on a serving cell that can offer improved reliability, whenever possible and/or available. For example, a serving cell in lower frequency bands, such as the sub-1 GHz, offers strong channel conditions and lower pathloss compared to mid/high bands, hence is suitable for carrying UCI. Reliability of the control signalling is essential for all applications, but more so for such use-cases as URLLC.

There is another need to avoid congestion of control signalling on each PUCCH cell, such as the PCell and the PUCCH-SCell. It is essential that sufficient control/PUCCH resources are guaranteed for transmission of UCI corresponding to PCell itself and/or PUCCH-SCell itself, before offering control/PUCCH resources for transmission of UCI corresponding to other serving cells in a PUCCH group. For example, a low-band serving cell is likely to be configured as the PCell for a UE with CA operation, and therefore may face increased control signaling overhead from (numerous) UEs/transmissions within the same serving cell as well as UEs/transmissions from other serving cells.

For example, a serving cell in lower frequency bands, such as the sub-1 GHz, offers strong channel conditions and is hence suitable for URLLC & mMTC use-cases. In addition, such a low-band serving cell also enjoys a lower pathloss compared to mid/high bands and can therefore provide a high coverage for eMBB service and also act as a potential "fallback" serving cell when mid-/high-band cells experience failure, deactivation, and so on. It is important to ensure that inherently low-band services such as URLLC and mMTC enjoy sufficient PUCCH resources on a low-band (primary) serving cell. In addition, control signalling overhead from other serving cells belonging to a PUCCH group need to stay within reasonable limits so that time-frequency resources on a low-band (primary) serving cell get freed-up and available for data transmission, when needed.

There is a further need to support mechanisms that enable dynamic trade-off between control channel reliability and control signaling overhead. For example, in the current specifications a low-band (primary) serving cell may be overwhelmed with many UCIs from different serving cells within a PUCCH group, but there is no possibility for temporarily offloading some UCIs such as some cross-carrier UCIs to other PUCCH cells, unless the configuration for PUCCH cell(s) is RRC reconfigured. Depending on various aspects, such as change of network traffic situation and availability (or not) of control resources, the network needs to dynamically offload UCI/PUCCH signaling overhead among the PUCCH cells, e.g., the PCell and the PUCCH-SCell, to avoid control congestion on one/some PUCCH cells, while maintaining the option to have most/all of the control signaling on PUCCH cell(s) with improved control channel reliability, such as a low-band (primary) serving cell with stronger channel conditions, whenever possible.

The present disclosure provides enhancements for PUCCH groups in a CA operation to enable dynamic and flexible mechanisms for offloading of uplink control overhead corresponding to different serving cells among the PUCCH cells/groups. Various embodiments of this disclosure present solutions that allow the network to decide on which PUCCH cell to transmit the control/PUCCH/UCI signaling corresponding to a given serving cell and/or a given serving cell group. The network benefits from the flexibility of changing the PUCCH group association dynamically, so that a UE can transmit UCIs corresponding to a serving cell and/or a cell group on two (or more) PUCCH cells, for different UCI types and/or for different occasions of a same UCI type.

The provided flexible PUCCH group mechanism provides the network with a tool for dynamically offloading UCI/PUCCH signaling overhead among different PUCCH cells, while maintaining most/all of the control signaling on PUCCH cell(s) offering improved reliability, when possible. For example, when a low-band primary serving cell with strong channel conditions is "available," i.e., the low-band primary serving cell has sufficient control resources, all UCIs can be transmitted over the low-band PCell to improve UCI reliability, but when the low-band PCell is "busy," i.e., it is overwhelmed with many UCIs originated from the same cell and/or from some other serving cells, and therefore has insufficient control resources to handle all such UCI transmissions, the network can offload some cross-carrier UCIs to an alternative PUCCH cell such as the PUCCH-SCell.

The provided control overhead offloading mechanisms are supported with dynamic, fast and "light" signaling mechanisms in L1/L2, without a need for RRC reconfiguration, and therefore can conveniently address scenarios of (rather) fast change in network traffic situation.

This disclosure addresses the above concepts and provides additional design aspects for supporting enhanced carrier aggregation operation and discloses novel solutions and embodiments for flexible PUCCH groups as summarized in the following and fully elaborated further below.

In one embodiment of EA-1, support for configuration of two/multiple PUCCH serving cells for a serving cell and indication of an "active PUCCH serving cell" for UCI transmission for the serving cell is provided.

In one embodiment, a UE which is configured with two or more serving cells (CA operation) can be configured with two PUCCH serving cells for a given serving cell and/or for a given serving cell group. According to this embodiment, a UE can transmit different UCI types and/or different occasions of UCI transmission for a given serving cell and/or for a given serving cell group on different PUCCH serving cells. According to this embodiment, the UE is provided with a configuration and/or indication for an "active" PUCCH serving cell, that belongs to the set of configured PUCCH serving cells for the given serving cell/cell group, on which the UE transmits a UCI (occasion).

In one embodiment of EA-1-1, a first active PUCCH cell is provided. In one embodiment, a serving cell which is configured with two or more PUCCH cells can be configured with a "first active PUCCH cell" on which the UE can transmit UCI before receiving any L1/L2 signaling to indicate an active PUCCH cell for the serving cell. For example, the configuration of the first active PUCCH cell for a serving cell ensures that the UE has no confusion for transmission of HARQ-ACK information (e.g., corresponding to Msg2/4/B), and possibly CSI report, during initial access, and/or during random access procedure, and/or immediately after configuration of a serving cell.

In one embodiment of EA-1-2, contents of an indication for switching of an active PUCCH cell are provided. In one embodiment, for a UE configured (to operate) with two or more PUCCH cells for at least one serving cell, the UE can receive a network signaling and/or an indication from higher layers for change of an active PUCCH cell for a given serving cell, herein referred to as an indication for switching of an active PUCCH cell. According to this embodiment, an indication for switching of an active PUCCH cell for a given serving cell can include one or more "PUCCH group switching" (PGS) field(s), wherein each PGS field includes at least one or more of a PUCCH cell indicator (PCI), and an indication for a BWP in the new active PUCCH cell, and an indication for a serving cell for which the new active PUCCH cell applies.

In one embodiment of EA-2, joint indication mechanisms for both UCI triggering and active PUCCH cell indication are provided. In one embodiment, when a UE is configured with a serving cell associated with two or more PUCCH cells, an indication for switching of an active PUCCH cell for the serving cell can be jointly provided with a signaling and/or indication that triggers a UCI transmission.

In one embodiment of EA-2-1, joint indication mechanisms based on L1/L2 network signaling are provided. In one embodiment, when an L1/L2 network signaling such as a DCI or a MAC-CE triggers a UCI, the network signaling can also include an indication for switching of an active PUCCH cell for a serving cell (and/or a serving cell group and/or for a UCI type and/or for a UCI configuration of a UCI type, and/or so on). Examples of such network signaling include a DCI format in a PDCCH that schedules a PDSCH reception, and/or a DCI format for activation and/or release of SPS PDSCH, and/or a MAC-CE command for activation and/or release of SP-CSI reporting on PUCCH.

In one embodiment of EA-2-2, joint indication mechanisms based on higher layer indication are provided. In one embodiment, when higher layers trigger/request a UCI transmission without any associated L1/L2 network signaling, e.g., without any DCI or MAC-CE, the UE can determine an active PUCCH cell for a serving cell (and/or a serving cell group and/or for a UCI type and/or for a UCI configuration of a UCI type, and/or so on) based on a timing of a UCI transmission, such as transmission occasion index and/or a slot index for the UCI transmission, based on a predetermined rule/method and/or a configured time pattern.

In one embodiment of EA-2-3, active PUCCH cell determination and switching for a group of UCIs with a single trigger are provided. In one embodiment, when a single trigger such as a L1/L2 network signaling and/or a higher layer indication triggers a group of two or more UCI transmission occasions, the UE can transmit the group of UCI transmissions on a same active PUCCH cell or on different active PUCCH cells. For example, a group of two or more UCI transmission occasions triggered by a single trigger can be a periodic UCI transmission during a time window such as one or more of a HARQ-ACK feedback information for a SPD PDSCH, a SR and/or LRR, and a P/SP CSI reporting.

In one example, the UE determines an active PUCCH cell for a first/earliest UCI transmission occasion from the group of two or UCI transmission occasions, and then transmit the remaining UCI transmission occasions on the same determined active PUCCH serving cell. In one example, the UE is provided a predetermined rule and/or a configured time pattern, as in embodiment EA-2-2, and the UE determines an active PUCCH cell for each occasion of the group of UCI transmission occasions based on the timing (e.g., occasion index and/or slot index) of the UCI transmissions and the predetermined rule and/or a configured time pattern.

In one embodiment of EA-3, "Stand-alone" indication mechanisms for switching of active PUCCH cell without UCI triggering are provided. In one embodiment, when a UE is configured with at least two PUCCH cells for a given serving cell, various mechanisms based on network signaling and/or UE determination can be used to indicate/trigger a switching of the active PUCCH cell among the at least two PUCCH cells, without triggering a UCI/PUCCH transmission. Such mechanisms are herein referred to as "stand-alone" indication mechanisms for indication of an active PUCCH cell only and apply to future UCI/PUCCH transmission(s).

In one embodiment of EA-3-1, in a first mechanism for this embodiment, a UE-specific PDCCH/DCI can be used to indicate a switching of the active PUCCH cell. According to this mechanism, the UE receives a DCI format in a PDCCH, wherein the DCI format carries an indication for switching of an active PUCCH cell. The DCI format can be used solely for such indication purposes or can be additionally used for scheduling uplink data transmission on that serving cell.

In one embodiment of EA-3-2, in a second mechanism for this embodiment, a group-common PDCCH/DCI format can be used to indicate a switching of the active PUCCH cell(s). According to this mechanism, a group of UEs receive a single joint indication in a group-common DCI format including two/multiple fields, wherein each field corresponds to an indication for one UE for switching of active PUCCH cell. For example, the group of UEs can include UEs in nearby proximity with similar channel conditions experiencing similar PUCCH reliability performance and requiring similar/related UCI offloading situation between PCell and PUCCH-SCell(s).

In one embodiment of EA-3-3, in a third mechanism for this embodiment, a downlink MAC-CE activation/deactivation command can be used to indicate a switching of the active PUCCH cell(s). According to this mechanism, the DL MAC-CE command is carried by a PDSCH transmission and applies to a single UE, namely the UE for which the PDSCH is scheduled (and received). This mechanism is suitable for control overhead load balancing and offloading for situations with moderate speed of change in the network traffic pattern. In addition, this mechanism facilitates a joint indication of switching of active PUCCH cell(s) for multiple/several PUCCH cells and/or corresponding to multiple/several serving cells within a single command, which is difficult/impossible to fit in a (UE-specific or group-common) DCI format as described in Embodiments EA-3-1 and EA-3-2.

In one embodiment of EA-3-4, Timeline aspects for change of active PUCCH cell(s) are provided. In one embodiment, when a UE is configured with at least two PUCCH cells for a given serving cell, and when network signaling is used to indicate a switching of the active PUCCH cell among the at least two PUCCH cells, the gNB and/or the UE can perform UCI transmission on a current/previous active PUCCH cell and/or on a new active PUCCH cell based on some timeline considerations. According to this embodiment, the UE can perform UCI transmission with various methods during a time period, e.g., referred to as a PUCCH cell "activation" time or simply put an "activation" time, from a time when the UE receives a gNB indication for switching of the active PUCCH cell until a time when the UE can start to transmit UCI on a new active PUCCH cell.

In one embodiment of EA-4, determination of active PUCCH cell for different UCI types is provided. In one embodiment, the UE can determine an active PUCCH cell for a serving cell or a serving cell group based on a UCI type that is carried by a PUCCH resource on the PUCCH cell.

In one embodiment of EA-4-1, determination of active PUCCH cell for HARQ-ACK feedback corresponding to dynamically scheduled PDSCH or DL SPS activation/release is provided. In one embodiment, a DCI format that schedules a PDSCH and/or a DCI format that activates/releases an SPS PDSCH configuration on a serving cell can include an indication for an active PUCCH cell for transmission of a HARQ-ACK information corresponding to the scheduled PDSCH and/or corresponding to the first/earliest SPS PDSCH reception associated with a PDCCH that carries the activation DCI format and/or corresponding to an SPS PDSCH release on the serving cell.

In one embodiment of EA-4-2, determination of active PUCCH cell for HARQ-ACK corresponding to SPS PDSCH reception without a corresponding PDCCH is provided. In one embodiment, a UE can be configured with a SPS PDSCH configuration that can include two/multiple PUCCH resources on two/multiple PUCCH serving cells, wherein the PUCCH resources are for transmission of HARQ-ACK information corresponding to SPS PDSCH transmission occasions not associated with a PDCCH. According to this embodiment, the UE determines an active PUCCH cell for transmission of HARQ-ACK information for the SPS PDSCH reception without a corresponding PDCCH based on an active PUCCH cell indication provided in a DCI format that activates the SPS PDSCH configuration. The UE can continue to transmit HARQ-ACK information for SPS PDSCH on a first PUCCH cell, until the UE receives an indication for switching an active PUCCH cell, after which the UE transmits the HARQ-ACK information corresponding to SPS PDSCH reception occasions on a newly indicated active PUCCH cell, e.g., a second PUCCH cell.

In one embodiment of EA-4-3, determination of active PUCCH cell for scheduling request (SR) or link recovery request (LRR) is provided. In one embodiment, a UE can be configured with multiple SR and/or link recovery request LRR configurations corresponding to a serving cell group and/or a MAC entity, wherein each SR/LRR configuration includes two or more PUCCH resources on two or more PUCCH serving cells. The UE can determine an active PUCCH cell for a first/earliest transmission occasion of a SR/LRR configuration and the UE transmits the following SR/LRR transmission occasions on the same active PUCCH cell. The UE can also determine an active PUCCH cell for transmission of SR/LRR based on a timing of a UCI transmission, based on a predetermined rule/method and/or a configured time pattern.

In one embodiment of EA-4-4, determination of active PUCCH cell for CSI report is provided. In one embodiment, a UE can be configured, on two or more PUCCH serving cells, with CSI report configurations corresponding to a same serving cell. According to this embodiment, the UE determines an active PUCCH cell to transmit a CSI report corresponding to a given serving cell (and a given CSI-RS resource configuration) based on a predetermined or configured time pattern and/or based on a network signaling such a MAC-CE activation command for SP-CSI reporting.

In one embodiment of EA-4-5, determination of active PUCCH cell for UCI multiplexing is provided. In on embodiment, when a UE is configured with two or multiple PUCCH cells for UCI transmission, and when multiple UCIs overlap in time, e.g., occur in a same slot, a single multiplexing of the multiple UCIs can be transmitted in a single active PUCCH cell and/or two or more of the multiple UCIs or multiplexing thereof can be transmitted on two or more active PUCCH cells.

In one embodiment of EA-5, HARQ-ACK codebook generation based on indication(s) for switching of active PUCCH cell(s) is provided. In one embodiment, a UE can generate a semi-static and/or dynamic HARQ codebook(s) based on a set of serving cells that are associated with a same active PUCCH cell (for HARQ-ACK information transmission). According to this example, the number of serving cells that belong to a HARQ codebook can change over time, based on the received indications for switching active PUCCH cell(s).

In one example, a unified framework can be used, so that a TCI state applies to both uplink and downlink beam indication, e.g., by providing QCL relationship for a PUSCH, PUCCH, and/or SRS transmission.

In one example, a further enhanced framework can be used so that a configuration of TCI state can be UE-specific, UE-common, UE-group-specific, and/or cell-specific. In addition, such a configuration can be provided by one or more of UE-specific signaling, UE-group signaling, dedicated higher layer signaling, common higher layer signaling, and/or system information signaling such as by a MIB or a SIB.

A PUCCH carries the UCI from the UE to the gNB. Five formats of PUCCH exist, depending on the duration of PUCCH and the UCI payload size.

In one example of Format #0, short PUCCH of 1 or 2 symbols with small UCI payloads of up to two bits with UE multiplexing capacity of up to 6 UEs with 1-bit payload in the same PRB.

In one example of Format #1, long PUCCH of 4-14 symbols with small UCI payloads of up to two bits with UE multiplexing capacity of up to 84 UEs without frequency hopping and 36 UEs with frequency hopping in the same PRB.

In one example of Format #2, short PUCCH of 1 or 2 symbols with large UCI payloads of more than two bits with no UE multiplexing capability in the same PRBs.

In one example of Format #3, long PUCCH of 4-14 symbols with large UCI payloads with no UE multiplexing capability in the same PRBs.

In one example of Format #4, long PUCCH of 4-14 symbols with moderate UCI payloads with multiplexing capacity of up to 4 UEs in the same PRBs.

The short PUCCH format of up to two UCI bits is based on sequence selection, while the short PUCCH format of more than two UCI bits frequency multiplexes UCI and DMRS. The long PUCCH formats time-multiplex the UCI and DMRS. Frequency hopping is supported for long PUCCH formats and for short PUCCH formats of duration of 2 symbols. Long PUCCH formats can be repeated over multiple slots.

For operation with shared spectrum channel access, PUCCH Format #0, #1, #2, #3 are extended to use resource in one PRB interlace (up to two interlaces for Format #2 and Format #3) in one RB Set. PUCCH Format #2 and #3 are enhanced to support multiplexing capacity of up to 4 UEs in the same PRB interlace when one interlace is used.

UCI multiplexing in PUSCH is supported when UCI and PUSCH transmissions coincide in time, either due to transmission of a UL-SCH transport block or due to triggering of A-CSI transmission without UL-SCH transport block: (1) UCI carrying HARQ-ACK feedback with 1 or 2 bits is multiplexed by puncturing PUSCH; (2) In all other cases UCI is multiplexed by rate matching PUSCH.

UCI includes the following information: (1) CSI; (2) ACK/NAK; and (3) Scheduling request.

For operation with shared spectrum channel access, multiplexing of CG-UCI and PUCCH carrying HARQ-ACK feedback can be configured by the gNB. If not configured, when PUCCH overlaps with PUSCH scheduled by a configured grant within a PUCCH group and PUCCH carries HARQ ACK feedback, PUSCH scheduled by configured grant is skipped.

QPSK and π/2 BPSK modulation can be used for long PUCCH with more than 2 bits of information, QPSK is used for short PUCCH with more than 2 bits of information and BPSK and QPSK modulation can be used for long PUCCH with up to 2 information bits.

Transform precoding is applied to PUCCH Format #3 and Format #4. Channel coding used for uplink control information is described in TABLE 8.

TABLE 8

Channel coding for uplink control information

| Uplink Control Information size including CRC, if present | Channel code |
| --- | --- |
| 1 | Repetition code |
| 2 | Simplex code |
| 3-11 | Reed Muller code |
| >11 | Polar code |

PUSCH and PUCCH can be associated with a priority (high/low) by RRC or L1 signalling. If a PUCCH transmission overlaps in time with a transmission of a PUSCH or another PUCCH, only the PUCCH or PUSCH associated with a high priority can be transmitted.

In case of Supplementary Uplink (SUL, see TS 38.101-1), the UE is configured with 2 ULs for one DL of the same cell, and uplink transmissions on those two ULs are controlled by the network to avoid overlapping PUSCH/PUCCH transmissions in time. Overlapping transmissions on PUSCH are avoided through scheduling while overlapping transmissions on PUCCH are avoided through configuration (PUCCH can only be configured for only one of the 2 ULs of the cell). In addition, initial access is supported in each of the uplink.

PUCCH is configured for one BWP of the normal UL or SUL of a serving cell. If the UE is configured with SUL, the network configures PUCCH only on the BWPs of one of the uplinks (normal UL or SUL). The network configures PUCCH-Config at least on non-initial BWP(s) for SpCell and PUCCH SCell. If supported by the UE, the network may configure at most one additional SCell of a cell group with PUCCH-Config (i.e., PUCCH SCell).

In (NG)EN-DC and NE-DC, the NW configures at most one serving cell per frequency range with PUCCH. In (NG)EN-DC and NE-DC, if two PUCCH groups are configured, the serving cells of the NR PUCCH group in FR2 use the same numerology. For NR-DC, the maximum number of PUCCH groups in each cell group is one, and only the same numerology is supported for the cell group with carriers only in FR2.

The NW may configure PUCCH for a BWP when setting up the BWP. The network may also add/remove the pucch-Config in an RRCReconfiguration with reconfiguration-WithSync (for SpCell or PUCCH SCell) or with SCell release and add (for PUCCH SCell) to move the PUCCH between the UL and SUL carrier of one serving cell. In other cases, only modifications of a previously configured pucch-Config are allowed.

If one (S)UL BWP of a serving cell is configured with PUCCH, all other (S)UL BWPs must be configured with PUCCH, too.

Asynchronous incremental redundancy hybrid ARQ is supported. The gNB provides the UE with the HARQ-ACK feedback timing either dynamically in the DCI or semi-statically in an RRC configuration. Retransmission of HARQ-ACK feedback is supported for operation with shared spectrum channel access by using enhanced dynamic codebook and/or one-shot triggering of HARQ-ACK transmission for all configured CCs and HARQ processes in the PUCCH group.

The gNB schedules each uplink transmission and retransmission using the uplink grant on DCI. For operation with shared spectrum channel access, UE can also retransmit on configured grants.

The UE may be configured to transmit code block group-based transmissions where retransmissions may be scheduled to carry a sub-set of all the code blocks of a transport block. Up to two HARQ-ACK codebooks corresponding to a priority (high/low) can be constructed simultaneously. For each HARQ-ACK codebook, more than one PUCCH for HARQ-ACK transmission within a slot is supported. Each PUCCH is limited within one sub-slot, and the sub-slot pattern is configured per HARQ-ACK codebook.

The HARQ functionality ensures delivery between peer entities at Layer 1. A single HARQ process supports one TB when the physical layer is not configured for downlink/uplink spatial multiplexing, and when the physical layer is configured for downlink/uplink spatial multiplexing, a single HARQ process supports one or multiple TBs.

In case of CA, the multi-carrier nature of the physical layer is only exposed to the MAC layer for which one HARQ entity is required per serving cell. In both uplink and downlink, there is one independent hybrid-ARQ entity per serving cell and one transport block is generated per assignment/grant per serving cell in the absence of spatial multiplexing. Each transport block and potential HARQ retransmissions are mapped to a single serving cell.

With Semi-persistent scheduling (SPS), the gNB can allocate downlink resources for the initial HARQ transmissions to UEs: RRC defines the periodicity of the configured downlink assignments while PDCCH addressed to CS-RNTI can either signal and activate the configured downlink assignment, or deactivate it; i.e., a PDCCH addressed to CS-RNTI indicates that the downlink assignment can be implicitly reused according to the periodicity defined by RRC, until deactivated. When required, retransmissions are explicitly scheduled on PDCCH(s).

Link adaptation (e.g., adaptive modulation and coding (AMC)) with various modulation schemes and channel coding rates is applied to the PDSCH. The same coding and modulation are applied to all groups of resource blocks belonging to the same L2 PDU scheduled to one user within one transmission duration and within a MIMO codeword.

For channel state estimation purposes, the UE may be configured to measure CSI-RS and estimate the downlink channel state based on the CSI-RS measurements. The UE feeds the estimated channel state back to the gNB to be used in link adaptation.

Uplink buffer status reports (BSR) are needed to provide support for QoS-aware packet scheduling. In NR, uplink buffer status reports refer to the data that is buffered in for a group of logical channels (LCG) in the UE. Eight LCGs and two formats are used for reporting in uplink: (1) a short format to report only one BSR (of one LCG); and/or (2) a flexible long format to report several BSRs (up to all eight LCGs).

Uplink buffer status reports are transmitted using MAC signalling. When a BSR is triggered (e.g., when new data arrives in the transmission buffers of the UE), an SR can be transmitted by the UE (e.g., when no resources are available to transmit the BSRs).

If a UE is configured with a SCG, the UE may apply the procedures described in this clause for both MCG and SCG. When the procedures are applied for MCG, the terms "secondary cell," "secondary cells," "serving cell," "serving cells" in this clause refer to secondary cell, secondary cells, serving cell, serving cells belonging to the MCG respectively. When the procedures are applied for SCG, the terms "secondary cell," "secondary cells," "serving cell," "serving cells" in this clause refer to secondary cell, secondary cells (not including PSCell), serving cell, serving cells belonging to the SCG respectively. The term "primary cell" in this clause refers to the PSCell of the SCG.

If the UE is configured with a PUCCH-SCell, the UE may apply the procedures described in this clause for both primary PUCCH group and secondary PUCCH group. When the procedures are applied for the primary PUCCH group, the terms "secondary cell," "secondary cells," "serving cell," "serving cells" in this clause refer to secondary cell, secondary cells, serving cell, serving cells belonging to the primary PUCCH group respectively. When the procedures are applied for secondary PUCCH group, the terms "secondary cell," "secondary cells," "serving cell," "serving cells" in this clause refer to secondary cell, secondary cells (not including the PUCCH-SCell), serving cell, serving cells belonging to the secondary PUCCH group respectively. The term "primary cell" in this clause refers to the PUCCH-SCell of the secondary PUCCH group.

If a UE is configured for NR-DC operation, the UE does not expect to be configured with a PUCCH-SCell.

The SR is used for requesting UL-SCH resources for new transmission. The MAC entity may be configured with zero, one, or more SR configurations. An SR configuration includes a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (if such a configuration exists) is utilized as corresponding SR configuration for the triggered SR.

RRC configures the following parameters for the scheduling request procedure: sr-ProhibitTimer (per SR configuration); and sr-TransMax (per SR configuration).

The following UE variables are used for the scheduling request procedure: SR_COUNTER (per SR configuration).

If an SR is triggered and there are no other SRs pending corresponding to the same SR configuration, the MAC entity may set the SR_COUNTER of the corresponding SR configuration to 0.

When an SR is triggered, it may be considered as pending until the SR is canceled. All pending SR(s) triggered prior to the MAC PDU assembly may be cancelled and each respective sr-ProhibitTimer may be stopped when the MAC PDU is transmitted and this PDU includes a Long or Short BSR MAC CE which contains buffer status up to (and including) the last event that triggered a BSR prior to the MAC PDU assembly. All pending SR(s) may be cancelled and each respective sr-ProhibitTimer may be stopped when the UL grant(s) can accommodate all pending data available for transmission.

Only PUCCH resources on a BWP which is active at the time of SR transmission occasion are considered valid. As long as at least one SR is pending, the MAC entity may for each pending SR as shown in TABLE 9.

TABLE 9

MAC entity operation for pending SR

1> if the MAC entity has no valid PUCCH resource configured for the pending SR:
  2> initiate a Random Access procedure on the SpCell and cancel the pending SR.
1> else, for the SR configuration corresponding to the pending SR:
  2> when the MAC entity has an SR transmission occasion on the valid PUCCH resource for SR
    configured; and
  2> if sr-ProhibitTimer is not running at the time of the SR transmission occasion; and
  2> if the PUCCH resource for the SR transmission occasion does not overlap with a measurement
    gap; and
  2> if the PUCCH resource for the SR transmission occasion does not overlap with a UL-SCH
    resource:
      3> if SR_COUNTER < sr-TransMax:
        4> increment SR_COUNTER by 1;
        4> instruct the physical layer to signal the SR on one valid PUCCH resource for SR;
        4> start the sr-ProhibitTimer.
      3> else:
        4> notify RRC to release PUCCH for all Serving Cells;
        4> notify RRC to release SRS for all Serving Cells;
        4> clear any configured downlink assignments and uplink grants;
        4> clear any PUSCH resources for semi-persistent CSI reporting;
        4> initiate a Random Access procedure on the SpCell and cancel all pending SRs.

The selection of which valid PUCCH resource for SR to signal SR on when the MAC entity has more than one overlapping valid PUCCH resource for the SR transmission occasion is left to UE implementation.

If more than one individual SR triggers an instruction from the MAC entity to the PHY layer to signal the SR on the same valid PUCCH resource, the SR_COUNTER for the relevant SR configuration is incremented only once.

The MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR prior to the MAC PDU assembly, or when the UL grant(s) can accommodate all pending data available for transmission.

A UE is configured by higher layer parameter SchedulingRequestResourceConfig a set of configurations for SR in a PUCCH transmission using either PUCCH format 0 or PUCCH format 1.

The UE is configured a PUCCH resource by SchedulingRequestResourceId providing a PUCCH format 0 resource or a PUCCH format 1 resource. The UE is also configured a periodicity $SR_{PERIODICITY}$ in symbols or slots and an offset $SR_{OFFSET}$ in slots by periodicityAndOffset for a PUCCH transmission conveying SR. If $SR_{PERIODICITY}$ is larger than one slot, the UE determines a SR transmission occasion in a PUCCH to be in a slot with number $n_{s,f}^{\lambda}$ [TS 38.211] in a frame with number $n_f$ if $(n_f N_{slot}^{frame,\mu} + n_{s,f}^{\mu} - SR_{OFFSET}) \bmod SR_{PERIODICITY} = 0$.

If $SR_{PERIODICITY}$ is one slot, the UE expects that $SR_{OFFSET} = 0$ and every slot is a SR transmission occasion in a PUCCH.

If $SR_{PERIODICITY}$ is smaller than one slot, the UE determines a SR transmission occasion in a PUCCH to start in a symbol with index l [TS 38.211] if $(l-l_0 \bmod SR_{PERIODICITY}) \bmod SR_{PERIODICITY} = 0$ where $l_0$ is the value of startingSymbolIndex.

If the UE determines that, for a SR transmission occasion in a PUCCH, the number of symbols available for the PUCCH transmission in a slot is smaller than the value provided by nrofSymbols, the UE does not transmit the PUCCH in the slot.

The UE transmits a PUCCH in the PUCCH resource for the corresponding SR configuration only when the UE transmits a positive SR. For a positive SR transmission using PUCCH format 0, the UE transmits the PUCCH as described in [TS 38.211] by obtaining $m_0$ as described for HARQ-ACK information and by setting in $m_{cs}=0$. For a positive SR transmission using PUCCH format 1, the UE transmits the PUCCH as described in [TS 38.211] by setting $b(0)=0$.

The MAC entity includes a HARQ entity for each Serving Cell, which maintains a number of parallel HARQ processes. Each HARQ process is associated with a HARQ process identifier. The HARQ entity directs HARQ information and associated TBs received on the DL-SCH to the corresponding HARQ processes.

The number of parallel DL HARQ processes per HARQ entity is specified in TS 38.214. The dedicated broadcast HARQ process is used for BCCH.

The HARQ process supports one TB when the physical layer is not configured for downlink spatial multiplexing. The HARQ process supports one or two TBs when the physical layer is configured for downlink spatial multiplexing.

When the MAC entity is configured with pdsch-AggregationFactor >1, the parameter pdsch-AggregationFactor provides the number of transmissions of a TB within a bundle of the downlink assignment. Bundling operation relies on the HARQ entity for invoking the same HARQ process for each transmission that is part of the same bundle. After the initial transmission, pdsch-AggregationFactor 1 HARQ retransmissions follow within a bundle.

The MAC entity may perform operation as shown in TABLE 10.

TABLE 10

MAC entity operation

1> if a downlink assignment has been indicated:
  2> allocate the TB(s) received from the physical layer and the associated HARQ information to
    the HARQ process indicated by the associated HARQ information.
1> if a downlink assignment has been indicated for the broadcast HARQ process:
  2> allocate the received TB to the broadcast HARQ process.

When a transmission takes place for the HARQ process, one or two (in case of downlink spatial multiplexing) TBs and the associated HARQ information are received from the HARQ entity. For each received TB and associated HARQ information, the HARQ process may perform operation as shown in TABLE 11.

TABLE 11

HARQ process

1> if the NDI, when provided, has been toggled compared to the value of the previous received
  transmission corresponding to this TB; or
1> if the HARQ process is equal to the broadcast process, and this is the first received transmission
  for the TB according to the system information schedule indicated by RRC; or
1> if this is the very first received transmission for this TB (i.e. there is no previous NDI for this TB):
  2> consider this transmission to be a new transmission.
1> else:
  2> consider this transmission to be a retransmission.
    The MAC entity then may:
1> if this is a new transmission:
  2> attempt to decode the received data.
1> else if this is a retransmission:
  2> if the data for this TB has not yet been successfully decoded:
    3> instruct the physical layer to combine the received data with the data currently in the soft
      buffer for this TB and attempt to decode the combined data.
1> if the data which the MAC entity attempted to decode was successfully decoded for this TB; or
1> if the data for this TB was successfully decoded before:
  2> if the HARQ process is equal to the broadcast process:
    3> deliver the decoded MAC PDU to upper layers.
  2> else if this is the first successful decoding of the data for this TB:
    3> deliver the decoded MAC PDU to the disassembly and demultiplexing entity.
1> else:
  2> instruct the physical layer to replace the data in the soft buffer for this TB with the data which
    the MAC entity attempted to decode.
1> if the HARQ process is associated with a transmission indicated with a Temporary C-RNTI and
  the Contention Resolution is not yet successful; or
1> if the HARQ process is equal to the broadcast process; or
1> if the timeAlignmentTimer, associated with the TAG containing the Serving Cell on which the
  HARQ feedback is to be transmitted, is stopped or expired:
  2> not instruct the physical layer to generate acknowledgement(s) of the data in this TB.
1> else:
  2> instruct the physical layer to generate acknowledgement(s) of the data in this TB.

The MAC entity may ignore NDI received in all downlink assignments on PDCCH for a temporary C-RNTI when determining if NDI on PDCCH for a C-RNTI has been toggled compared to the value in the previous transmission. If the MAC entity receives a retransmission with a TB size different from the last TB size signalled for this TB, the UE behavior is left up to UE implementation.

For a periodic or semi-persistent CSI report on PUCCH, the periodicity $T_{CSI}$ (measured in slots) and the slot offset $T_{offset}$ are configured by the higher layer parameter reportSlotConfig. Unless specified otherwise, the UE may transmit the CSI report in frames with SFN $n_f$ and slot number within the frame $n_{s,f}^\mu$ satisfying $(N_{slot}^{frame,\mu} n_f + n_{s,f}^\mu - T_{offset}) \bmod T_{CSI} = 0$ where $\mu$ is the SCS configuration of the UL BWP the CSI report is transmitted on.

For semi-persistent reporting on PUCCH, the PUCCH resource used for transmitting the CSI report are configured by reportConfigType. Semi-persistent reporting on PUCCH is activated by an activation command as described in TS 38.321, which selects one of the semi persistent reporting settings for use by the UE on the PUCCH. When the UE would transmit a PUCCH with HARQ-ACK information in slot n corresponding to the PDSCH carrying the activation command, the indicated semi-persistent reporting setting may be applied starting from the first slot that is after slot $n+3N_{slot}^{subframe,\mu}$ where $\mu$ is the SCS configuration for the PUCCH.

A PCell is a MCG cell, operating on the primary frequency, in which the UE either performs the initial connection establishment procedure or initiates the connection re-establishment procedure. For dual connectivity operation, primary SCG cell (PSCell) is a SCG cell in which the UE performs random access when performing the reconfiguration with sync procedure. For dual connectivity operation the term special cell (SpCell) refers to the PCell of the MCG or the PSCell of the SCG, otherwise the term Special Cell refers to the PCell.

For a UE configured with CA, a SCell is a cell providing additional radio resources on top of Special Cell. An SCell configured with PUCCH is referred to as a PUCCH-SCell. For a UE in RRC_CONNECTED not configured with CA/DC there is only one serving cell comprising of the primary cell. For a UE in RRC_CONNECTED configured with CA/DC the term "serving cells" is used to denote the set of cells comprising of the Special Cell(s) and all secondary cells. A serving cell with PUCCH configuration is referred to as a PUCCH serving cell.

Throughout the present disclosure, the terms "PUCCH serving cell(s)" and "PUCCH cell(s)" are used interchangeably, as well as variants thereof, such as "configured PUCCH cell(s)," "active PUCCH cell(s)," and so on.

The PUCCH serving cell for transmission of HARQ-ACK feedback can be indicated in the PDSCH configuration. For example, the IE PDSCH-ServingCellConfig is used to configure UE specific PDSCH parameters that are common across the UE's BWPs of one serving cell. In this information element, pucch-Cell is the ID of the serving cell (of the same cell group) to use for PUCCH. If the field is absent, the UE sends the HARQ feedback on the PUCCH of the SpCell of this cell group, or on this serving cell if it is a PUCCH SCell. It is optionally present, Need S, for (non-PUCCH) SCells when adding a new SCell. The field is absent, Need M, when reconfiguring SCells. The field is also absent for the SpCells as well as for a PUCCH SCell. Accordingly, based on whether pucch-Cell is set to the serving cell index of the PCell or the PUCCH-SCell, the serving cell can belong to the primary or the secondary PUCCH group.

A PUCCH resource for transmission of HARQ-ACK feedback can be indicated in a DCI such as a downlink assignment DCI for a dynamically scheduled PDSCH or an activation/release DCI for SPS PDSCH, and/or can be configured by higher layers such as by RRC configuration of a PUCCH resource "n1PUCCH-AN" or a list of PUCCH resources "sps-PUCCH-AN-List" for SPS PDSCH transmission not associated with a PDCCH.

A PUCCH resource for transmission of SR and/or LRR is configured by higher layers such as by RRC configuration of a PUCCH resource corresponding to each SR/LRR. It is noted that the set of SR/LRR configurations can be configured per MAC entity, which can correspond to a cell group such as a master cell group (MCG) or a secondary cell group (SCG). The UE transmits an SR/LRR corresponding to a given "SchedulingRequestId" on a PUCCH resource configured on the same UL BWP and PUCCH serving cell as those on which a SR/LRR resource configuration "SchedulingRequestResourceConfig" corresponding to the same SR/LRR, namely with a same SR/LRR index "SchedulingRequestId," is configured.

For CSI reporting, periodic CSI (P-CSI) reporting or semi-persistent CSI (SP-CSI) reporting can occur on a PUCCH. For example, higher layer signalling such as RRC configures a periodic or semi-persistent report sent on PUCCH on a cell in which the CSI reporting configuration "CSI-ReportConfig" is included. Accordingly, the configuration indicates, using a parameter "carrier," for which serving cell the CSI reporting is done, i.e., in which serving cell the CSI-ResourceConfig are to be found. If the field "carrier" is absent, the CSI-RS resources are on the same serving cell as this CSI report configuration. The CSI reporting configuration additionally includes other reporting configuration such as a PUCCH resource (per BWP) of the PUCCH cell used for CSI reporting, and a periodicity and slot offset for P/SP CSI reporting on PUCCH.

The UE is supported to multiplex multiple UCI types on a single PUCCH resource if the corresponding PUCCH resources overlap in time, based on one or more of PUCCH formats, UE timeline, UCI payload size, and so on. Specifications provide existing/legacy rules for UCI multiplexing. For example, the UE multiplexes HARQ-ACK information with an overlapping SR/LRR on a PUCCH resource for HARQ-ACK information, and multiplexes CSI report with an overlapping SR/LRR on a PUCCH resource for CSI reporting. In another example, the UE multiplexes HARQ-ACK information corresponding to SPS PDSCH (without PDCCH) with an overlapping CSI report and an overlapping SR/LRR on a PUCCH resource with the smallest payload size such that all UCIs can be accommodated. In yet another example, the UE multiplexes HARQ-ACK information corresponds to dynamic PDSCH (with PDCCH) with an overlapping CSI report and an overlapping SR/LRR on a PUCCH resource indicated in the last DCI.

Figure 30:
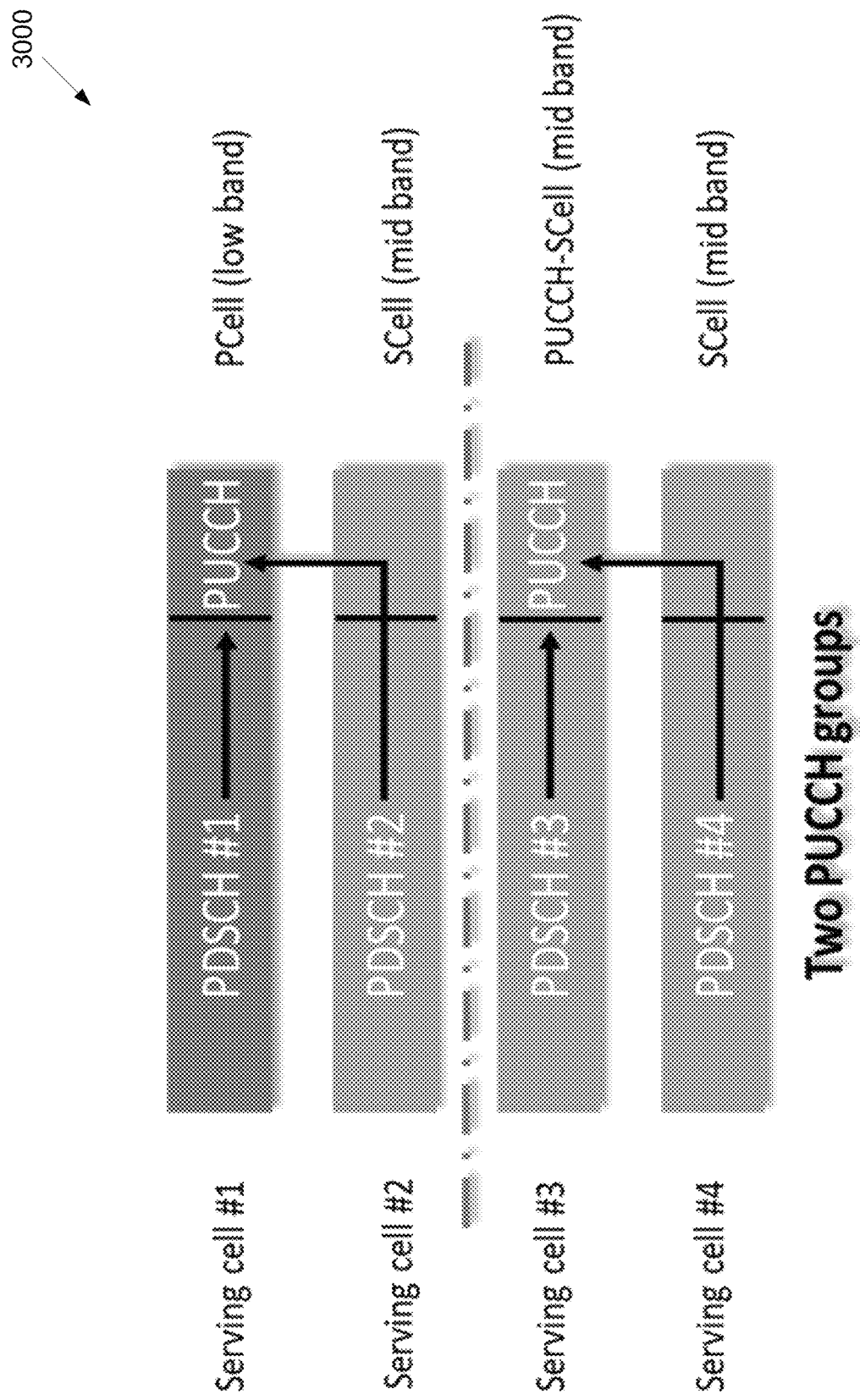
FIG. 30 illustrates an example UE configuration with two PUCCH groups according to embodiments of the present disclosure.

FIG. 30 illustrates an example UE configuration 3000 with two PUCCH groups according to embodiments of the present disclosure. An embodiment of the UE configuration 3000 shown in FIG. 30 is for illustration only.

FIG. 30 shows an example for a UE configured with two PUCCH groups, wherein a PCell which is operating e.g. in a low-band frequency (such as below 1-GHz), is the PUCCH cell for a own cell as well as for serving cell #2, while serving cell #3 is a PUCCH-SCell e.g. operating in mid-band frequency (such as 1-6 GHz) and acts as a PUCCH cell for a own cell as well as for serving cell #4. In one example, serving cells #1, #2, #3, and #4 can be on low-band and/or high-band frequency. In one example, the UE receives four PDSCHs, namely PDSCH #1 on serving cell #1 (the PCell), PDSCH #2 on serving cell #2, PDSCH #3 on serving cell #3 (the PUCCH-SCell), and PDSCH #4 on serving cell #4. The UE generates HARQ-ACK feedback for each of the four PDSCHs. The UE transmits HARQ-ACK feedback corresponding to PDSCH #1 and PDSCH #2 for serving cells #1 and #2 on a PUCCH resource(s) on the PCell and transmits HARQ-ACK feedback corresponding to PDSCH #3 and PDSCH #3 for serving cells #3 and #4 on a PUCCH resource(s) on the PUCCH-SCell.

A shortcoming of PUCCH grouping in the current standards is that a configuration of a serving cells and PUCCH cell(s) and an association thereof is only semi-statically configured, and cannot be changed unless by an RRC signaling, which incurs high overhead and/or latency. Such a semi-static configuration may not capture the impact of (rather) fast change in the network traffic situation such as variable scheduling load and/or control signaling overhead. For example, with a rather low traffic load as depicted in FIG. 30, the low-band PCell may have sufficient resources to handle all the HARQ-ACK feedback corresponding to all four PDSCHs, and therefore offer improved reliability for more cross-carrier UCIs, but the UE is not allowed to do so due to the semi-static association configuration of PUCCH groups.

The present disclosure considers solutions, referred to herein as flexible PUCCH groups, to overcome the shortcomings described above for the currently supported PUCCH groups, by allowing/supporting multiple (two or more) PUCCH cells for a given serving cell or a given serving cell group, along with an "active" PUCCH cell on which the UE transmits a UCI, wherein the active PUCCH cell can dynamically change over time based on network indication and/or UE determination.

Figure 31:
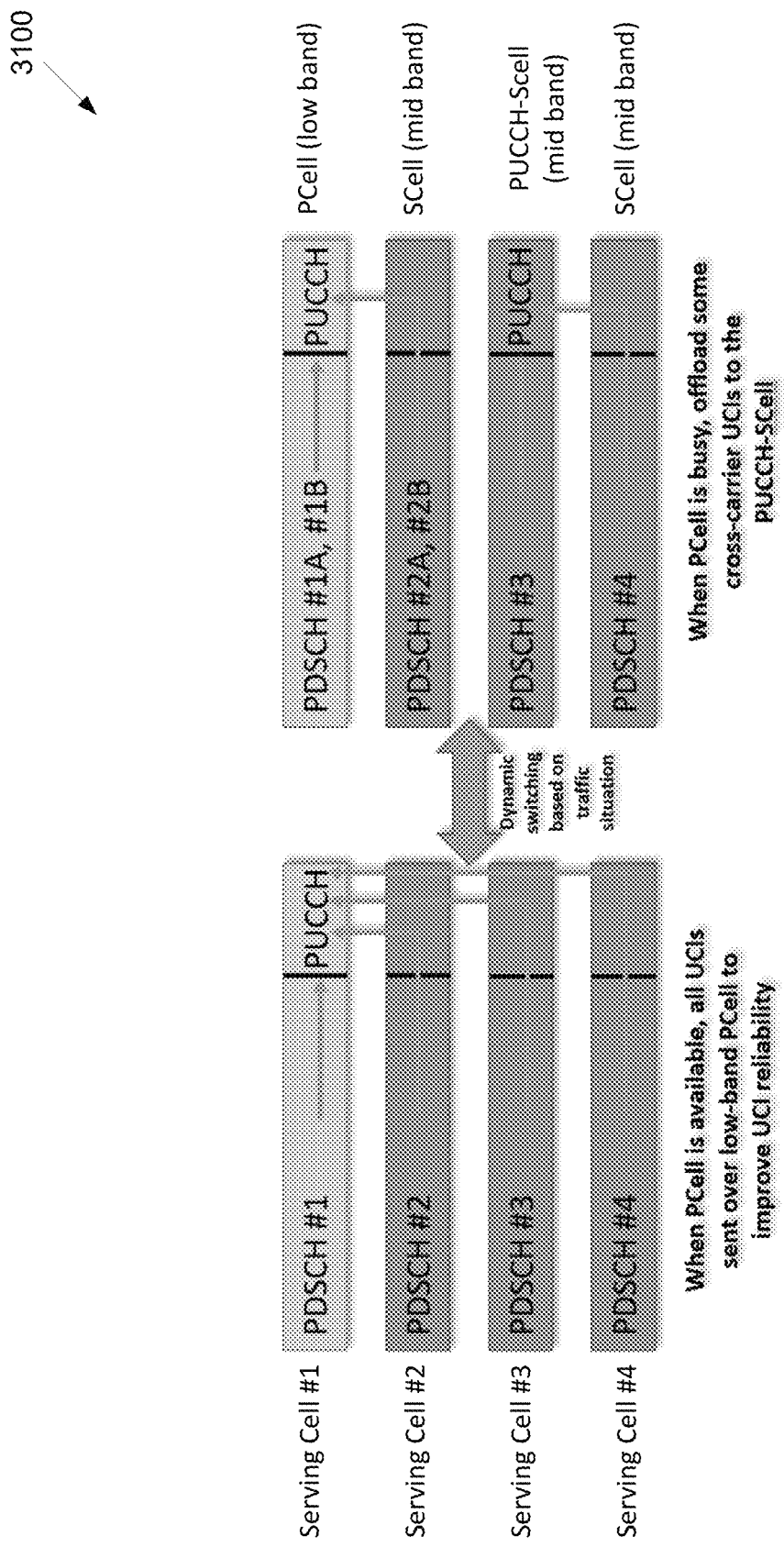
FIG. 31 illustrates an example flexible PUCCH groups according to embodiments of the present disclosure.

FIG. 31 illustrates an example flexible PUCCH groups 3100 according to embodiments of the present disclosure.

An embodiment of the flexible PUCCH groups 3100 shown in FIG. 31 is for illustration only.

The setting of serving cells in this example is the same as that in FIG. 30.

In this example, however, serving cell #1 (the PCell) is configured in addition to serving cell #3 (the PUCCH-SCell) as an alternative PUCCH cell for serving cells #3 and #4. When the network traffic situation is moderate/normal and serving cell #1, namely, the low-band PCell is "available," e.g., only one PDSCH from each of serving cells #1 and #2, so that fewer HARQ-ACK feedbacks corresponding to only PDSCH #1 on serving cell #1 and PDSCH #2 on serving cell #2, then all PUCCHs/UCIs are transmitted over serving cell #1 (the low-band PCell) to benefit from the improved reliability offered by the low-band PCell; in this case, there is only one active PUCCH group and PUCCH-SCell does not carry any UCIs.

But, when the network traffic situation is high/congested and serving cell #1, namely, the low-band PCell is "busy," e.g., only two PDSCHs from each of serving cells #1 and #2, so that more HARQ-ACK feedbacks corresponding to PDSCH #1A and PDSCH #1B on serving cell #1 and PDSCH #2A and PDSCH #2B on serving cell #2, then serving cell #3, namely the PUCCH-SCell, is indicated as the active PUCCH cell for serving cells #3 and #4, so that cross-carrier UCIs from serving cells #3 and #4 is offloaded to serving cell #3 (the PUCCH-SCell), hence serving cell #1 (i.e., the low-band PCell) can manage the extra traffic/control signalling load on serving cells #1 and #2; in this case, there are two active PUCCH groups and both PCell and PUCCH-SCell carry some of the UCIs. Such a switching between these two cases is supported in a dynamic manner based on network indication and/or UE determination.

Throughout this disclosure, for a UE configured with an SCG, any statement mentioning "PCell" can also apply to a primary cell for the SCG, namely, the "PSCell."

As aforementioned, in one embodiment of EA-1, support for configuration of two/multiple PUCCH serving cells for a serving cell & indication of an "active PUCCH serving cell" for UCI transmission for the serving cell is provided.

In one embodiment, a UE which is configured with two or more serving cells (CA operation) can be configured with two PUCCH serving cells for a given serving cell and/or for a given serving cell group. According to this embodiment, a UE can transmit different UCI types and/or different occasions of UCI transmission for a given serving cell and/or for a given serving cell group on different PUCCH serving cells. Herein, a PUCCH serving cell is a serving cell with PUCCH configuration. For example, the UE transmits a first UCI (type/occasion) on a first PUCCH serving cell such as a PCell and transmits a second UCI (type/occasion) on a second PUCCH serving cell such as a PUCCH-SCell. Herein, the configured PUCCH serving cells belong to set of serving cells configured to the UE. As such, a serving cell can belong to two/multiple PUCCH groups, wherein a PUCCH group is a set of serving cells configured to transmit UCI on a same PUCCH serving cell.

According to this embodiment, the UE is provided with a configuration and/or indication for an "active" PUCCH serving cell, that belongs to the set of configured PUCCH serving cells for the given serving cell/cell group, on which the UE transmits a UCI (occasion). For example, a configuration can include one or more of an indication by system information such as by a MIB or a SIB, a common higher layer such as common RRC signalling, and a dedicated higher layer such as dedicated RRC signalling. In another example, an indication can an L1 and/or L2 signalling such as one or more of a DCI or a MAC-CE.

In one example, a PUCCH serving cell can be an active PUCCH serving cell for a given serving cell/cell group for a given/single UCI occasion, and/or for multiple UCI occasions such as all UCI occasions within a time period, e.g., from a reception/activation time of a first indication to a reception/activation time of a second indication.

In another example, a first PUCCH serving cell such as PCell can be an active PUCCH cell for a first UCI type (such as HARQ-ACK) corresponding to a given serving cell, while a second PUCCH serving cell such as PUCCH-SCell can be an active PUCCH cell for a second UCI type, such as CSI reporting, corresponding to the same serving cell.

In yet another example, the UE transmits all transmission occasions of the first UCI type corresponding to a given serving cell on a first PUCCH serving cell such as PCell, so that PCell is the active PUCCH serving cell for the first UCI type for the given serving cell, while the UE transmits some transmission occasions of a second UCI type corresponding to the given serving cell, such as CSI reporting, on the first (or a third) PUCCH serving cell such as PCell and transmits some other transmission occasions of the second UCI type corresponding to a given serving cell on the second (or a fourth) PUCCH serving cell such as PUCCH-SCell, so that either the PCell or the PUCCH-SCell can be the active PUCCH serving cell for the second UCI type corresponding to the given serving cell.

In one example, a PUCCH serving cell such PCell can be configured as a PUCCH serving cell for both a first serving cell and a second serving cell, and the PUCCH serving cell e.g. PCell is (i) only an active PUCCH serving cell for the first (resp. second) serving cell, but not an active PUCCH serving cell for the second (resp. first) serving cell, or (ii) an active PUCCH serving cell for both the first and the second serving cells, or (iii) not an active PUCCH serving cell for either the first or the second serving cell. In one example, a UE does not expect that a PUCCH serving cell is only active for other serving cell(s), but not an active PUCCH cell for a own cell, i.e., a PUCCH serving cell needs to be an active PUCCH cell at least for the same serving cell; in other words, for the active UL BWP of a serving cell on which the UE is configured with PUCCH, the UE transmits UCI at least for the same serving cell. For example, the UE transmits UCI corresponding to the PCell (resp. a PUCCH-SCell) on a PUCCH resource(s) configured on the PCell (resp. the PUCCH-SCell). In another example, the UE is allowed to offload UCI corresponding to a first PUCCH serving cell to a second PUCCH serving cell, e.g., the UE can transmit UCI corresponding to the PCell (resp. a PUCCH-SCell) on a PUCCH resource(s) configured on a PUCCH-SCell (resp. PCell).

It is noted that a configuration for multiple configured PUCCH serving cells can apply to one or more of the serving cell(s) and need not apply to all serving cells. For example, the UE can be configured with a first group of one or more serving cells that are associated with a single PUCCH serving cell (only PCell/PSCell or a PUCCH-SCell), and also configured with a second group of one or more serving cells that are associated with two or more PUCCH serving cells, i.e., two or more of PCell, PSCell, PUCCH-SCell(s).

In one example, a UE can be configured with only one PUCCH serving cell, and thereby all serving cells are also configured with one PUCCH cell. In another example, a UE can be configured with two or more PUCCH serving cells, and (i) all serving cells are configured with only one of the two PUCCH cells; or (ii) some serving cells are configured with one PUCCH cell, while some other serving cells are configured with two or more PUCCH cell; or (iii) all serving cells are configured with two or more PUCCH cells. In cases (ii) and/or (iii), at least one serving cell configured with two or more PUCCH cells can be configured with a strict subset of the PUCCH cells configured to the UE, e.g., two out of the four PUCCH serving cells, or all serving cells configured with two or more PUCCH cells can be configured with the entire set of the PUCCH cells configured to the UE, e.g., all two out of two PUCCH serving cells, or all four out of the four PUCCH serving cells.

Figure 32:
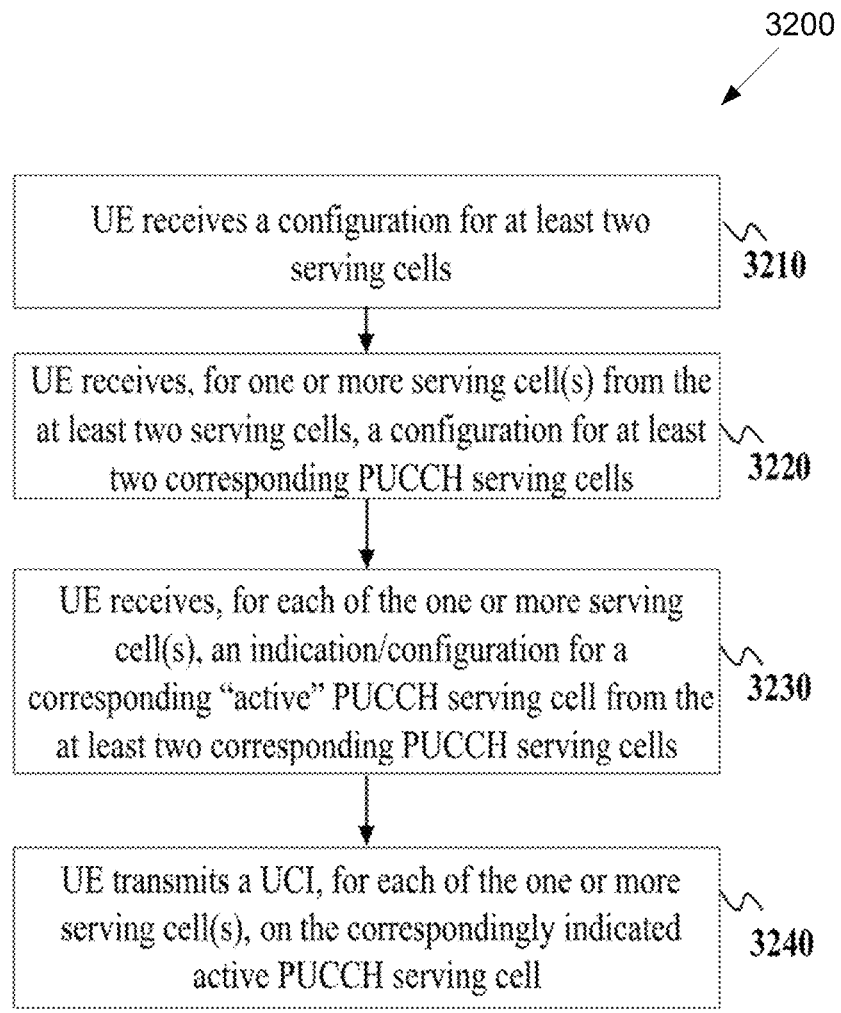
FIG. 32 illustrates a flowchart of a method for supporting of two/multiple PUCCH serving cells and indication of one active PUCCH serving cell corresponding to one or more serving cells according to embodiments of the present disclosure.

FIG. 32 illustrates a flowchart of a method 3200 for supporting of two/multiple PUCCH serving cells and indication of one active PUCCH serving cell corresponding to one or more serving cells according to embodiments of the present disclosure. An embodiment of the method 3200 shown in FIG. 32 is for illustration only. One or more of the components illustrated in FIG. 32 can be implemented in specialized circuitry configured to perform the noted functions or one or more of the components can be implemented by one or more processors executing instructions to perform the noted functions.

As illustrated in FIG. 32, a UE receives a configuration for operation with at least two serving cells, at step 3210, i.e., carrier aggregation operation. It is noted that a configuration can include one or more of an indication by system information such as by a MIB or a SIB, a common higher layer such as common RRC signalling, and a dedicated higher layer such as dedicated RRC signalling. The UE also receives a configuration for PUCCH grouping of one or more serving cell(s) from the at least two serving cells, so that each of the one or more serving cell(s) is configured with at least two corresponding PUCCH serving cells, i.e., corresponding to each of the one or more serving cell(s) at step 3220.

Herein, the two configured PUCCH serving cells are included among the at least two serving cells. For example, when the UE is configured with two serving cells and the two serving cells are a PCell and a PUCCH-SCell, then the two serving cells are the same as the two PUCCH serving cells. In another example, when the UE is configured with three serving cells including a PCell, a PUCCH-SCell, and another SCell without PUCCH configuration, and if both PCell and PUCCH-SCell are configured as PUCCH serving cells for the SCell without PUCCH configuration, then the serving cell is different from the PUCCH serving cells and the entire set of serving cells is different from (e.g., a super-set of) the set of PUCCH serving cell. As such, a serving cell can belong to two/multiple PUCCH groups.

In one example, a first serving cell is configured with a first set of at least two PUCCH serving cells and a second serving cell is configured with a second set of at least two PUCCH serving cells, wherein the first set and the second set can be same or different, with or without overlap. The UE then receives an indication and/or configuration for designating an active PUCCH serving cell for each of the one or more serving cell(s), wherein the active PUCCH serving cell belongs to the corresponding set of at least two configured PUCCH serving cells, at step 3230.

For example, the UE receives a first indication of a first active PUCCH serving cell for/corresponding to a first serving cell, and a second indication of a second active PUCCH serving cell for/corresponding to a second serving cell, wherein the first indicated active PUCCH serving cell belongs to the first set of at least two PUCCH serving cells and the second indicated active PUCCH serving cell belongs to the second set of at least two PUCCH serving cells, and wherein the first active PUCCH serving cell can be same as or different from the second PUCCH serving cell, and wherein the first indication and the second indication can be included in separate or same indications, such as a multiplexed or joint indication.

In one example, an active PUCCH serving cell can depend on the UCI type and/or UCI transmission occasion, thereby different active PUCCH cells for different UCI types and/or different UCI transmission occasions. Accordingly, the UE transmits a UCI for each of the one or more serving cell(s), on a corresponding PUCCH resource(s) on the correspondingly indicated active PUCCH serving cell, at step 3240. For example, the UE transmits a first UCI for a first serving cell on a first indicated active PUCCH serving cell, and a second UCI for a second serving cell on a second indicated active PUCCH serving cell. It is noted that, a UCI transmission for a first serving cell can occur in a different time, overlapping or non-overlapping, compared to a UCI transmission for a second serving cell.

An example RRC information element for a serving cell configured with two more PUCCH serving cells is provided below. According to this example, a UE can be configured with "nrOfPUCCHcells" PUCCH serving cells for a given serving cell, wherein "nrOfPUCCHcells" can be a number between 1 (i.e., only PUCCH serving cell) up to "MaxNrOfPUCCHcells" such as 2 (i.e., up to 2 PUCCH serving cells) for the given serving cell. In this information element, "pucch-Cells" is the set of ID(s) of the serving cell(s) of the same (or different) cell group to use for PUCCH.

In one example, if the field is absent, the UE sends the HARQ feedback on the PUCCH of the SpCell of this cell group, or on this serving cell if it is a PUCCH SCell. In one example, the field is optionally present, Need S, for (non-PUCCH) SCells when adding a new SCell. In one example, the field is absent, Need M, when reconfiguring SCells. In one example, the field is also absent for the SpCells as well as for a PUCCH SCell. In another example, the field is optionally present for the SpCells as well as for a PUCCH SCell. Based on this example, if a given serving cell is configured with a pucch-Cell that includes the serving indices for both PCell and a PUCCH-SCell, then that serving cell belongs to both the primary and the secondary PUCCH group. It is noted, however, that a given UCI occasion is transmitted on only one of the configured PUCCH serving cells, namely the active PUCCH serving cell, so at each time/occasion instance, the serving cell is effectively a member of only one of the two PUCCH groups.

In another example, for a UE which is configured with two or more PUCCH serving cells for a givens serving cell, the UE can be configured with a parameter/information element that indicates the first active PUCCH serving cell (see embodiment EA-1-1), on which the UE transmits a UCI before a first/initial indication is provided to the UE to indicate an active PUCCH serving cell for the given serving cell (see embodiment EA-2, EA-3, EA-4, and sub-embodiments thereof for details on indication methods for active PUCCH serving cell). According to this example, a value of "1" for the parameter "firstActivePUCCHcell" indicates that the first configured PUCCH cell for the serving cell is the first active PUCCH cell for the given serving cell, and a value of "2" for the parameter "firstActivePUCCHcell" indicates that the second configured PUCCH cell for the serving cell is the first active PUCCH cell for the given serving cell, and so on. TABLE 12 shows PDSCH configuration information elements.

TABLE 12

PDSCH-ServingCellConfig information element

-- ASN1START
-- TAG-PDSCH-SERVINGCELLCONFIG-START
PDSCH-ServingCellConfig ::= SEQUENCE {
codeBlockGroupTransmission SetupRelease { PDSCH-CodeBlockGroupTransmission } OPTIONAL,
-- Need M
xOverhead ENUMERATED {xOh6, xOh12, xOh18 } OPTIONAL, -- Need S
nrofHARQ-ProcessesForPDSCH ENUMERATED {n2, n4, n6, n10, n12, n16} OPTIONAL, -- Need S
pucch-Cells SIZE (1.. nrOfPUCCHcells) OF ServCellIndex OPTIONAL, -- Cond SCellAddOnly
firstActivePUCCHcell INTEGER (1.. nrOfPUCCHcells) OPTIONAL,
...,
[[
maxMIMO-Layers INTEGER (1..8) OPTIONAL, -- Need M
processingType2Enabled BOOLEAN OPTIONAL -- Need M
]],
[[
pdsch-CodeBlockGroupTransmissionList-r16 SetupRelease { PDSCH-
CodeBlockGroupTransmissionList-r16 } OPTIONAL -- Need M
]]
}
nrOfPUCCHcells ::= INTEGER (1.. maxNrOfPUCCHcells),
maxNrOfPUCCHcells ::= [2]

In one example, an RRC information element "CSI-ReportConfig" for CSI reporting corresponding to a given serving cell can be configured in two or more PUCCH serving cells. According to this example, the UE can be configured with a first information element "CSI Report-Config" on a first PUCCH serving cell such as PCell, and also configured with a second information element "CSI-ReportConfig" on a second PUCCH serving cell such as a PUCCH SCell, wherein a same parameter "carrier" is included/indicated in both the first information element "CSI-ReportConfig" and the second information element "CSI-ReportConfig," namely, both CSI report configurations refer to CSI reporting for a same serving cell, i.e., a same serving cell on which the CSI-ResourceConfig is to be found.

In one example, a type for both CSI report configurations can be the same, e.g., both are P-CSI reporting or both are SP-CSI reporting. In another example, the two CSI report configurations can be different, e.g., a first CSI report configuration with P-CSI reporting on a first PUCCH serving cell such as PCell, while a second CSI report configuration with SP-CSI reporting on a second PUCCH serving cell such as PUCCH-SCell, while both CSI reports corresponds to a same serving cell. In one example, when the UE is configured with two CSI report configurations corresponding to a given serving cell on two different PUCCH serving cells, a CSI-RS resource configuration within the given serving cell can be same or different between the two CSI report configurations.

In one example, when the UE is configured with two CSI report configurations corresponding to a given serving cell on two different PUCCH serving cells, and the CSI report configurations are of the type P-CSI reporting and/or SP-CSI reporting, then a periodicity and/or slot offset for P/SP CSI reporting on PUCCH can same or different between the two CSI report configurations.

In one example, the two or more PUCCH serving cells configured for a given serving cell for P/SP CSI reporting on PUCCH can be same or different, with or without overlap, compared to the one, two, or more PUCCH serving cells configured for the same serving cell for HARQ-ACK information transmission, as provided in the parameter "pucch-Cells" as previously discussed.

In another example, RRC information element "CSI-ReportConfig" for CSI reporting corresponding to a given serving cell can be configured on two or more serving cells with or without PUCCH configuration, wherein if the serving cell that includes the information element "CSI-ReportConfig" is not configured for PUCCH and/or if the CSI reporting type is aperiodic CSI reporting or semi-persistent CSI reporting on PUSCH, then the UE receives, on a serving cell(s) that include(s) the information element "CSI-ReportConfig," a DCI(s) that schedule(s)/activate(s)/trigger(s) the PUSCH(s) that carry(ies) the AP-CSI/SP-CSI report(s). In such a case, the cell(s) on which the corresponding PUSCH(s) is/are transmitted in indicated in the scheduling/activation/triggering DCI(s). TABLE 13 shows CSI configuration information.

TABLE 13

CSI-ReportConfig information element [for a same "carrier" can be included in two PUCCH serving cells]

-- ASN1START
-- TAG-CSI-REPORTCONFIG-START
CSI-ReportConfig ::= SEQUENCE {
reportConfigId CSI-ReportConfigId,
carrier ServCellIndex OPTIONAL, -- Need S
resourcesForChannelMeasurement CSI-ResourceConfigId,
csi-IM-ResourcesForInterference CSI-ResourceConfigId OPTIONAL, -- Need R
nzp-CSI-RS-ResourcesForInterference CSI-ResourceConfigId OPTIONAL, -- Need R

TABLE 13-continued

CSI-ReportConfig information element [for a same "carrier" can be included in two PUCCH serving cells]

```
reportConfigType CHOICE {
periodic SEQUENCE {
reportSlotConfig CSI-ReportPeriodicityAndOffset,
pucch-CSI-ResourceList SEQUENCE (SIZE (1..maxNrofBWPs)) OF PUCCH-CSI-Resource
},
semiPersistentOnPUCCH SEQUENCE {
reportSlotConfig CSI-ReportPeriodicityAndOffset,
pucch-CSI-ResourceList SEQUENCE (SIZE (1..maxNrofBWPs)) OF PUCCH-CSI-Resource
},
semiPersistentOnPUSCH SEQUENCE {
reportSlotConfig ENUMERATED {s15, s110, s120, s140, s180, s1160, s1320},
reportSlotOffsetList SEQUENCE (SIZE (1.. maxNrofUL-Allocations)) OF INTEGER(0..32),
p0alpha P0-PUSCH-AlphaSetId
},
aperiodic SEQUENCE {
reportSlotOffsetList SEQUENCE (SIZE (1..maxNrofUL-Allocations)) OF INTEGER(0..32)
}
},
REST IS OMITTED...
}
PUCCH-CSI-Resource ::= SEQUENCE {
uplinkBandwidthPartId BWP-Id,
pucch-Resource PUCCH-ResourceId
}
```

In one example, for transmission of SR and/or LRR, an RRC information element SchedulingRequestResourceConfig determines physical layer resources on PUCCH where the UE may send the dedicated scheduling request. In this example, the parameter/information element "resource" provides the ID of the PUCCH resource in which the UE may send the scheduling request/link recovery request. The actual PUCCH-Resource is configured in PUCCH-Config of the same UL BWP and serving cell as this SchedulingRequestResourceConfig. Accordingly, the UE transmits a given SR/LRR configuration with a given "SchedulingRequestId" on the PUCCH serving cell on which the SchedulingRequestResourceConfig is configured.

In one example, an SR/LRR configuration with a given "SchedulingRequestId" can be configured on two or more PUCCH serving cells, such as PCell and a PUCCH-SCell. According to this example, the UE can be configured with a same or different periodicity and/or slot offset and/or priority index for SR/LRR transmission corresponding to a same SR/LRR configuration with a same "SchedulingRequestId" on the two or more PUCCH serving cells. TABLE 14 shoes scheduling configuration information.

TABLE 14

SchedulingRequestResourceConfig information element [for a same "SchedulingRequestId" can be included in two PUCCH serving cells]

```
-- ASN1START
-- TAG-SCHEDULINGREQUESTRESOURCECONFIG-START
SchedulingRequestResourceConfig ::= SEQUENCE {
schedulingRequestResourceId SchedulingRequestResourceId,
schedulingRequestID SchedulingRequestId,
periodicityAndOffset CHOICE {
sym2 NULL,
sym6or7 NULL,
sl1 NULL, -- Recurs in every slot
sl2 INTEGER (0..1),
sl4 INTEGER (0..3),
sl5 INTEGER (0..4),
sl8 INTEGER (0..7),
sl10 INTEGER (0..9),
sl16 INTEGER (0..15),
sl20 INTEGER (0..19),
```

TABLE 14-continued

SchedulingRequestResourceConfig information element [for a same "SchedulingRequestId" can be included in two PUCCH serving cells]

```
sl40 INTEGER (0..39),
sl80 INTEGER (0..79),
sl160 INTEGER (0..159),
sl320 INTEGER (0..319),
sl640 INTEGER (0..639)
}
OPTIONAL, -- Need M
resource PUCCH-ResourceId OPTIONAL -- Need M
}
SchedulingRequestResourceConfig-v1610 ::= SEQUENCE {
phy-PriorityIndex-r16 ENUMERATED {p0, p1} OPTIONAL, -- Need M
...
}
-- TAG-SCHEDULINGREQUESTRESOURCECONFIG-STOP
-- ASN1STOP
```

As aforementioned, in one embodiment of EA-1-1, a first active PUCCH cell is provide. In one embodiment, a serving cell which is configured with two or more PUCCH cells can be configured with a "first active PUCCH cell" on which the UE can transmit UCI before receiving any L1/L2 signaling to indicate an active PUCCH cell for the serving cell. For example, the configuration of the first active PUCCH cell for a serving cell ensures that the UE has no confusion for transmission of HARQ-ACK information (e.g., corresponding to Msg2/4/B), and possibly CSI report, during initial access, and/or during random access procedure, and/or immediately after configuration of a serving cell. The UE can later receive network signaling or apply other (predetermined) rules/methods to determine a new active PUCCH cell. In one example, a serving cell can be configured with only a single first active PUCCH cell for all UCI types. In another example, a serving cell can be configured with different first active PUCCH cells for different UCI types.

Figure 33:
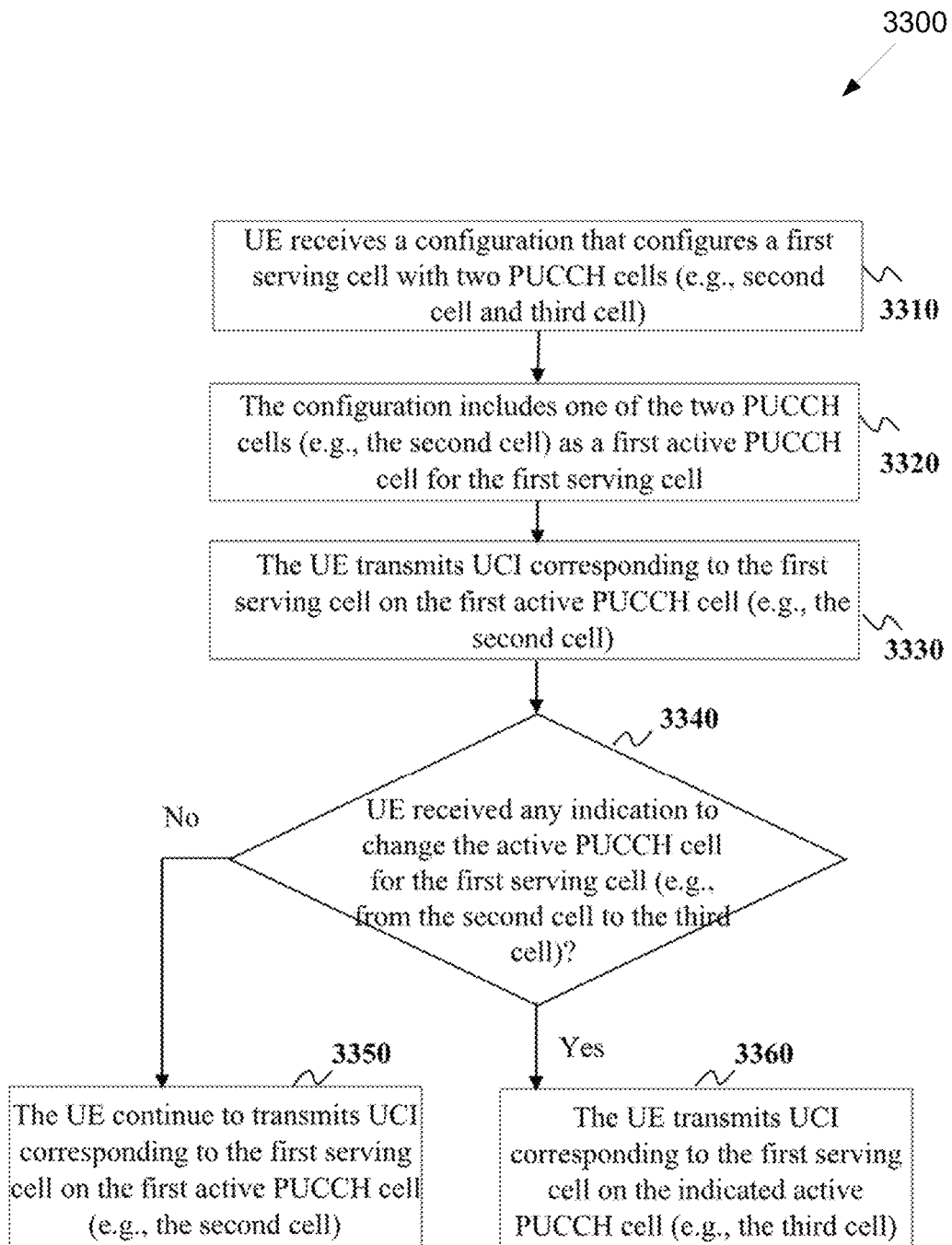
FIG. 33 illustrates a flowchart of a method for an operation with a first active PUCCH cell according to embodiments of the present disclosure.

FIG. 33 illustrates a flowchart of a method 3300 for an operation with a first active PUCCH cell according to embodiments of the present disclosure. An embodiment of the method 3300 shown in FIG. 33 is for illustration only. One or more of the components illustrated in FIG. 33 can be implemented in specialized circuitry configured to perform the noted functions or one or more of the components can be implemented by one or more processors executing instructions to perform the noted functions.

As illustrated in FIG. 33, a UE receives a configuration that configures a first serving cell with two PUCCH cells (e.g., second cell and third cell), at step 3310. For example, the first cell can be same or different from the second cell and/or the third cell. In one example, the second cell can be PCell and the third cell can be a PUCCH-SCell. The configuration includes or designates one of the two PUCCH cells (e.g., the second cell) as a first active PUCCH cell for the first serving cell, at step 3320. In one example, a designation of the first active PUCCH cell can be for all UCI types or for only one or some UCI types, while a different active PUCCH cell is designated for some other UCI types. Accordingly, the UE transmits UCI corresponding to the first serving cell on the first active PUCCH cell (e.g., the second cell), at step 3330, e.g., for a given/corresponding UCI type.

The UE determines whether the UE received any new indication to change the active PUCCH cell for the first serving cell (e.g., from the second cell to the third cell), at step 3340. If not, that is, if the UE has not received any indication to change the active PUCCH cell for the first serving cell, then the UE continues to transmit UCI (possibly for the given/corresponding UCI type) for the first serving cell on the first active PUCCH cell (e.g., the second cell), at step 3350. But if the UE has received a new indication to change the active PUCCH cell for the first serving cell (e.g., from the second cell to the third cell), then the UE transmits UCI (possibly for the given/corresponding UCI type) corresponding to the first serving cell on the newly indicated active PUCCH cell (e.g., the third cell), at step 3360. It is noted that a UCI transmission occurs upon/after a UCI is triggered by network signaling and/or higher layer indication, subject to UE processing and timeline limitations.

As aforementioned, in one embodiment of EA-1-2, contents of an indication for switching of an active PUCCH cell are provided. In one embodiment, for a UE configured (to operate) with two or more PUCCH cells for at least one serving cell, the UE can receive a network signaling and/or an indication from higher layers for change of an active PUCCH cell for a given serving cell, herein referred to as an indication for switching of an active PUCCH cell. According to this embodiment, an indication for switching of an active PUCCH cell for a given serving cell can include one or more "PUCCH group switching" (PGS) field(s), wherein each PGS field includes at least one or more of a PUCCH cell indicator (PCI) such as 1-2 bits to provide an index of a new active PUCCH cell, and an indication for a BWP in the new active PUCCH cell such as 1-2 bits to indicate an active BWP switching in the new active PUCCH cell before transmitting a PUCCH/UCI, and an indication for a serving cell for which the new active PUCCH cell applies such as 5 bits to provide an index for the serving cell, e.g., to distinguish the cell on which the PGS indication is received from the cell for which the new PUCCH cell activation applies.

In one example, an indication for a BWP in the new active PUCCH cell can be absent in which case the UE transmits PUCCH/UCI on the current active BWP of the new PUCCH cell. In one example, an indication for switching of active PUCCH cell can include multiple PGS fields, corresponding to multiple PUCCH cells, and/or multiple serving cell(s), and/or multiple UEs.

In one example, a PGS field within an indication for switching of an active PUCCH cell for a given serving cell can include a serving cell index and therefore applies only to the serving cell indicated in the PGS indication. According to this example, a PUCCH serving cell which is configured for both a first and a second serving cell, can be an active PUCCH cell for the first serving cell since the first serving cell index is included in the PGS field of the indication, while it may be not an active PUCCH cell for the second serving cell.

In one example of this embodiment, a PGS field within an indication for switching of an active PUCCH cell for a given serving cell can exclude an indication for a serving cell for which the new active PUCCH cell applies, in which case a PUCCH serving cell included in the PGS field can be an active PUCCH cell for all serving cell(s) that are configured with UCI transmission on the PUCCH serving cell. According to this example, a PUCCH cell indicator (PCI) included in the PGS field in this case can be e.g. 5 bits to provide a "full/absolute" serving cell index for the new active PUCCH serving cell.

Figure 34:
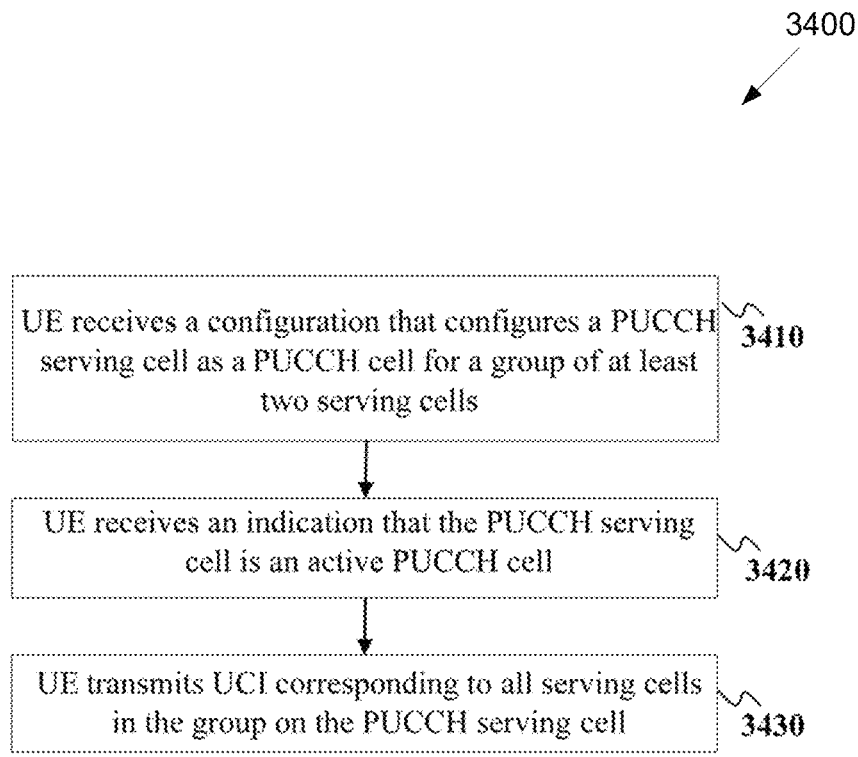
FIG. 34 illustrates a flowchart of a method for an indication for switching of an active PUCCH cell according to embodiments of the present disclosure.

FIG. 34 illustrates a flowchart of a method 3400 for an indication for switching of an active PUCCH cell according to embodiments of the present disclosure. An embodiment of the method 3400 shown in FIG. 34 is for illustration only. One or more of the components illustrated in FIG. 34 can be implemented in specialized circuitry configured to perform the noted functions or one or more of the components can be implemented by one or more processors executing instructions to perform the noted functions.

As illustrated in FIG. 34, a UE receives a configuration that configures a PUCCH serving cell as a PUCCH cell for a group of at least two serving cells, at step 3410. For example, the group can include at least the PUCCH serving cell. The UE receives an indication that the PUCCH serving cell is an active PUCCH cell for UCI transmission, at step 3420. Then, the UE transmits UCI corresponding to all serving cells in the group on the PUCCH serving cell, at step 3430.

Figure 35:
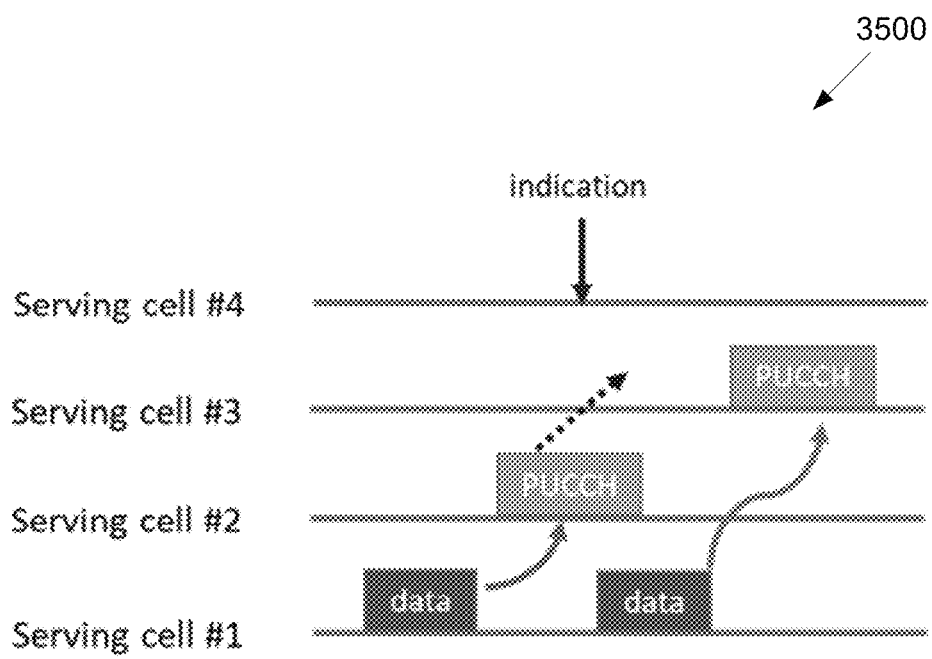
FIG. 35 illustrates an example dynamic switching of the active PUCCH cell according to embodiments of the present disclosure.

FIG. 35 illustrates an example dynamic switching of the active PUCCH cell 3500 according to embodiments of the present disclosure. An embodiment of the dynamic switching of the active PUCCH cell 3500 shown in FIG. 35 is for illustration only.

A serving cell #1 is configured with two PUCCH cells, namely serving cells #2 and #3. It is noted that, serving cell #1 can be same as or different from PUCCH cell #2 and/or PUCCH cell #3. It is assumed that PUCCH cells #2 and #3 are different. For example, the PUCCH cell #2 can be a first active PUCCH cell for serving cell #1 (see embodiment EA-1-1) or a previously indicated active PUCCH cell. The UE transmits a first UCI, such as a first HARQ-ACK information corresponding to a first PDSCH/data transmission in serving cell #1, on PUCCH cell #2. The UE receives, for serving cell #1, an indication of change of the active PUCCH cell from PUCCH cell #2 to PUCCH cell #3. The indication is received on a serving cell #4, which can be same as PUCCH cells #2 or #3 or same as the serving cell #1, or a serving cell which is different from both the serving cell #1 and the PUCCH cells #2 and #3. The UE then transmits a second UCI, such as a second HARQ-ACK information corresponding to a second PDSCH/data transmission in serving cell #1, on PUCCH cell #3.

Figure 36:
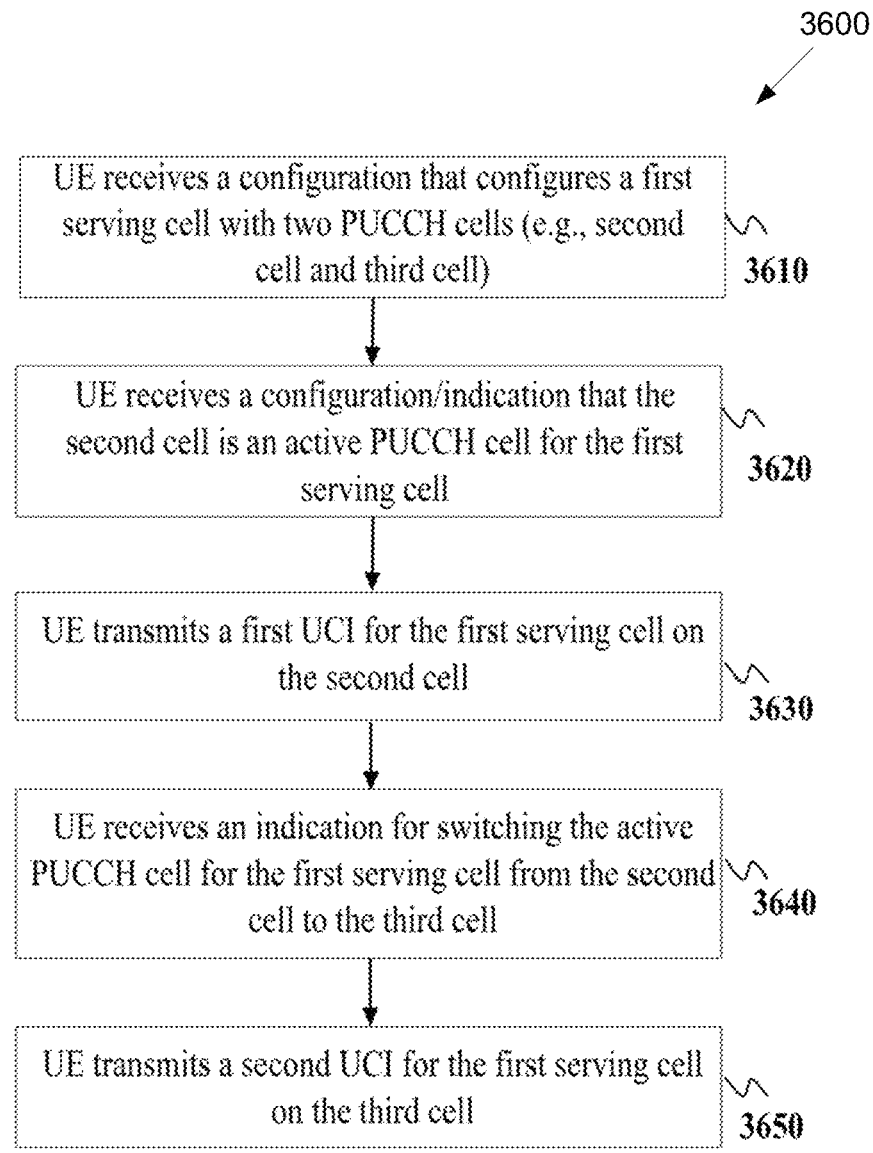
FIG. 36 illustrates a flowchart of a method for dynamic switching of the active PUCCH serving cell for a given serving cell according to embodiments of the present disclosure.

FIG. 36 illustrates a flowchart of a method 3600 for dynamic switching of the active PUCCH serving cell for a given serving cell according to embodiments of the present disclosure. An embodiment of the method 3600 shown in FIG. 36 is for illustration only. One or more of the components illustrated in FIG. 36 can be implemented in specialized circuitry configured to perform the noted functions or one or more of the components can be implemented by one or more processors executing instructions to perform the noted functions.

As illustrated in FIG. 36, a UE receives a configuration that configures a first serving cell with two PUCCH cells (e.g., second cell and third cell), at step 3610. The UE receives a configuration/indication that the second cell is an active PUCCH cell for the first serving cell, as step 3620. Accordingly, the UE transmits a first UCI for the first serving cell on the second cell, at step 3630. Then, later at some point in time, the UE receives an indication for switching the active PUCCH cell for the first serving cell from the second cell to the third cell, at step 3640. Accordingly, the UE transmits a second UCI for the first serving cell on the third cell, at step 3650.

In one example, a dynamic switching of the active PUCCH serving cell such as that illustrated in FIG. 36 can correspond to a cell group. In another example, a dynamic switching of the active PUCCH serving cell such as that illustrated in FIG. 36 can correspond to a given UCI type and/or a given configuration for a given UCI type, such as a given SR/LRR configuration with a given "SchedulingRequestId" for a given cell group and/or a MAC entity.

As aforementioned, in one embodiment of EA-2, joint indication mechanisms for both UCI triggering and active PUCCH cell indication: key principles are provided. In one embodiment, when a UE is configured with a serving cell associated with two or more PUCCH cells, an indication for switching of an active PUCCH cell for the serving cell can be jointly provided with a signaling and/or indication that triggers a UCI transmission. According to this embodiment, the UE receives a network signaling and/or a higher layer indication that triggers a UCI transmission for a serving cell and also provides an indication for the active PUCCH cell on which a UCI transmission can be made. Such a mechanism can facilitate fast UCI offloading among the configured PUCCH serving cells by indicating an active PUCCH cell for a/each UCI transmission instance/occasion.

As aforementioned, in one embodiment of EA-2-1, joint indication mechanisms based on L1/L2 network signaling are provided. In one embodiment, when an L1/L2 network signaling such as a DCI or a MAC-CE triggers a UCI, the network signaling can also include an indication for switching of an active PUCCH cell for a serving cell (and/or a serving cell group and/or for a UCI type and/or for a UCI configuration of a UCI type, and/or so on). According to this embodiment, the network signaling can additionally include an indication for a PUCCH resource for UCI transmission. For example, a DCI format in a PDCCH that schedules a PDSCH reception, such as a DCI format 1_0 or 1_1 or 1_2, and/or a DCI format for activation and/or release of SPS PDSCH, and/or a MAC-CE command for activation and/or release of SP-CSI reporting on PUCCH, can trigger UCI transmission e.g. HARQ-ACK feedback information or CSI report, and/or can include an indication for a PUCCH resource for UCI transmission, and/or can include an indication for an active PUCCH cell for the UCI transmission (or in general a PGS field as described in embodiment EA-1-2).

Figure 37:
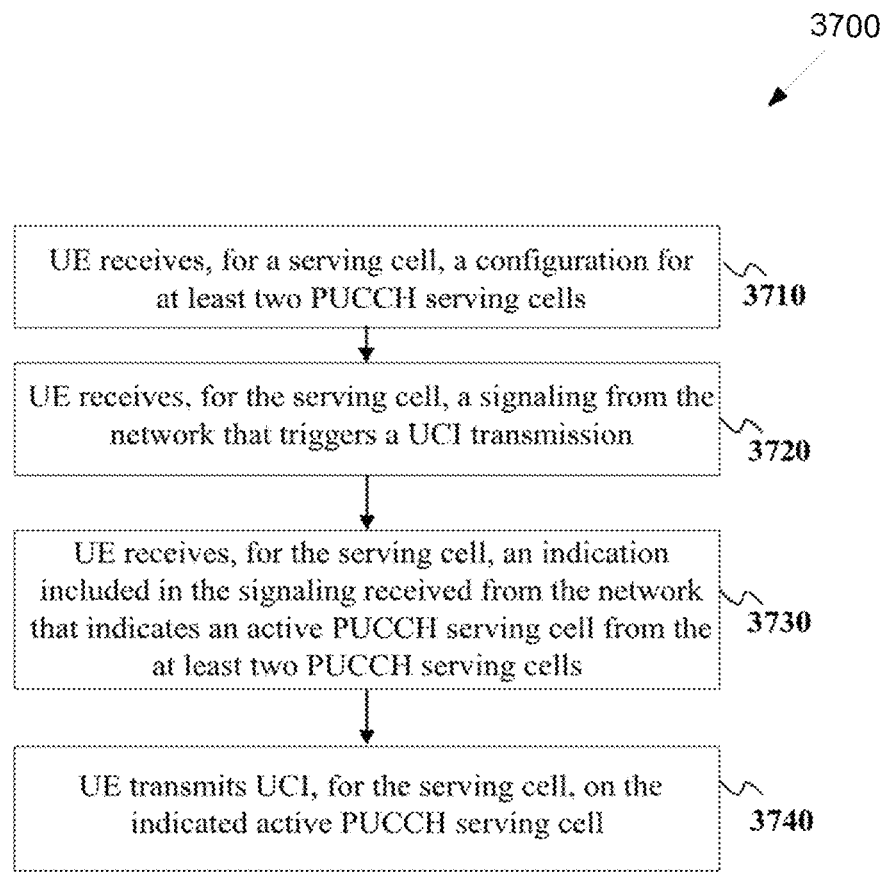
FIG. 37 illustrates a flowchart of a method for indication of active PUCCH serving cell for UCI transmission according to embodiments of the present disclosure.

FIG. 37 illustrates a flowchart of a method 3700 for indication of active PUCCH serving cell for UCI transmission according to embodiments of the present disclosure. An embodiment of the method 3700 shown in FIG. 37 is for illustration only. One or more of the components illustrated in FIG. 37 can be implemented in specialized circuitry configured to perform the noted functions or one or more of the components can be implemented by one or more processors executing instructions to perform the noted functions.

FIG. 37 shows an example flowchart for indication of active PUCCH serving cell for UCI transmission for the case that UCI is triggered by a L1/L2 (dynamic or semi-dynamic) signalling from the network, wherein the network signalling that triggers the UCI also includes the indication for the active PUCCH serving cell on which the UCI needs to be transmitted.

As illustrated in FIG. 37, a UE receives, for a serving cell, a configuration for at least two PUCCH cells, at step 3710. The UE receives, for the serving cell, a signalling from the network that triggers a UCI transmission, at step 3720, such as HARQ-ACK feedback information triggered by scheduling DCI or activation/release DCI for SPS PDSCH or SP-CSI reporting triggered by MAC-CE activation command for SP-CSI. The UE receives, for the serving cell, an indication included in the signalling received from the network that indicates an active PUCCH cell from the at least two PUCCH cells, at step 3730. In one example, the indication additionally includes an indication for a PUCCH resource(s) for UCI transmission. Accordingly, the UE transmits UCI, for the serving cell, on the indicated active PUCCH cell, at step 3740.

As aforementioned, in one embodiment of EA-2-2, joint indication mechanisms based on higher layer indication are provided. In one embodiment, when higher layers trigger/request a UCI transmission without any associated L1/L2 network signaling, e.g., without any DCI or MAC-CE, the UE can determine an active PUCCH cell for a serving cell (and/or a serving cell group and/or for a UCI type and/or for a UCI configuration of a UCI type, and/or so on) based on a timing of a UCI transmission, such as transmission occasion index and/or a slot index for the UCI transmission. For example, the UE transmits a first UCI occasion corresponding to a serving cell on a first PUCCH cell and transmits a second UCI occasion corresponding to the same serving cell on a second PUCCH cell, wherein the first UCI is different from the second UCI, and the first PUCCH cell is different from the second PUCCH cell.

According to this embodiment, the determination of the active PUCCH cell based on the timing of the UCI transmission can be based on at least one or more of a predetermined rule/method and a configured time pattern, such as a periodic time pattern, e.g., with a periodicity and/or a slot offset that defines a periodic mapping between the UCI transmission timing (occasion/slot index) with the set of configured PUCCH cells, or an explicit "irregular" time pattern that defines a mapping between the UCI transmission timing (occasion/slot index) with the set of configured PUCCH cells, e.g., using an arbitrary pattern of e.g. [10 or 20 or 40] PUCCH cell indices with a predetermined length such as 40 slots/frames/occasions, and then repeats afterwards. In one example, a mapping can further depend on a UE ID, such as a global UE ID. In another example, a mapping can further depend on a random variable and/or a seed or initialization of a random number generator. For example, an SR/LRR configuration and/or a periodic CSI (P-CSI) reporting can be triggered by higher layers and an active PUCCH cell for transmission thereof can be based on the corresponding slot/occasion index.

Figure 38:
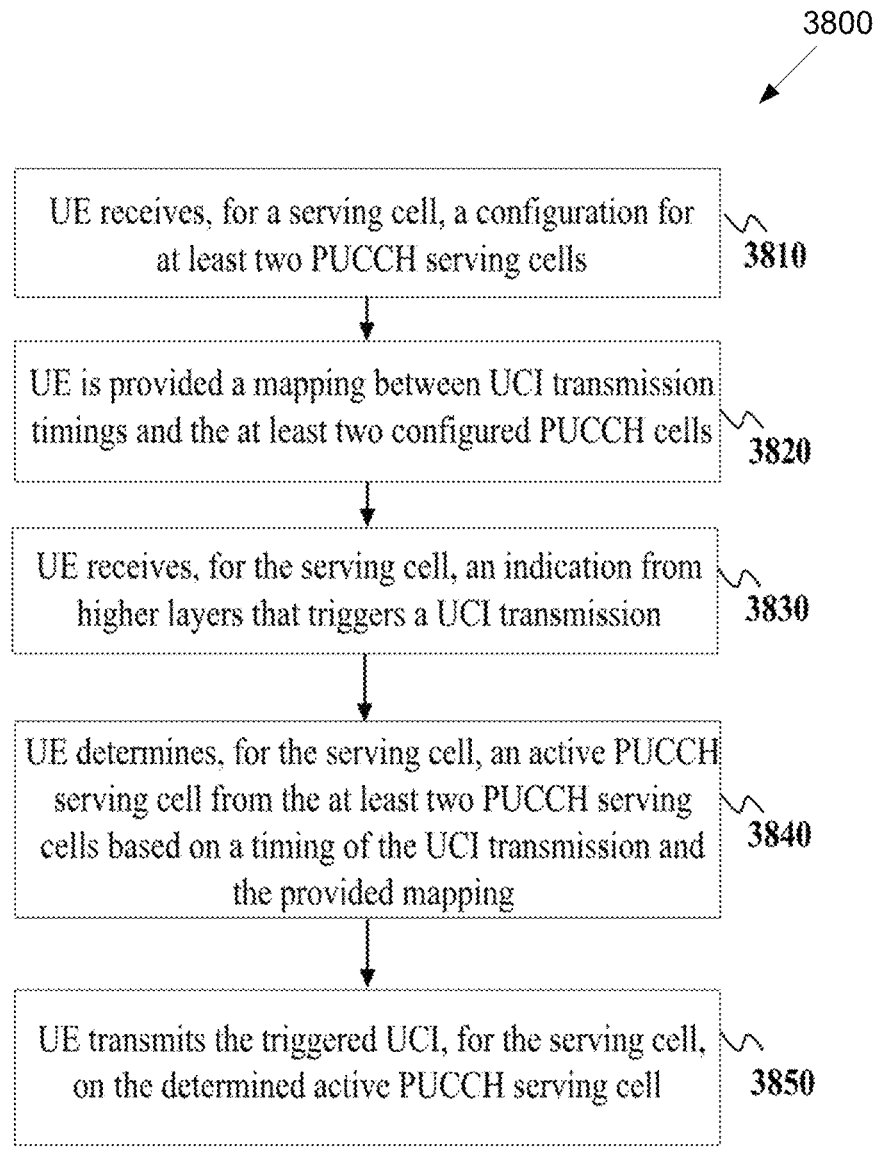
FIG. 38 illustrates a flowchart of a method for an indication of active PUCCH serving cell for UCI transmission according to embodiments of the present disclosure.

FIG. 38 illustrates a flowchart of a method 3800 for an indication of active PUCCH serving cell for UCI transmission according to embodiments of the present disclosure. An embodiment of the method 3800 shown in FIG. 38 is for illustration only. One or more of the components illustrated in FIG. 38 can be implemented in specialized circuitry configured to perform the noted functions or one or more of the components can be implemented by one or more processors executing instructions to perform the noted functions.

FIG. 38 shows an example flowchart for indication of active PUCCH serving cell for UCI transmission for the case that UCI is not associated with a dynamic and/or semi-dynamic signalling from the network and/or is triggered by higher layer signalling within the UE, such as SR/LRR or periodic CSI reporting, in which case the UE can determine an active PUCCH serving cell based on the timing of the UCI transmission, such as the UCI occasion index and/or slot index, and so on.

As illustrated in FIG. 38, a UE receives, for a serving cell (and/or a serving cell group and/or for a UCI type and/or for a UCI configuration of a UCI type, and/or so on), a configuration for at least two PUCCH serving cells, at step 3810. The UE is provided a mapping between UCI transmission timings, such as the UCI occasion index and/or slot index, and the at least two configured PUCCH cells, at step 3820. The UE receives, for the serving cell, an indication from higher layers that triggers a UCI transmission, at step 3830. Then, the UE determines, for the serving cell, an active PUCCH serving cell from the at least two PUCCH serving cells based on a timing of the UCI transmission and the provided mapping, at step 3840. Accordingly, the UE transmits the triggered UCI, for the serving cell, on the determined active PUCCH serving cell, at step 3850.

As aforementioned, in one embodiment of EA-2-3, active PUCCH cell determination and switching for a group of UCIs with a single trigger are provided. In one embodiment, when a single trigger such as a L1/L2 network signaling and/or a higher layer indication triggers a group of two or more UCI transmission occasions, the UE can transmit the group of UCI transmissions on a same active PUCCH cell or on different active PUCCH cells. For example, a group of two or more UCI transmission occasions triggered by a single trigger can be a periodic UCI transmission during a time window such as one or more of a HARQ-ACK feedback information for a SPD PDSCH, a SR and/or LRR, and a P/SP CSI reporting.

In one example of this embodiment, the UE determines an active PUCCH cell for a first/earliest UCI transmission occasion from the group of two or UCI transmission occasions, and then transmit the remaining UCI transmission occasions on the same determined active PUCCH serving cell.

According to thee example, determining the active PUCCH cell for the first/earliest UCI transmission occasion can be e.g. based on one or more of a first active PUCCH cell (see embodiment EA-1-1 for details) and a PGS field (see embodiment EA-1-2) in a network signaling that triggers the group of one or more UCI transmissions, and a predetermined or configured mapping between UCI transmission timing/occasions and the active PUCCH cells, as described e.g. in embodiments EA-2, EA-2-1, and EA-2-2.

In one example, an active PUCCH cell can stay the same for all occasions of the group of UCI transmission occasions. In another example, an active PUCCH cell can be changed by a PGS indication field (see embodiment EA-1-2) received later at some point in time, so that the UE transmits a first number of (consecutive) UCI occasions from the group of two or more UCI transmission occasions on a first PUCCH cell and transmits a second number of (consecutive) UCI occasions from the group of two or more UCI transmission occasions on a second PUCCH cell. For example, a PGS field indication can be by one or more of a joint indication for switching of the active PUCCH cell that triggers another UCI transmission (see embodiment EA-2, EA-2-1, EA-2-2, and so on for details) and a "stand-alone" indication for switching of the active PUCCH cell (see embodiment EA-3 for details).

Figure 39:
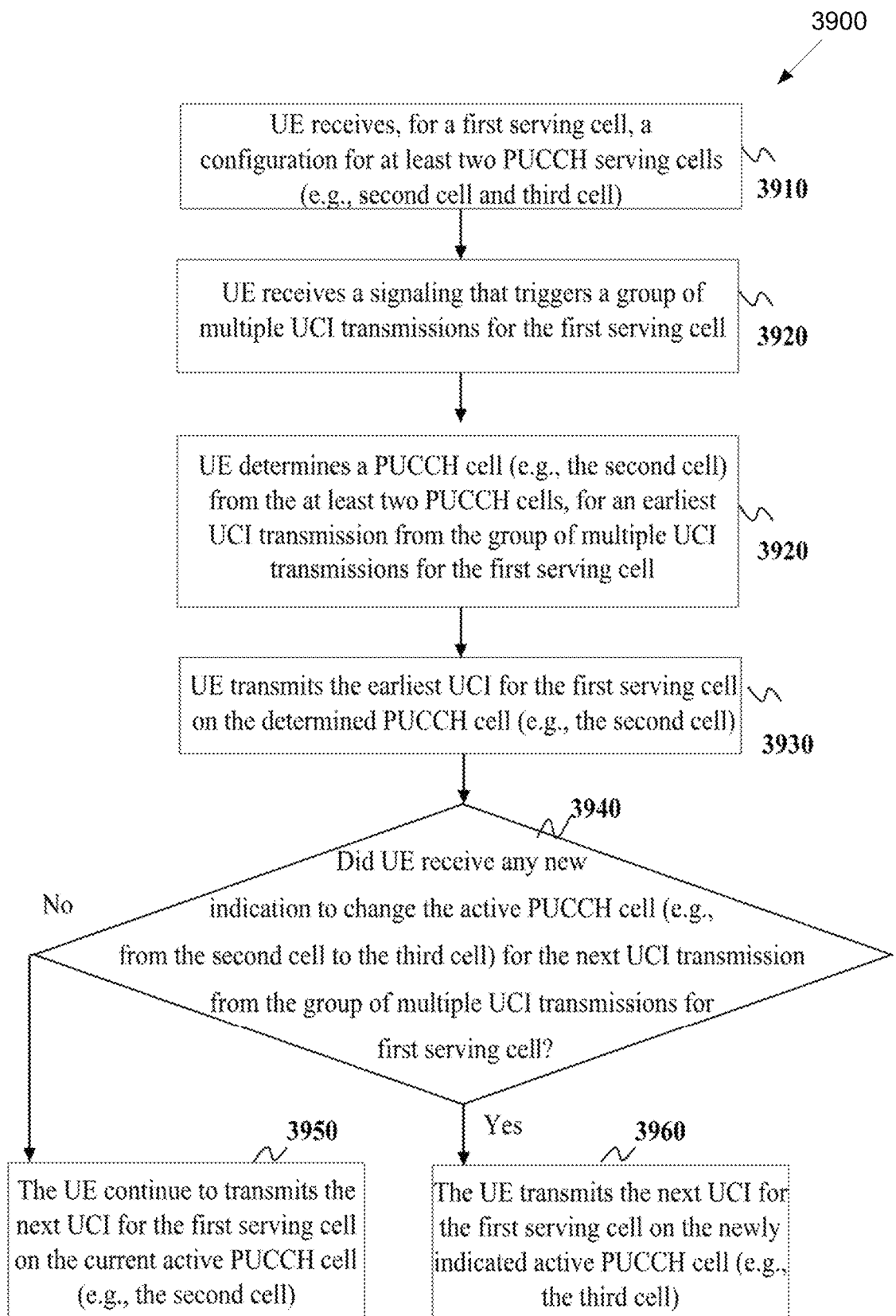
FIG. 39 illustrates a flowchart of a method for determination/switching of the active PUCCH serving cell according to embodiments of the present disclosure.

FIG. 39 illustrates a flowchart of a method 3900 for determination/switching of the active PUCCH serving cell according to embodiments of the present disclosure. An embodiment of the method 3900 shown in FIG. 39 is for illustration only. One or more of the components illustrated in FIG. 39 can be implemented in specialized circuitry configured to perform the noted functions or one or more of the components can be implemented by one or more processors executing instructions to perform the noted functions.

FIG. 39 shows an example flowchart for determination/switching of the active PUCCH serving cell for the case of multiple UCI transmission, such as for HARQ-ACK information for SPS PDSCH, P-CSI/SP-CSI reporting, SR, LRR, and so on.

As illustrated in FIG. 39, a UE receives, for a first serving cell (and/or a serving cell group and/or for a UCI type and/or for a UCI configuration of a UCI type, and/or so on), a configuration for at least two PUCCH serving cells (e.g., second cell and third cell), at step 3910. The UE receives a signalling that triggers a group of multiple (namely, two or more) UCI transmissions for the first serving cell (and/or a serving cell group and/or for a UCI type and/or for a UCI configuration of a UCI type, and/or so on), at step 3920. The UE transmits the earliest UCI for the first serving cell (and/or a serving cell group and/or for a UCI type and/or for a UCI configuration of a UCI type, and/or so on) on the determined PUCCH cell (e.g., the second cell), at step 3930.

The UE determines whether the UE has received any new indication to change the active PUCCH cell (e.g., from the second cell to the third cell) for the next UCI transmission from the group of multiple UCI transmissions for first serving cell (and/or a serving cell group and/or for a UCI type and/or for a UCI configuration of a UCI type, and/or so on, at step 3940. If not, namely, the UE has not received such an indication, the UE continue to transmit the next UCI for the first serving cell (and/or a serving cell group and/or for a UCI type and/or for a UCI configuration of a UCI type, and/or so on) on the current active PUCCH cell (e.g., the second cell), at step 3950. But if yes, namely, the UE has received the indication, then the UE transmits the next UCI for the first serving cell (and/or a serving cell group and/or for a UCI type and/or for a UCI configuration of a UCI type, and/or so on) on the newly indicated active PUCCH cell (e.g., the third cell), at step 3960.

It is noted that the procedure for checking for an indication to switch the active PUCCH cell continues even after a first indication received, until the entire occasions of the group of UCI transmissions are transmitted, so if the UE receives a second indication to change the active PUCCH cell as in at step 3940, the UE operates as in at step 3950 or at step 3960, and similarly for a third indication, and so on.

In one example of this embodiment, the UE is provided a predetermined rule and/or a configured time pattern, as described in embodiment EA-2-2, and the UE determines an active PUCCH cell for each occasion of the group of UCI transmission occasions based on the timing (e.g., occasion index and/or slot index) of the UCI transmissions and the predetermined rule and/or a configured time pattern.

Figure 40:
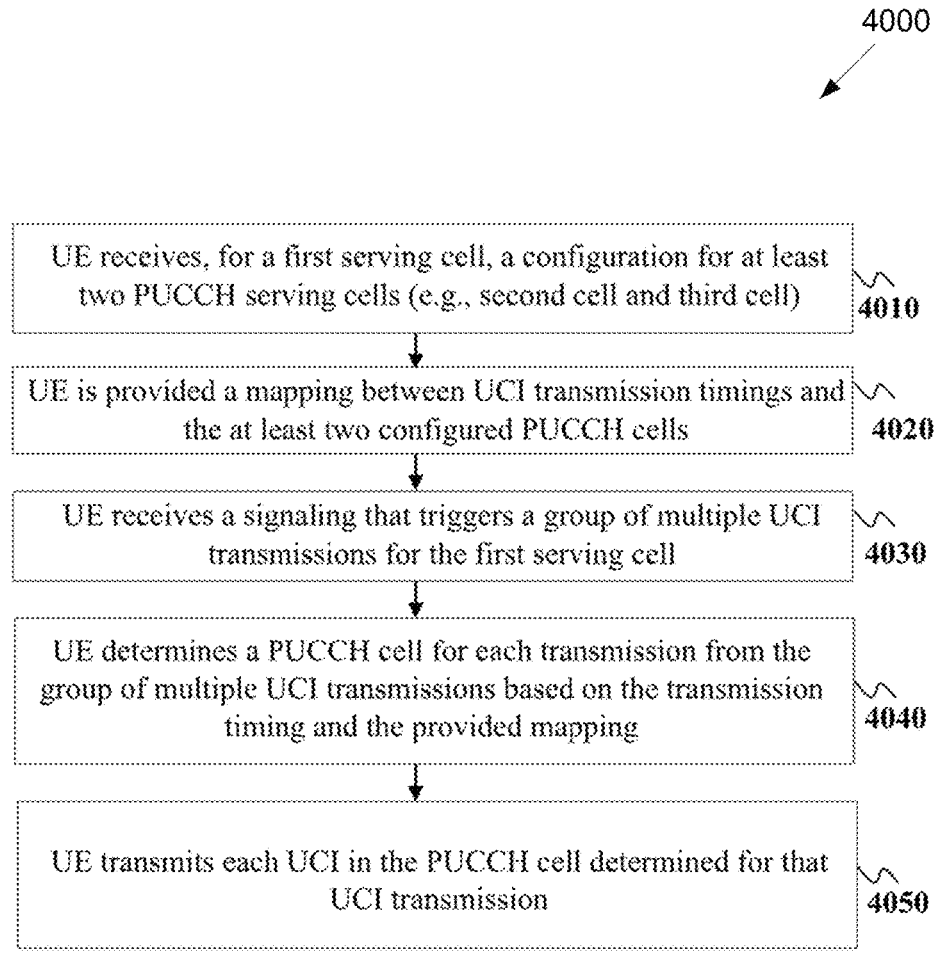
FIG. 40 illustrates another flowchart of a method for determination/switching of the active PUCCH serving cell according to embodiments of the present disclosure.

FIG. 40 illustrates another flowchart of a method 4000 for determination/switching of the active PUCCH serving cell according to embodiments of the present disclosure. An embodiment of the method 4000 shown in FIG. 40 is for illustration only. One or more of the components illustrated in FIG. 40 can be implemented in specialized circuitry configured to perform the noted functions or one or more of the components can be implemented by one or more processors executing instructions to perform the noted functions.

FIG. 40 shows an example flowchart for determination/switching of the active PUCCH serving cell for the case of multiple UCI transmission, such as for HARQ-ACK information for SPS PDSCH, P-CSI/SP-CSI reporting, SR, LRR, and so on.

As illustrated in FIG. 40, a UE receives, for a first serving cell (and/or a serving cell group and/or for a UCI type and/or for a UCI configuration of a UCI type, and/or so on), a configuration for at least two PUCCH serving cells (e.g., second cell and third cell), at step 4010. The UE is provided a mapping between UCI transmission timings and the at least two configured PUCCH cells, at step 4020. For example, the specification provides a predetermined rule or the UE receives a configuration for a time pattern that maps UCI transmission occasions to the active PUCCH cells used for that transmission occasion. The UE receives a signaling that triggers a group of multiple UCI transmissions for the first serving cell (and/or a serving cell group and/or for a UCI type and/or for a UCI configuration of a UCI type, and/or so on), at step 4030, such as for HARQ-ACK information for SPS PDSCH, P-CSI/SP-CSI reporting, SR, LRR, and so on. The UE determines a PUCCH cell for each transmission from the group of multiple UCI transmissions based on the transmission timing and the provided mapping, at step 4040. The UE transmits each UCI in the PUCCH cell determined for that UCI transmission, at step 4050.

In one example, the UE solely follows the provided time pattern as described above. In another example, the UE can receive a PGS indication field (see embodiment EA-1-2) that provides an indication for switching to a new active PUCCH cell for UCI transmission, in which case, the UE follows discards the provided time pattern and follows the PGS indication field (only for one/a number of following UCI transmission occasion(s) or for the entire remaining UCI transmission occasions from the group of UCI transmission occasions).

As aforementioned, in one embodiment of EA-3, "stand-alone" indication mechanisms for switching of active PUCCH cell without UCI triggering are provided. In one embodiment, when a UE is configured with at least two PUCCH cells for a given serving cell, various mechanisms based on network signaling and/or UE determination can be used to indicate/trigger a switching of the active PUCCH cell among the at least two PUCCH cells, without triggering a UCI/PUCCH transmission. Such mechanisms are herein referred to as "stand-alone" indication mechanisms for indication of an active PUCCH cell only and apply to future UCI/PUCCH transmission(s). Stand-alone indication mechanisms are useful for offloading of UCI overhead among configured PUCCH cells in situations with moderate speed/rate of change in the network load/traffic. Such indications can be transmitted on the same serving cell for which an active PUCCH cell is indicated or on a separate cell different from the serving cell for which the active PUCCH cell is indicated.

As aforementioned, in one embodiment of EA-3-1, a UE-specific PDCCH/DCI can be used to indicate a switching of the active PUCCH cell. According to this mechanism, the UE receives a DCI format in a PDCCH, wherein the DCI format carries an indication for switching of an active PUCCH cell.

In one example, the indication for switching of active PUCCH cell applies only to the serving cell which receives the DCI format and/or for which a data transmission is scheduled by the DCI format. In another example, the indication for switching of active PUCCH cell applies to all serving cells configured with a same PUCCH cell as the serving cell which receives the DCI format and/or for which a data transmission is scheduled by the DCI format; namely the PUCCH cell becomes an active PUCCH cell for the serving cell receiving the indication as well as all serving cells that are configured with the same PUCCH cell.

In one example, a UE-specific PDCCH carries a DCI format that includes an indication for switching of the active PUCCH cell for a serving cell in addition to scheduling uplink data transmission on that serving cell. In one example, a "PUCCH group switching" (PGS) field (see embodiment EA-1-2) is added as a new field to the DCI format. In one example, a DCI format may include multiple PGS fields, each corresponding to activation of a different/separate PUCCH cell (for the serving cell which receives the DCI format and/or for the serving cell for which the data transmission is scheduled by the DCI format).

In one example, when a serving cell is configured with a single PUCCH cell, then the UE does not expect any field for PUCCH group switching (PGS) in the DCI format, i.e., the PGS field has a zero (0) bit-width, and the UE continues to transmit UCI for the serving cell on the same PUCCH cell.

In one example, a DCI format can be a DCI format for scheduling UL data transmission such as a DCI format 0_0 and 0_1, or a "compact" DCI format (e.g., for URLLC use-cases) such as a DCI format 0_2, potentially with restrictions on the bit-width of the PGS field, such as a configurable bit-width for the PGS field, or potentially with merging of the PGS field with other fields such as PUCCH resource indication (PRI) so that a combined bit-width (e.g., PGS+PRI bit-width) does not exceed a configured/specified number of bits.

Figure 41:
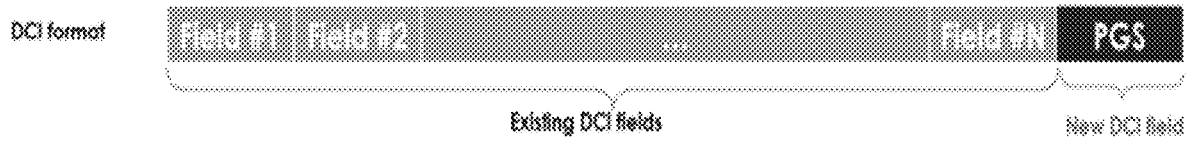
FIG. 41 illustrates an example DCI format according to embodiments of the present disclosure.

FIG. 41 illustrates an example DCI format 4100 according to embodiments of the present disclosure. An embodiment of the DCI format 4100 shown in FIG. 41 is for illustration only.

As illustrated in FIG. 41, wherein Fields #1, #2, through #N correspond to existing fields in the DCI format, e.g., for scheduling UL data transmission, and a new field for PGS is added to the DCI format for indication of a switching of the active PUCCH cell.

Figure 42:
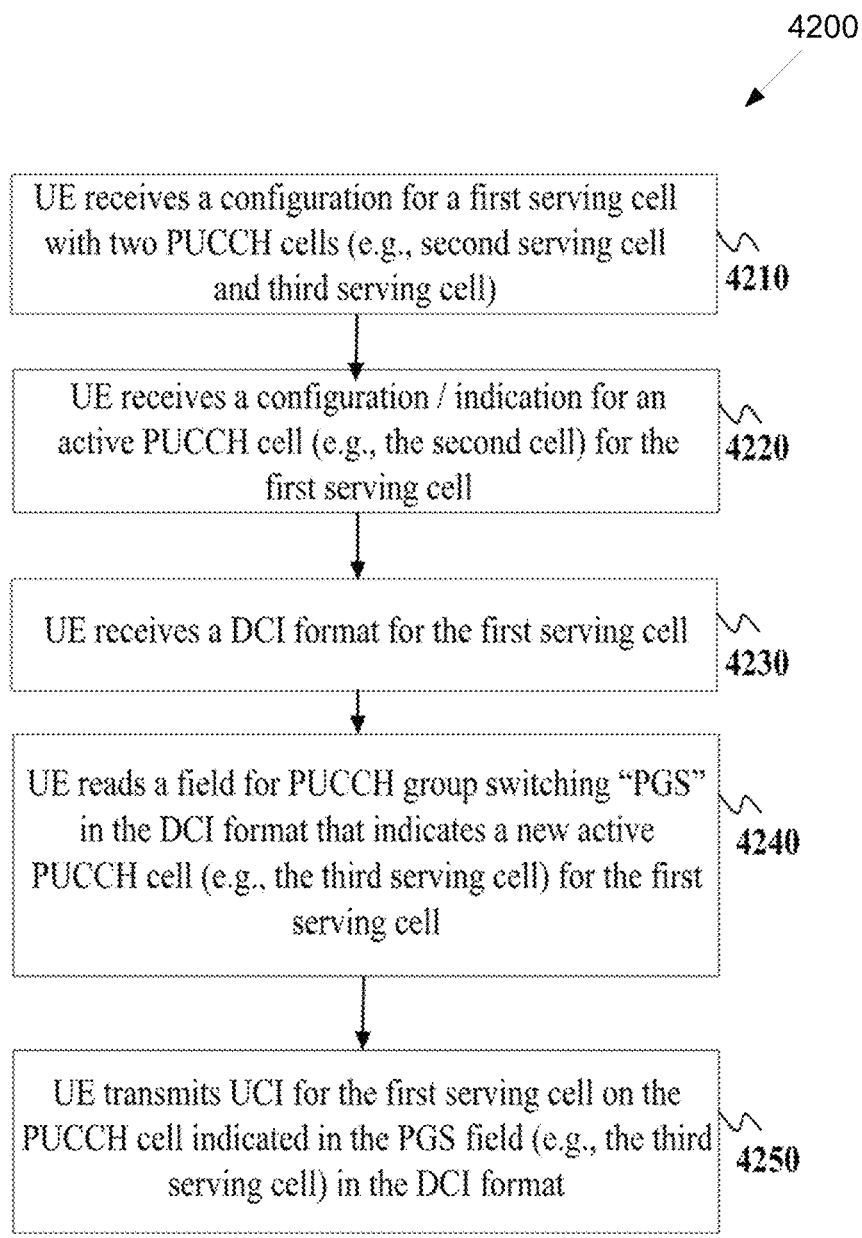
FIG. 42 illustrates a flowchart of a method for an indication of switching of the active PUCCH cell according to embodiments of the present disclosure.

FIG. 42 illustrates a flowchart of a method 4200 for an indication of switching of the active PUCCH cell according to embodiments of the present disclosure. An embodiment of the method 4200 shown in FIG. 42 is for illustration only. One or more of the components illustrated in FIG. 42 can be implemented in specialized circuitry configured to perform the noted functions or one or more of the components can be implemented by one or more processors executing instructions to perform the noted functions.

FIG. 42 shows an example flowchart for, using UE-specific PDCCH/DCI), indication of switching of the active PUCCH cell. A UE receives a configuration for a first serving cell with two PUCCH cells (e.g., second serving cell and third serving cell), at step 4210, such as the PCell and a PUCCH-SCell. The UE receives a configuration/indication for an active PUCCH cell (e.g., the second cell) for the first serving cell, at step 4220. For example, the second serving cell can be a first active PUCCH cell or a configured and previously/currently indicated activate PUCCH cell for the first serving cell. In one example, the DCI format can be in a PDCCH in a UE-specific search space or a common search space for triggering data transmission (e.g., uplink grant, configured grant PUSCH activation) on a first serving cell. In another example, the UE performs data transmission on the first serving cell as triggered in the received DCI format. The UE receives a DCI format for the first serving cell, at step 4230, wherein the UE reads a field for PUCCH group switching "PGS" in the DCI format that indicates a new active PUCCH cell (e.g., the third serving cell) for future UCI/PUCCH transmission(s) for the first serving cell, at step 4240. Then, the UE transmits future UCI(s) for the first serving cell on the PUCCH cell indicated in the PGS field (e.g., the third serving cell) in the DCI format, at step 4250.

In one example, a UE-specific PDCCH carries a DCI format that may not be used for scheduling data transmission on a serving cell, rather merely used for including an indication for switching of the active PUCCH cell. According to this example, no new field may be included in the DCI format for cross-carrier scheduling, rather a specified group of DCI fields, such as one or more of an FDRA field and a TDRA, can be re-interpreted/re-purposed to indicate a PGS field, as described in Embodiment EA-1-2. In one example, the specified group of DCI fields can be re-interpreted/re-purposed as multiple PGS fields, each corresponding to activation of a different/separate PUCCH cell, e.g., corresponding to different serving cells.

According to this example, for PDCCH monitoring for this DCI format, in one example, the UE uses an existing RNTI, such as a C-RNTI, while in another example, the UE uses a new RNTI such as a "PGS-RNTI." In one example, the UE performs a validation of a DCI format to determine whether the DCI format is used as an indication for switching of the active PUCCH cell. For example, the UE determines whether a specified group of DCI fields, such as one or more of MCS, HPN, RV, are set to specified default values, such as all zero(s) or all one(s) values. In another example, a validation also includes the usage of the new RNTI such as PGS-RNTI for PDCCH monitoring and reception of the DCI format.

In one example, a DCI format can be a DCI format for scheduling UL data transmission such as a DCI format 0_0 and 0_1, and/or can be a DCI format for scheduling DL data transmission such as a DCI format 1_0 and 1_1. In another example, a DCI format can be a "compact" DCI format (e.g., for URLLC use-cases) such as a DCI format 0_2 and 1_2, potentially with restrictions on the bit-width of the PGS field, such as a configurable bit-width for the PGS field, or potentially with merging of the PGS field with other fields such as PRI so that a combined bit-width (e.g., PGS+PRI bit-width) does not exceed a configured/specified number of bits.

Figure 43:
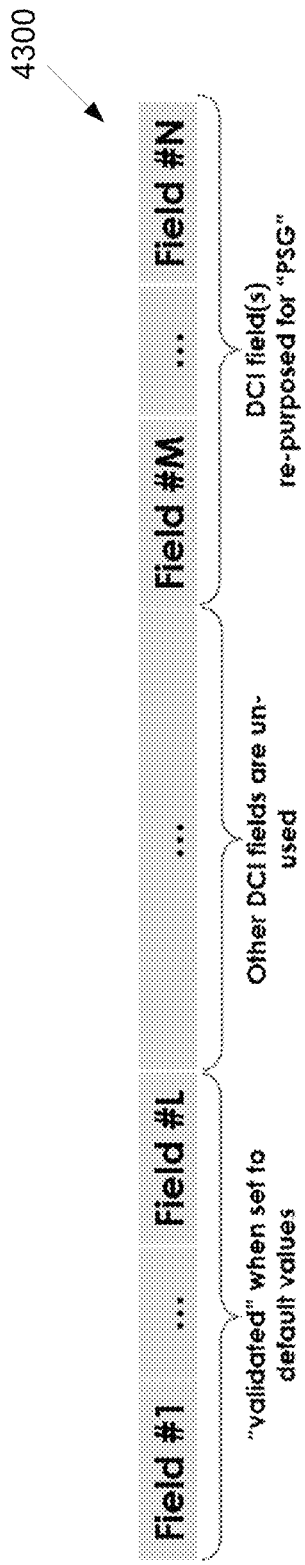
FIG. 43 illustrates an example DCI format according to embodiments of the present disclosure.

FIG. 43 illustrates an example DCI format 4300 according to embodiments of the present disclosure. An embodiment of the DCI format 4300 shown in FIG. 43 is for illustration only.

As illustrated in FIG. 43, wherein Fields #1 through #L correspond to validation fields, that are validated when set to default values per specifications, and Fields #M through #N are re-purposed for/re-interpreted as a PGS field(s). In one example, other remaining DCI fields are unused.

In one example, a UE receives a DCI format (for a first serving cell) in a UE-specific PDCCH using an existing RNTI such as a C-RNTI or using a new RNTI for PUCCH group switching, such as a PGS-RNTI. The UE determines a value(s) of a first group of at least one "validation" DCI field within the received DCI format per specifications. The UE determines whether the value(s) of the first group of at least one "validation" field is/are set to default value(s) per specifications. In one example, if the UE determines that the value(s) of the first group of at least one "validation" field is/are not set to default value(s) per specifications and the UE has used a legacy RNTI such as a C-RNTI for PDCCH monitoring and reception of the DCI format, the UE performs legacy operation, such as data transmission or reception as triggered by the received DCI format.

In another example, if the UE determines that the value(s) of the first group of at least one "validation" field is/are not set to default value(s) per specifications and the UE has used a new RNTI such as a PGS-RNTI for PDCCH monitoring and reception of the DCI format, the UE discards the received DCI format. But, if the UE determines that the value(s) of the first group of at least one "validation" field is/are set to default value(s) per specifications, the UE does not perform any legacy operation such as data transmission or reception, rather the UE determines a value(s) of a second group of at least one field in the received DCI format per specifications. The UE re-interprets the value(s) of the second group including at least one field to determine a new active PUCCH cell (e.g., a third serving cell) that the UE can use for future UCI/PUCCH transmission (for the first serving cell). In one example, the UE sends a HARQ-ACK feedback to indicate successful reception of the PDCCH and determination of the new active PUCCH cell. The UE transmits future UCI/PUCCH transmissions (for the first serving cell) on the determined new active PUCCH cell.

Protection methods can be utilized for a UE-specific DCI format to reduce the likelihood of UE missing the PDCCH/DCI format used for indication of a switching of an active PUCCH cell. In one example, gNB implementation can increase the aggregation level (AL) for transmission of this DCI format so that low coding rate can be used and a higher reliability for the DCI format can be achieved. In another example, the UE may transmit a HARQ-ACK feedback to indicate the successful reception of the PDCCH/DCI format for indication of a switching of active PUCCH cell. According to this example, the UE can transmit the HARQ-ACK feedback in a PUCCH resource, such as a specified/default/configured PUCCH resource or a PUCCH resource indicated by the DCI format, or multiplexed on a PUSCH resource transmission.

As aforementioned, in one embodiment of EA-3-2, a group-common PDCCH/DCI format can be used to indicate a switching of the active PUCCH cell(s). According to this mechanism, a group of UEs receive a single joint indication in a group-common DCI format including two/multiple fields, wherein each field corresponds to an indication for one UE for switching of active PUCCH cell, such as a PGS field as described in Embodiment EA-1-2. For example, the group of UEs can include UEs in nearby proximity with similar channel conditions experiencing similar PUCCH reliability performance and requiring similar/related UCI offloading situation between PCell and PUCCH-SCell(s). In one example, the UE receives the group-common DCI format using a new UE-group RNTI such as a PGS-RNTI.

In one example, the group-common DCI format includes a fixed set of UEs in the group. According to this option, each UE within the group is RRC configured with a parameter for a position in the group-common DCI format, so that the UE reads a fixed position/field within the group-common DCI format. In one example, if there is no change for the active PUCCH cell(s) to be indicated to a UE within the group, the position/field corresponding to that UE in the group-common DCI format can include a default value such as all zeros.

Figure 44:
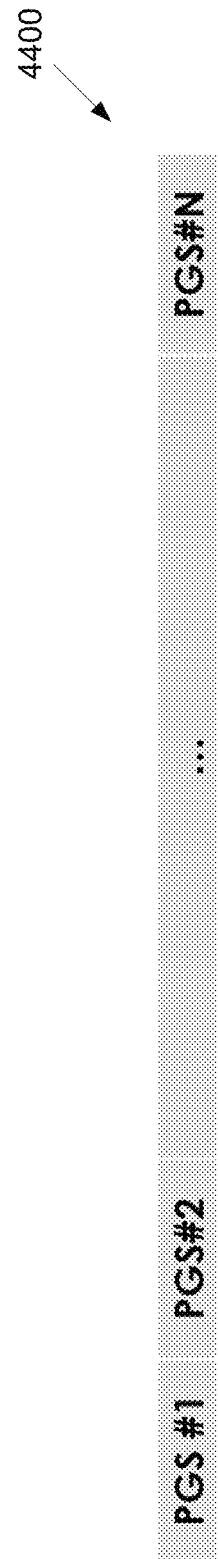
FIG. 44 illustrates an example group-common DCI format according to embodiments of the present disclosure.

FIG. 44 illustrates an example group-common DCI format 4400 according to embodiments of the present disclosure. An embodiment of the group-common DCI format 4400 shown in FIG. 44 is for illustration only.

FIG. 44 shows an example group-common DCI format including [N] fields for [N] UEs, wherein PGS #1 corresponds to a switching of the active PUCCH cell(s) for a first UE, and PGS #2 corresponds to a second UE, and so on, and the field PGS #N corresponds to an N-th UE.

In one example, the group-common DCI format includes a variable set of UEs in the group with a variable position/field in the group-common DCI format. According to this example, each UE within the group is RRC configured with a UE ID within the UE-group/UE-group membership ID, with a bit-width such as 4 bits for a group of 16 UEs. Then, a UE determines an indication within the group-common DCI format for switching of active PUCCH cell(s), such as a PGS field as described in Embodiment EA-1-2, when the UE ID within the UE-group/UE-group membership ID for that UE is included in a field in the group-common DCI format. In such a case, the UE reads the value of the corresponding field to determine the indication, e.g., the PGS field. In this option, when there is no change for the active PUCCH cell(s) to be indicated to a UE within the group, the group-common DCI format may not include any field corresponding to that UE.

Figure 45:
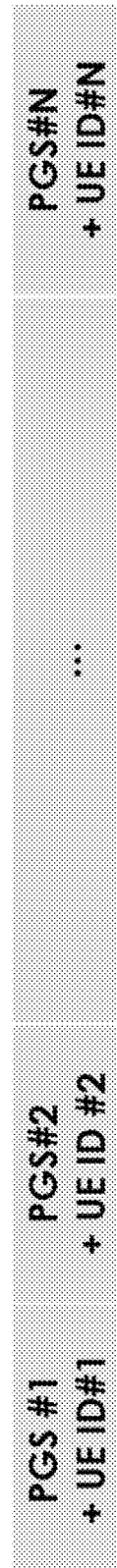
FIG. 45 illustrates another example group-common DCI format according to embodiments of the present disclosure.

FIG. 45 illustrates another example group-common DCI format 4500 according to embodiments of the present disclosure. An embodiment of the group-common DCI format 4500 shown in FIG. 45 is for illustration only.

FIG. 45 shows an example group-common DCI format including [N] fields for [N] UEs, wherein PGS #1 corresponds to a switching of the active PUCCH cell(s) for a first UE with a UE ID #1 within the group, and PGS #2 corresponds to a second UE with a UE ID #2 within the group, and so on, and the field PGS #N corresponds to an N-th UE with a UE ID #N within the group.

Figure 46:
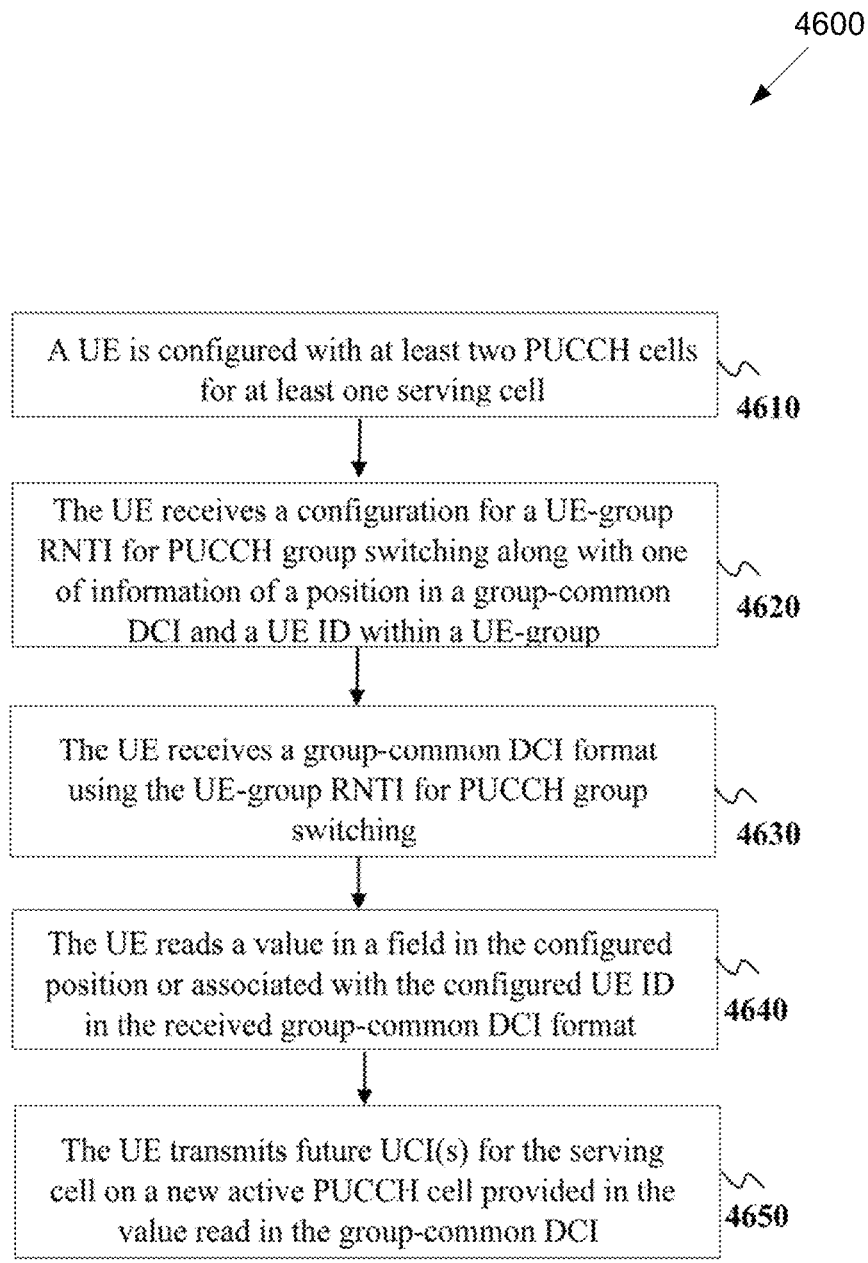
FIG. 46 illustrates a flowchart of a method for an indication of switching of active PUCCH cells according to embodiments of the present disclosure.

FIG. 46 illustrates a flowchart of a method 4600 for an indication of switching of active PUCCH cells according to embodiments of the present disclosure. An embodiment of the method 4600 shown in FIG. 46 is for illustration only. One or more of the components illustrated in FIG. 46 can be implemented in specialized circuitry configured to perform the noted functions or one or more of the components can be implemented by one or more processors executing instructions to perform the noted functions.

FIG. 46 shows an example flowchart for the indication of switching of active PUCCH cell(s), namely using group-common PDCCH/DCI format.

As illustrated in FIG. 46, a UE is configured with at least two PUCCH cells for at least one serving cell, at step 4610. The UE receives a configuration for a UE-group RNTI such as a PGS-RNTI for PUCCH group switching along with one of information of a position in a group-common DCI and a UE ID within a UE-group, at step 4620. The UE receives a group-common DCI format in a PDCCH using the UE-group RNTI for PUCCH group switching, at step 4630. The UE reads a value in a field in the configured position or in a field associated with the configured UE ID in the received group-common DCI format, at step 4640. Finally, the UE transmits future UCI(s) for the serving cell on a new active PUCCH cell provided in the value read in the group-common DCI, at step 4650. In one example, when the UE is configured with the UE ID within the UE-group, and when the UE determines that a configured UE ID within the UE-group is not included in the group-common DCI format, the UE discards the group-common DCI format, and continues to transmit UCI/PUCCH for the serving cell on the current active PUCCH cell(s), i.e., no change to the active PUCCH cell(s) for that UE.

As aforementioned, in one embodiment of EA-3-3, a downlink MAC-CE activation/deactivation command can be used to indicate a switching of the active PUCCH cell(s). According to this mechanism, the DL MAC-CE command is carried by a PDSCH transmission and applies to a single UE, namely the UE for which the PDSCH is scheduled (and received). This mechanism is suitable for control overhead load balancing and offloading for situations with moderate speed of change in the network traffic pattern. In addition, this mechanism facilitates a joint indication of switching of active PUCCH cell(s) for multiple/several PUCCH cells and/or corresponding to multiple/several serving cells within a single command, which is difficult/impossible to fit in a (UE-specific or group-common) DCI format as described in Embodiments EA-3-1 and EA-3-2.

In this mechanism, the DL MAC-CE command can include a variable number of PGS fields, as described in Embodiment EA-1-2, wherein each PGS field corresponds to a serving cell whose active PUCCH cell is changing and/or corresponds to a PUCCH cell which is getting activated or deactivated for all corresponding serving cells. In one example, the MAC-CE includes a field that indicates the number of PGS fields included in the MAC-CE command. In another example, for each PGS field, there is a corresponding field that indicates whether the PGS field correspond to activation/addition of a PUCCH cell or deactivation/removal/replacement of a PUCCH cell (for a serving cell). In one example, the UE transmits a HARQ-ACK feedback to acknowledge a successful reception (or not) of the MAC-CE command for switching of active PUCCH cell(s). Such HARQ-ACK feedback, in one example, is transmitted in a specified/default/configured PUCCH resource or a PUCCH resource indicated in a DCI format the schedules the PDSCH that carries the MAC-CE command, while in other example is multiplexed on a PUSCH resource transmission.

Figure 47:
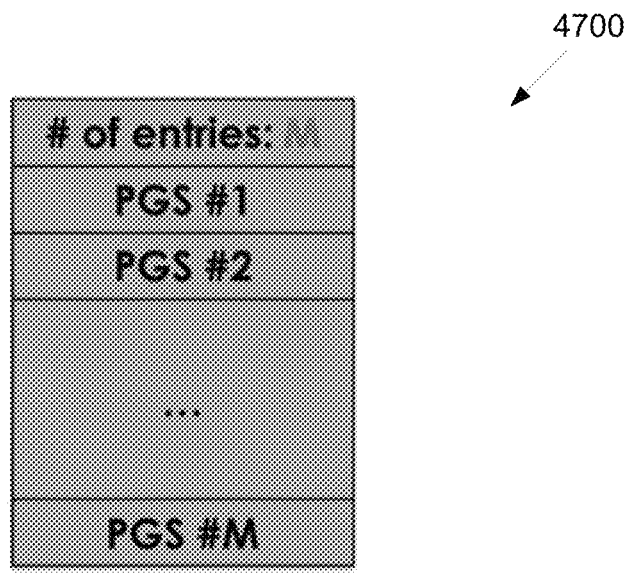
FIG. 47 illustrates an example downlink MAC-CE activation deactivation command according to embodiments of the present disclosure.

FIG. 47 illustrates an example downlink MAC-CE activation deactivation command 4700 according to embodiments of the present disclosure. An embodiment of the downlink MAC-CE activation deactivation command 4700 shown in FIG. 47 is for illustration only.

As illustrated in FIG. 47, wherein a field indicates the number [M] of the PGS fields included the MAC-CE command, and wherein PGS #1 corresponds to a first indication of a switching in an active PUCCH cell, and PGS #2 corresponds to a second indication of a switching in an active PUCCH cell, and so on, and PGS #M corresponds to an M-th indication of a switching in an active PUCCH cell.

Figure 48:
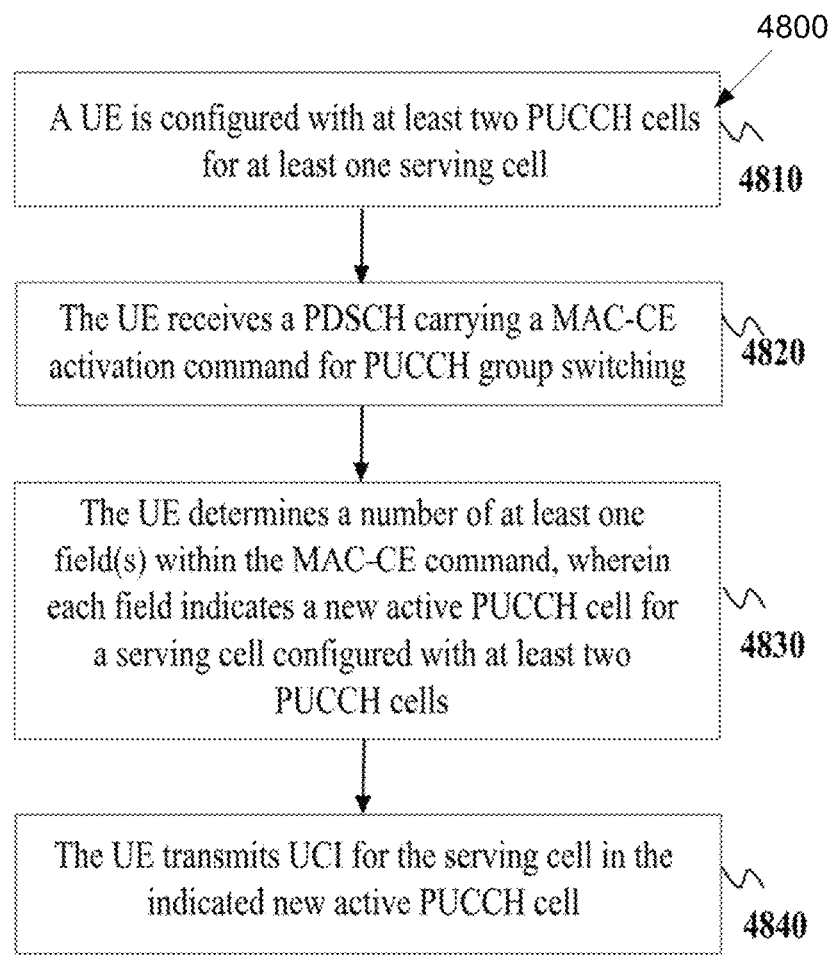
FIG. 48 illustrates a flowchart of a method for an indication of switching of active PUCCH cells using MAC-CE activation/deactivation command according to embodiments of the present disclosure.

FIG. 48 illustrates a flowchart of a method 4800 for an indication of switching of active PUCCH cells using MAC-CE activation/deactivation command according to embodiments of the present disclosure. An embodiment of the method 4800 shown in FIG. 48 is for illustration only. One or more of the components illustrated in FIG. 48 can be implemented in specialized circuitry configured to perform the noted functions or one or more of the components can be implemented by one or more processors executing instructions to perform the noted functions.

As illustrated in FIG. 48, a UE is configured with at least two PUCCH cells for at least one serving cell, at step 4810. The UE receives a PDSCH carrying a MAC-CE activation command for PUCCH group switching, at step 4820. The UE determines a number of at least one field(s) within the MAC-CE command, wherein each field indicates a new active PUCCH cell for a serving cell configured with at least two PUCCH cells, at step 4830. In one example, the UE transmits a HARQ-ACK feedback in a PUCCH resource to indicate a successful reception of the PDSCH carrying the MAC-CE activation command. The UE transmits future UCI(s) for the serving cell in the indicated new active PUCCH cell, at step 4840. In one example, the UE starts transmitting UCI on the new active PUCCH cell after [N] time units/msec/symbols/slots after transmission of the HARQ-ACK in the PUCCH, wherein the parameter [N] is specified or configured or determined based on a rule, such as 3 ms.

As aforementioned, in one embodiment of EA-3-4, timeline aspects for change of active PUCCH cell(s) is provided. In one embodiment, when a UE is configured with at least two PUCCH cells for a given serving cell, and when network signaling is used to indicate a switching of the active PUCCH cell among the at least two PUCCH cells, the gNB and/or the UE can perform UCI transmission on a current/previous active PUCCH cell and/or on a new active PUCCH cell based on some timeline considerations. According to this embodiment, the UE can perform UCI transmission with various methods during a time period, e.g., referred to as a PUCCH cell "activation" time or simply put an "activation" time, from a time when the UE receives a gNB indication for switching of the active PUCCH cell until a time when the UE can start to transmit UCI on a new active PUCCH cell.

In one example, an activation time for switching of the active PUCCH cell(s) can involve RF switching delay/latency, e.g., when a newly indicated active PUCCH cell(s) has/have not been an activated serving cell(s) before the gNB indication, and/or when a newly indicated active PUCCH cell(s) has/have been in a different current/old active BWP compared to the new active BWP intended for operation after a switching of the active PUCCH cell(s), and/or when a newly indicated active PUCCH cell(s) and/or a corresponding BWP(s) has/have been in a dormancy behavior before the gNB indication, and so on. In another example, an activation time for switching of the active PUCCH cell(s) can involve UE baseband processing time, e.g., for the UE to receive the gNB indication for switching of the active PUCCH cell(s), decoding and processing the indication, and determining a newly active PUCCH cell(s). In one example, an indication for switching of the active PUCCH cell(s) can explicitly or implicitly include a starting time for when the UE can/is expected to transmit UCI on a newly indicated active PUCCH cell(s).

In one example, an activation time for switching of the active PUCCH cell(s) can be zero, so that a switching of the active PUCCH cell(s) can be instant. In another example, an activation time for switching of the active PUCCH cell(s) can be greater than zero, so that a switching of the active PUCCH cell(s) incurs some latency/delay.

When an activation time for switching of the active PUCCH cell is greater than zero, in one example, a UE can transmit UCI/PUCCH on neither the current/old active PUCCH cell, nor the new active PUCCH cell during a PUCCH cell activation time, i.e., the UE is not expected to transmit UCI for that serving cell on either the current/old or the new active PUCCH cell. In another example, the UE can continue to transmit UCI on the current/old active PUCCH cell during an entire duration/period for a PUCCH cell activation time. In yet another example, a UE can continue to transmit UCI on the current/old active PUCCH cell after receiving an indication for switching the active PUCCH cell(s), but the UE can continue to do so until an offset from (the end of) a PUCCH cell activation time, after/during which the UE is not expected to transmit UCI/PUCCH on either the current/old or the new active PUCCH cell.

Figure 49:
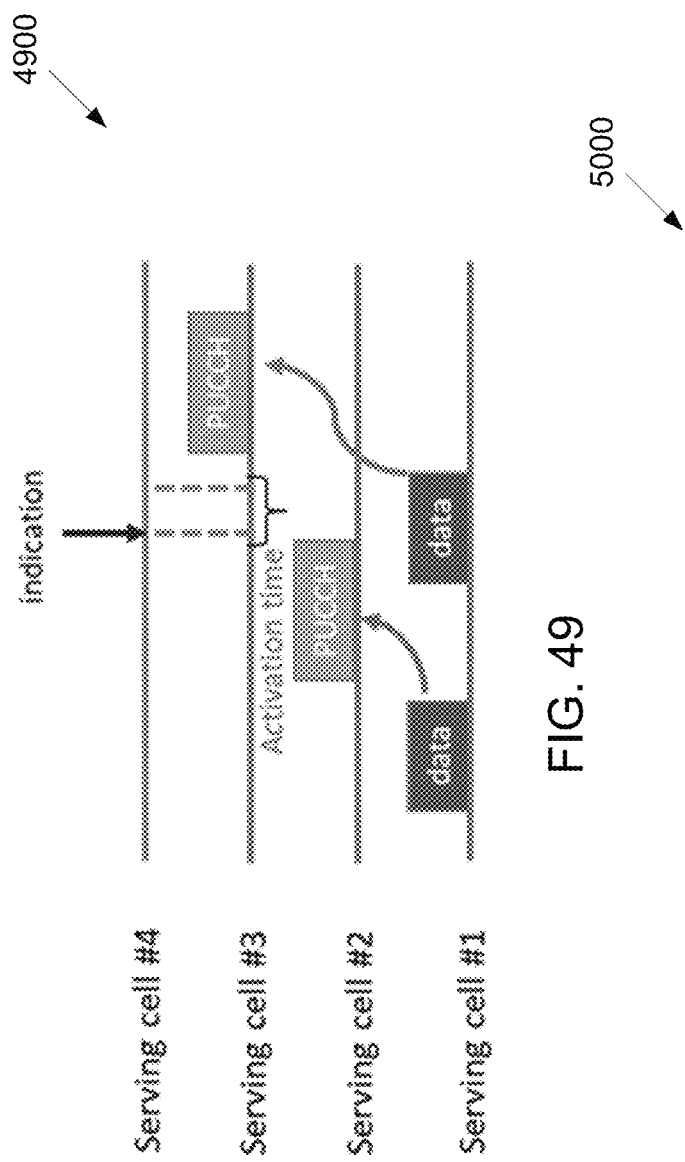
FIG. 49 illustrates an example activation time for switching of an active PUCCH cell according to embodiments of the present disclosure.

FIG. 49 illustrates an example activation time 4900 for switching of an active PUCCH cell according to embodiments of the present disclosure. An embodiment of the activation time 4900 shown in FIG. 49 is for illustration only.

A serving cell #1 (i.e., serving cell) is configured with two PUCCH cells, namely PUCCH cells #2 and #3. It is noted that, serving cell #1 can be same as or different from PUCCH cell #2 or PUCCH cell #3. It is assumed that PUCCH cells #2 and #3 are different. In one example, the PUCCH cell #2 can be a first active PUCCH cell for serving cell #1 (see embodiment EA-1-1). The UE transmits UCI for serving cell #1 on PUCCH cell #2. The UE receives, for serving cell #1, an indication of change of the active PUCCH cell from PUCCH cell #2 to PUCCH cell #3. The indication can be received on a serving cell #4, which can be same as the PUCCH cell #2 or #3 or the serving cell #1, or even a serving cell which is different from both the serving cell #1 and the PUCCH cells #2 and #3. The UE processes the gNB indication for switching of the active PUCCH cell(s) for an activation time period. In one example, the UE is not expected to transmit UCI/PUCCH during the activation time. The UE then transmits UCI/PUCCH for serving cell #1 on PUCCH cell #3.

In one example, when a PDCCH/DCI format, such as a UE-specific DCI and/or a group-common DCI, as described in Embodiment EA-3-1 and EA-3-2 is used for gNB indication of a switching of the active PUCCH cell(s), and (i) in a first case, the DCI format, e.g., a "PGS" field in the DCI format, indicates no change to the active PUCCH cell(s), then the UE can continue to transmit UCI on the current active PUCCH cell(s), and (ii) in a second case, the DCI format, e.g., a "PGS" field in the DCI format, indicates a change to the active PUCCH cell(s), then in one example, the UE does not expect a UCI/PUCCH transmission during a UE processing "activation" time, such as a decoding and/or processing time for a PDCCH/DCI format that indicates a change to the active PUCCH cell(s). After that activation time for the newly indicated active PUCCH cell(s), the UE can transmit UCI on the new active PUCCH cell.

For example, the UE is expected to start UCI transmission on the newly indicated active PUCCH cell(s) after N symbols from the last symbol of a PDCCH providing an indication for switching of the active PUCCH cell(s). In one example, if processingType2Enabled of PDSCH-ServingCellConfig is set to enable for the serving/serving cell whose active PUCCH cell(s) is indicated to be switched, for example, N=5 for $\mu=0$, N=5.5 for $\mu=1$, and N=11 for $\mu=2$, otherwise, N=10 for $\mu=0$, N=12 for $\mu=1$, N=22 for $\mu=2$, and N=25 for $\mu=3$, wherein $\mu$ corresponds to (ii-A) in one example, the SCS configuration of the PDCCH providing the indication for switching of the active PUCCH cell(s), and/or (u-B) in another example, the smallest SCS configuration between the SCS configuration of the PDCCH providing the indication for switching of the active PUCCH cell(s) and the SCS configuration of a serving/serving cell whose active PUCCH cell(s) is indicated to be switched, and/or (ii-C) in another example, the smallest SCS configuration among the SCS configuration of the PDCCH providing the indication for switching of the active PUCCH cell(s)

and the SCS configuration of a serving/serving cell whose active PUCCH cell(s) is indicated to be switched and the SCS configuration of the current/old active PUCCH cell(s) and/or the newly indicated active PUCCH cell(s).

In another example, if processingType2Enabled of PDSCH-ServingCellConfig is set to enable for the serving/serving cell whose active PUCCH cell(s) is indicated to be switched, for example, N=3 for µ=0, N=4.5 for µ=1, and N=9 for µ=2, otherwise, N=8 for µ=0, N=10 for µ=1, N=17 for µ=2, and N=20 for µ=3, wherein µ is as above.

In one example, when a MAC-CE activation/deactivation command, as described in Embodiment EA-3-3 is used for gNB indication of a switching of the active PUCCH cell(s), and (i) in a first case, the MAC-CE activation/deactivation command, e.g., a "PGS" field in the MAC-CE activation/deactivation command, indicates no change to the active PUCCH cell(s), then the UE can continue to transmit UCI/PUCCH on the current active PUCCH cell(s), and (ii) in a second case, the MAC-CE activation/deactivation command, e.g., a "PGS" field in the MAC-CE activation/deactivation command, indicates a change to the active PUCCH cell(s), then in one example, there can be an activation delay, such as [N]=3 msec, delay for processing of the MAC-CE command. For example, if the UE receives a MAC-CE activation command for switching of the active PUCCH cell(s), the UE applies the activation command in the first slot that is after slot $k+3 \cdot N_{slot}^{subframe,\mu}$ where k is the slot where the UE would transmit a PUCCH with HARQ-ACK information for the PDSCH providing the activation command and µ is the SCS configuration for the PUCCH. The active BWP is defined as the active BWP in the slot when the activation command is applied.

The activation time can additionally include a time between the time the UE receives the PDCCH/PDSCH providing the activation command and the time the UE would transmit a PUCCH with HARQ-ACK information for the PDSCH providing the activation command. In such a case, in one example, the UE does not expect any UCI transmission during this MAC-CE activation time. In another example, the UE can still transmit UCI on the current/old active PUCCH cell(s) during this MAC-CE activation time. In a further example, the UE can transmit UCI on the current/old active PUCCH cell(s) during this MAC-CE activation time but can continue to do so until an offset from the end of the activation time, such a 3 msec period minus a UE processing time for PDCCH reception, such as N symbols.

In one example, if processingType2Enabled of PDSCH-ServingCellConfig is set to enable for the serving/serving cell whose active PUCCH cell(s) is indicated to be switched, for example, N=5 for µ=0, N=5.5 for µ=1, and N=11 for µ=2, otherwise, N=10 for µ=0, N=12 for µ=1, N=22 for µ=2, and N=25 for µ=3, wherein µ corresponds for example to one or more options from option (ii-A), (ii-B), and (ii-C) described above. In another example, if processingType2Enabled of PDSCH-ServingCellConfig is set to enable for the serving/serving cell whose active PUCCH cell(s) is indicated to be switched, for example, N=3 for µ=0, N=4.5 for and N=9 for µ=2, otherwise, N=8 for µ=0, N=10 for µ=1, N=17 for µ=2, and N=20 for µ=3, wherein µ is as above.

As aforementioned, in one embodiment of EA-4, determination of active PUCCH cell for different UCI types is provided. In one embodiment, the UE can determine an active PUCCH cell for a serving cell or a serving cell group based on a UCI type that is carried by a PUCCH resource on the PUCCH cell. A UCI type can be triggered by a L1/L2 network signaling and/or by a configuration and/or indication from higher layers. According to this embodiment, the UE can use the corresponding network signaling and/or configuration and/or indication, possibly along with predetermined/configured rules corresponding to a UCI type, to determine an active PUCCH cell for that UCI type.

In this embodiment, a UCI type can be e.g. one of a HARQ-ACK information/feedback, an SR, an LRR, a CSI report such a P-CSI report or an SP-CSI report, and a combination thereof such as a UCI multiplexing.

As aforementioned, in one embodiment of EA-4-1, determination of active PUCCH cell for HARQ-ACK feedback corresponding to dynamically scheduled PDSCH or DL SPS activation/release is provided.

In one embodiment, a DCI format that schedules a PDSCH and/or a DCI format that activates/releases an SPS PDSCH configuration on a serving cell can include an indication for an active PUCCH cell for transmission of a HARQ-ACK information corresponding to the scheduled PDSCH and/or corresponding to the first/earliest SPS PDSCH reception associated with a PDCCH that carries the activation DCI format and/or corresponding to an SPS PDSCH release on the serving cell.

In one example, a DCI format such as a DCI format 1_0, 1_1, or 1_2 that schedules a PDSCH can include a PGS field (see embodiment EA-1-2) to indicate the active PUCCH cell for transmission of the HARQ-ACK information corresponding to the PDSCH. It is noted that, a DCI format 1_x includes a PRI field to indicate a PUCCH resource to use for HARQ-ACK information transmission, so with inclusion of a PGS field, the PRI is interpreted as a PUCCH resource in the indicated PUCCH serving cell to be used by UE to transmit the HARQ-ACK information corresponding to the PDSCH.

In another example, a DCI format such as a DCI format 1_0, 1_1, or 1_2 that activates an SPS PDSCH configuration can include a PGS field (see embodiment EA-1-2) to indicate the active PUCCH cell for transmission of the HARQ-ACK information corresponding to the first/earliest transmission occasion of SPS PDSCH, namely the one associated with a PDCCH that carries the activation DCI format. In yet another example, a DCI format such as a DCI format 1_0, 1_1, or 1_2 that releases an SPS PDSCH configuration can include a PGS field (see embodiment EA-1-2) to indicate the active PUCCH cell for transmission of the HARQ-ACK information corresponding to the SPS PDSCH release/deactivation.

In both examples, the activation/release DCI format include a PRI field to indicate a PUCCH resource to use for HARQ-ACK information transmission, so with inclusion of a PGS field, the PRI is interpreted as a PUCCH resource in the indicated PUCCH serving cell to be used by UE to transmit the HARQ-ACK information corresponding to the first/earliest transmission occasion of SPS PDSCH and/or the SPS PDSCH release.

Figure 50:
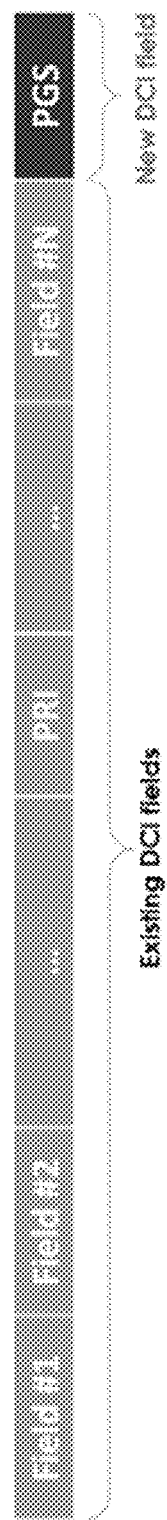
FIG. 50 illustrates an example DCI format according to embodiments of the present disclosure.

FIG. 50 illustrates an example DCI format 5000 according to embodiments of the present disclosure. An embodiment of the DCI format 5000 shown in FIG. 50 is for illustration only.

FIG. 50 shows an example DCI format used for active PUCCH indication, wherein Fields #1, #2, through #N correspond to existing fields in the DCI format, e.g., for PDSCH reception or for activation/release of an SPS PDSCH configuration, including a PRI field to indicate a PUCCH resource for transmission of HARQ-ACK information corresponding to the scheduled PDSCH/SPS PDSCH/SPS release, and wherein a new field for PGS is added to the DCI format for indication of a switching of the active PUCCH cell on which the PUCCH resource indicated by PRI is located/configured.

Figure 51:
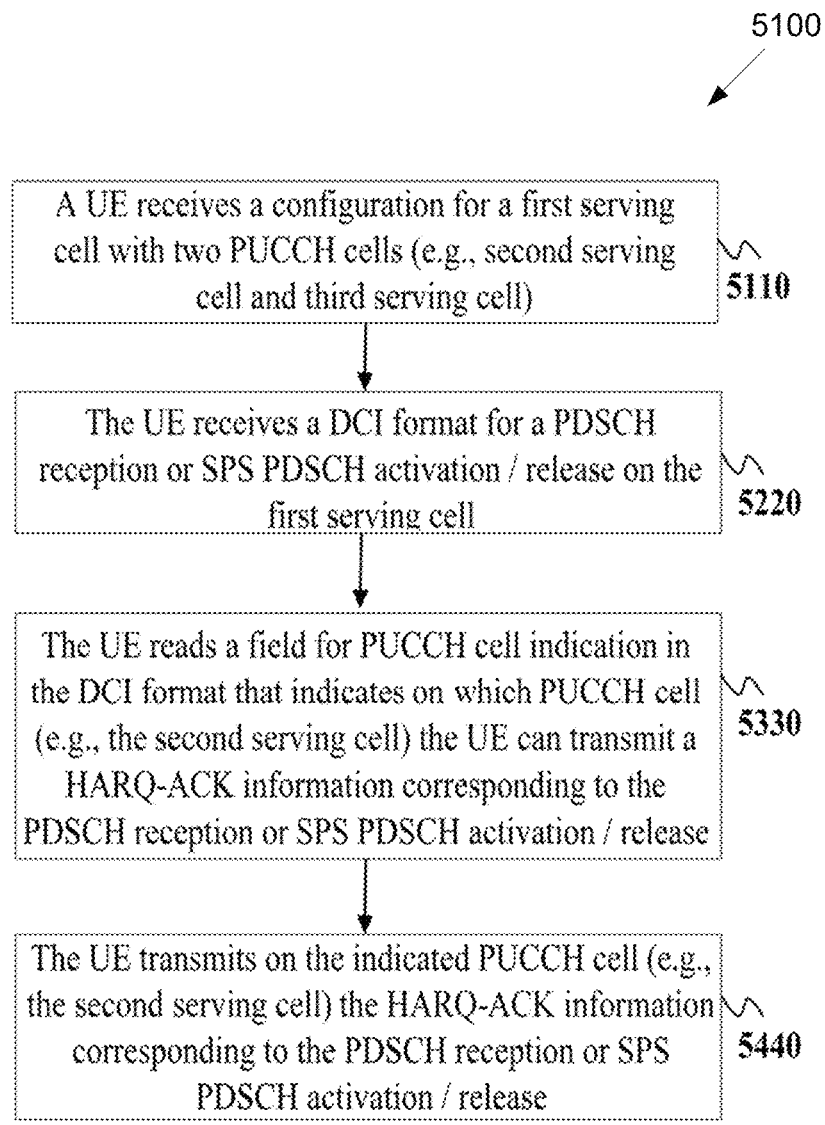
FIG. 51 illustrates a flowchart of a method for a DCI format to indicate a switching of the active PUCCH cell according to embodiments of the present disclosure.

FIG. 51 illustrates a flowchart of a method 5100 for a DCI format to indicate a switching of the active PUCCH cell according to embodiments of the present disclosure. An embodiment of the method 5100 shown in FIG. 51 is for illustration only. One or more of the components illustrated in FIG. 51 can be implemented in specialized circuitry configured to perform the noted functions or one or more of the components can be implemented by one or more processors executing instructions to perform the noted functions.

As illustrated in FIG. 51, a UE receives a configuration for a first serving cell with two PUCCH cells (e.g., second serving cell and third serving cell), at step S110. In one example, the first cell can be same as or different from the second cell and/or the third cell. The UE receives a DCI format for a PDSCH reception or for SPS PDSCH activation/release on the first serving cell, at step S120. The UE reads a field for PUCCH cell indication such as a PGS field (as discussed in embodiment EA-1-2) in the DCI format that indicates on which PUCCH cell (e.g., the second serving cell) the UE can transmit a 6HARQ-ACK information corresponding to the PDSCH reception or SPS PDSCH activation/release, at step S130. In one example, the DCI format additionally includes a PRI field to indicate a PUCCH resource to use for HARQ-ACK information transmission. Accordingly, the UE transmits on the indicated PUCCH cell (e.g., the second serving cell) the HARQ-ACK information corresponding to the PDSCH reception or SPS PDSCH activation/release, at step S140. In one example, the UE transmits the HARQ-ACK information on the PUCCH resource, as indicated by the PRI field in the DCI format, on the PUCCH serving cell indicated by the PGS field in the DCI format.

As aforementioned, in one embodiment of EA-4-2, determination of active PUCCH cell for HARQ-ACK corresponding to SPS PDSCH reception without a corresponding PDCCH is provided. In one embodiment, a UE can be configured with a SPS PDSCH configuration that can include two/multiple PUCCH resources on two/multiple PUCCH serving cells, wherein the PUCCH resources are for transmission of HARQ-ACK information corresponding to SPS PDSCH transmission occasions not associated with a PDCCH, namely starting from a second SPS PDSCH transmission occasion. In one example, the SPS configuration can include a first PUCCH resource on a first PUCCH cell and a second PUCCH resource on a second PUCCH cell. In one example, the SPS configuration can include a first set of one or multiple PUCCH resources for HARQ-ACK transmission on a first PUCCH cell, and a second set of one or multiple PUCCH resources for HARQ-ACK information transmission on a second PUCCH cell.

According to this embodiment, the UE determines an active PUCCH cell for transmission of HARQ-ACK information for the SPS PDSCH reception without a corresponding PDCCH based on an active PUCCH cell indication provided in a DCI format that activates the SPS PDSCH configuration. For example, if a PSG field in a DCI format for SPS PDSCH activation (see embodiment EA-2-4) indicates a first PUCCH cell for transmission of HARQ-ACK information corresponding to an earliest/first SPS PDSCH reception occasion, then the UE transmits HARQ-ACK information corresponding to the other/following SPS PDSCH reception occasions, starting from the second SPS PDSCH transmission occasion, on a same PUCCH cell, namely the first PUCCH cell.

In one example, the UE can continue to do so, i.e., transmit HARQ-ACK information for SPS PDSCH on a first PUCCH cell, until the UE receives an indication for switching an active PUCCH cell, e.g., by a joint indication mechanism as described in embodiments EA-2, EA-2-1, EA-2-2, and so on, and/or by a stand-alone indication mechanism as described in embodiment EA-3, after which the UE transmits the HARQ-ACK information corresponding to SPS PDSCH reception occasions on a newly indicated active PUCCH cell, e.g., a second PUCCH cell.

Figure 52:
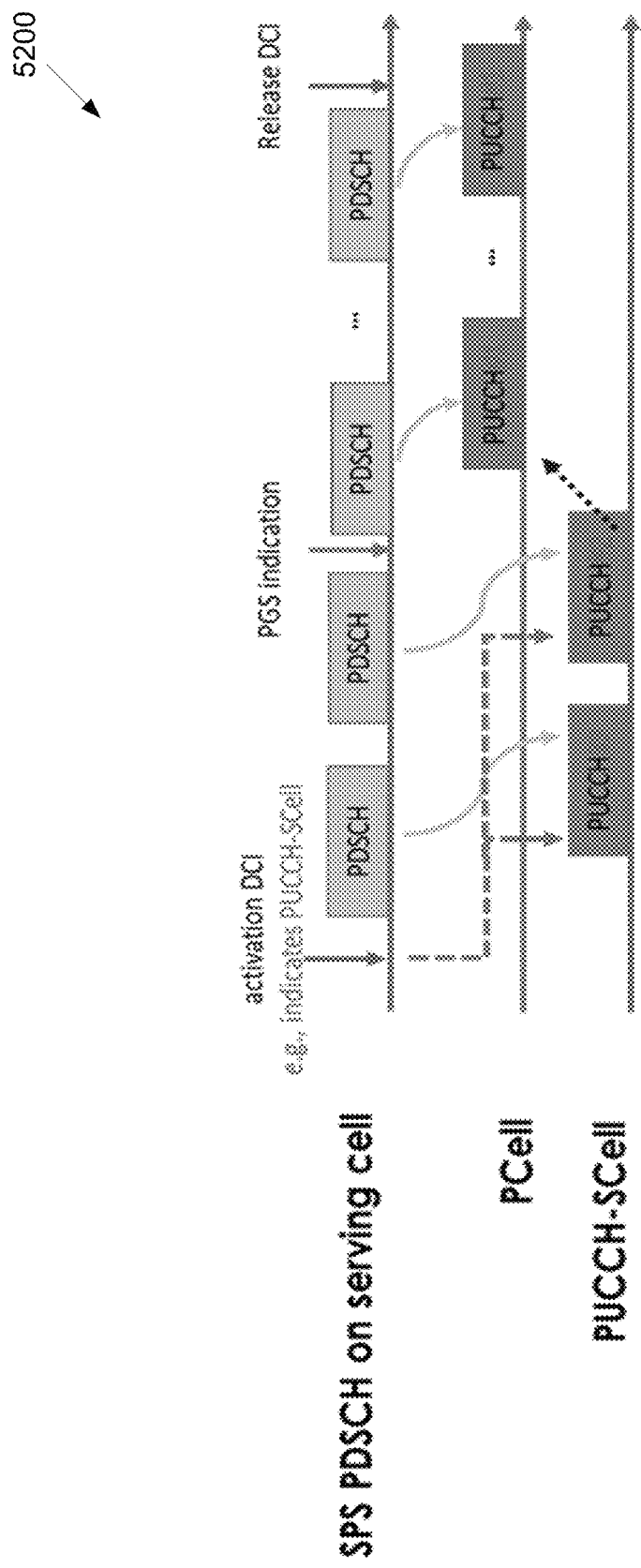
FIG. 52 illustrates an example SPS PDSCH configuration according to embodiments of the present disclosure.

FIG. 52 illustrates an example SPS PDSCH configuration 5200 according to embodiments of the present disclosure. An embodiment of the SPS PDSCH configuration 5200 shown in FIG. 52 is for illustration only.

FIG. 52 shows an example SPS PDSCH configuration on a serving cell with two PUCCH cells, namely PUCCH resource #1 on the PCell and PUCCH resource #2 on the PUCCH-SCell. The activation DCI for the SPS PDSCH configuration can indicate an active PUCCH cell for HARQ-ACK transmission, such as a PUCCH-SCell, and can indicate a different PUCCH resource such a PUCCH resource #3. Accordingly, the UE transmits a HARQ-ACK information for a first SPS PDSCH reception occasion on the PUCCH resource #3 of PUCCH-SCell. In addition, the UE determines an active PUCCH cell for the following SPS PDSCH reception occasions to be the PUCCH-SCell, and so transmits HARQ-ACK information for the next SPS PDSCH reception occasions on the PUCCH-SCell but on the PUCCH resource #2 as provided in the SPS PDSCH configuration. Later on, when the UE receives an indication for switching of an active PUCCH cell for the serving cell, such as a PGS indication, that indicates a new active PUCCH cell to be the PCell, the UE transmits the next HARQ-ACK information corresponding to the next SPS PDSCH reception occasions on the PUCCH resource #1 configured on the PCell.

In one example, when a UE is configured with two or more SPS PDSCH configuration on a DL BWP of a serving cell, the UE can transmit HARQ-ACK information corresponding to different SPS PDSCH configurations on different PUCCH cells. According to this example, a first SPS PDSCH configuration can include a single PUCCH resource for HARQ-ACK information transmission on a first PUCCH cell, and a second SPS PDSCH configuration can include a single PUCCH resource for HARQ-ACK information transmission on a second PUCCH cell.

The RRC information element below shows an example of configuration of multiple lists of PUCCH resources for HARQ-ACK information transmission corresponding to a SPS PDSC configuration, wherein each list is associated with one PUCCH cell. For example, an information element "SPS-PUCCH-AN-List-Cells" can provide up to e.g. 2 lists, associated with up to 2 PUCCH cells, such as PCell and a PUCCH-SCell, as indicated by the parameter "PUCCH-cell" that provides the index of the PUCCH serving cells configured for the SPS PDSCH configuration. Each list "PUCCH-resource-SPS" provides a list of e.g. [4] PUCCH resources including e.g. a PUCCH resource ID and a corresponding payload size, wherein the PUCCH resources belong to the indicated serving cell. In one example, a configuration can have different/configurable number of PUCCH resources for each PUCCH cell. In another example, a configuration of lists of PUCCH resources is per BWPs of PUCCH cells. TABLE 15 shows SPS-Config information elements.

TABLE 15

SPS-Config information element

```
SPS-Config ::= SEQUENCE {
periodicity ENUMERATED {ms10, ms20, ms32, ms40, ms64, ms80, ms128, ms160, ms320,
ms640,
spare6, spare5, spare4, spare3, spare2, spare1},
nrofHARQ-Processes INTEGER (1..8),
SPS-PUCCH-AN-List-Cells SEQUENCE (SIZE(1..nrOfPUCCHcells)) OF SPS-PUCCH-AN-Cell
OPTIONAL,
mcs-Table ENUMERATED {qam64LowSE}OPTIONAL, -- Need S
...,
[[
sps-ConfigIndex-r16 SPS-ConfigIndex-r16 OPTIONAL, -- Cond SPS-List
harq-ProcID-Offset-r16 INTEGER (0..15) OPTIONAL, -- Need R
periodicityExt-r16 INTEGER (1..5120) OPTIONAL, -- Need R
harq-CodebookID-r16 INTEGER (1..2) OPTIONAL, -- Need R
pdsch-AggregationFactor-r16 ENUMERATED {n1 , n2, n4, n8 }OPTIONAL -- Need S
]]
}
SPS-PUCCH-AN-List-Cell ::= SEQUENCE {
PUCCH-cell ServCellIndex,
PUCCH-resource-SPS SEQUENCE (SIZE(144D) OF SPS-PUCCH-AN-r16,
}
SPS-PUCCH-AN-r16 ::= SEQUENCE {
sps-PUCCH-AN-ResourceID-r16 PUCCH-ResourceId,
maxPayloadSize-r16 INTEGER (4..256) OPTIONAL -- Need R
}
nrOfPUCCHcells ::= INTEGER (1.. maxNrOfPUCCHcells),
maxNrOfPUCCHcells ::= [2]
```

Figure 53:
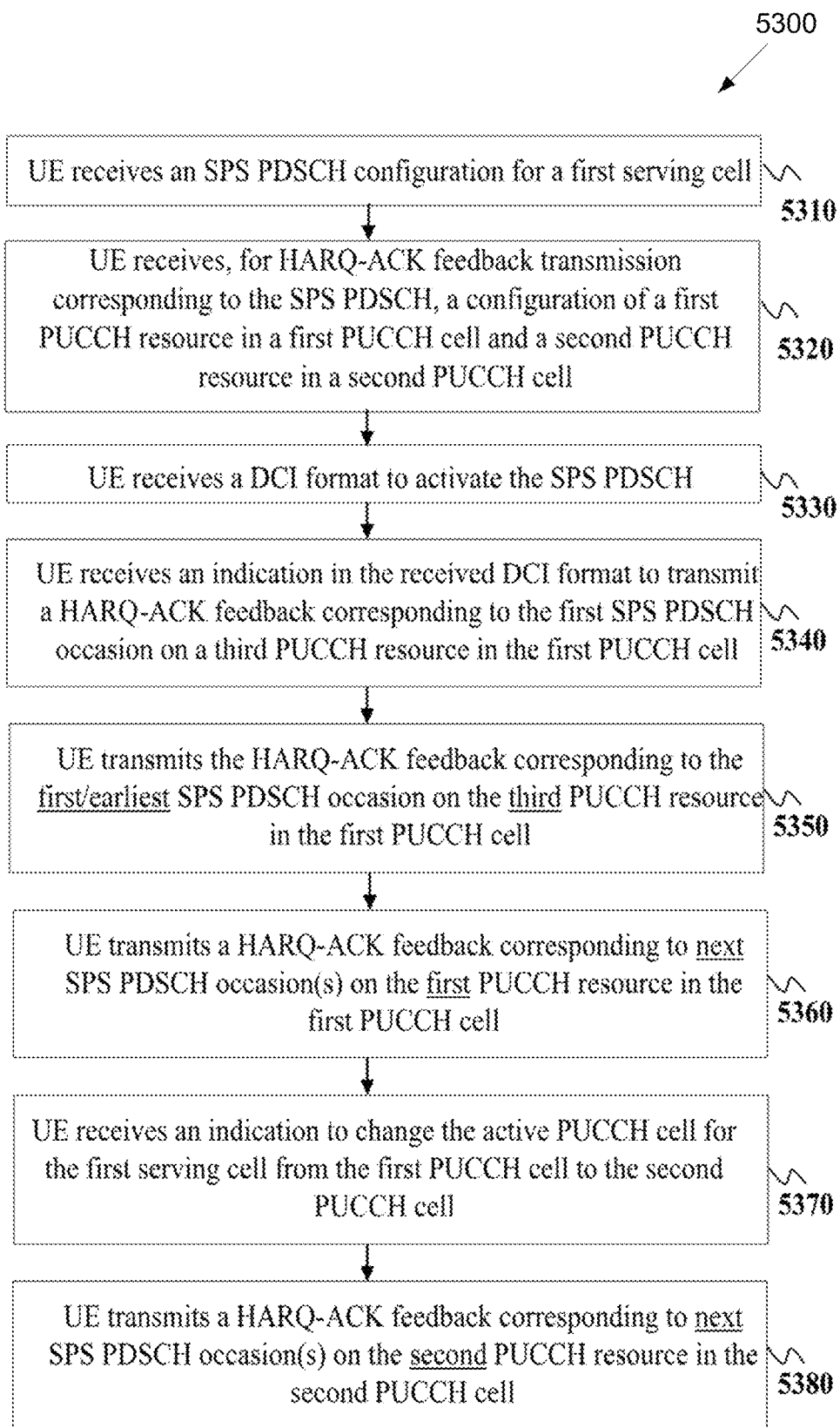
FIG. 53 illustrates a flowchart of a method for determination and change of PUCCH serving cell for HARQ-ACK information transmission corresponding to SPS PDSCH reception according to embodiments of the present disclosure.

FIG. 53 illustrates a flowchart of a method 5300 for determination and change of PUCCH serving cell for HARQ-ACK information transmission corresponding to SPS PDSCH reception according to embodiments of the present disclosure. An embodiment of the method 5300 shown in FIG. 53 is for illustration only. One or more of the components illustrated in FIG. 53 can be implemented in specialized circuitry configured to perform the noted functions or one or more of the components can be implemented by one or more processors executing instructions to perform the noted functions.

As illustrated in FIG. 53, a UE receives an SPS PDSCH configuration for a first serving cell, at step S310. The UE receives, for HARQ-ACK feedback transmission corresponding to the SPS PDSCH, a configuration of a first PUCCH resource in a first PUCCH cell and a second PUCCH resource in a second PUCCH cell, at step S320. The first and second PUCCH cells can be e.g. the PCell and a PUCCH-SCell. The UE receives a DCI format to activate the SPS PDSCH, at step S330. Then, the UE starts to receive SPS PDSCH per activation DCI and the SPS PDSCH configuration.

The UE receives an indication in the received DCI format to transmit a HARQ-ACK feedback corresponding to the first SPS PDSCH occasion on e.g. the first PUCCH. The UE transmits the HARQ-ACK on a PUCCH resource on the first PUCCH cell that is possibly different from the first PUCCH resource configured for SPS PDSCH on that cell (and of course, also different from the second PUCCH resource configured for SPS PDSCH on the second PUCCH cell), which is referred to as a third PUCCH resource on the first PUCCH cell, at step S340. Accordingly, the UE transmits the HARQ-ACK feedback corresponding to the first SPS PDSCH occasion (associated with a PDCCH one that carries the activation DCI format) on the third PUCCH resource in the first PUCCH cell, at step S350. Then, the UE receives the second and following/next SPS PDSCH reception occasion, and accordingly transmits a HARQ-ACK feedback corresponding to next SPS PDSCH occasion(s) in the same PUCCH cell as that indicated by the activation DCI for the very first HARQ-ACK transmission, namely, the still on the first PUCCH cell, and therefore, on the first PUCCH resource which is configured for the first SPS PDSCH, at step S360. Later, for example after a few SPS PDSCH reception occasions, the UE receives an indication to change the active PUCCH cell for the first serving cell from the first PUCCH cell to the second PUCCH cell, at step S370. The UE transmits a HARQ-ACK feedback corresponding to next SPS PDSCH occasion(s) on the second PUCCH resource in the second PUCCH cell, at step S380.

As aforementioned, in one embodiment of EA-4-3, determination of active PUCCH cell for an SR or an LRR is provided. In one embodiment, a UE can be configured with multiple SR and/or LRR configurations corresponding to a serving cell group and/or a MAC entity, wherein each SR/LRR configuration includes two or more PUCCH resources on two or more PUCCH serving cells. In one example, each SR/LRR configuration can include a first PUCCH resource on a first PUCCH cell, e.g., PCell, and a second PUCCH resource on a second PUCCH cell, e.g., a PUCCH-SCell. In another example, each SR/LRR configuration can include a first set of one or multiple PUCCH resources for HARQ-ACK transmission on a first PUCCH cell, and a second set of one or multiple PUCCH resources for HARQ-ACK information transmission on a second PUCCH cell.

In one example, the UE determines an active PUCCH cell for a first/earliest transmission occasion of a SR/LRR configuration and the UE transmits the following SR/LRR transmission occasions on the same active PUCCH cell.

In one example, the UE is configured with a first active PUCCH cell for SR/LRR (see embodiment EA-1-1), so the UE transmits a first, i.e., earliest, SR/LRR transmission occasion on the configured first active PUCCH cell for SR/LRR and continues to do so for the following SR/LRR transmission occasions. In one example, a first active PUCCH cell for SR/LRR can be a single, same first active PUCCH cell for all SR/LRR configurations of a cell group/

MAC entity, or different first active PUCCH cells for different SR/LRR configurations of the cell group/MAC entity.

In another example, the UE determines an active PUCCH cell for the first/earliest transmission occasion of the SR/LRR configuration based on a timing such as slot index of the first/earliest occasion of SR/LRR transmission, e.g., using a predetermined rule or a configured mapping that maps slot indices to active PUCCH cells.

In another example, a current active PUCCH cell for a given serving cell from the serving cell group and/or associated with the corresponding MAC entity is used as an active PUCCH cell for a first/earliest transmission occasion of a SR/LRR configuration. For example, a serving cell with lowest/highest cell index or with a smallest/highest numerology or a serving cell with a higher priority level, is selected.

In one example, the UE transmits all transmission occasions of a SR/LRR configuration on the same active PUCCH cell determined for the first/earliest transmission occasion. In another example, the UE transmits transmission occasions of a SR/LRR configuration on the same active PUCCH cell determined for the first/earliest transmission occasion, until the UE receives a PGS indication field (see embodiment EA-1-2) that indicates a change of the active PUCCH cell.

In one example, the UE determines an active PUCCH cell for transmission of SR/LRR based on a timing of a UCI transmission, such as transmission occasion index and/or a slot index for the UCI transmission, e.g., based on at least one or more of a predetermined rule/method and a configured time pattern, such as a periodic time pattern, or an explicit "irregular" time pattern, that possibly depends on a UE ID and/or an initialization seed for a random number generator (e.g., Embodiment EA-2-2).

In one example, the UE solely follows the provided time pattern as described above. In another example, the UE can receive a PGS indication field (see embodiment EA-1-2) that provides an indication for switching to a new active PUCCH cell for UCI transmission, in which case, the UE follows discards the provided time pattern and follows the PGS indication field (only for one/a number of following UCI transmission occasion(s) or for the entire remaining UCI transmission occasions from the group of UCI transmission occasions).

Figures 54, 55:
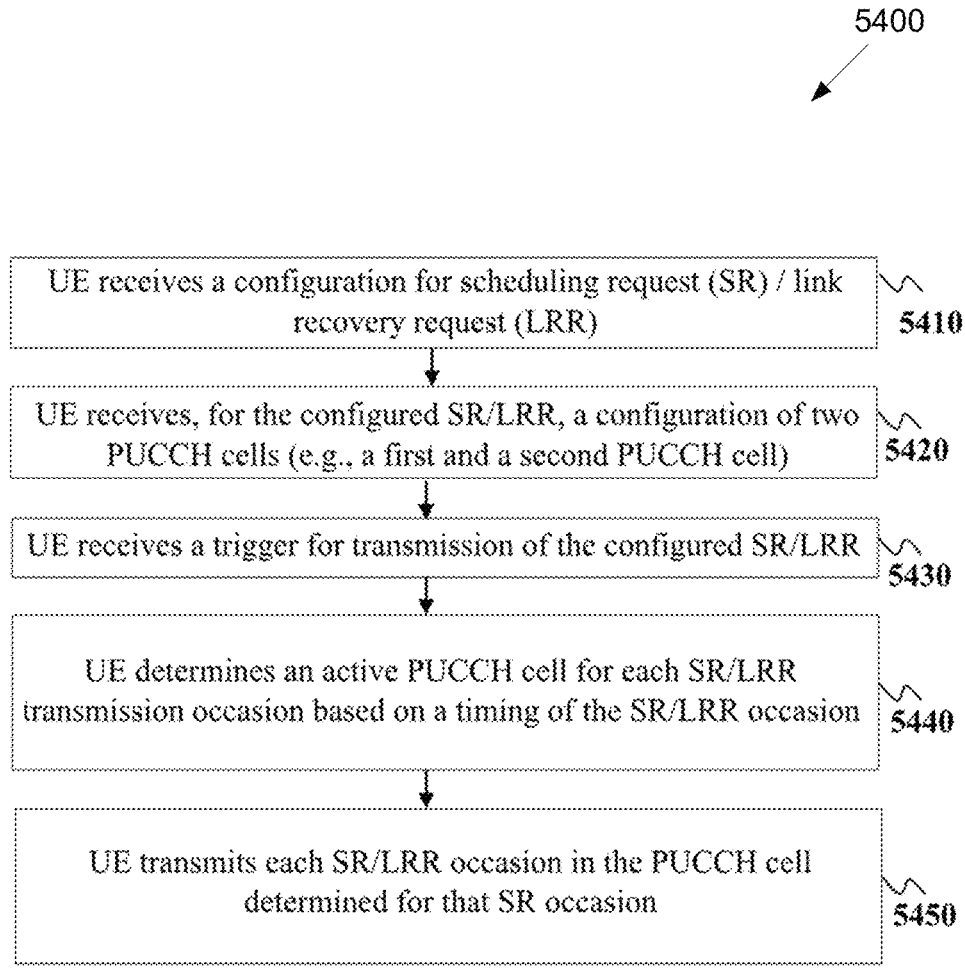
FIG. 54 illustrates a flowchart of a method for usage of a predetermined or configured time pattern for SR/LRR transmission of multiple PUCCH cells according to embodiments of the present disclosure.
FIG. 55 illustrates an example MAC-CE command for activation/deactivation of SP-CSI reporting on PUCCH according to embodiments of the present disclosure.

FIG. 54 illustrates a flowchart of a method 5400 for usage of a predetermined or configured time pattern for SR/LRR transmission of multiple PUCCH cells according to embodiments of the present disclosure. An embodiment of the method 5400 shown in FIG. 54 is for illustration only. One or more of the components illustrated in FIG. 54 can be implemented in specialized circuitry configured to perform the noted functions or one or more of the components can be implemented by one or more processors executing instructions to perform the noted functions.

As illustrated in FIG. 54, a UE receives a configuration for SR/LRR, at step S410. The UE receives, for the configured SR/LRR, a configuration of two PUCCH cells (e.g., a first and a second PUCCH cell), at step S420. In one example, the UE receives a configuration of a first PUCCH resource on the first PUCCH cell and a second PUCCH resource on the second PUCCH cell for transmission of the configured SR/LRR. The UE receives a trigger for transmission of the configured SR/LRR, at step S430. In one example, a transmission of the SR/LRR configuration can include multiple transmission occasions. The UE determines an active PUCCH cell for each SR/LRR transmission occasion based on a timing (such as a slot index) of the SR/LRR occasion, at step S440. The UE transmits each SR/LRR occasion in the PUCCH cell determined for that SR occasion, at step S450. In one example, the UE transmits each SR/LRR occasion in the PUCCH resource corresponding to the PUCCH cell determined for that SR occasion.

In one example, when a UE is configured with two or more SR/LRR configurations corresponding to a same serving cell group and/or a MAC entity, the UE can transmit different SR/LRR configurations on different PUCCH cells. According to this example, a first SR/LRR configuration can include a single PUCCH resource on a first PUCCH cell, and a second SR/LRR configuration can include a single PUCCH resource on a second PUCCH cell.

As aforementioned, in one embodiment of EA-4-4, determination of active PUCCH cell for CSI report is provided. In one embodiment, a UE can be configured, on two or more PUCCH serving cells, with CSI report configurations corresponding to a same serving cell. For example, for reporting CSI measurements corresponding to a same given/third serving cell, a UE can be configured with a first set including a first number of CSI report configurations on a first PUCCH cell such as the PCell, and also configured with a second set including a second number of CSI report configurations on a second PUCCH cell such as a PUCCH-SCell.

In one example, there is an implicit or explicit linkage between CSI report configurations corresponding to a same serving cell on the two PUCCH cells. For example, the UE can be configured with a first CSI reporting configuration on a first PUCCH cell such as the PCell and a second CSI report configuration on a second PUCCH cell such as a PUCCH-SCell, wherein the first and the second CSI reporting configurations are identical, including a same value for a parameter "carrier" to refer to a same serving cell that includes the CSI-RS resources to be measured and a same value(s) for parameter "CSI-ResourceConfigId" for channel measurement, interference measurement and so on, a same value for CSI report type such as periodic CSI reporting or semi-persistent CSI reporting on PUCCH, and same values for periodicity and slot offset of the CSI report; the only difference is that the first configuration allows the UE to send the CSI report on the first PUCCH cell, while the second configuration allows the UE to send the CSI report on the second PUCCH cell.

In another example, only some of the parameters are the same between the two configuration on the two PUCCH cells, e.g., only the serving cell, i.e., the parameter "carrier" parameter, and the CSI-RS resource configuration, i.e., the parameter "CSI-ResourceConfigId," have the same values between the two linked CSI reports, while other parameters such as report type, periodicity, and slot offset can be different. In yet another example, the linkage is explicitly indicated, e.g., two CSI reports for a given serving cell on two PUCCH cells are linked when two CSI reports have the same "CSI-ReportConfigId," and/or a separate parameter is used to indicate a linkage of two CSI reporting configurations on two PUCCH cells.

According to this embodiment, the UE determines an active PUCCH cell to transmit a CSI report corresponding to a given serving cell (and a given CSI-RS resource configuration) based on a predetermined or configured time pattern and/or based on a network signaling.

For example, for periodic CSI reporting, the UE can use a predetermined or configured time pattern between slot indices and/or CSI reporting occasion timing/slots and the set of PUCCH cells to determine an active PUCCH cell. For example, the UE performs CSI reporting based on a first CSI reporting configuration from the two linked CSI reporting configurations which is included in a determined active PUCCH cell. In another example, the UE switches between the two PUCCH cells and the corresponding linked CSI report configurations to report CSI for the given serving cell (and the given CSI-RS resource configuration).

In another example, for SP-CSI reporting on PUCCH, the UE receives a MAC-CE command for activation/deactivation of SP-CSI reporting on PUCCH, wherein the MAC-CE command includes an indication for an active PUCCH cell from the two PUCCH cells on which the CSI reporting configuration is included. Accordingly, the UE reports CSI using one out of the two linked CSI report configurations that is included in the indicated active PUCCH cell.

In one example, if the UE receives a PGS indication field (see embodiment EA-1-2), then the UE switches the active PUCCH cell and reports the CSI measurements on the newly indicated active PUCCH cell and using the corresponding linked CSI reporting configuration on that PUCCH cell.

FIG. 55 illustrates an example MAC-CE command 5500 for activation/deactivation of SP-CSI reporting on PUCCH according to embodiments of the present disclosure. An embodiment of the MAC-CE command 5500 shown in FIG. 55 is for illustration only.

Such a MAC-CE includes for example an index for the serving cell and DL BWP on which the CSI-RS resource(s) is configured, and a list of SP-CSI reporting on PUCCH configurations that are associated with that CSI-RS resource (s) with an indication whether the configuration is activated or deactivated. For example, the MAC-CE includes an index for an active PUCCH cell and the UL BWP on which PUCCH resources for SP-CSI reporting are configured.

FIG. 56 illustrates a flowchart of a method 5600 for determination of SP-CSI report on PUCCH on multiple PUCCH cells according to embodiments of the present disclosure. An embodiment of the method 5600 shown in FIG. 56 is for illustration only. One or more of the components illustrated in FIG. 56 can be implemented in specialized circuitry configured to perform the noted functions or one or more of the components can be implemented by one or more processors executing instructions to perform the noted functions.

As illustrated in FIG. 56, a UE receives, for a serving cell, a first SP-CSI reporting on PUCCH configuration on a first PUCCH cell and a second linked SP-CSI reporting on PUCCH configuration on a first PUCCH cell, at step S610. For example, the linkage can refer to one or more of the following, e.g., the first and the second SP-CSI reporting on PUCCH configurations corresponds to a same serving cell, and a same CSI-RS resource configuration, and a same CSI reporting type, a same periodicity, a same slot offset, and a same CSI reporting configuration index, and so on. The UE receives a MAC-CE command to activate the SP-CSI reporting on PUCCH, at step S620. The UE receives an indication within the received MAC-CE command on which PUCCH cell to transmit SP-CSI, e.g., on the first PUCCH cell, at step S630. The UE transmits the SP-CSI report on the indicated PUCCH cell, e.g., on the first PUCCH cell using the first SP-CSI reporting on PUCCH configuration, at step S640. The UE transmits an indication for change of active PUCCH cell for the serving cell, e.g., from the first PUCCH cell to the second PUCCH cell, at step S650. Accordingly, the UE transmits the SP-CSI report on the newly indicated PUCCH cell, e.g., on the second PUCCH cell using the second SP-CSI reporting on PUCCH configuration, at step S660.

As aforementioned, in one embodiment of EA-4-5, determination of active PUCCH cell for UCI multiplexing is provided. In on embodiment, when a UE is configured with two or multiple PUCCH cells for UCI transmission, and when multiple UCIs overlap in time, e.g., occur in a same slot, a single multiplexing of the multiple UCIs can be transmitted in a single active PUCCH cell and/or two or more of the multiple UCIs or multiplexing thereof can be transmitted on two or more active PUCCH cells. In one example, the multiple UCIs can be of a same type and/or of different types. In another example, the multiple UCIs can correspond to a same serving cell, and/or can correspond to different serving cells.

In one example, a UE does not expect to receive multiple UCI triggers such as multiple L1/L2 network signalings (e.g., HARQ-ACK feedback information triggered by a scheduling DCI or activation/release DCI for SPS PDSCH, and/or SP-CSI reporting triggered by a MCA-CE activation command) that trigger multiple overlapping UCI transmissions, e.g. in a same slot, on different active PUCCH cells. In other words, when multiple UCI triggers such as multiple L1/L2 network signaling trigger multiple UCI transmissions (corresponding to a same serving cell) that overlap in time, e.g., in a same slot, then the UE expects that the network signals indicate a same active PUCCH cell for all UCI overlapping UCI transmissions. In another example, same principle applies to the case of UCIs triggered by higher layer indication/configuration, such as SR, LRR, and/or P-CSI reporting, and/or UCIs some triggered by network signaling and some by higher layer indication/configuration.

In one example, it is possible that multiple UCIs triggered by network signaling and/or higher layer indication/configuration and/or a combination thereof, overlap in time, e.g., in a same slot, and correspond to different active PUCCH cells, e.g., some are indicated/determined to be transmitted on the PCell and others to be transmitted on a PUCCH-SCell.

For example, a DCI that schedules a PDSCH reception on a serving cell indicates PCell as the active PUCCH cell for HARQ-ACK information transmission, while a MAC-CE that activates a SP-CSI reporting corresponding to the same serving cell indicates PUCCH-SCell to carry the SP-CSI report, and the HARQ-ACK is indicated to be in a same slot with at least one of the SP-CSI reporting transmission occasions.

In another example, the UE is configured with a SR configuration and a SPS PDSCH configuration, and HARQ-ACK information corresponding to at least one SPS PDSCH reception occasion occurs in a same slot as at least one transmission occasion of the SR configuration, wherein the UE determines PCell as the active PUCCH cell for transmission of the HARQ-ACK information corresponding to the at least one SPS PDSCH reception occasion, and determines a PUCCH-SCell as the active PUCCH cell for the at least one transmission occasion of the SR configuration.

In one example, the UE can multiplex a first group of UCIs that overlap in a same slot on a first PUCCH cell such as the PCell and can multiplex a second group of UCIs that overlap in the same slot on a second PUCCH cell such as a PUCCH-SCell, so that UCI multiplexing occurs separately on the two/multiple PUCCH cells based on existing/legacy rules for UCI multiplexing. According to this example, the UE can transmit, in a same slot, multiple UCIs, e.g., multiple UCIs corresponding to same/different serving cell(s), on two or more PUCCH cells.

In another example, the UE can multiplex the first group of UCIs and the second group of UCIs on a same PUCCH cell, e.g., multiplex all overlapping UCIs on the PCell or e.g. multiplex all overlapping UCIs on a PUCCH-SCell. According to this example, the UE can determine an active PUCCH cell for the overall multiplexed UCI based on existing/legacy UCI multiplexing rules and/or based on a priority order between the PUCCH cells. For example, if the UE would transmit an SR occasion on a first PUCCH cell such a PCell, and the UE would transmit a HARQ-ACK information on a second PUCCH cell such as a PUCCH-SCell, and the SR occasion would be transmitted in a same slot as the HARQ-ACK information, then the UE multiplexes the SR with the HARQ-ACK information on the PUCCH cell that carries the HARQ-ACK, namely the second PUCCH cell, e.g., the PUCCH-SCell.

In another example, the UE can be provided by a priority order between PUCCH cell, e.g., predetermined priority order in the specification and/or configure priority level/order/index among the configured PUCCH cells, e.g., that PCell has higher priority than a PUCCH-SCell. Then, in the aforementioned example for multiplexing of SR with HARQ-ACK information, then the UE multiplexes the SR with the HARQ-ACK information on the first PUCCH cell namely PCell that has higher priority order over the second PUCCH cell namely the PUCCH-SCell.

As aforementioned, in one embodiment of EA-5, HARQ-ACK codebook generation based on indication(s) for switching of active PUCCH cell(s) is provided. In one embodiment, a UE can generate a semi-static and/or dynamic HARQ codebook(s) based on a set of serving cells that are associated with a same active PUCCH cell (for HARQ-ACK information transmission). According to this example, the number of serving cells that belong to a HARQ codebook can change over time, based on the received indications for switching active PUCCH cell(s). In one example, UE processing and/or timeline limitations are utilized when constructing a codebook based on indication(s) for switching of active PUCCH cell(s).

The disclosure can be applicable to NR specifications Rel-17/18 to provide enhancements for PUCCH groups in a CA operation and enable dynamic and adaptive mechanisms for offloading of control overhead corresponding to different serving cells among the PUCCH serving cells, such as PCell and PUCCH-SCell(s). The network benefits from the flexibility of changing the PUCCH cell association dynamically, so that a serving cell can potentially transmit UCI on two or more PUCCH cells, namely, a different PUCCH cell at each time.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for receiving physical downlink control channels (PDCCHs), the method comprising:
   receiving first information for first search space sets associated with receptions of first PDCCHs on a first scheduling cell, wherein:
      the first PDCCHs have subcarrier spacing (SCS) configuration $\mu 1$,
      a first PDCCH from the first PDCCHs provides a first downlink control information (DCI) format,
      the first DCI format schedules a first physical downlink shared channel (PDSCH) reception or a first physical uplink shared channel (PUSCH) transmission on a scheduled cell, and
      the first DCI format is from a first set of DCI formats;
   receiving second information for second search space sets associated with receptions of second PDCCHs on a second scheduling cell, wherein:
      the second PDCCHs have SCS configuration $\mu 2$,
      a second PDCCH from the second PDCCHs provides a second DCI format,
      the second DCI format schedules a second PDSCH reception or a second PUSCH transmission on the scheduled cell, and
      the second DCI format is from a second set of DCI formats, wherein the second set of DCI formats is different from the first set of DCI formats; and
   determining:
      a first number of scheduled cells associated with scheduling cells having PDCCH receptions with SCS configuration $\mu 1$, wherein, when $\mu 1 = \mu 2$, the scheduled cell is counted once towards the first number of scheduled cells, and
      a second number of scheduled cells associated with scheduled cells having PDCCH receptions with SCS configuration $\mu 2$ wherein, when $\mu 1 < \mu 2$, the scheduled cell is counted once towards a sum of:
         the first number of scheduled cells, and
         the second number of scheduled cells.

2. The method of claim 1, wherein the first scheduling cell is a primary cell (PCell), the second scheduling cell is a secondary cell (SCell), and the scheduled cell is the PCell.

3. The method of claim 1, wherein the first scheduling cell and the scheduled cell is a same cell.

4. The method of claim 1, further comprising:
   determining a number of PDCCH receptions over a number of non-overlapping control channel elements (CCEs) in a slot of the first scheduling cell based on the second search space sets, wherein:
      the number of PDCCH receptions does not exceed $(1-\alpha) \cdot \min(M_{PDCCH}^{total,slot,\mu 1}, M_{PDCCH}^{max,slot,\mu 1})$,
      the number of non-overlapping CCEs does not exceed $(1-\alpha) \cdot \min(C_{PDCCH}^{total,slot,\mu 1}, C_{PDCCH}^{max,slot,\mu 1})$,
      $\alpha$ is a scaling factor,
      $M_{PDCCH}^{total,\,slot,\mu 1}$ and $C_{PDCCH}^{total,\,slot,\mu 1}$ are respectively a total number of PDCCH receptions and a total number of non-overlapping CCEs per slot for the first scheduling cell,
      $M_{PDCCH}^{max,\,slot,\mu 1}$ and $C_{PDCCH}^{total,\,slot,\mu 1}$ are respectively a maximum number of PDCCH receptions and a maximum number of non-overlapping CCEs per slot for the first scheduling cell, and
      $\mu 1 \leq \mu 2$.

5. The method of claim 4, further comprising receiving third information indicating the scaling factor $\alpha$.

6. The method of claim 4, wherein $M_{PDCCH}^{total,\,slot,\mu1}$ and $C_{PDCCH}^{total,\,slot,\mu1}$ are determined based on the first number of scheduled cells.

7. The method of claim 4, wherein:
α=1 when the second scheduling cell is a deactivated cell or an active downlink (DL) bandwidth part (BWP) of the second scheduling cell is a dormant BWP.

8. A user equipment (UE) comprising:
a transceiver configured to receive:
first information for first search space sets associated with receptions of first physical downlink control channels (PDCCHs) on a first scheduling cell, wherein:
the first PDCCHs have subcarrier spacing (SCS) configuration µ1,
a first PDCCH from the first PDCCHs provides a first downlink control information (DCI) format,
the first DCI format schedules a first physical downlink shared channel (PDSCH) reception or a first physical uplink shared channel (PUSCH) transmission on a scheduled cell, and
the first DCI format is from a first set of DCI formats;
second information for second search space sets associated with receptions of second PDCCHs on a second scheduling cell, wherein:
the second PDCCHs have SCS configuration µ2,
a second PDCCH from the second PDCCHs provides a second DCI format,
the second DCI format schedules a second PDSCH reception or a second PUSCH transmission on the scheduled cell, and
the second DCI format is from a second set of DCI formats, wherein the second set of DCI formats is different from the first set of DCI formats; and
a processor operably coupled to the transceiver, the processor configured to:
determine a first number of scheduled cells associated with scheduling cells having PDCCH receptions with SCS configuration µ1, wherein, when µ1=µ2, the scheduled cell is counted once towards the first number of scheduled cells, and
determine a second number of scheduled cells associated with scheduling cells having PDCCH receptions with SCS configuration µ2 wherein, when µ1<µ2, the scheduled cell is counted once towards a sum of:
the first number of scheduled cells, and
the second number of scheduled cells.

9. The UE of claim 8, wherein the first scheduling cell is a primary cell (PCell), the second scheduling cell is a secondary cell (SCell), and the scheduled cell is the PCell.

10. The UE of claim 8, wherein the first scheduling cell and the scheduled cell is a same cell.

11. The UE of claim 8, wherein the processor is further configured to:
determine a number of PDCCH receptions over a number of non-overlapping control channel elements (CCEs) in a slot of the first scheduling cell based on the second search space sets, wherein:
the number of PDCCH receptions does not exceed $(1-\alpha) \cdot \min(M_{PDCCH}^{total,slot,\mu1}, M_{PDCCH}^{max,slot,\mu1})$,
the number of non-overlapping CCEs does not exceed $(1-\alpha) \cdot \min(C_{PDCCH}^{total,slot,\mu1}, C_{PDCCH}^{max,slot,\mu1})$,
α is a scaling factor,
$M_{PDCCH}^{total,slot,\mu1}$ and $C_{PDCCH}^{total,slot,\mu1}$ are respectively a total number of PDCCH receptions and a total number of non-overlapping CCEs per slot for the first scheduling cell,
$M_{PDCCH}^{max,slot,\mu1}$ and $C_{PDCCH}^{max,slot,\mu1}$ are respectively a maximum number of PDCCH receptions and a maximum number of non-overlapping CCEs per slot for the first scheduling cell, and
µ1≤µ2.

12. The UE of claim 11, wherein the transceiver is further configured to receive third information indicating the scaling factor α.

13. The UE of claim 11, wherein the processor is further configured to determine $M_{PDCCH}^{total,slot,\mu1}$ and $C_{PDCCH}^{total,slot,\mu1}$ based on the first number of scheduled cells.

14. The UE of claim 11, wherein:
α=1 when the second scheduling cell is a deactivated cell or an active downlink (DL) bandwidth part (BWP) of the second scheduling cell is a dormant BWP.

15. A base station comprising:
a transceiver configured to transmit:
first information for first search space sets associated with receptions of first physical downlink control channels (PDCCHs) on a first scheduling cell, wherein:
the first PDCCHs have subcarrier spacing (SCS) configuration µ1,
a first PDCCH from the first PDCCHs provides a first downlink control information (DCI) format,
the first DCI format schedules a first physical downlink shared channel (PDSCH) reception or a first physical uplink shared channel (PUSCH) transmission on a scheduled cell, and
the first DCI format is from a first set of DCI formats;
second information for second search space sets associated with receptions of second PDCCHs on a second scheduling cell, wherein:
the second PDCCHs have SCS configuration µ2,
a second PDCCH from the second PDCCHs provides a second DCI format,
the second DCI format schedules a second PDSCH reception or a second PUSCH transmission on the scheduled cell, and
the second DCI format is from a second set of DCI formats, wherein the second set of DCI formats is different from the first set of DCI formats; and
a processor operably coupled to the transceiver, the processor configured to:
determine a first number of scheduled cells associated with scheduling cells having PDCCH receptions with SCS configuration µ1, wherein, when µ1=µ2, the scheduled
cell is counted once towards the first number of scheduled cells, and
determine a second number of scheduled cells associated with scheduling cells having PDCCH receptions with SCS configuration µ2 wherein, when µ1<µ2, the scheduled cell is counted once towards a sum of:
the first number of scheduled cells, and
the second number of scheduled cells.

16. The base station of claim 15, wherein the first scheduling cell is a primary cell (PCell), the second scheduling cell is a secondary cell (SCell), and the scheduled cell is the PCell.

17. The base station of claim 15, wherein the first scheduling cell and the scheduled cell is a same cell.

18. The base station of claim 15, wherein the processor is further configured to:
determine a number of PDCCH receptions over a number of non-overlapping control channel elements (CCEs) in a slot of the first scheduling cell based on the second search space sets, wherein:

the number of PDCCH receptions does not exceed $(1-\alpha) \cdot \min(M_{PDCCH}^{total,slot,\mu 1}, M_{PDCCH}^{max,slot,\mu 1})$, the number of non-overlapping CCEs does not exceed $(1-\alpha) \cdot \min(C_{PDCCH}^{total,slot,\mu 1}, C_{PDCCH}^{max,slot,\mu 1})$, $\alpha$ is a scaling factor, $M_{PDCCH}^{total,slot,\mu 1}$ and $C_{PDCCH}^{total,slot,\mu 1}$ are respectively a total number of PDCCH M PDCCH receptions and a total number of non-overlapping CCEs per slot for the first scheduling cell, $M_{PDCCH}^{max,slot,\mu 1}$ and $C_{PDCCH}^{max,slot,\mu 1}$ are respectively a maximum number of PDCCH receptions and a maximum number of non-overlapping CCEs per slot for the first scheduling cell, and $\mu 1 < \mu 2$.

19. The base station of claim 18, wherein the transceiver is further configured to transmit third information indicating the scaling factor $\alpha$.

20. The base station of claim 18, wherein the processor is further configured to determine $M_{PDCCH}^{total,slot,\mu 1}$ and $C_{PDCCH}^{total,slot,\mu 1}$ based on the first number of scheduled cells.

* * * * *